(12) United States Patent
Braunstein

(10) Patent No.: US 8,028,822 B2
(45) Date of Patent: Oct. 4, 2011

(54) AUTOMATIC DISTRIBUTED VENDING SYSTEM

(76) Inventor: Zachary L. Braunstein, San Marcos, CA (US)

( * ) Notice: Subject to any disclaimer, the term of this patent is extended or adjusted under 35 U.S.C. 154(b) by 845 days.

(21) Appl. No.: 11/320,420

(22) Filed: Dec. 28, 2005

(65) Prior Publication Data
US 2006/0293784 A1 Dec. 28, 2006

Related U.S. Application Data

(60) Provisional application No. 60/694,269, filed on Jun. 27, 2005, provisional application No. 60/708,593, filed on Aug. 16, 2005.

(51) Int. Cl.
*B65G 47/40* (2006.01)
*B65G 17/36* (2006.01)
*B65G 35/00* (2006.01)
*B65H 5/00* (2006.01)

(52) U.S. Cl. ........ 198/706; 198/710; 198/712; 198/708; 198/711; 198/370.05; 221/234; 74/84

(58) Field of Classification Search .................. 198/706, 198/370.05, 710, 712, 708, 711; 74/84; 221/234
See application file for complete search history.

(56) References Cited

U.S. PATENT DOCUMENTS

| | | | |
|---|---|---|---|
| 4,890,722 A * | 1/1990 | Gough .......................... | 198/706 |
| 6,388,873 B1 * | 5/2002 | Brooks et al. ............ | 361/679.34 |
| 6,554,105 B2 * | 4/2003 | Brown et al. .................... | 186/41 |
| 2003/0233165 A1 * | 12/2003 | Hein et al. ..................... | 700/216 |
| 2007/0175734 A1 * | 8/2007 | Stang Hauge et al. ........ | 198/706 |
| 2007/0209458 A1 * | 9/2007 | Bruland ......................... | 74/84 R |
| 2008/0314991 A1 * | 12/2008 | Gelbman ....................... | 235/492 |

* cited by examiner

*Primary Examiner* — Gene O. Crawford
*Assistant Examiner* — Rakesh Kumar

(57) ABSTRACT

Invention describes apparatus automating distributed item processing including pharmacy. Apparatus includes: portable vending cartridges, automatic vending modules, controllers. Cartridge contains conveyor transporting items inside carriers. Cartridges slide-into receptacles inside vending module. Controllers in real-time monitor presence of cartridges; inventory of carries, items; and execute controls of each cartridge and vending module including: indexing conveyors; loading and/or unloading items into/from carriers; maintaining items within specifications: environment, handling, safety with reports confirming compliance. Controllers execute in real-time optimization algorithm achieving required performance: rates of item loading/unloading, power consumption. Pharmacy applications include cartridges handling containers with medications. Apparatus automates distributed processing of medications: at one centralized location cartridges are filled with medications and then transported to assigned destinations for insertion into designated modules for dispensing medications to authorized customers. Number of apparatuses could be configured as closed-loop real-time process control system aimed at achieving optimum utilization of resources and delivering products within specifications.

5 Claims, 68 Drawing Sheets

Figure 1:
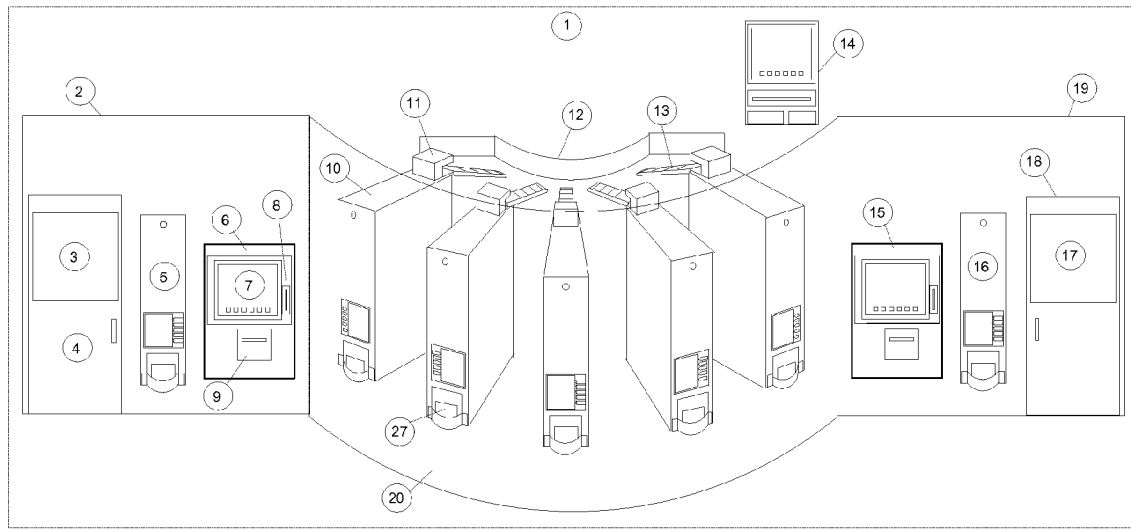

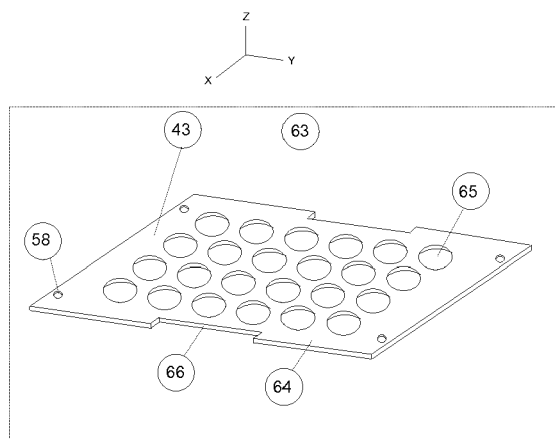
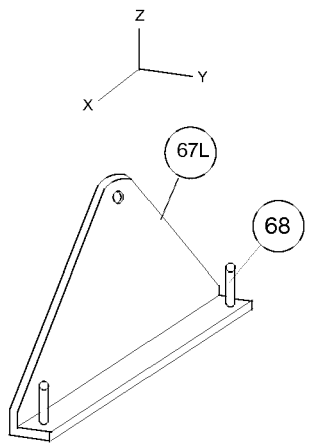
FIG. 20                FIG. 21
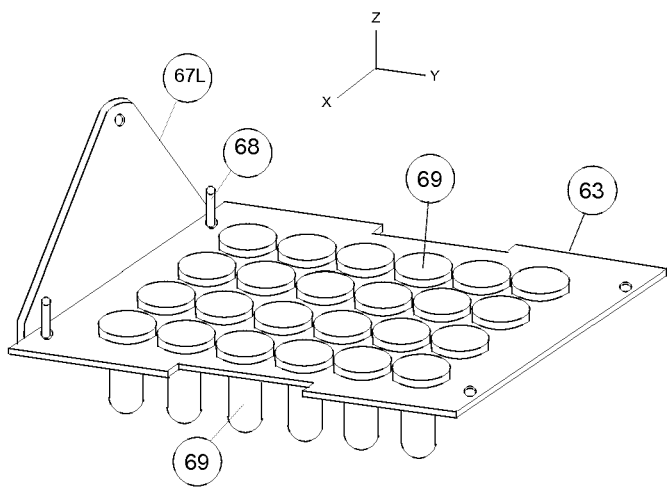
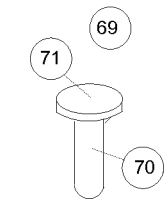
FIG. 22                FIG. 23

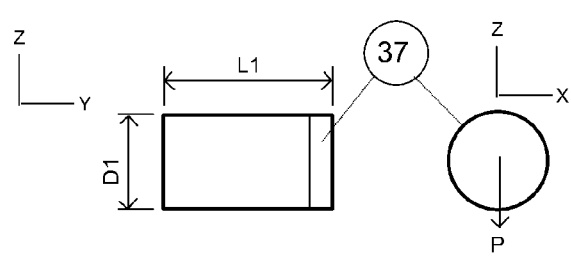
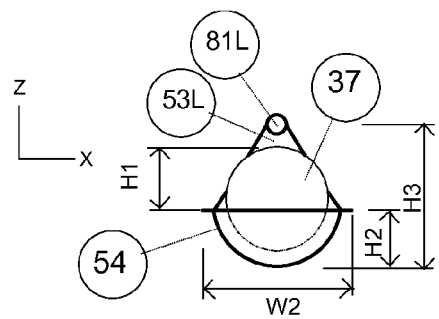
FIG. 24          FIG. 25
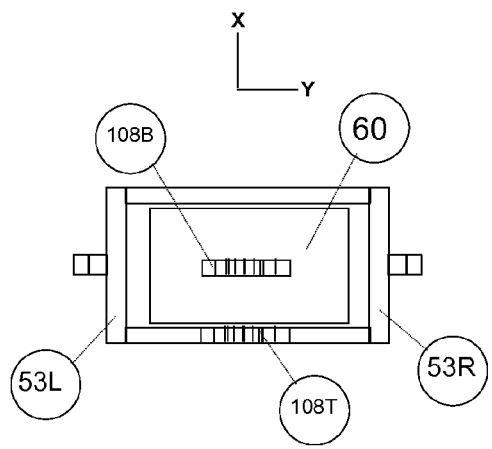
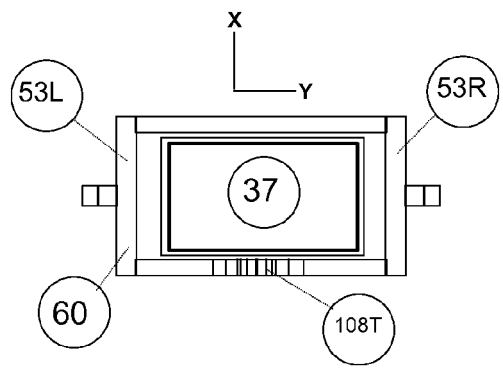
FIG. 26          FIG. 27
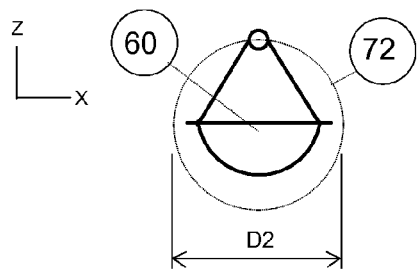
FIG. 28

AUTOMATIC DISTRIBUTED VENDING SYSTEM

CROSS-REFERENCE TO RELATED APPLICATIONS

I claim the benefits of Provisional Application No. 60/694,269 filed on Jun. 27, 2005, title "Automatic Distributed Vending System". I also claim benefits of Provisional Application No. 60/708,593 filed on Aug. 16, 2005, title "Automatic Distributed Vending System".

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

Many businesses periodically perform number of processes or operations, in order to sell products and achieve business objectives. Majority of businesses deliver products in a form of a physical entity vs. the ones that deliver products in a form of an electronic-type service. Products of physical entity require packaging and distribution to their potential users, which may purchase them, and as result, generate revenue for business.

Packaging and distribution of products to potential customers could be a significant expense for business. There are number of automation tools available in regard to product packaging and distribution. These tools are bulky, not automation friendly and lack flexibility to be optimized for a specific application in terms of efficiency and start-up expenses. Most of the existing vending machines could only serve one customer at a time, hence when a customer in process of being served needs assistance, the entire machine is tied up until the problem is resolved. For these and other good reasons, there is a substantial requirement to develop new automation tools to further improve productivity, reduce cost, improve reliability, safety, etc.

BRIEF SUMMARY OF THE INVENTION

My designs of Automatic Distributed Vending System (ADVS) combine unique and standard automation components, which could provide variety of businesses with significantly improved efficiency, safety and flexibility of business related products packaging, distribution and sales. The entire process, from point of product manufacturing at one location to point of product sale at another location, could be effectively automated using ADVS. Throughout all processes within ADVS, intelligent devices such as Controller(s) and Computer(s) could keep Provider(s) and higher level Computer(s) connected, informed of all relevant events, which could take place within or outside ADVS, to ensure reliable and safe coordinated effort by respective ADVS components in executing requested or scheduled tasks. ADVS Module design features modularity for achieving maximum efficiency, safety, flexibility and quality.

Efficiency is attained through optimum utilization of resources (space, energy, etc.) and expandable levels of automation to achieve required business objectives with minimum investment. ADVS design principals employ "nature's" elements such as weight of various components, including Items being handled, for drive-load optimization, self-alignment, etc. Weight of each support component is optimized to lower the overall weight of each Module. This all accomplished without compromise on safety and reliability.

Safety is achieved through dual Enclosure (Outer and Inner) designs of each vending Module with respective access openings displacements to practically eliminate "manual" access from outside Module to Items inside. In addition, dedicated Safety Electronics are incorporated in each Module to monitor and report any events, which may compromise safety of Items inside of it. In number of applications, ADVS Stations or stand-alone Modules could offer Clear-View security. These ADVS configurations could allow Provider to observe activities taken place from Customers end, and then promptly take appropriate action to assist Customer or correct a problem, as needed. In number of applications where only front of Module is exposed to Customer, side and rear panels of both Inner and Outer Enclosures could be Clear-View type. These type of Modules could allow Provider to periodically observe and/or inspect in real-time activities within Module, and then promptly take appropriate action to correct a potential problem, as needed.

Flexibility is achieved through plug-in/out Module design features and variety of Items ADVS is capable of processing. Inner Enclosure, loaded or empty, could be conveniently removed from or installed into respective Outer Enclosure within seconds. "Interface" mechanics of both Outer and Inner Enclosures assist in this transition, and ensure reliable alignment during installation. Carrier's Item holding/support component could be shaped accordingly to requirements of specific application. As result, ADVS Module could handle variety of Items in terms of their shape, size, etc. In addition, Items physical properties could also vary. Packaged in appropriate Containers, Items could be: solids, liquids, powder, etc. As needed, Items inside Module's Process Chamber(s) could undergo special treatment. Process could change Item(s) in terms of their physical and chemical properties.

Maximum quality is achieved through continuous in-process automatic quality inspection of Items and other components (Carriers, etc.) at all critical locations, such as: loading, storage and vending. Rejected Item(s) are either automatically returned back to Provider, or Provider is informed and the respective ADVS component (Module, Feeder, etc.) could wait for further instructions. Dual synchronized Conveyor is designed to minimize any impact on content inside Carriers. As result, Items could remain inside Module as long as required for any given application. Carriers within Inner Enclosure could be pre-loaded with Items manually or automatically using ADVS loading support components. Preloading of Items could take place off-site, at the factory. As required, removable Security Panels could enclose respective openings of the Inner Enclosure from all sides. When Security Panel(s) installed, there could be no access to Items inside Inner Enclosure. As required, the removable Security Panels could be sealed, and/or monitored by battery-operated Security Electronics installed inside Inner Enclosure. When Security Electronics are used, "break-in" history could be recorded and then verified prior to use of respective Inner Enclosure. In addition, Security Diagnostics could be used to indicate the latest "integrity" status of Inner Enclosure. When pre-loaded at the factory, Customers could be assured of buying "100% Factory-sealed QUALITY" Items.

BRIEF DESCRIPTION

7.1 Drawing Content and Listing

My application contains drawings, which include my designs in a form of:
a) Scanned images from my Laboratory Book, where I documented my invention, dated, signed by me and witnesses, and
b) Computer generated drawings, saved on my personal computer and CD's.

List of all drawings and figures—Table 1, below.

TABLE 1

List of Drawings and Figures.

| Drawing | FIG. | Description |
|---|---|---|
| 1 | | ADVS configurations |
| | 1-1 | ADVS layout - half-STAR, 2 sides |
| | 1-2 | ADVS layout - half-STAR, 2 sides, 1 center |
| | 1-3 | ADVS layout - STAR, 1 center, side Computers |
| | 1-4 | ADVS layout - in-line, 2 sides service |
| | 1-5 | ADVS layout - in-line stand-alone |
| | 1-6 | ADVS layout - drive-through |
| | 1-7 | ADVS layout - in-line retail |
| 2 | | ADVS Item packaging |
| | 2-1 | Container cylindrical |
| | 2-2 | Container cylindrical, multiple Items |
| | 2-3 | Container cylindrical, compartmental |
| | 2-4 | Container cylindrical bottle |
| | 2-5 | Container cylindrical with top lid |
| | 2-6 | Container rectangular |
| 3 | | ADVS Item Carrier design |
| | 3-1 | Carrier components |
| | 3-2 | Carrier assembly |
| | 3-3 | Carrier inserts for rectangular Item |
| | 3-4 | Carrier with inserts - loading Item |
| | 3-5 | Carrier with inserts - loaded with Item |
| | 3-6 | Carrier inserts for cylindrical Item |
| | 3-7 | Carrier with removable plate |
| | 3-8 | Carrier with removable plate, side panel |
| | 3-9 | Carrier with removable plate assembly |
| | 3-10 | Item shaped as vial |
| | 3-11 | Item shaped as cylindrical bottle |
| | 3-12 | Carrier design details-1 |
| | 3-13 | Carrier design details-2 |
| | 3-14 | Carrier design details-3 |
| | 3-15 | Carrier design details-4 |
| 4 | | ADVS Carrier Conveyor design |
| | 4-1 | Roller-type Conveyor wheels |
| | 4-2 | Carrier support shaft |
| | 4-3 | Conveyor wheel - cross-section |
| | 4-4 | Conveyor wheel components - cross-section |
| | 4-5 | Conveyor joint bracket |
| | 4-6 | Roller-type Conveyor design |
| | 4-7 | Conveyor drive detail |
| | 4-8 | Conveyor layout-1 |
| | 4-9 | Conveyor layout-2 |
| | 4-10 | Conveyor layout-3 |
| | 4-11 | Roller Conveyor design details-1 |
| | 4-12 | Roller Conveyor design details-2 |
| | 4-13 | Roller Conveyor design details-3 |
| | 4-14 | Roller Conveyor design details-4 |
| | 4-15 | Roller Conveyor design details-5 |
| | 4-16 | Roller Conveyor design details-6 |
| | 4-17 | Roller Conveyor design details-7 |
| | 4-18 | Roller Conveyor design details-8 |
| | 4-19 | Roller Conveyor design details-9 |
| | 4-20 | Roller Conveyor design details-10 |
| | 4-21 | Roller Conveyor design details-11 |
| | 4-22 | Roller Conveyor design details-12 |
| | 4-23 | Roller Conveyor design details-13 |
| | 4-24 | Roller Conveyor design details-14 |
| | 4-25 | Belt Conveyor design details-1 |
| | 4-26 | Belt Conveyor design details-2 |
| | 4-27 | Belt Conveyor design details-3 |
| | 4-28 | Belt Conveyor design details-4 |

TABLE 1-continued

List of Drawings and Figures.

| Drawing | FIG. | Description |
|---|---|---|
| | 4-29 | Belt Conveyor design details-5 |
| | 4-30 | Belt Conveyor design details-6 |
| | 4-31 | Belt Conveyor design details-7 |
| | 4-32 | Belt Conveyor design details-8 |
| | 4-33 | Belt Conveyor design details-9 |
| | 4-34 | Belt Conveyor design details-10 |
| 5 | | ADVS Module design |
| | 5-1 | Module design details-1 |
| | 5-2 | Module design details-2 |
| | 5-3 | Module design details-3 |
| | 5-4 | Module design details-4 |
| | 5-5 | Module design details-5 |
| | 5-6 | Module design details-6 |
| | 5-7 | Module design details-7 |
| | 5-8 | Module design details-8 |
| | 5-9 | Module design details-9 |
| | 5-10 | Portable Module design details-1 |
| | 5-11 | Module design details-10 |
| | 5-12 | Portable Inner Enclosure design details-1 |
| | 5-13 | Portable Inner Enclosure design details-2 |
| | 5-14 | Module security design details |
| 6 | | ADVS Process Module design |
| | 6-1 | Process Chamber design details-1 |
| | 6-2 | Process Chamber design details-2 |
| | 6-3 | Process Chamber design details-3 |
| | 6-4 | Process Chamber design details-4 |
| | 6-5 | Process Chamber design details-5 |
| | 6-6 | Process Chamber design details-6 |
| | 6-7 | Process Module design details-1 |
| | 6-8 | Process Module design details-2 |
| | 6-9 | Process Module design details-3 |
| | 6-10 | Process Module design details-4 |
| | 6-11 | Item Processing example-1 |
| | 6-12 | Item Processing example-2 |
| 7 | | ADVS Support Components |
| | 7-1 | Automatic Item Feeding design details-1 |
| | 7-2 | Automatic Item Feeding design details-2 |
| | 7-3 | Automatic Item Feeding design details-3 |
| | 7-4 | Automatic Item Feeding design details-4 |
| | 7-5 | Automatic Item Feeding design details-5 |
| | 7-6 | Automatic Item Feeding design details-6 |
| | 7-7 | Item Automatic Sliding Unloading design details-1 |
| | 7-8 | Item Automatic Sliding Unloading design details-2 |
| | 7-9 | Item Automatic Sliding Unloading design details-3 |
| | 7-10 | Item Automatic Gripper Loading/Unloading design details-1 |
| | 7-11 | Item Automatic Gripper Loading/Unloading design details-2 |
| | 7-12 | Item Automatic Gripper Loading/Unloading design details-3 |
| | 7-13 | Item Automatic Gripper Loading/Unloading design details-4 |
| | 7-14 | Item Automatic Gripper Loading/Unloading design details-5 |
| | 7-15 | Item Automatic Gripper Loading/Unloading design details-6 |
| | 7-16 | Item Automatic Gripper Loading/Unloading design details-7 |
| | 7-17 | Item Automatic Gripper Loading/Unloading design details-8 |
| | 7-18 | Item Automatic Gripper Loading/Unloading design details-9 |
| | 7-19 | Item Automatic Gripper Loading/Unloading design details-10 |
| | 7-20 | Item Automatic Gripper Loading/Unloading design details-11 |
| | 7-21 | Item Automatic Gripper Loading/Unloading design details-12 |
| | 7-22 | Item Automatic Gripper Loading/Unloading design details-13 |
| | 7-23 | Item Automatic Gripper Loading/Unloading design details-14 |
| | 7-24 | Item Automatic Gripper Loading/Unloading design details-15 |
| | 7-25 | Item Automatic Gripper Loading/Unloading design details-16 |

TABLE 1-continued

List of Drawings and Figures.

| Drawing | FIG. | Description |
|---|---|---|
| | 7-26 | Item Automatic Gripper Loading/Unloading design details-17 |
| | 7-27 | Item Automatic Gripper Loading/Unloading design details-18 |
| | 7-28 | Item Automatic Gripper Loading/Unloading design details-19 |
| | 7-29 | Package Automatic Feeding design details-1 |
| | 7-30 | Package Automatic Feeding design details-2 |
| | 7-31 | Package Automatic Feeding design details-3 |
| | 7-32 | Automatic Module Feeding design |
| 8 | | ADVS Block Diagrams |
| | 8-1 | Block-diagram - ADVS half-STAR |
| | 8-2 | Block-diagram - ADVS in-line |
| | 8-3 | Block-diagram - ADVS multi-sectional |
| | 8-4 | Block-diagram - ADVS Module |
| | 8-5 | Block-diagram - ADVS Conveyor |
| | 8-6 | Block-diagram - Module Safety Gate |
| | 8-7 | Block-diagram - User touch-screen |
| | 8-8 | Block-diagram - User ATM |
| | 8-9 | Block-diagram - User Control panel |
| | 8-10 | Block-diagram - ADVS Process Module |
| | 8-11 | Block-diagram - ADVS closed-loop Control System |

7.2 Drawing Convention and Format

Drawings with this application are not to scale and are referenced to "X-Y-Z" coordinate system, which is consistent throughout all Drawings, where shown.

The "X-Y-Z" coordinate system orientation is as follows:
X points toward Provider side of Module. Module's elements facing Provider side could be labeled with suffix "P".
−X points toward Customer side of Module. Module's elements facing Customer side could be labeled with suffix "C".
Y points toward right side of Module. Module's elements facing right side of Module could be labeled with suffix "R".
−Y points toward left side of Module. Module's elements facing left side of Module could be labeled with suffix "L".
Z points toward top of Module. Module's elements facing top side of Module could be labeled with suffix "T".
−Z points toward bottom of Module. Module's elements facing bottom side of Module could be labeled with suffix "B".

Elements on computer-generated drawings have identification numbers inside a circle.

For ADVS Block-Diagrams shown on Drawing 8, an identification number inside a box with no specific pointer line— identifies all elements inside that box.

7.3 Definitions

My application contains definitions of specific components or processes, which are scripted in "bold italic", and which are listed below in alphabetical order. Definitions are used and expanded in greater details in later paragraphs, as needed.

ADVS
Automatic Distributed Vending System. ADVS could be configured as a closed-loop Item Processing and Vending System, configuration and layout of which could be optimized in terms of productivity, efficiency, quality, safety, esthetics for number of vending applications such as: Vending General Items and/or Vending Prescribed/Assigned Items at pharmacy or drug Store; Vending General Items and/or Vending Assigned Items at retail operations; Vending money rolls at any cash operated business; storage-Processing-Vending of Items at biomedical research or service laboratory, etc. ADVS could include number of main and support components: Automatic Vending Modules, Automatic Item Loading/Unloading, Automatic Item Feeding, Automatic Package Feeding, and other support components such as: computer hardware, software, electronic devices, network devices. Inventory of Items, including number of parameters, which could be unique for each Item, within all respective components of the ADVS could be automatically monitored in real time by respective Controllers and Computers, and optimized accordingly, to make specific Item or Items available at designated locations, as needed. Inventory of Items within all components of the ADVS could be managed in real time by respective Controllers and Computers, to provide coordinated: loading of Items into the System for optimum processing of them within the System; availability of specific Items to the System, as needed. Items within ADVS could be automatically inspected, and then rejected Items could be automatically returned to Provider, as needed. The rules pertaining to ADVS performance could be specified by Provider via Computers and Controllers at certain designated locations with regard to how the System works in relation to the input and output of designated Items which could include anything from their types, locations, times, quantities, etc.

Access Door
Door, which could be opened or closed under instructions from Controller. Door could be used to secure access to Items and other parts of Module, as necessary, to satisfy requirements of ADVS application.

Access Door Drive
Electromechanical assembly which could control and monitor position of Access Door under instructions from Controller.

Actuator
Electromechanical assembly, such as: motor, solenoid, etc. which could move designated element to specified location under Controller supervision.

Assigned Item
Item(s) with item-specific information tag attached (barcode label, RFID, etc.), which could be recognized within ADVS, and could be made available for vending to Specific Customer(s)

Assigned Vending
Vending of Assigned Item(s) to Specific Customer(s)

Barcode Scan
Device, which could be controller by Computer or Controller, and capable of reading barcode labels specific to ADVS application Belt Guiding Rail
Mechanical assembly, which could consist of lower and upper Guiding Rails or Tracks, which could be used for direction-trajectory Guiding of one Belt-type sub-Conveyor. Belt Guiding Rails retain and guide the Conveyor Belt along required direction-trajectory during Belt-type sub-Conveyor motion. The inner surface shape and material of the lower Rails could be designed with objectives to provide reliable engagement, while minimizing, or optimizing the friction between the Belt and the lower Rails. In addition, properly designed rollers could be embedded into the lower Rails or into the Belt to further reduce the friction while minimizing vibration of the Belt, as it slides along them during Conveyor motion.

Carrier
Part of Conveyor, which could be used for safe storage, processing and transportation of Item(s) or Container loaded inside of it. Carrier assembly could be stationary, or part of Carrier assembly could include removable holding plate. Holding plate could house several Items or Containers. Items or Containers could be pre-loaded into holding plate manually or by other ADVS automatic means. Holding plate with preloaded Items or Containers could be placed/removed in/from Carrier assembly by Automatic Gripper assembly.

Carrier Clearance

Area surrounding Carrier, which is designated to be free from other Carriers at all times Carrier Insert Component designed to match specific shape of Item. Insert could be attached to inner surface of Carrier holding assembly and serve as mechanical interface between Carrier and Item.

Carriers Inventory

ADVS information, which could be updated real-time, of all Carriers within ADVS, and could include such parameters as: Carrier ID, location, status, etc.

Carrier Side Panel

Carrier Side Panels could be used to embrace the Carrier Pocket from each side and to create an enclosed Pocket, which could reliably hold Item inside during Carrier movements, as needed.

Carrier Stop

Electro-mechanical assembly, which could be designed to properly stop tilted Carrier at designated location.

Carrier Support Bracket

Bracket, which could be suspended from adjacent Conveyor Wheels Bearings, and which could serve as support for Carrier assembly. Together with Joint Brackets, Carrier Support Brackets could interconnect sub-Conveyor Wheel assemblies into one continuous sub-Conveyor chain.

Carrier Support Bearing

Mechanical assembly, which could include Bearing or appropriately designed busing, from which Carrier shaft could be supported, and related components. The design could ensure that the shaft together with attached Carrier assembly could swing one direction or another under combined weight of Carrier and Item inside, to maintain it's original vertical position during changes in Conveyor direction.

Carrier Support Shaft

Each Carrier has two Support Shafts on each side. Each Support Shaft is inserted into respective Carrier Support Bearing. Support Shafts, together with attached Carrier, could rotate around the axis of the Support Bearing.

Container

Item, which could serve as enclosure for physical entities (Content) inside of it. For convenient handling of odd-shape Items a cylindrically shaped Container could be used to house one or more of these type Items. Container components could be made (molded, etc.) out of plastic of specific material to ensure safety and reliability of Item(s) placed inside during transportation, as required. Container could have body shaped as cylindrical enclosure with open end on one side or both sides. Container body could have separation panels inside (vertical, horizontal, or both) to create "compartments". Each compartment could be occupied by one or more Item placed inside of it. Container could have cover(s) or lid(s) to seal the opening(s), so that Content inside Container is secured during transportation.

Content

Physical entities inside Container

Controller

Embedded hardware-software, which could be based on one or more integrated circuits, responsible for control of part or entire Module, or stand alone electromechanical assembly such as: Item Automatic Feeding, etc.

Conveyor

Electromechanical assembly for automated vending, storage and handling of Items or Containers with Items inside, comprising of: dual synchronized Roller-type or Belt-type sub-Conveyors with Carriers attached in a such a manner, that has minimum affect on it's content during Conveyor motions and allows automatic loading of Items or Containers into Carriers, automatic inspection, automatic processing and automatic unloading of content out of Carriers at designated locations. Sub-Conveyor on each side could be automatically controlled in such a way as to assure required in-synch motion of each sub-Conveyor in respect to the other, and advanced according to trajectory which could be coordinated by means of Guiding Rails or Tracks, pulley's or channels which could be supported from respective side walls of Conveyor enclosure. Conveyor could have one-type of Carriers, or multiple type of Carriers, which could differ in terms of what type of Item they are intended for. A barcode label for each Carrier could be used to identify the Carrier type, which could be used by Controller to load proper Items inside each Carrier. Depending on Conveyor size and load, each sub-Conveyor could have a designated sub-Conveyor Drive System, which could be synchronized with the other sub-Conveyor Drive System by Controller. Controller could monitor position of the respective sub-Conveyor drive shafts by processing signals from respective position Sensors, such as rotary encoders. Controller could also monitor linear position of respective sub-Conveyors by processing signals from respective position Sensors, which could monitor index slots of either Belt-type or Roller-type sub-Conveyors. Based on rotary and/or linear position data, Controller could promptly detect condition when either of sub-Conveyors falls out of synchronization. When this occurs, Controller could re-instate synchronization by advancing the "trailing" sub-Conveyor required number of indexes, while maintaining position of the "leading" sub-Conveyor. The resolution of Conveyor linear position index marks or openings/slots could be made small enough to allow Controller to correct de-synchronization with no impact on Conveyor reliability, which includes Carriers and respective support components.

Conveyor Belt-Type

Conveyor, which is designed based on dual synchronized Belt-driven sub-Conveyors. Proper selection of material and design parameters could ensure reliable and safe operation.

Conveyor Drive

Electromechanical assembly, which could consist of motor, mechanical coupling, etc., which is assigned to advance Conveyor under directions of Controller Conveyor Drive Sprocket Wheel Sprocket Wheel attached to Conveyor Drive, which could engage with Drive Slots of Joint Brackets and advance entire Conveyor along Guiding Rails.

Conveyor Idle Sprocket Wheel

Idle Sprocket Wheel, which could engage with Drive Slots of Joint Brackets, and could support Convey or during transitions: start/stop, changing directions, etc.

Conveyor Joint Bracket

Joint Bracket, which could be suspended off Support Wheel Bearings, joining adjacent Support Wheels. Joint Bracket could have position Flags, which could be aligned to represent Carrier leading edge, center line, etc. Joint Bracket could have index marks or openings, spaced closely from each other, which could be detected by optical Sensor to report to Controller the Conveyor linear position within resolution equal to distance between adjacent marks or openings.

Together with Carrier Support Brackets, Joint Brackets, could interconnect sub-Conveyor Wheel assemblies into one continuous sub-Conveyor chain.

Conveyor Index

Distance between adjacent Carriers attached to Carrier Conveyor, or distance between adjacent Feeding Slots attached to Feeding Conveyor.

Conveyor Processing Index

Distance, which is required for Conveyor to travel in order to move Carrier from one Process chamber to the next one. For applications where more than one Process chamber installed, Process Index could vary, as needed. For example, in one complete Process cycle, it could be the distance of moving Carrier from Process chamber #1 to #2, where in the next complete Process cycle, it could be the distance of moving Carrier from Process chamber #1 to #3 (skipping #2), etc.

Conveyor Roller-Type

Conveyor, which is designed based on dual synchronized Wheel-driven sub-Conveyors. Proper selection of material and design parameters could ensure reliable and safe operation.

Conveyor Support Wheels

Support Wheels or Rollers, which could be connected via Joint Brackets on one side, and Carrier Support Brackets from the other side, and which could travel along Roller-type Conveyor Guide Rails under control of Conveyor Drive assembly. Conveyor Support Wheels could have slots along the perimeter. These slots could be used to further assist Conveyor Guide Rails to retain the Wheels within the required position during Conveyor motions.

Customer

End user, which may or may not have assigned Item(s) within ADVS. Customer could enter an order for General or Assigned Item(s) via ADVS support components, such as: in-store Computer, or via business internet software, or by phone, or over the counter. Customer could register with business, and then use Customer-specific ID card, issued by business, to access and receive Item(s) directly from respective ADVS Modules Cycle Time, which could be required for Conveyor to advance Carrier one Index Docking Station Electromechanical assembly used for pre-loading Inner Enclosure with Items manually or automatically. Preloading could be off-site, at the factory location. Modified, as required, Outer Enclosure could serve as a Docking Station.

Drive Slots

Part of Joint Bracket, which could engage with Conveyor Drive Sprocket Wheels

Dynamic Module

Module that could be allocated for prompt Customer service. These type of Modules could have reserved capacity of empty Carriers to allow Provider to promptly load them with Items, as needed. Example of usage—in a Pharmacy with ADVS, a Customer could place an order over the counter and then receive ordered Item(s) at the specified Dynamic Module shortly after prescription(s) been filled by Pharmacist, or Provider.

Dynamic Sub-System

Sub-system or section of ADVS, which consists of Dynamic Modules and their respective support components.

Feedback

Interface between: ADVS support and main components, ADVS components and Providers, ADVS components and Customers. Feedbacks could consist of: communication interface via ADVS network, and physical interface in a form of transfer of Items. Feedbacks together with Links interconnect respective ADVS components into closed-loop System.

Feeding Conveyor

Electromechanical assembly, which could be designed to store and transport Items/Containers, empty packing boxes, etc. as part of Automatic Feeding assembly.

Feeding Slot

Location on Feeding Conveyor, which could be designated to hold and support loaded Item during and after Feeding Conveyor motion is complete.

Flag

Mechanical bracket, which could be attached to a moving part, or be an integral part of a moving part. Flag could be detected by Sensor when it passes through Sensor slot or passes by Sensor, depending on type of Sensor used. Flag could be aligned with specific location of moving part. Controller, which could monitor Sensor, could obtain position of Flag detected by Sensor. Actuator or drive assembly could have one or more Flag(s) assigned to indicate respective Home position.

General Item

Item(s), which could have item-specific information tag attached (barcode label, RFID, etc.), that could be recognized within ADVS General Vending Vending with no Item(s) assignment to specific Customer. General Vending could co-exist with Assigned Vending within same Module.

Gripper Drive

Electro-mechanical assembly, which could be part of Automatic Loading of Items into Module, and Automatic Unloading of Items out of Module. Gripper could reliably pick-up, transport and release Items under instructions from Controller Home Unique position of an actuator or drive assembly, which could be detected by respective Sensor(s) and reported to respective Controller. Home could be used by Controller as reference point in terms of monitoring position of respective Actuator or drive assembly. Sensors such as: Rotary Encoder with index signal, Flag with detecting Sensors, etc. could be used.

Horizontal Drive

Electro-mechanical assembly, which could be part of Automatic Loading of Items into Module, and Automatic Unloading of Items out of Module. Horizontal Drive, which could also be referenced as "X-drive", could be designed based on rack-and-pinion drive principals.

Inventory

ADVS information, which could be updated real-time, of all Carriers and Items within ADVS, or within ADVS component (Module, etc,), Inventory could include such Carrier and/or Item parameters as: ID, location, status, quantity, etc.

Index Mark

A mark on top surface of the Join Brackets of the Roller-type Conveyor, or on top of Belt-type Conveyor, which could be detected by optical Sensors, and used by Controller to monitor linear position of the respective sub-Conveyor. Distance between adjacent Index Marks could be made small enough to provide required resolution for accurate Conveyor position tracking.

Index Slot

Opening through Join Brackets of the Roller-type Conveyor, or through Belt-type Conveyor, which could be in a form of a slot or round hole, which could be detected by optical Sensors, and used by Controller to monitor linear position of the respective sub-Conveyor. Distance between adjacent Index Slots could be made small enough to provide required resolution for accurate Conveyor position tracking. For Roller-type Conveyor, Index Slots could be sized and spaced a part to match the gap in-between adjacent Joint Brackets, so that the gap itself, could be considered as an Index Slot also.

Index Tag

Unique ID (numeric, characters, etc.), which could be assigned by Controller to each Carrier of Conveyor, which could be referenced to Conveyor Home position in terms of number of Index moves required to reach Carrier from Home position.

Inspection Platform

Designated location where an Item, Container or Package could be inspected manually by Provider, or by respective ADVS Automatic Inspection device. Item Inspection Platform could be a part of Automatic Item Feeding assembly. Package Inspection Platform could be a part of Automatic Package Feeding assembly.

Item

Physical entity, which could be handled by ADVS. Item physical shape could vary, with the most preferred one being in a shape of cylinder. Item could consist of itself only, or serve as Container for other physical entities inside of it—named Content. Item could have barcode label with information specific to ADVS application. Item presence, location, etc. could be monitored within ADVS by Sensors and Barcode Scan devices in real-time, as needed Item Automatic Loading Electro-mechanical assembly designed for loading Items into respective empty Carriers inside Module. Item loading could be assigned, which could be the case when specific Items, based on Item barcode, are loaded into specific Carriers, based on Carrier barcode Item Automatic Feeding Electro-mechanical assembly, which could include:
a) Item Feeding Convey or assembly
b) Conveyor Drive assembly
c) Sensors for monitoring Item presence at various locations on the Conveyor
d) Sensors for monitoring Conveyor position
e) Barcode Scan devices, which could report Item barcode label to respective Controller Item Automatic Packing Electro-mechanical assembly which could be under supervision of Module Controller, which could deliver empty not labeled Packing containers to Item Unloading section of Module. As needed, unloaded Item could be placed inside empty container, which could add privacy to Customers.

Item Pick-Up Bin

Bin from which unloaded Items could be picked-up by Provider or Customer. Bin could have Item Automatic Packing for additional safety and privacy. Bin could have designated Sensor, which could be used by Controller to monitor or detect Item(s) inside the Bin. Controller could ensure, if Item(s) remains in the Bin, that the next Item could be requested by the same Customer only. Controller could also, after a specified time-out, warn a Customer to pick-up requested Item from the Bin. If after warning and additional time-out, Item(s) still remain, Controller could send a warning message to Provider, or higher-level ADVS Computer(s).

Item Slider Unloading

Electro-mechanical assembly, which could be part of Automatic Unloading of Items out of Module.

Items Inventory

ADVS information, which could be updated real-time, of all Items within ADVS, or ADVS component (Module, etc.), and could include such Item parameters as: ID, location, status, quantity, etc.

Item Loading Platform

Designated location, which could be used for loading Item(s) on top of Automatic Item Feeding assembly, or other ADVS support components Item Pick-Up Platform Designated location, which could be used for loading Items on top of Automatic Item Feeding assembly, or other ADVS support components Link Interface between: ADVS main and support components, Providers and ADVS components, Customers and ADVS components. Links could consist of: communication interface via ADVS network, and physical interface in a form of transfer of Items. Links together with Feedbacks interconnects respective ADVS components into closed-loop System.

Loading Platform

Designated location where an Item, Container or Package could be loaded manually by Provider, or by respective ADVS Automatic Loading component. Item Loading Platform could be a part of Automatic Item Feeding assembly. Package Loading Platform could be a part of Automatic Package Feeding assembly.

Main Section

Section with Station Computer in close proximity

Module

Electro-mechanical apparatus of ADVS, which could accept Item(s), and then could process and store them until Item(s) have been requested and vended to Customer(s) and/or Provider(s)

Module Controller

Controller inside Module which could supervise all or part of activities within Module, including interface to Station Computer Module Inner Enclosure Inner Enclosure, which could house Carrier Conveyor assembly and associated elements. Inner Enclosure could consist of front/back/side panels, which could be easily removed by Provider, when needed. As needed, Inner Enclosure could be made out of clear-view-through material, such as plastic, which in addition to mechanical functions, could allow Provider to observe operation of respective components inside Inner Enclosure.

Module Outer Enclosure

Outer Enclosure could house: Inner Enclosure, user interfaces for Provider and Customer, various electromechanical and mechanical assemblies within Module. Outer Enclosure could add additional levels of security and safety to ADVS Modules. Outer Enclosure could consist of front/back/side panels, which could be easily removed by Provider, when needed. Outer Enclosure could be designed to accommodate Portable Inner Enclosure. As needed, Outer Enclosure could be made out of clear-view-through material, such as plastic, which in addition to mechanical functions, could allow Provider to observe operation of respective components inside Outer Enclosure. As needed, both Outer and Inner Enclosures could be made out of clear-view-through material, which could allow Provider and Customer to view Items stored inside, which could be available for vending.

Network
    ADVS Network, which could be dedicated and/or shared, for communication with one or more Computers within ADVS and Host Computer
Pick-Up Platform
    Designated location at which an Item, Container or Package could be presented for pick-up manually by Provider, or by respective ADVS Automatic Loading/Unloading component. Item Pick-up Platform could be a part of Automatic Item Feeding assembly. Package Pick-up Platform could be a part of Automatic Package Feeding assembly.
Portable Inner Enclosure
    Inner Enclosure, which could be designed for portability in terms of it's ease of being loaded/removed into/out of Outer Enclosure, as needed. Portable Inner Enclosure could be loaded with Items remotely, at the factory producing them. Loaded Portable Inner Enclosures could then be transported to designated locations, where they could be inserted into respective Modules for the purpose of vending loaded Items to Customers, as requested. The accessibility of Items within Portable Inner Enclosure could be monitored by respective Security Electronics. As result, the entire process could assure that Items could be sold to Customers with 100% Factory-Sealed Quality.
Process
    One or more operations, which could be performed over Item(s). Example: Process of heating or cooling Item(s) within Process Chamber to specified temperature.
Process Chamber
    Area within Module, which could be enclosed, and assigned for conducting specific Process(es)
Process Index
    Distance between entry into and exit from Process Chamber
Process Cycle
    Time required for Item(s) to remain within Process Chamber to achieve Process objective(s)
Process Module
    Module with Item Processing capabilities
Provider
    Business, which could be responsible for development, installation, operation and maintenance of ADVS
Push-Out Rollers
    Part of Automatic Item Slider Unloading assembly, which could be designed to engage with Carrier and could tilt the Carrier around Carrier Support Shaft assembly.
Roller Guiding Rail
    Mechanical assembly, which could consist of lower and upper Guiding Rails or Tracks, which could be used for direction-trajectory Guiding of one Roller-type sub-Conveyor. Roller Guiding Rails or Tracks could be designed in respect to type of Wheels selected for Roller sub-Conveyor. Wheels of Roller sub-Conveyor could be moved along the respective lower Rails, while the respective upper Rails retain the Wheels within the Track. The inner shape and surface material of the lower Rails could match the outer shape and surface of the Wheels with objectives to provide reliable engagement, while minimizing, or optimizing the friction between them during Conveyor motion. To further improve the control of the Wheels trajectory within the tracks, additional Rail could be added, to match the respective grove or slot along the perimeter of the respective Wheels.
Rotary Encoder
    Rotary Encoder assembly, which could be mounted to a drive shaft and report rotational position of the shaft to Controller. Rotary Encoder assembly could have index wheel, or consist of just one index wheel. This index wheel could report to Controller one unique position during every complete rotation of 360°. The index wheel could be used as position HOME indicator for various drives within respective ADVS components.
Safety Sensor
    Device, which could report to Controller change of state (position, temperature, presence, etc.) of element within Module, and could independently from Controller disconnect power to respective Actuator, Process, etc. to prevent possible damage. Device could be: limit switch, relay contact, etc.
Satellite Section
    Section, which could be located away from Main Section and connected to Station Computer via Station Local Network
Section
    Part of Station, which could consist of one or more Modules
Sensor
    Device, which could report to Controller change of state (position, temperature, presence, etc.) of element within Module. Device could be: limit switch, photo-detector, temperature gauge, encoder, etc.
Secured Enclosure
    Enclosure, which could have all Security related elements, and which could serve as either Portable Inner Enclosure, Enclosure for Vending Cartridge, etc.
Security Controller
    Embedded hardware-software, which could be based on one or more integrated circuits, responsible for monitoring security of part of Module, or entire Module. When applied to monitor security of ADVS component during transportation or power outage, Security Controller hardware could be made out of low-power devices, those extending its operations when powered by battery.
Security Electronics
    Combination of hardware-software components (Security Controller, Security Sensors, etc.), which could be assigned for monitoring security of a component within ADVS, and reporting violations, as requested.
Security Panel
    Removable panel, which could be installed to block opening in the exterior walls of Outer or Inner Enclosures, in order to protect content and other components inside respective Enclosure from being reached from outside by non-authorized personnel.
Security Sensor
    Device, which could report to Security Controller change of state of Security Panel it is assigned to. Security Controller, based on signals from Security Sensors, could establish if respective Security Panel has been displaced beyond established security limits, causing Security Violation.
Security Diagnostics
    Low power indicator (LED, lamp, etc.), which could be used by Security Controller to signal to indicate Condition when Security Panel has been displaced, according to Security Sensor(s), beyond established security limits.
Security Violation
    Condition when Security Panel has been displaced, according to Security Sensor(s), beyond established security limits. Security Violation(s) could be registered by Security Controller in non-volatile memory for future processing.
Specific Customer
    Customer with customer-specific information, which could be stored by Computer(s) and Controllers within ADVS. Provider could issue special ID cards to Customers, including Specific Customers. ID cards could be recognized by ADVS devices attached to Computer and/or Controller, and could be used for: security access, obtaining relevant information about Customers, including Specific Customers Station Stand-alone ADVS, or part of ADVS, which could consists of one or more Sections, supervised by Station's Computer Station Computer Computer, which could supervise operation of all Modules within Station, which could consist of one or more pc-board based embedded devices (CPU, memory, peripheral controllers, etc.) and embedded software to support required supervisory control functions of Station activities. Station Computer could include such support peripherals as: magnetic card reader, signature pad, security camera.

Station Network

Station local area Network, which could be used for communications between Station Computer and Station Module Controllers System Integrity ADVS Actuators could have all necessary elements, including Sensors (position Safety, Security, etc.), which could be used by respective Controller to ensure safe, accurate and reliable operation. Throughout all process steps within ADVS, Controller(s) keep Provider(s) and higher level Computer(s) connected, informed in real-time of all relevant events to ensure reliable and safe coordinated effort by respective ADVS elements in executing requested or scheduled tasks.

Vending Cartridge

Portable Inner Enclosure, which could be conveniently used for off-site loading of Items, storage of loaded Items inside, secured transportation of Items inside. The Vending Cartridge, loaded with Items, could be transported to a vending location, as needed. In order to vend Items out of Vending Cartridge, the Cartridge could be installed into a Module. Module could be designed to accept one or several Vending Cartridges. In a Module designed to house several Vending Cartridges, the Cartridges could either share one Automatic Item Unloading assembly, or could have individual Automatic Item Unloading assembly. Vending Cartridge could include such elements as: Secured Enclosure, Carrier Conveyor with all associated elements (Roller or Belt-type Conveyor support elements, Drive and Idle Pulleys, position Sensors, etc.), Security related elements (Electronics, Sensors, etc.), etc. Module designed to house Vending Cartridge or Cartridges could have all required support elements, such as: Carrier Conveyor Drive assemblies, Controller, user interface Provider and Customer, etc.

Vertical Drive

Electro-mechanical assembly, which could be part of Automatic Loading of Items into Module, and Automatic Unloading of Items out of Module. Vertical Drive, which could also be referenced as "Z-drive", could be designed based on rack-and-pinion drive principals.

100% Factory-Sealed Quality

Process of distribution of Item(s) inside Containers from point of origination (factory) to point of sale (vending via Module) with assurance that the Item itself has remained inside the original sealed Container.

DETAILED DESCRIPTION OF THE INVENTION

Figure 2:
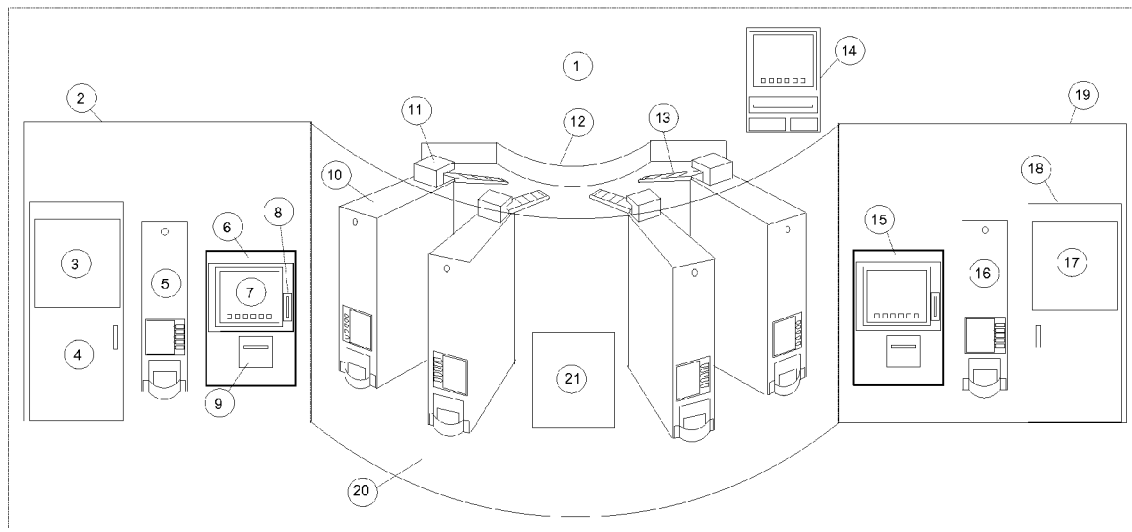

FIG. 1 through FIG. 7 illustrate possible ADVS configuration and layouts for business such as: Pharmacy, Retails, etc. Applications could include vending of:
  a) Prescribed and/or general purpose drugs at pharmacy-type business
  b) General retail items (small electronics, designer clothes, etc.)
  c) Money rolls at any large size cash-operated businesses, or financial institutions FIG. 1—ADVS configuration as half-star layout, with service on each side, primarily for indoor installation. This layout could be one of most efficient and ergonomic layouts. For simplicity to view details, the half-star partition or wall (20), is shown as transparent. In this type of installations, ADVS Stations or stand-alone Modules could offer Clear-View security. These ADVS configurations could allow Provider to observe activities taken place from Customers end, and then promptly take appropriate action to assist Customer or correct a problem, as needed. In addition, only front of Module could be exposed to Customer, while side and rear panels of both Inner and Outer Enclosures could be Clear-View type. This arrangement of Modules could allow Provider to periodically observe and/or inspect in real-time activities within Module, and then promptly take appropriate action to correct a potential problem, as needed. This arrangement of Modules could also allow Provider to effectively use ADVS Automatic Item Feeding assembly (13) and ADVS Automatic Item Loading assembly (11) for convenient Item loading and additional Item buffering capacity. Figure elements are labeled as follows:

1—ADVS installation
2—ADVS left partition wall
3—Customer service window, left side
4—Provider access door, left side
5—Dynamic Module, left side
6—Station Computer #1, which could be used for initial processing of Customer's ID card, etc.
7—Station Computer #1 touch-screen monitor
8—Station Computer #1 card reader, which could accept ID cards, ATM/credit cards
9—Station Computer #1 printer
10—Module, which could be used for General or Assigned vending (card reader not shown)
11—Automatic Item Loading/Unloading assembly
12—Area behind Modules, which could be used for Provider working bench/area
13—Automatic Item Feeding assembly
14—ADVS Host Computer
15—Station Computer #2, which could be used for initial processing of Customer's ID card, etc.
16—Dynamic Module, right side
17—Customer service window, right side
18—Provider access door, right side
19—ADVS right partition wall
20—ADVS center partition wall
27—Item Pick-up Bin, Customer side FIG. 2—ADVS configuration as half-star layout, similar to the one shown on FIG. 1, except with center Module(s) replaced with additional Customer service window, as needed.

Figure 3:
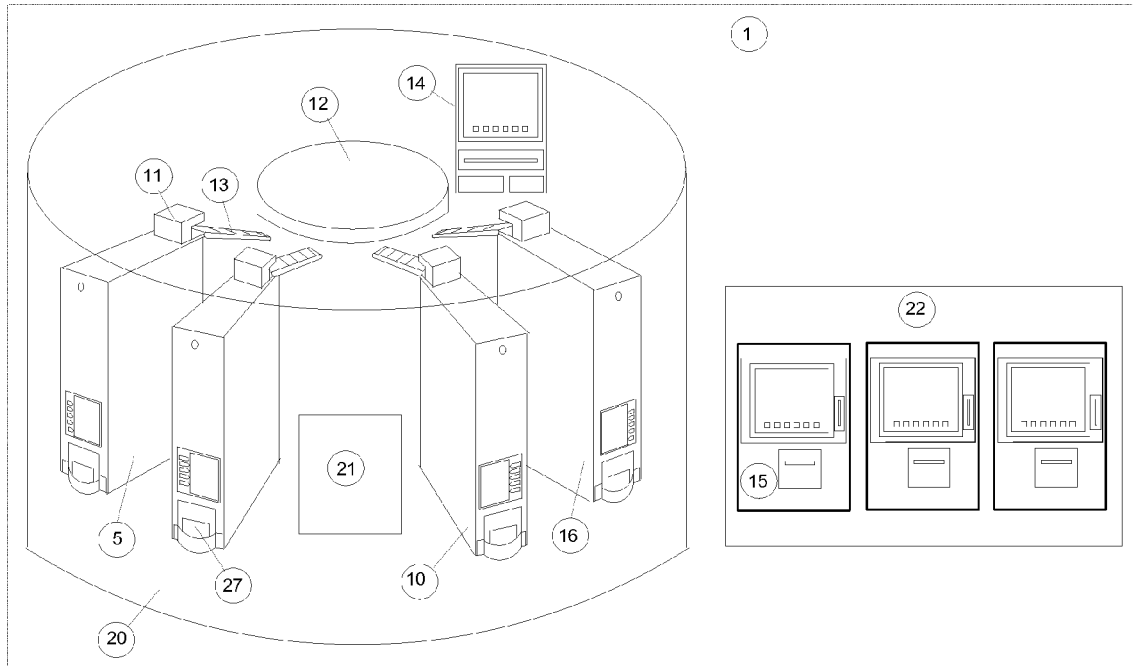
Figure 4:
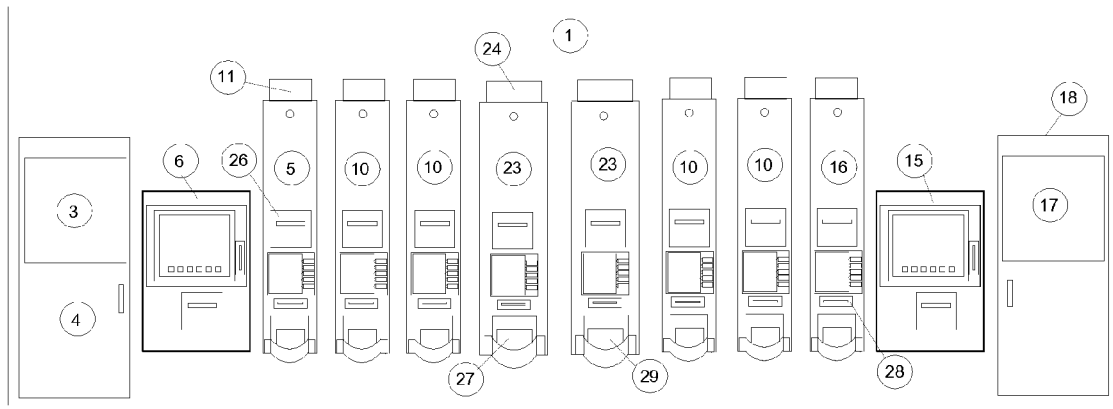

Figure elements are labeled as follows:
1-20—are labeled same as on FIG. 1
21—Customer service window, center location FIG. 3—ADVS configuration as full-star layout. The walls/partitions surrounding Modules have been made transparent from Customer side to illustrate possible ADVS arrangement "behind the walls". Modules could be placed along the perimeter of the enclosed area (366), with one or more entry/exit doors in between selected adjacent Modules. The working area of Provider (12) could be elevated, leveled or placed below the upper sections of Modules surrounding it. ADVS Automatic Item Feeding assemblies (13) could be placed according to layout. The entire process of Item handling and transitions within ADVS Modules and ADVS support components could be easily observed real-time by Provider when Clear-View type enclosures are installed. Also addition, sections of the front walls could be made transparent from Pharmacy's side only. This, in addition to security cameras, etc. could allow Provider to visually observe the Customer's activities, etc. A door (not shown) could be installed in one of the sections in-between adjacent Modules for quick access by the Provider for assistance to Customer or maintenance related issues. ADVS Automatic Item Feeding assemblies could increase overall capacity of available Items inventory within ADVS by 20-30%. This could further improve efficiency and extend support for un-attended 24-hours service, as needed. Figure elements are labeled as follows:

1,5,10-16,27—are labeled same as on FIG. 1
21—Customer service window, center location
22—Customer service Computer Station FIG. 4—ADVS configuration as in-line, one Station layout. Similarly to configurations shown on FIG. 1 through FIG. 3, Automatic Feeding and Automatic Loading of Items could be added, as needed.

Figure 5:
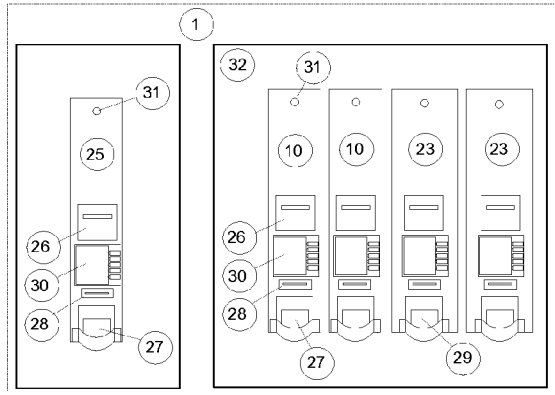
Figure 6:
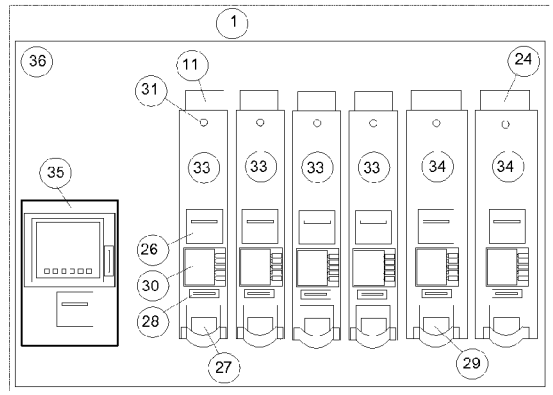
Figure 7:
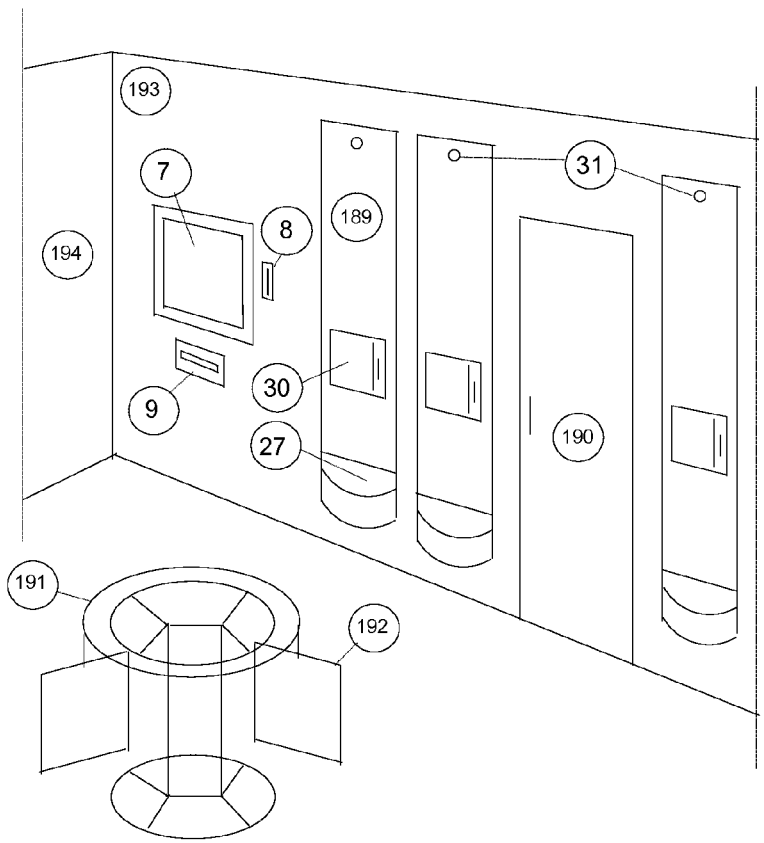

Figure elements are labeled as follows:
1,3-6,10,11,15-18,27—are labeled same as on FIG. 1
21—Customer service window, center location
22—Customer service Computer Station
23—Module large size, which could be used for General or Assigned vending
26—Thermal printer, or equivalent
28—Module card reader, which could accept ID cards, ATM/credit cards
29—Large Item Pick-up Bin, Customer side FIG. 5—ADVS configuration as stand-alone layout. Figure elements are labeled as follows:
1,10,12,23,26-29—are labeled same as on FIG. 4
25—Module General or Assigned vending, stand-alone configuration
30—ATM-type interface terminal
31—Module ID tag (numeric, alpha, or alpha-numeric), which could be used for Module identification
32—ADVS stand-alone Section FIG. 6—ADVS in-line layout for outdoor drive-through installation. Similarly to configurations shown on FIG. 1 through FIG. 3, Automatic Feeding and Automatic Loading of Items could be added to take full advantage of ADVS support components to achieve superior efficiency and expanded real-time Items inventory capacity, as needed for un-attended 24-hours service. Figure elements are labeled as follows:
1,11,24,26-31—are labeled same as on FIG. 4 and FIG. 5.
33—Module for General or Assigned vending, outdoor configuration
34—Large Module for General or Assigned vending, outdoor configuration
35—Station Computer, outdoor configuration
36—ADVS Station, outdoor configuration FIG. 7—ADVS in-line layout for indoor installation at retail-type businesses. In these type of applications, ADVS Modules could be used for vending retail Items such as:
  a) Small valuable Items—watches, jewelry, electronic devices (camera's, audio, etc.), etc. pre-packaged in cylindrical-type Containers
  b) Designer clothes—jeans, shirts, etc. pre-packaged in cylindrical-type Containers Modules could have removable Inner Enclosures, which could be pre-loaded with Items at the factory (point of origination). Loaded Inner Enclosures could then be delivered to respective store. As needed, loaded Inner Enclosures could then be inserted into respective Modules for vending pre-loaded at factory Items directly to Customers. This process could qualify for availability of Items sold with 100% Factory-Sealed Quality. Businesses with ADVS, could use the 100% Factory-Sealed Quality, as one of assurance-type feature, to successfully compete with other businesses. As shown, the ADVS installation is for vending designer clothes. Other ADVS components, such as Host Computer and support devices, are not shown for simplicity. Figure elements are labeled as follows:
7—Station Computer touch-screen monitor
8—Station Computer card reader, which could accept ID cards, ATM/credit cards
9—Station Computer printer, which could be used for printing out receipts, etc.
27—Item pick-up bin.
30—ATM-type interface terminal
31—Module ID tag (numeric, alpha, or alpha-numeric), which could be used for Module identification
189—Module with portable Inner Enclosure, designed for vending retail-type Items or Containers
190—Retail store door to fitting room
191—Retail store Item display rack. Displayed Items could represent all shapes, colors, sizes, etc. of Items available at this ADVS vending station or location. Displayed Items could be tried by Customers inside fitting room (190)
192—Item, available at the display rack (191)
193—Wall section inside a retail store allocated for ADVS Station and Modules
194—Wall section inside retail store, which could be allocated for another ADVS Station.

FIG. 8 through FIG. 13 illustrate possible shapes of Items, most suitable for automated processing and handling. These type of Item shapes are currently used in such applications as:
  a) Pharmacy—plastic or glass containers with general or prescription type of medication
  b) Retail stores—plastic, glass or metal containers (soup cans, salad dressings, etc.)
  c) Any cash-based outlet—money rolls with number of coins or paper money of one denomination wrapped in plastic or paper for convenient storage and distribution.

Items or Containers, which could have other shapes, could be accommodated with appropriate Inserts, as covered later.

Figure 8:
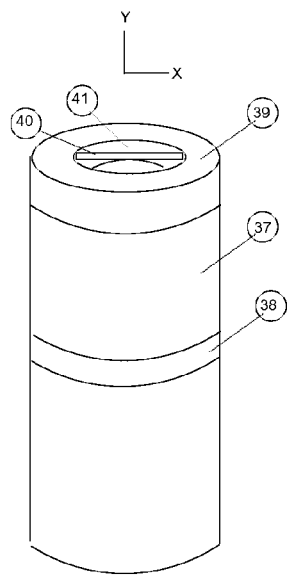

FIG. 8—illustrates a cylindrically shaped Item or any shape Item housed inside cylindrical Container. Extra space inside Container could be filled with shock-absorbing material (foam, bubble wrap, etc.). Placing Item inside Container could also provide additional protection, as needed, of rather expensive or fragile Items throughout the entire process: from point of manufacturing, through ADVS processing, to point of sale. Container could have small holes for "air circulation", as needed, to preserve Item inside.

Figure elements are labeled as follows:
37—Cylindrical Container, which could house one Item. Container could be made out of plastic.
38—Container circular barcode label, which could be in a form of a tape wrapped around body of Container as shown. Barcode label could contain information about Container and/or it's content.
39—Container lid, which protects content inside
40—Container lid pull-out handle
41—Container lid recess area FIG. 9—illustrates a cylindrically shaped Container, which could be used for housing several Items. The middle section of Container is shaped for convenient handling by ADVS Automatic Gripper Loading/Unloading assembly. The interior of the Container could have vertical and/or horizontal separator walls/panels, as shown on FIG. 10. Figure elements are labeled as follows:

39-41—are labeled same as on FIG. 8

42—Compartmental Container, which could house several Items

43—Section of Container, which is shaped for convenient handling by ADVS Automatic Gripper Loading/Unloading assembly, and which could be also used for placement of a flat barcode label. Barcode label could contain information about Container and/or it's content.

Figure 10:
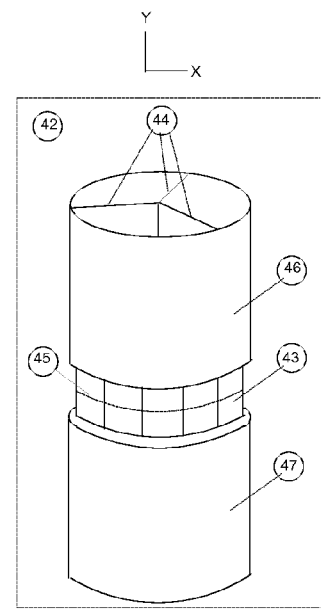

FIG. 10—illustrates a cylindrically shaped compartmental Container with the lid removed. As shown, Container has six individual compartments, each of which could house an Item.

Figure 9:
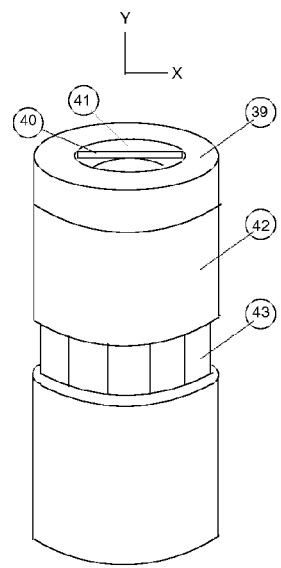

Figure elements are labeled as follows:

39-43—are labeled same as on FIG. 9

44—Compartmental Container vertical separator walls

45—Compartmental Container horizontal separator walls

46—Compartmental Container upper section(s)

47—Compartmental Container lower section(s)

Figure 11:
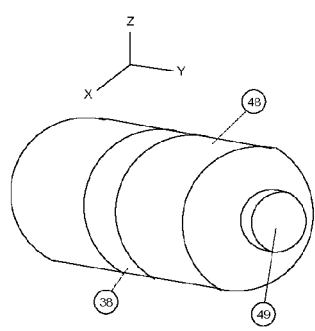

FIG. 11—Item or Container shaped in a form of a bottle. Figure elements are labeled as follows:

38—labeled same as on FIG. 8

48—Container shaped as a bottle

49—The lid of bottle-shaped Container, which protects content inside

Figure 12:
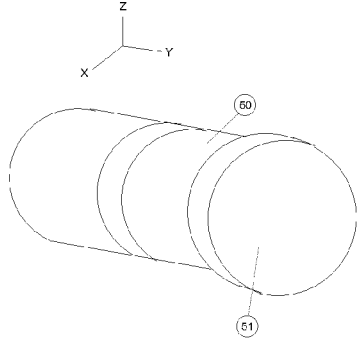

FIG. 12—Container similar to the one shown on FIG. 8, but with a different type lid.

Figure elements are labeled as follows:

38—is labeled same as on FIG. 8

50—Container's body

51—Container's lid

Figure 13:
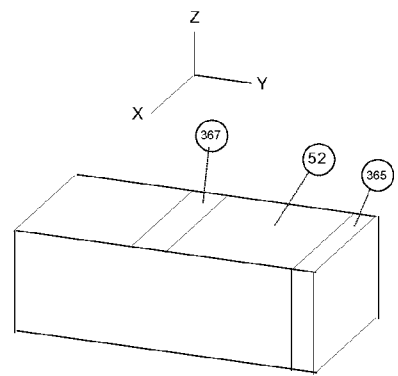

FIG. 13—Item or Container shaped as a rectangular box. Figure elements are labeled as follows:

52—Rectangular Container's body

365—Rectangular Container's lid

367—Area, which could be used for placement of barcode label. Barcode label could contain information about Container and/or it's content.

FIG. 14 through FIG. 28 illustrate designs of stationary and removable types of Item Carriers.

Figure 14:
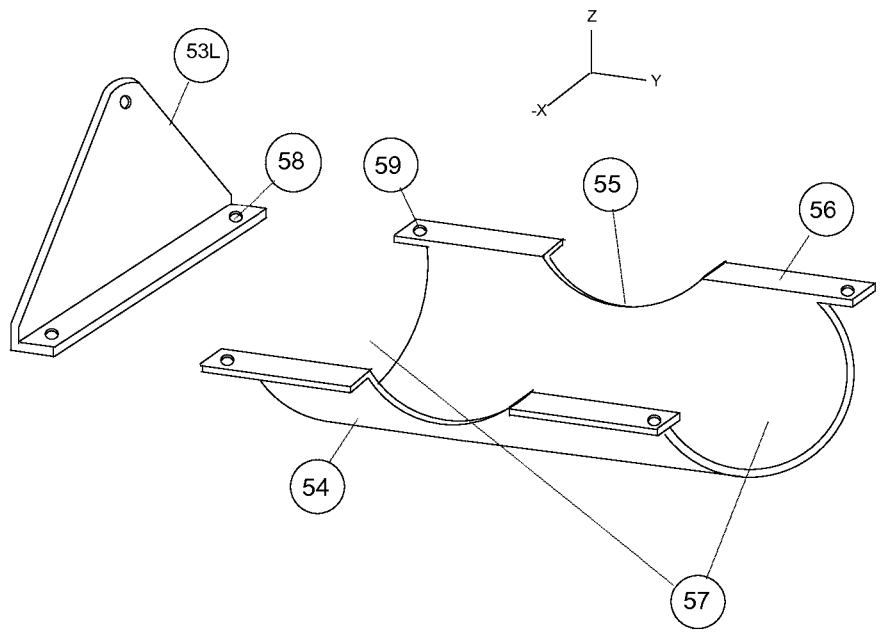

FIG. 14—Illustrates stationary Carrier components and assembly steps. The inner surface geometry of the Carrier Item holding assembly (54) could be designed to match the outer surface geometry of respective Item or Container it will need to house. This could be also accomplished by Item specific Inserts, which could be installed into the holding assembly, as illustrated on FIG. 16. Velcro-type strips could be added to the inner surface of holding assembly (54) to engage with mating Velcro-type strips attached to Item or Container, to secure their position inside the Carrier. Depending on application, Carrier components could be made out of plastic, or sheet metal, or aluminum, etc.

Figure elements are labeled as follows:

53L—Carrier side support panel on the left side of Carrier (only one shown for simplicity)

54—Carrier holding assembly for round-shaped Items, or Containers, or Inserts

55—One of two slots in the Carrier holding assembly for convenient access of Items inside Carrier by Automatic Gripper assembly 56—One of Carrier holding assembly platforms, which could be used for placing barcode label(s). Barcode label could contain information related to Carrier.

57—Indicates an open area (no components!)

58—One of mounting holes, not threaded, which could be used for attaching Carrier holding assembly (54)

59—One threaded mounting holes for attaching Carrier holding assembly

Figure 15:
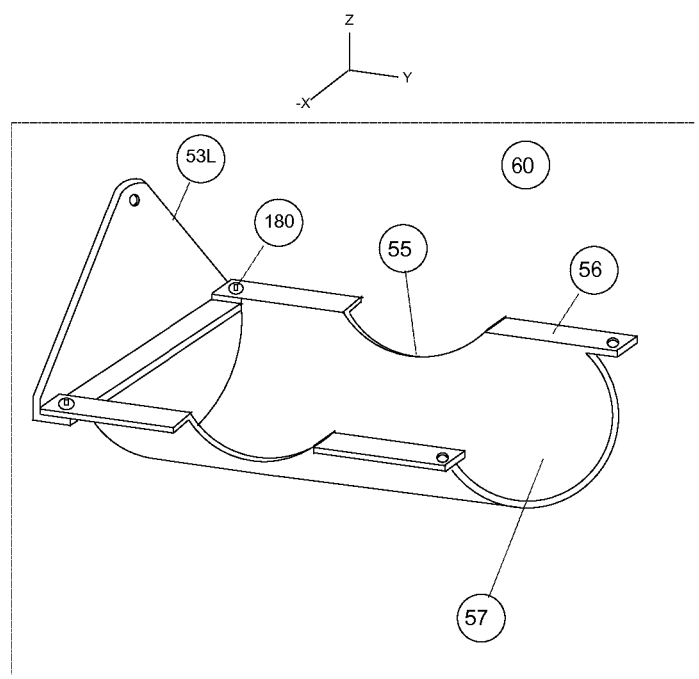

FIG. 15—Assembled section of a Carrier. Not all components are shown for simplicity.

Figure elements are labeled as follows:

53L,55-57—are labeled same as on FIG. 14

180—One of mounting screws for securing position of Carrier holding plate

Figure 16:
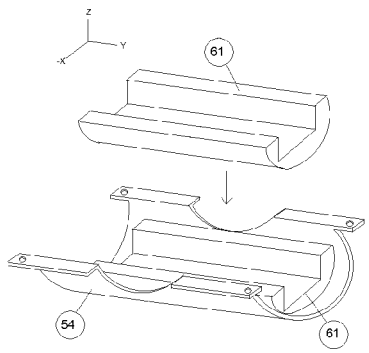

FIG. 16—Illustrates Carrier Insert (61) for rectangular type Items. The inner surface geometry of the Carrier holding assembly (54) could be designed to match the outer surface geometry of respective Item or Container it will need to house. For more flexibility, an Insert (61) could be designed to have inner surface matching the outer surface geometry of respective Item and used, as shown. The outer surface of Inserts could match the inner surface of Carrier holding assembly. There could be several methods of attaching and securing Inserts inside the Carrier holding assembly (54), such as: mounting screws, glue, Velcro-type strips, etc. Depending on application, Carrier Inserts could be made out of plastic (molded), or sheet metal, or aluminum, etc.

Figure 17:
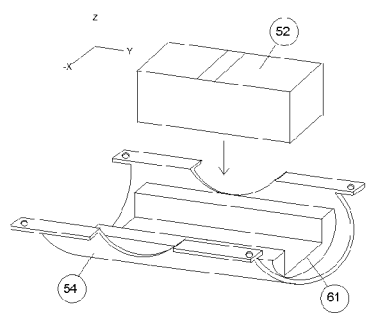

FIG. 17—Illustrates rectangular type Item (52) being placed inside Carrier holding assembly (54) with attached Insert (61) to match Item's shape.

Figure 18:
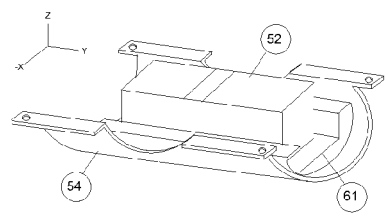

FIG. 18—Illustrates rectangular type Item (52) inside Carrier holding assembly (54) with Insert (61) inside to match Item's shape. Velcro-type strips (not shown) could be added to the inner surface of (61) to engage with mating Velcro-type strips of (52).

Figure 19:
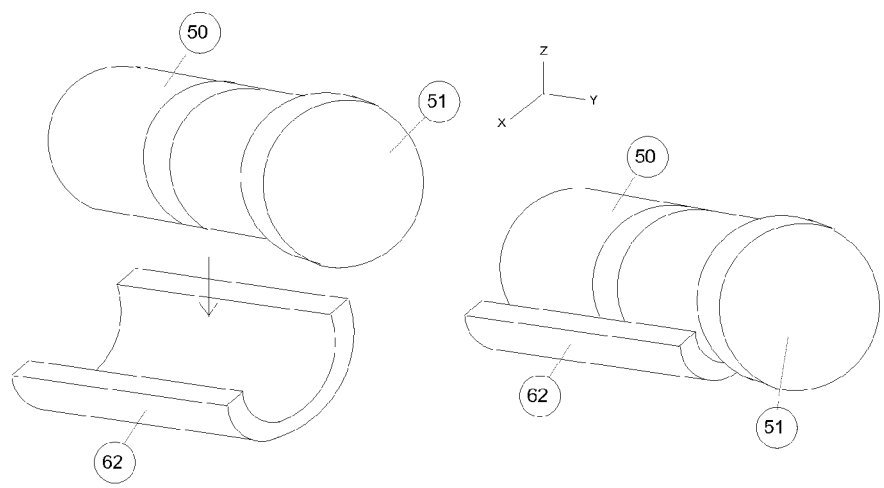

FIG. 19—Illustrates Carrier components and it's assembly steps for applications with cylindrical type Item or Container packing (50), which has a rather large lid (51). As with the previous case, this Item packing could be accomplished by Item specific Insert (62). Velcro-type strips (not shown) could be added to the inner surface of (62) to engage with mating Velcro-type strips of Item or Container, to secure their position inside Insert and Carrier. Depending on application, Carrier components could be made out of plastic (molded), or sheet metal, or aluminum, etc. Figure elements are labeled as follows:

50—Body of a cylindrically shaped Item or Container

51—Item or Container lid or cap

FIG. 20—Carrier Item(s) holding plate assembly. Holding plate(s) could be used for holding/support of individual tubes or vials, as shown. This design of Carrier could allow ADVS to process Items placed inside each tube. Tubes/vials could contain various type of Items in a form of: liquid, powder, solid, etc.

Figure elements are labeled as follows:

43—Area of holding plate assembly platform for placing barcode label, which could contain information about holding plate and/or Items loaded into it.

58—One of mounting holes, not threaded

63—Carrier removable holding plate for multiple Items or Containers, such as: vials, tubes, etc. Holding plate shown empty with maximum capacity of 24.

64—Carrier removable holding plate platform

65—Carrier removable holding plate platform openings (total 24, as shown) for placing an Item or a Container, such as: vial, tube, etc. The size of each opening could be designed accordingly to the size of respective type of Item or Container it is intended for. The construction of the platform, such as: material, physical dimensions—could be designed accordingly to maximum weight of the load.

66—Slot in platform (64), which could be used by Automatic Gripper assembly for convenient handling of the holding plate (empty or loaded), as needed, during it's automatic loading into respective Carrier or unloading out of specified Carrier.

FIG. 21—Carrier side support panel, which could be used on the left side of Carrier, and support removable holding plate, empty or loaded with Items or Containers.

Figure elements are labeled as follows:

67L—Carrier support assembly for removable holding plate, which could be used on left side of a Carrier 68—One of mounting pin for installation of removable holding plate FIG. 22—Carrier assembly based on flat plate-type removable Item holding/support plate with properly sized openings for handling specific size tubes/vials, shown loaded with 24 tubes. Pre-loaded holding plate with Containers or Items could be loaded or unloaded from Carrier Conveyor manually by authorized personnel, or automatically by ADVS Automatic Gripper assembly.

Figure elements are labeled as follows:

63—Carrier removable holding plate shown loaded with maximum capacity of 24 tubes.

67L—Carrier support assembly for removable holding plate, which could be used on left side of a Carrier 68—One of mounting pin for installation of removable holding plate 69—Item or Container with Item(s) inside, shaped as a tube or a vial FIG. 23—Item or Container shaped as a tube/vial. This type of Containers could be used for handling and processing Item(s) inside for variety of applications. Figure elements are labeled as follows:

69—Item or Container with Item(s) inside, shaped as a tube or a vial

70—Body of (69)

71—Lid of (69)

FIG. 24—Item or Container to be handled by ADVS. FIG. 24 through FIG. 28 illustrate design steps of a Carrier for specific Container. For simplicity, cylindrical shaped Container is shown, without an Insert.

Figure elements are labeled as follows:

37—Container of cylindrical shape with following parameters:

D1—Diameter of the Container base

L1—Length of the Container

P1—Weight of the Container with respective Item(s) inside

FIG. 25—Side view of a Carrier design, which could be used for Container shown on FIG. 24.

Figure elements are labeled as follows:

37—same as labeled on FIG. 24

53L—Carrier support assembly, left side

54—Carrier holding assembly for (37)

81L—Carrier support bearing assembly, left side

W2—Width of Container

H1—Distance from top of Container inside Carrier to Carrier side ledge

H2—Distance from bottom of Carrier to Carrier side ledge

H3—Distance from center of Carrier support bearing to bottom of Carrier, which could be considered as Carrier swing radius around center of (81L)

FIG. 26—Top view of the empty Carrier shown on FIG. 25. Figure elements are labeled as follows:

53L—Carrier support assembly, left side

53R—Carrier support assembly, right side

60—Conveyor Carrier assembly (not all components are shown)

108B—Carrier barcode label, located at the bottom of Carrier. Barcode label could contain information about Carrier. The information could include Carrier parameters, which could be used by ADVS for proper identification and usage of the Carrier for respective range of Items or Containers. This barcode label at the bottom will be covered by Item or Container loaded inside the Carrier. This fact could be detected by respective ADVS Controller, and could be used by Controller to verify or establish if respective Carrier is loaded or not, and also used by ADVS computer(s) for overall real-time inventory management of available capacity of empty Carriers with an objective to optimize their loading to achieve prompt availability of specified Items at designated locations.

108T—Carrier barcode label, which could be the same as 108B, but located on top of Carrier side ledge. This barcode label could be used by respective ADVS Controller for continuous verification of presence of respective Carrier within the system.

FIG. 27—Top view of the Carrier shown on FIG. 26, with Container (37) inside.

Figure elements are labeled as follows:

53,60,108—are labeled same as on FIG. 26

37—Cylindrical Container, shown on FIG. 24

FIG. 28—Carrier Clearance sphere, which as defined in paragraph 7.3, is an area, surrounding Carrier, designated to be free from other Carriers at all times, and is considered during design of Conveyor. The size of this sphere could be optimized, as needed, for maximum utilization of space for a specific application.

Figure elements are labeled as follows:

72—Carrier Clearance sphere

D2—Diameter of (72)

FIG. 29 through FIG. 62 illustrate design of dual synchronized Conveyor and related components. As defined in paragraph 7.3, ADVS Conveyor system consists of dual synchronized sub-Conveyors on each side of the Carrier, from which Carriers could be supported via respective Bearing assemblies. This method could ensure minimum disturbance of Content inside Carrier during Conveyor motions. Roller-type sub-Conveyor adjacent Wheels could be interconnected with special brackets. One method of interconnecting adjacent Wheels on the opposite side of the Carriers, could be accomplished via Joint Brackets, while the other method of interconnecting adjacent Wheels from the side facing Carriers, could be accomplished by Carrier Support Brackets. Combination of Wheels interconnected by brackets could form a continuous chain of Wheels and respective Joint Brackets, which could also be formed into a closed-loop chain. ADVS Conveyor could be based on the closed-loop chain of Wheels interconnected as described above, which could move along respective Guiding Rails under direction of respective Controller and drive electronics, which is defined in paragraph 7.3 as Roller-type Conveyor. Sub-Conveyor components on the positive end of "Y-axis" are labeled with a suffix "R", while similar components on the opposite side are labeled with a suffix "L". Such numbers as Wheel #1 or Drive Slot #1 are used for illustration purposes only.

Figure 29:
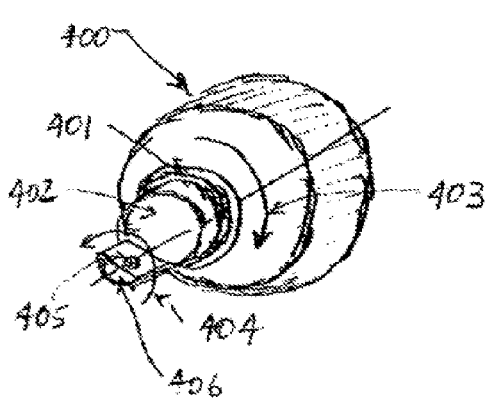

FIG. 29—Roller-type sub-Conveyor Wheel assembly. The Wheel (400) could be made out of plastic, or any other suitable material, with the objective to minimize noise and friction between the outer surface of the Wheel and the inner surface of the sub-Conveyor Guiding Rails during Conveyor movements. The outer surface of the Wheel could also be shaped to properly match the inner surface of the sub-Conveyor Guiding Rails with the objective to ensure smooth rotation of Wheels during Conveyor movements. The Wheels Bearing (401) and the respective Support Shaft (402) inserted into the Bearing could be also designed with the objective to ensure smooth rotation of Wheels during Conveyor movements, including changes in direction, etc. As shown, the Support Shaft (402) could rotate CW/CCW around the axis it's respective Bearing (401) it is installed into. Figure elements are labeled as follows:

405—One of threaded mounting holes (not all shown), which could be used for attaching Joint Bracket or Carrier Support Bracket

400—sub-Conveyor Support Wheel, which could have a Bearing (401) installed inside.

402—Carrier Support Shaft, which could be installed into Bearing (401)

403—Possible rotation CW of (400) in relation to (402)

404—Possible rotation CCW of (400) in relation to (402)

405—Threaded mounting hole (not all shown), which could be used to attach Joint Bracket to the top of Carrier Support Shaft Platform (406)

406—Carrier Support Shaft Platform, part of (402)

407—sub-Conveyor Support Wheel assembly

Figure 30:
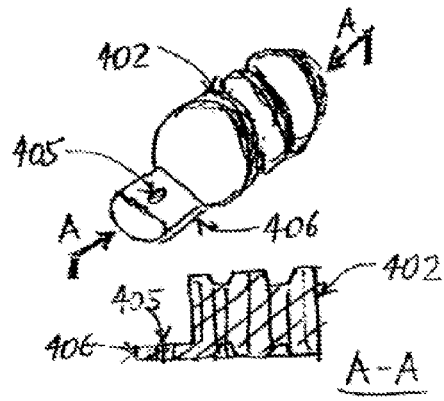

FIG. 30—Carrier Support Shaft detail, including cross-section A-A.

Figure elements are labeled same as on FIG. 29.

Figure 31:
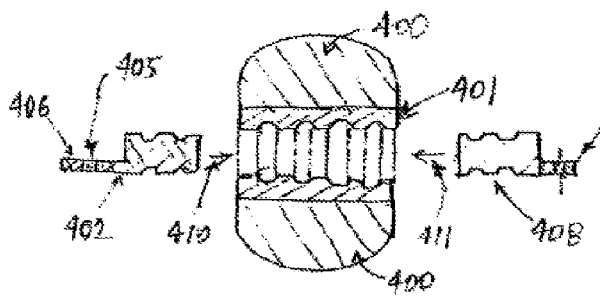

FIG. 31—Cross section view of Roller-type sub-Conveyor Wheel assembly (407) components.

Figure elements are labeled as follows:

408—Joint Bracket Support Shaft, which could be installed into Bearing (401)

409—Joint Bracket Support Shaft Platform, part of (408), which could be used for mounting Joint Brackets

410—Direction of inserting (402) into (400)

411—Direction of inserting (408) into (400)

Remaining elements are labeled same as on FIG. 29.

Figure 32:
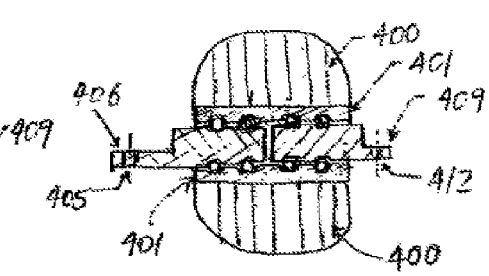

FIG. 32—Cross-section view of assembled Roller-type sub-Conveyor Wheel assembly Figure elements are labeled same as on FIG. 31

Figure 33:
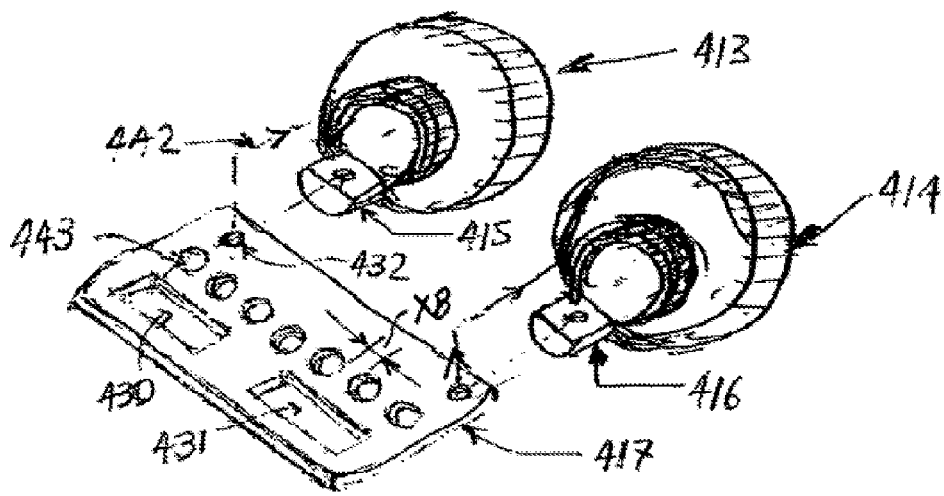

FIG. 33—Illustrates installation step of a partially shown Joint Bracket (417) in-between adjacent Roller-type sub-Conveyor Wheel assemblies (413) and (414). Together with Carrier Support Brackets, Joint Brackets, could interconnect sub-Conveyor Wheel assemblies into one closed-loop chain.

Figure elements are labeled as follows:

413—sub-Conveyor Wheel assembly #1

414—sub-Conveyor Wheel assembly #2

415—Joint Bracket Support Shaft Platform of sub-Conveyor Wheel assembly #1

416—Joint Bracket Support Shaft Platform of sub-Conveyor Wheel assembly #2

417—section of a Joint Bracket, shown with two Drive Slots (430, 431), and seven Index Holes (443) The design of Joint Bracket, including such parameters as: material, thickness along "Z-axis", overall length along "X-axis", number of Drive Slots and distance in-between them along "X-axis", distance in-between Index Slots along "X-axis" should be properly selected to ensure sufficient support and reliable engagement between Drive and Idle Sprockets and Joint Bracket Drive Slots. Details on FIG. 35.

430—Joint Bracket (417) Drive Slot #1

431—Joint Bracket (417) Drive Slot #2

432—one of two mounting holes, which could be used for attaching Joint Bracket (417) to respective Joint Bracket Support Shaft Platforms of sub-Conveyor Wheel assembly #1 and #2. The design of all respective components should ensure reliable mounting and interconnection between Joint Brackets and sub-Conveyor Wheel assemblies.

443—Joint Bracket Index Slot, shown as a round opening through Join Bracket, which could be detected by optical Sensors, and used by Controller to monitor linear position of the respective sub-Conveyor. Distance X8 between adjacent Index Slots could be made small enough to provide required resolution for accurate Conveyor position tracking. Index Slots could be sized and spaced a part to match the gap in-between adjacent Joint Brackets, so that the gap itself, could be considered as an Index Slot also—details on FIG. 35.

Figure 34:
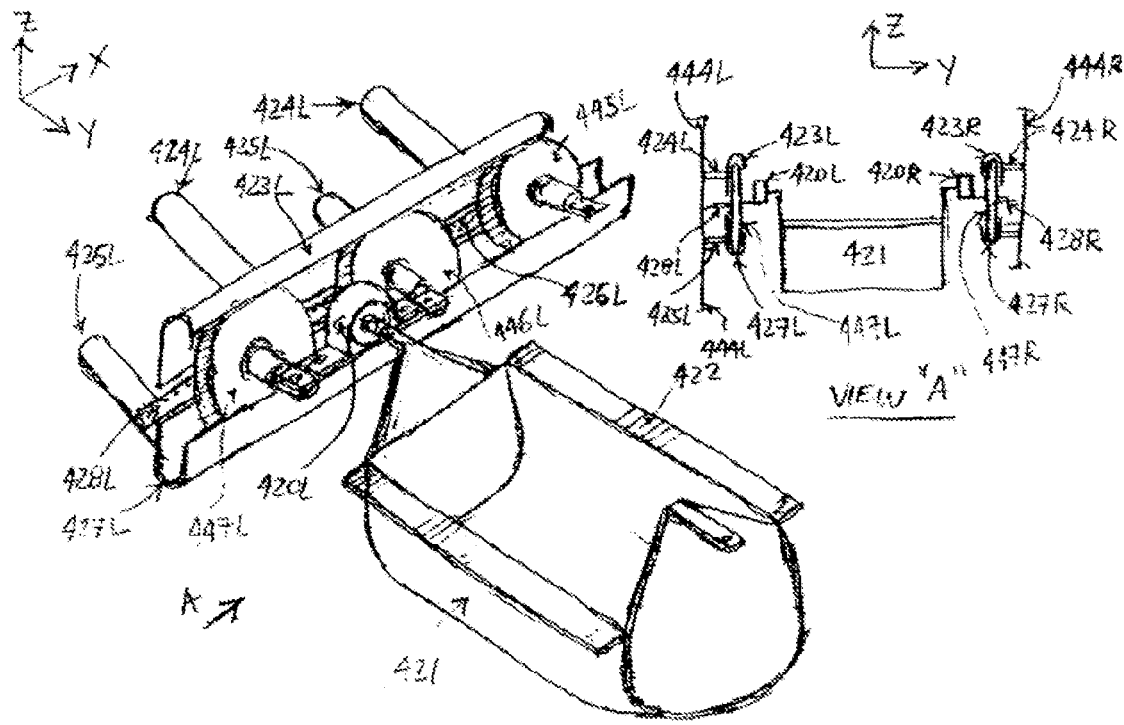

FIG. 34—section of Roller-type dual synchronized Conveyor assembly, and related details. Empty Carrier (421) is shown being supported from one side by sub-Conveyor on the left, with respected component labeled with suffix "L". The sub-Conveyor on the right is shown on View A, and could be used in a similar way to support the Carrier (421) from the right side. It's respective component labels have suffix "R". View "A" also illustrates the available space above Carrier (421), which could be used for loading/unloading of Items in/out of Carrier, as well as for addition of Process Chambers, as needed.

Figure elements, including view A, are labeled as follows:

423L/R—left/right sub-Conveyor Top Guiding Rail

424L/R—left/right Top Guiding Rails Mounting Brackets

425L/R—left/right Bottom Guiding Rails Mounting Brackets

426L—left Joint Bracket #2. For simplicity, not all details are shown here.

427L/R—left/right sub-Conveyor Bottom Guiding Rail

428L/R—left/right Joint Bracket #1. For simplicity, not all details are shown here.

445L—left sub-Conveyor Wheel #1

446L—left sub-Conveyor Wheel #2

447L/R—left/right sub-Conveyor Wheel #3

420L/R—left/right Carrier Support Bracket assembly

444L/R—side panels of Module Inner Enclosure, which could be used to support respective sub-Conveyor Guiding Rails (423,427) via respective Rail Mounting Brackets (424,425)

Figure 35:
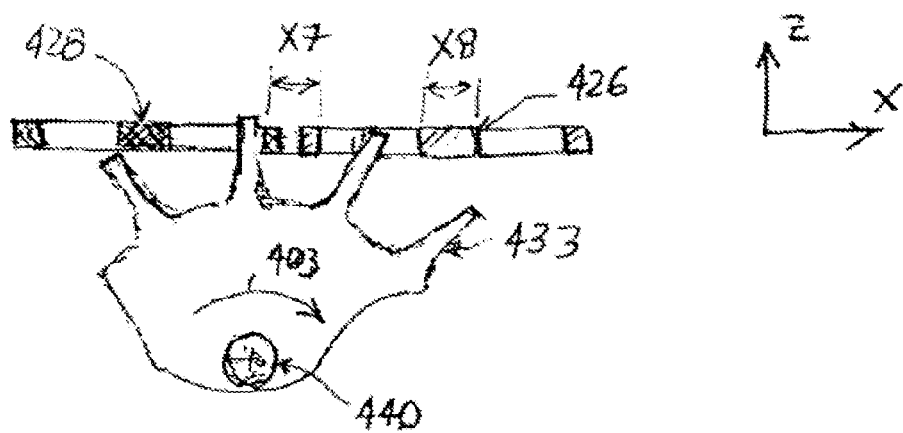

FIG. 35—Illustrates engagement in-between Drive Sprocket Wheel (433) and respective Drive Slots of adjacent Joint Brackets (426) and (428), which are shown as a cross-section along "X-axis" through the center line of their respective Drive Slots. Respective sub-Conveyor Wheels and other components are not shown for simplicity. Figure elements are labeled as follows:

403—CW rotation of the Joint Brackets Drive Sprocket Wheel (440), which could advance Joint Brackets (426) and (427) along "X-axis".

440—Joint Brackets Drive Sprocket Wheel shaft

X7—Distance between adjacent Joint Brackets Drive Slots should be equal to X8

X8—Distance between adjacent Drive Slots of a Joint Bracket

Figure 36:
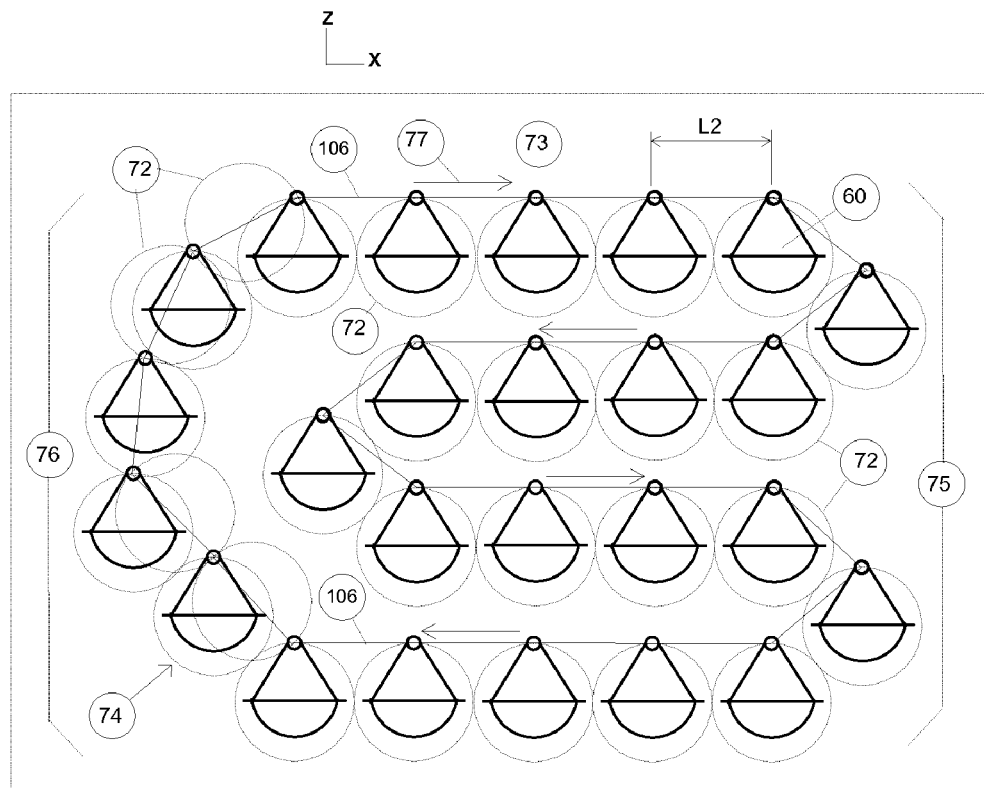

FIG. 36—Illustrates one of possible layouts of Roller-type dual synchronized Carrier Conveyor assembly with a capacity of 25 Carriers. The layout could be used for loading of Items by Automatic Gripper assembly, and then unloading by either Automatic Gripper assembly or Automatic Slider assembly (Customer side only). Figure elements are labeled as follows:

60—Item Carrier assembly

72—Carrier Clearance Sphere

73—Roller-type dual synchronized Carrier Conveyor assembly

Figure 37:
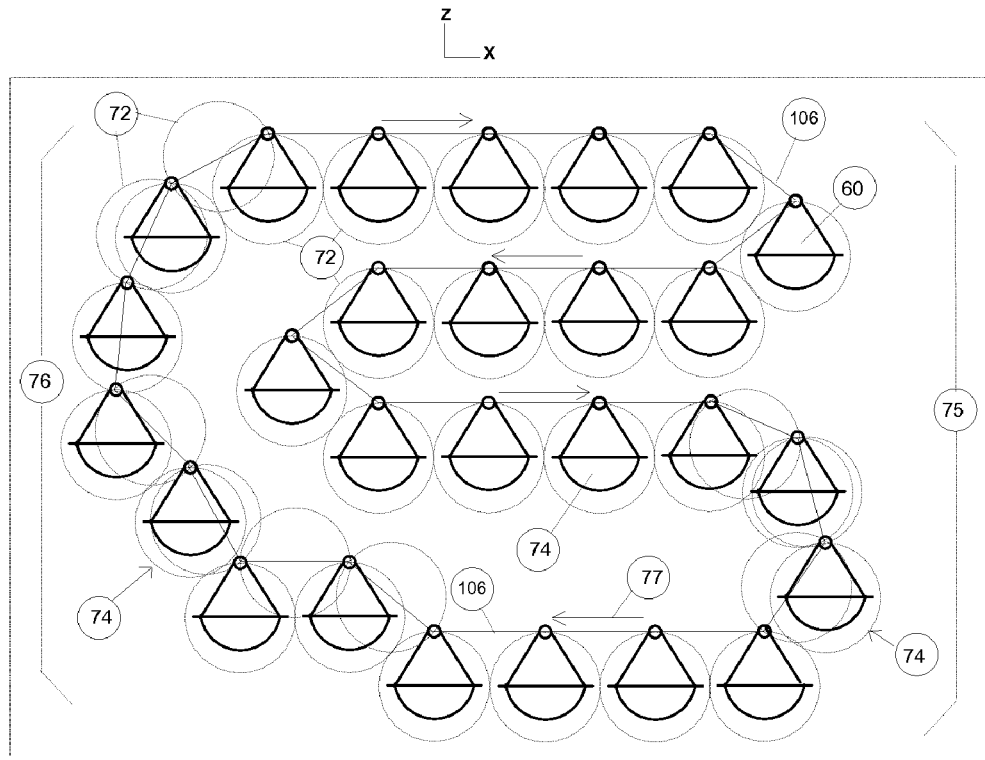

74—location, which could be used for unloading Items by Automatic Slider assembly 75—Provider side
76—Customer side
77—Direction of Conveyor motion
106—represents Conveyor direct linkage line, for layout purposes
L2—Distance between centers of adjacent Carrier Support Bearings FIG. 37—Illustrates one of possible layouts of Roller-type dual synchronized Carrier Conveyor assembly with a capacity of 27 Carriers. The layout could be used for loading of Items by Automatic Gripper assembly, and then unloading by either Automatic Gripper assembly or Automatic Slider assembly on both Customer and Provider sides. Figure elements are labeled same as on FIG. 36.

Figure 38:
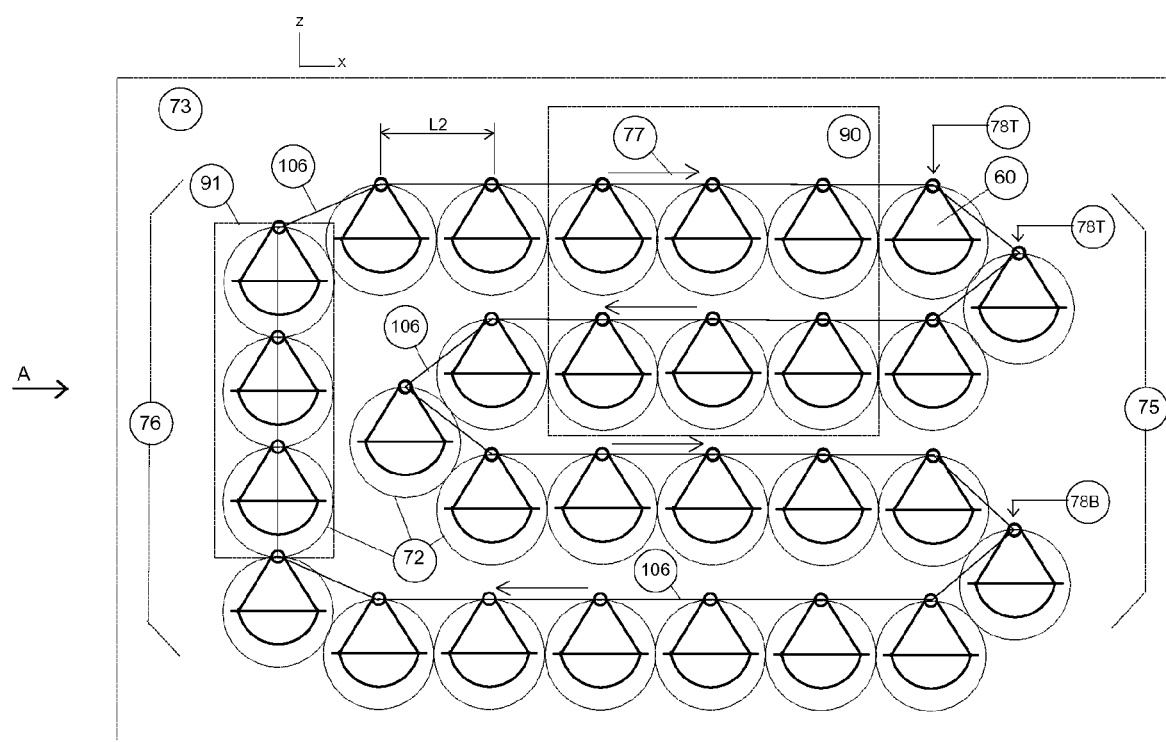
Figure 39:
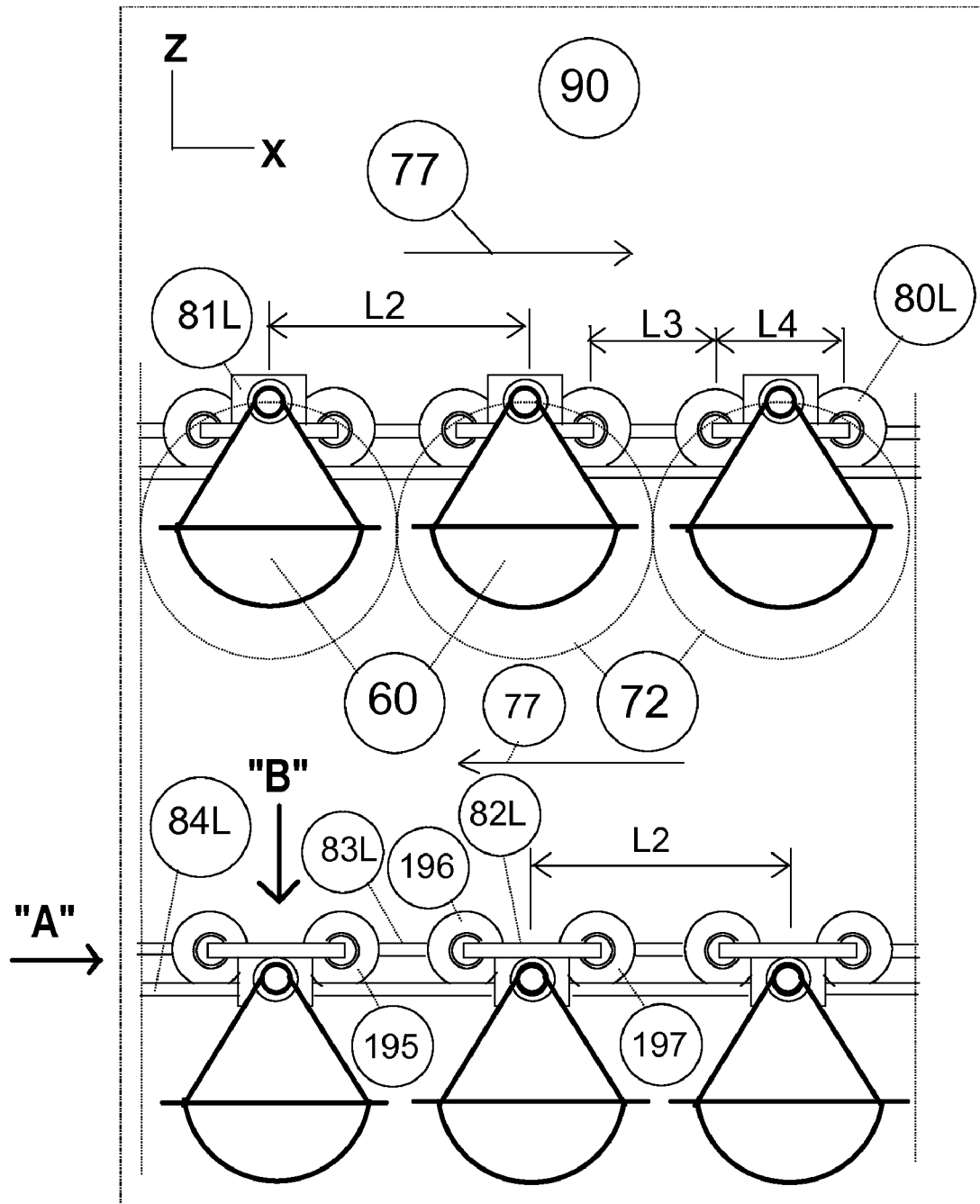
Figure 91:
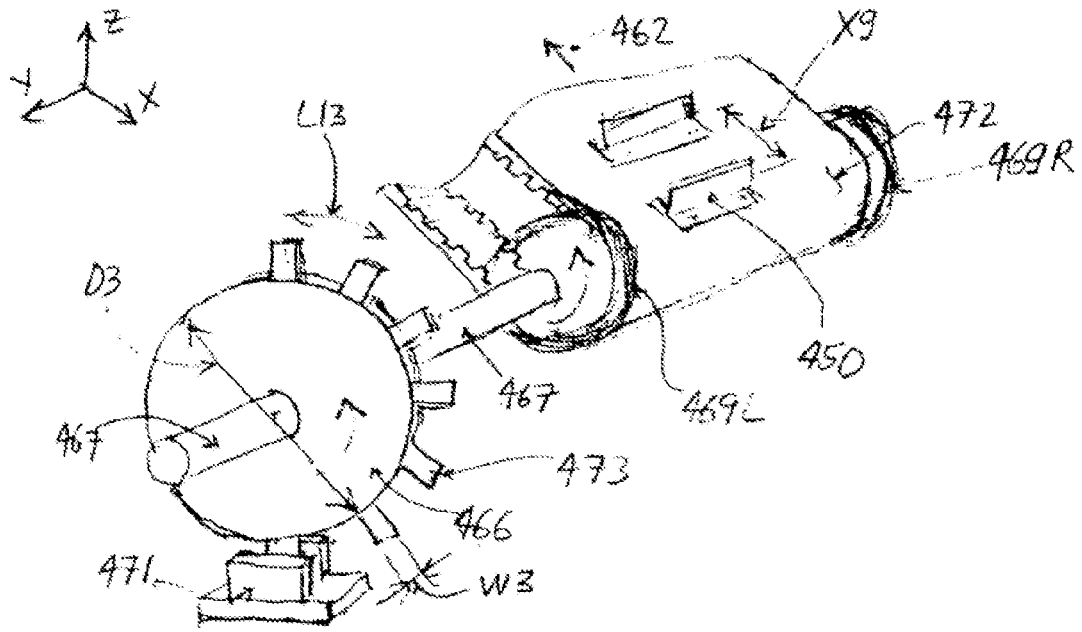

FIG. 38—Illustrates one of possible layouts of Roller-type dual synchronized Carrier Conveyor assembly with a capacity of 29 Carriers. The layout could be used for loading/unloading of Items by Automatic Gripper assembly. View "A" of the Roller-type dual synchronized Carrier Conveyor inside a Module is shown on FIG. 46. Figure elements are labeled as follows:

78T/B—respective top/bottom Conveyor locations, which could be designated for Item loading/unloading by Automatic Gripper assembly, Provider side
90—Conveyor horizontal section, details shown on FIG. 39
91—Conveyor vertical section, Customer side, which could be suitable for unloading Items by Automatic Gripper assembly. View "A" of section (91) is shown on FIG. 42. Remaining elements are labeled same as on FIG. 36.

FIG. 39—Illustrates details of section (90), shown on FIG. 38. For simplicity, only the details of the left sub-Conveyor are shown. View "A" is shown on FIG. 40.
Figure elements are labeled as follows:
60—Item Carrier assembly
72—Carrier Clearance Sphere
77—Direction of Conveyor motion
80L—Carrier support Wheel assembly, left side. For illustration purposes, other Carrier support Wheel assemblies are labeled: 195, 196, 197 respectively
81L—Carrier Support Bearing assembly, left side
82L—Carrier support Joint Bracket, left side, which could be used to inter-connect adjacent Support Wheels (196) and (197) from Carrier side
83L—Wheel assembly Joint Bracket, left side, which could be used to inter-connect adjacent Support Wheels (195) and (196) from the side opposite to Carrier side
84L—left sub-Conveyor horizontal lower Guides assembly
L2—Distance between centers of adjacent Carrier Support Bearings. L2=L3+L4.
L3—Distance between centers of adjacent Conveyor Wheels or Rollers, from Joint Brackets side
L4—Distance between centers of adjacent Conveyor Wheels or Rollers, from Carriers side Selection of L3 and L4 should be made per specific application with objectives to provide optimum utilization of available space and to ensure reliable operation of the Conveyor at the points of changing directions.

Figure 40:
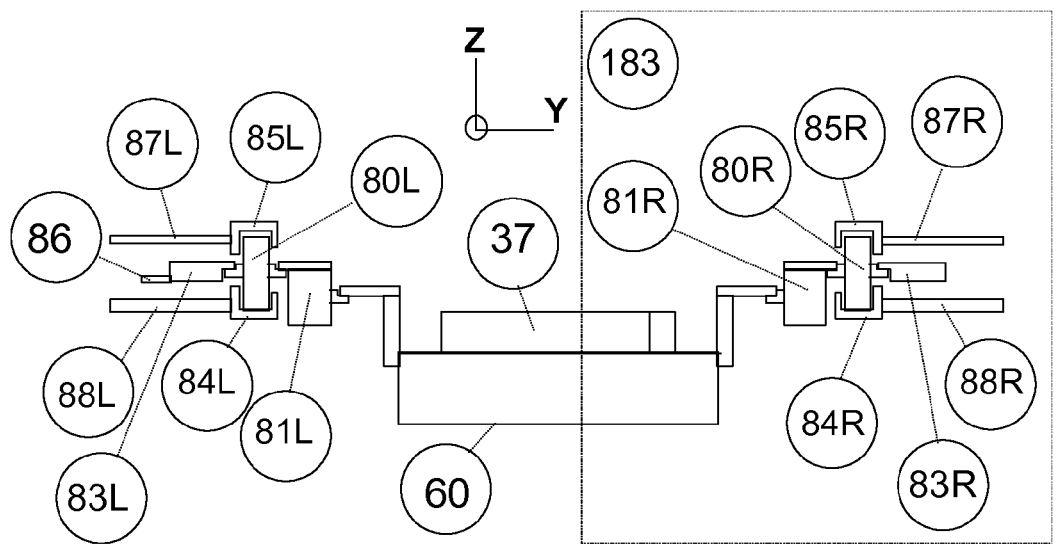

FIG. 40—Illustrates view "A" of the left sub-Conveyor as shown on FIG. 39. Right sub-Conveyor details were added. Figure elements are labeled as follows:
37—cylindrical shape Item or cylindrical shape Container
60—Item Carrier assembly
80L/R—Carrier support Wheel assembly
81L/R—Carrier Support Bearing assembly
83L/R—Wheel assembly Joint Bracket
84L/R—sub-Conveyor horizontal lower Guides assembly
85L/R—sub-Conveyor horizontal upper Guides assembly
86—Joint Bracket (83) position Flag
87L/R—Support brackets for respective sub-Conveyor upper Guides assembly
88L/R—Support brackets for respective sub-Conveyor lower Guides assembly
183—section shown in-detail on FIG. 44

Figure 41:
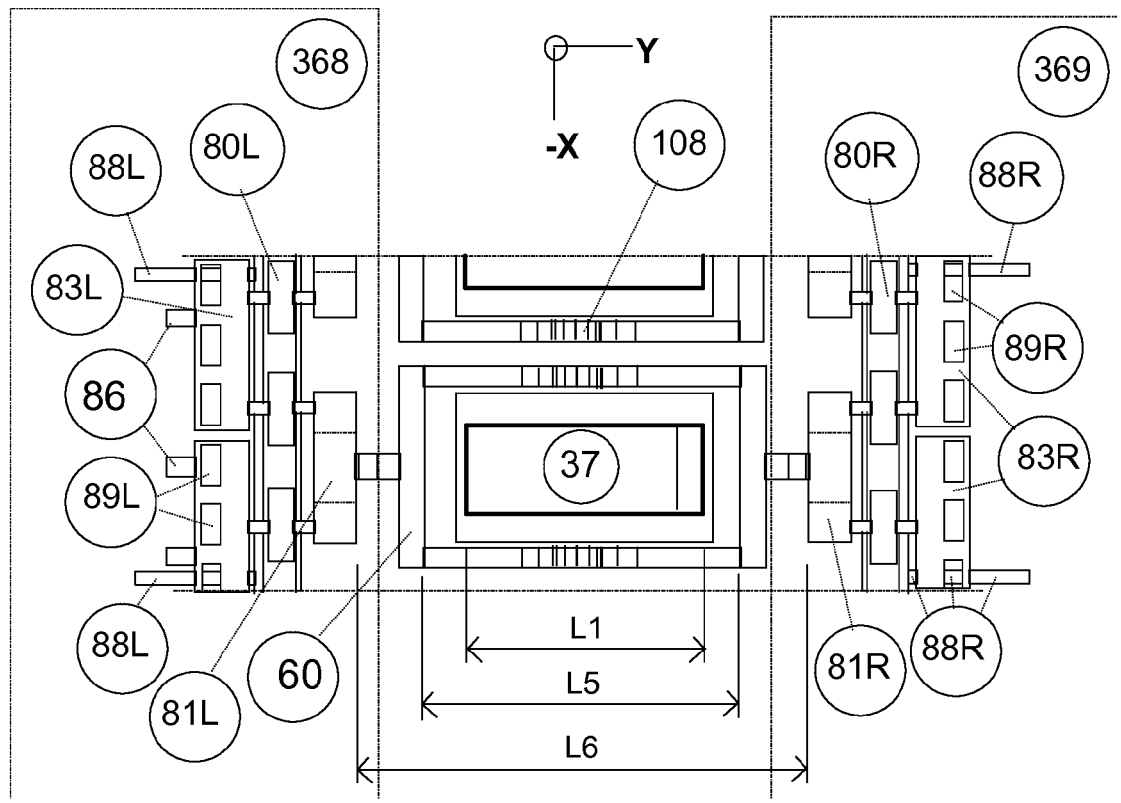

FIG. 41—Illustrates top of the section of left/right sub-Conveyors shown on FIG. 40.
Figure elements are labeled as follows:
108—Carrier barcode label. As shown, depending on application, each Carrier could have several barcode labels, which could be attached to: top of leading edge, top of trailing edge and top of inner bottom surface of the Carrier cavity.
89L/R—respective Drive Slots of left/right Joint Brackets (83)
368—group of components of the left sub-Conveyor
369—group of components of the right sub-Conveyor
The remaining elements are labeled same as on FIG. 40.

Figure 42:
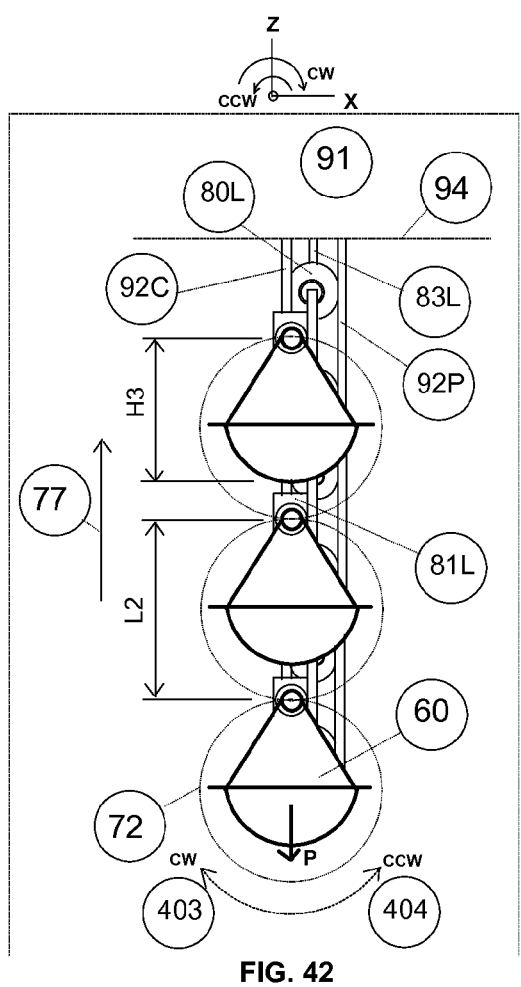

FIG. 42—Illustrates details of section (91) of FIG. 38. This section could be used for unloading of Items by Automatic Gripper assembly, Customer side. For simplicity, only left sub-Conveyor details included.
Figure elements are labeled as follows:
60—Item Carrier assembly
72—Carrier Clearance Sphere
77—Direction of Conveyor motion
80L—Carrier support Wheel assembly, left side
81L—Carrier Support Bearing assembly, left side
83L—Wheel assembly Joint Bracket, left side
92C—left sub-Conveyor vertical Guides assembly, facing Customer side
92P—left sub-Conveyor vertical Guides assembly, facing Provider side
94—section top "break" line
403—Carrier rotation around Support Bearing (81) CW (clock-wise)
404—Carrier rotation around Support Bearing (81) CCW (counter-clock-wise)
P—combined weight of Carrier and Item loaded inside of it. As shown, the weight will keep the Carrier loaded with Item inside in vertical position.
L2—Distance between centers of adjacent Carrier Support Bearings
H3—Distance from center of Carrier Support Bearing to bottom of Carrier (Carrier swing radius)

Figure 43:
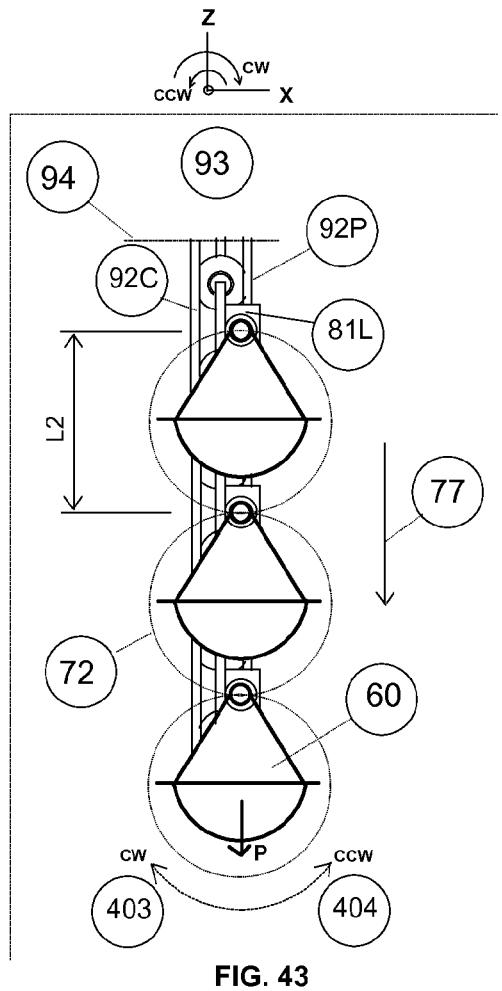

FIG. 43—Illustrates details of section (93), which is similar to section (91) shown on FIG. 42, but implemented on Provider side. This section could be used for unloading of Items by Automatic Gripper assembly, Provider side. For simplicity, only left sub-Conveyor details included.
Figure elements are labeled as follows:
187—section, which is shown in more details on FIG. 45
Remaining elements are labeled same as on FIG. 42.

Figure 44:
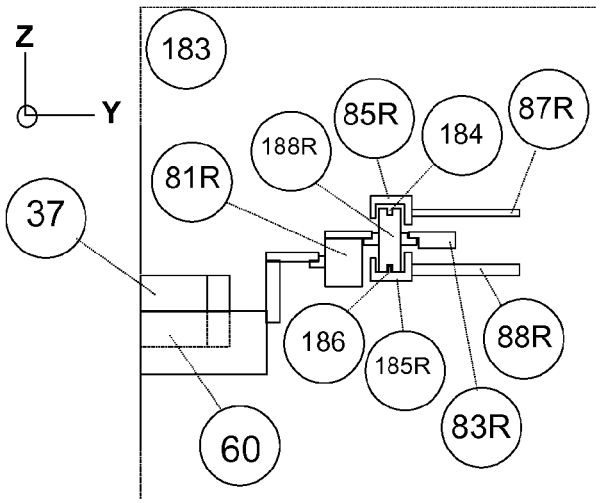

FIG. 44—Illustrates details of section (183) of FIG. 40. To further improve the control of the Wheels trajectory within the tracks, additional Rail (186) could be added to the lower Guiding Tracks (185), to match the respective grove or slot (184) along the perimeter of the respective Wheels.
Figure elements are labeled as follows:
184—Roller-type sub-Conveyor Carrier Support Wheel retaining slot
185R—right sub-Conveyor horizontal lower Guides assembly with Support Wheel retaining rail (186)
186—Retaining Rail, part of lower Guides (185)

188R—one of Carrier Support Wheels with retaining slot, part of right Roller-type sub-Conveyor Remaining elements are labeled same as on FIG. 40.

Figure 45:
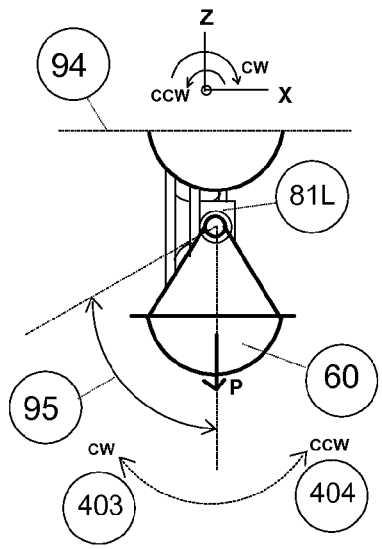

FIG. 45—Illustrates details of section (187) of FIG. 43. Figure elements are labeled as follows:

95—Carrier 'swing" angle. The design of respective components should ensure that during Conveyor motion, the combined weight of Carrier with Item loaded inside of it (P), could keep the "swing" angle at minimum. Remaining elements are labeled same as on FIG. 43.

Figure 46:
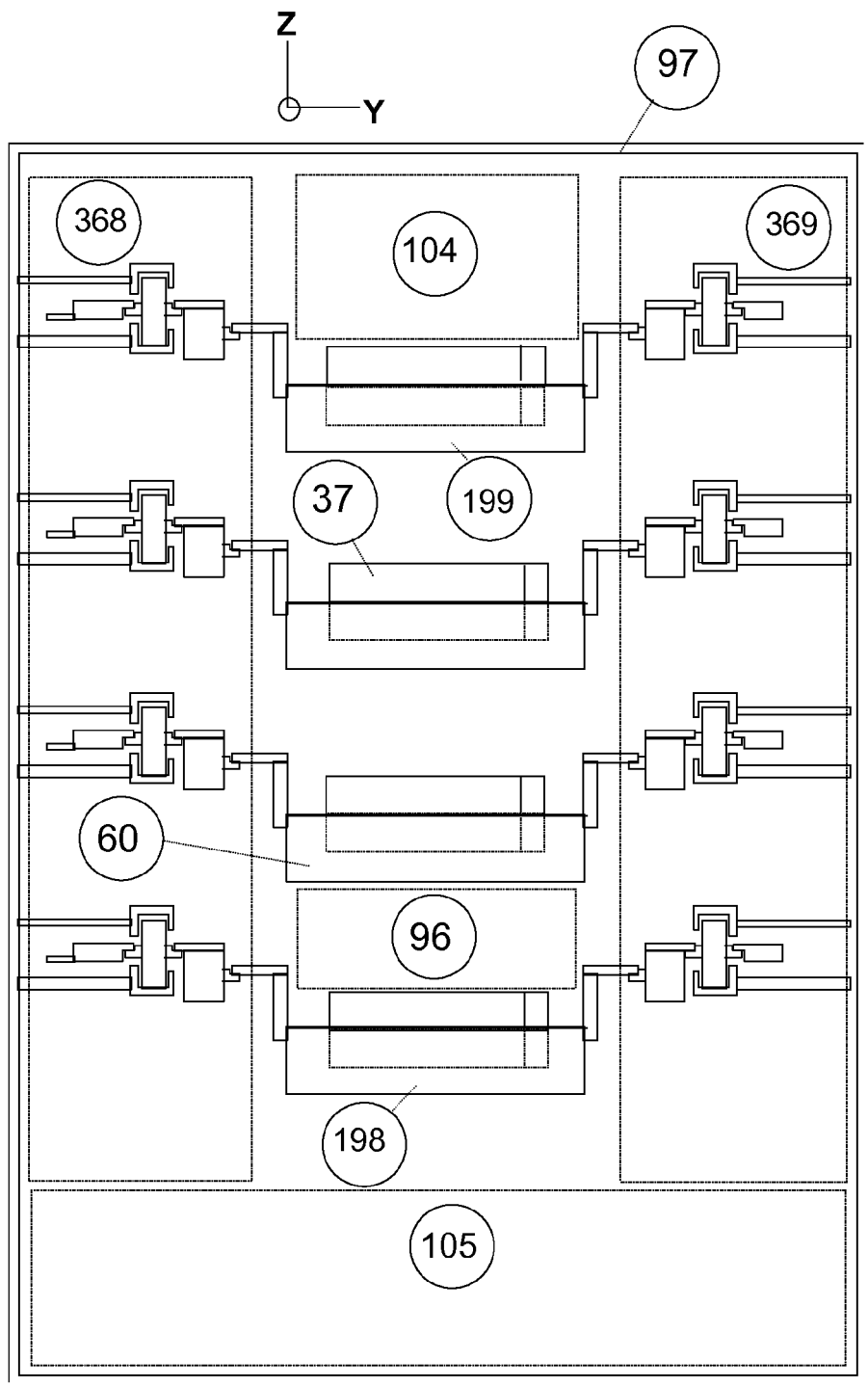
Figure 47:
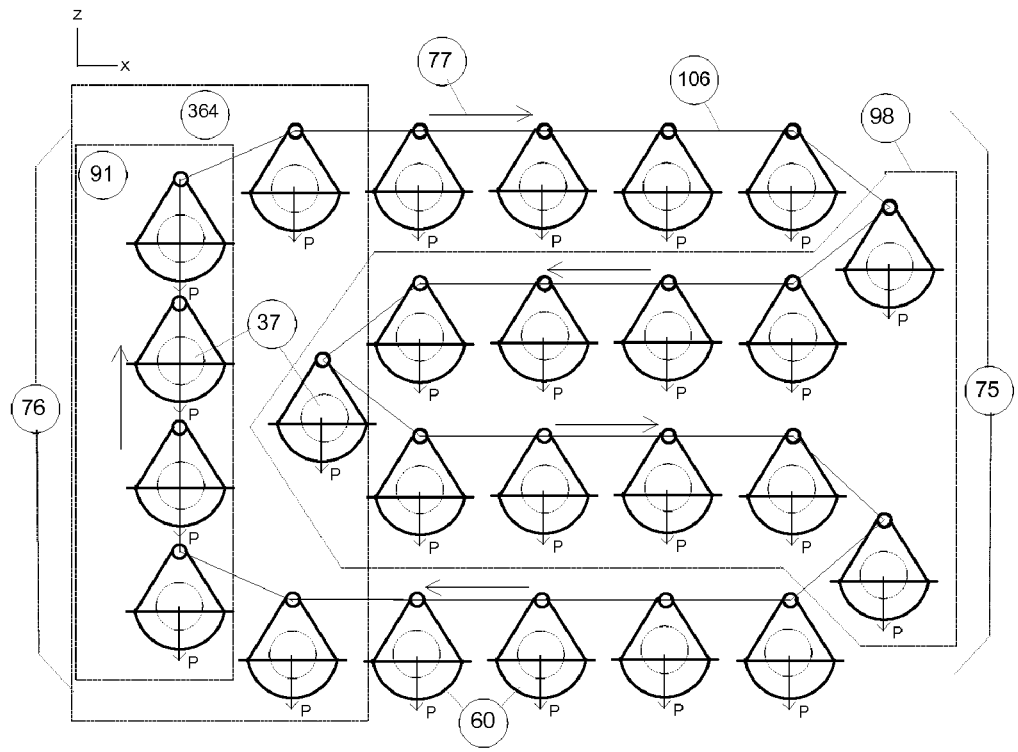
Figure 48:
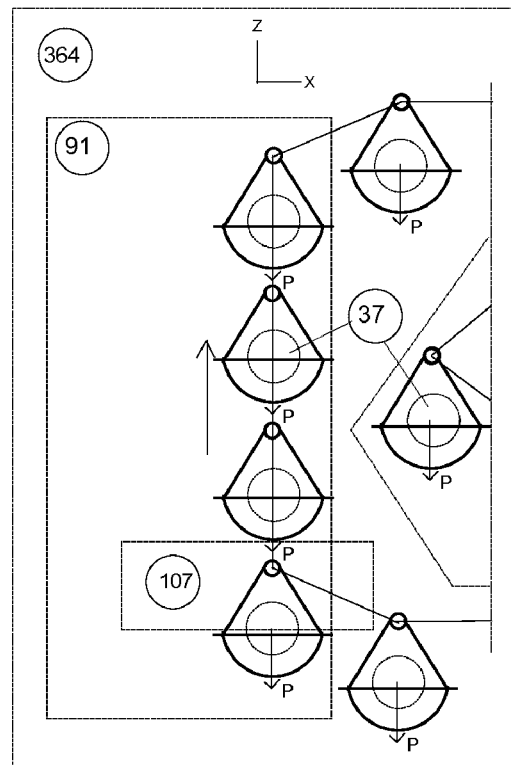

FIG. 46—Illustrates view "A" from Customer side, as indicated on FIG. 38, of the Roller-type dual synchronized Carrier Conveyor inside a Module. Figure elements are labeled as follows:

37—cylindrical shape Item or cylindrical shape Container
60—Item Carrier assembly
96—space above Carrier (198), which could be used for Item unloading by Automatic Gripper assembly
97—Conveyor Enclosure, which could be Module's Inner Enclosure
104—space above Carrier (199), which could be used for Item loading by Automatic Gripper assembly
105—space, which could be used for Conveyor Drive assembly and support components
198—Conveyor Carrier location, which could be selected for Item Unloading by Automatic Gripper assembly, Customer side
199—Conveyor Carrier location, which could be selected for Item Loading by Automatic Gripper assembly
368—section of the left Roller-type sub-Conveyor assembly
369—section of the right Roller-type sub-Conveyor assembly FIG. 47—illustrates ADVS Conveyor design advantages. As shown, Conveyor section (98) on the right without any applied driving force—tends to move "downward" in the desired direction under combined weights of respective Carriers and Items inside of them. Conveyor section (91) on the left without any applied driving force—tends to move "downward" in the opposite direction under combined weights of respective Carriers and Items inside of them. Design of the Conveyor should take advantage of this feature. Proper distribution of weights and track trajectory of sections (91,98) could reduce resistance (load) seen from section (91) by the Conveyor drive. The design objective should be to achieve reliable operation of the Conveyor with minimum drive power. Figure elements are labeled as follows:

106—Conveyor direct linkage line, for illustration purposes only
60—Carrier, each shown loaded with Item (37)
91—Conveyor track section moving vertically upward
98—Conveyor track section, consisting of number of sub-sections moving downward. The sub-sections moving horizontally, could be also inclined downward, as needed.
75—Provider side. Provider could have access to this side and sides facing "Y-axis", as needed
76—Customer side, labeled here for reference only
77—Direction of Conveyor motion
364—section of Conveyor shown in more details on FIG. 48
P—Combined weight of Carrier and Item inside of it, shown the same for simplicity FIG. 48—illustrates section 364 of Conveyor layout shown on FIG. 47.

Figure elements are labeled as follows:

107—space, which could be used for Item unloading by Automatic Gripper assembly, Customer side. Remaining elements are labeled same as on FIG. 47.

Figure 49:
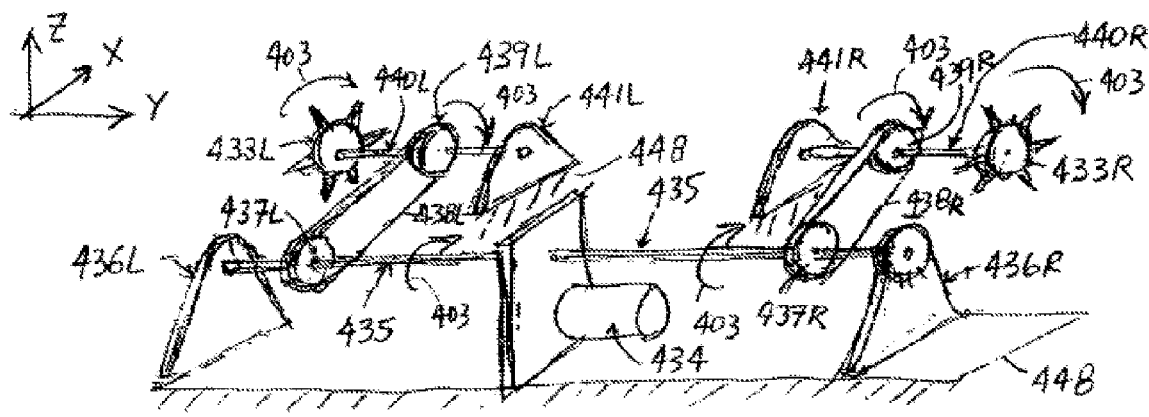

FIG. 49—Illustrates one of possible sub-Conveyors Drive mechanical assembly principals, and related details. The design principal is based on common drive for both left/right sub-Conveyors, and could be used in applications where "slippage" out of synchronization in-between sub-Conveyors is highly unlikely. In event it does happen, the Controller could stop sub-Conveyors drive, and alarm the operator of the problem. The operator could then re-adjust respective sub-Conveyor and restore synchronization. Depending on application, a required number of this type of drives could be conveniently installed to ensure sufficient amount of power for reliable and accurate operation. Figure elements are labeled as follows:

403—Rotation Clock-Wise
434—sub-Conveyors Drive gear motor assembly, which could be used to drive both left/right sub-Conveyors within required synchronization.
435—Motor Drive Shaft, which could extend through the motor gear connection
441L/R—left/right Drive Sprocket Wheel shaft (440) support assembly
437L/R—Belt Drive Pulley, which could be installed onto Motor Drive Shaft (435) as shown. Belt Drive Pulley could follow rotation of the Motor Drive Shaft (435)
438L/R—Belt, which could be engaged with Belt Drive Pulley (437) and Sprocket Drive Pulley (439), and as result, could transfer motion from Drive Pulley (437) to Sprocket Drive Pulley (439)
433L/R—sub-Conveyor Drive Sprocket Wheel, which could be mounted on Sprocket Wheel shaft (440). Sprocket Wheel (433) on each side could engage with respective Drive Slots of Joint Brackets (not shown). As shown, the respective left/right mechanical couplings could transfer rotational motion from Motor Drive Shaft (435) to respective left/right linear motion of Joint Brackets, which in turn, could advance the respective sub-Conveyor Wheels along "X-axis".
439L/R—Sprocket Drive Pulley, which could be installed onto respective Drive Sprocket Wheel shaft (440)
440L/R—Drive Sprocket Wheel shaft, which could transfer motion from respective Belt (438) to respective Drive Sprocket Wheel (433)
448—Mounting platform for various mechanical components, which could be referenced of a common mounting base FIG. 50—Illustrates side-view of design components per principal shown on FIG. 49.

Figure elements are labeled as follows:

421—Conveyor Carrier, which could be supported off respective Carrier Support Bracket assembly (420)
447L/R—sub-Conveyor Wheels, which could be riding along respective sub-Conveyor Bottom Guiding Rails (427)
423L/R—sub-Conveyor Top Guiding Rails, which could be used to retain sub-Conveyor Wheels (447) within the tracks, as needed.
427L/R—sub-Conveyor Bottom Guiding Rails, which could serve as part of main supports of the entire Conveyor assembly. Bottom Rails design parameters (number required, material, size, etc.) could be designed per specific application requirements to ensure reliable, safe and quite operation.
424L/R—Top Guiding Rails Mounting Bracket, which could be mounted to the respective side panels of Module Inner Enclosure (444). Top Mounting Brackets could experience far less stress than Bottom Mounting Brackets. Top Rails design parameters (number required, material, size, etc.)

could be designed per specific application requirements to ensure reliable, safe and quite operation.

425L/R—Bottom Guiding Rails Mounting Bracket, which could be mounted to the respective side panels of Module Inner Enclosure (444). Bottom Mounting Brackets could serve as part of main supports of entire Conveyor assembly. Bottom Mounting Brackets design parameters (number required, material, size, etc.) could be designed per specific application requirements to ensure reliable, safe and quite operation.

428L/R—sub-Conveyors Wheels Joint Bracket with Index Slots and/or position Flags.

420L/R—Carrier Support Shaft platform assembly, to which Carrier could be mounted from the top.

424L/R—left/right Supports for respective Top Guiding Rails (423)

425L/R—left/right Supports for respective Bottom Guiding Rails (427)

433L/R—left/right sub-Conveyor Drive Sprocket Wheel

434—sub-Conveyor Drive Motor assembly, which as shown, could be used as common drive for both left/right sub-Conveyors

435—sub-Conveyor Drive Motor main shaft

436L/R—left/right sub-Conveyor Drive Motor main shaft (435) support bracket, which could include required bushing and other parts, as needed

437L/R—left/right sub-Conveyor Drive Main shaft Pulley, which could be used to transfer motion from sub-Conveyor Drive Motor main shaft (435) to Belt (438)

438L/R—left/right Belt for respective sub-Conveyor

439L/R—left/right Shaft Pulley for respective Joint Bracket Drive Sprocket wheel

444L/R—left/right side walls of Inner Enclosure

448—Mounting platform, which could be of either Inner or Outer Enclosures

Figure 51:
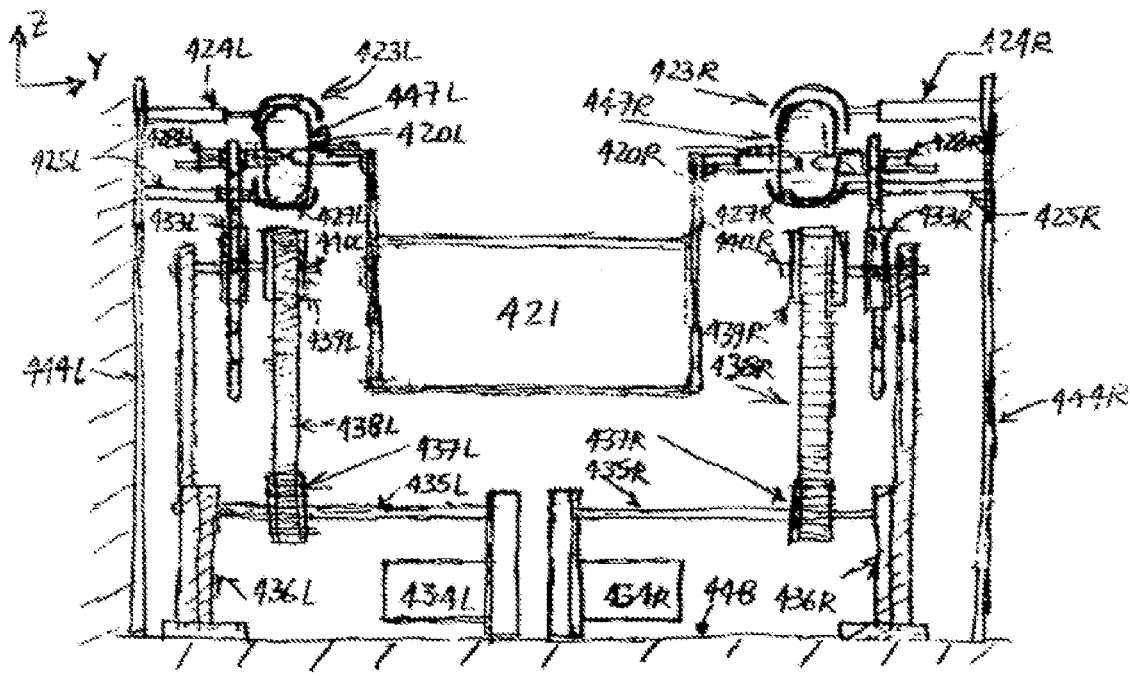

FIG. 51—Illustrates side-view of one of possible implementations of sub-Conveyors Drive mechanical assembly principal, which is based on individual sub-Conveyor drives. Based on rotary and/or linear position data from respective Sensors (not shown, for simplicity), Controller could promptly detect condition when either of sub-Conveyors falls out of synchronization. When this occurs, Controller could re-instate synchronization by advancing the "trailing" sub-Conveyor required number of indexes, while maintaining position of the "leading" sub-Conveyor. Figure elements are labeled as follows:

434L/R—left/right motor for respective sub-Conveyor Drive assembly

Figure 50:
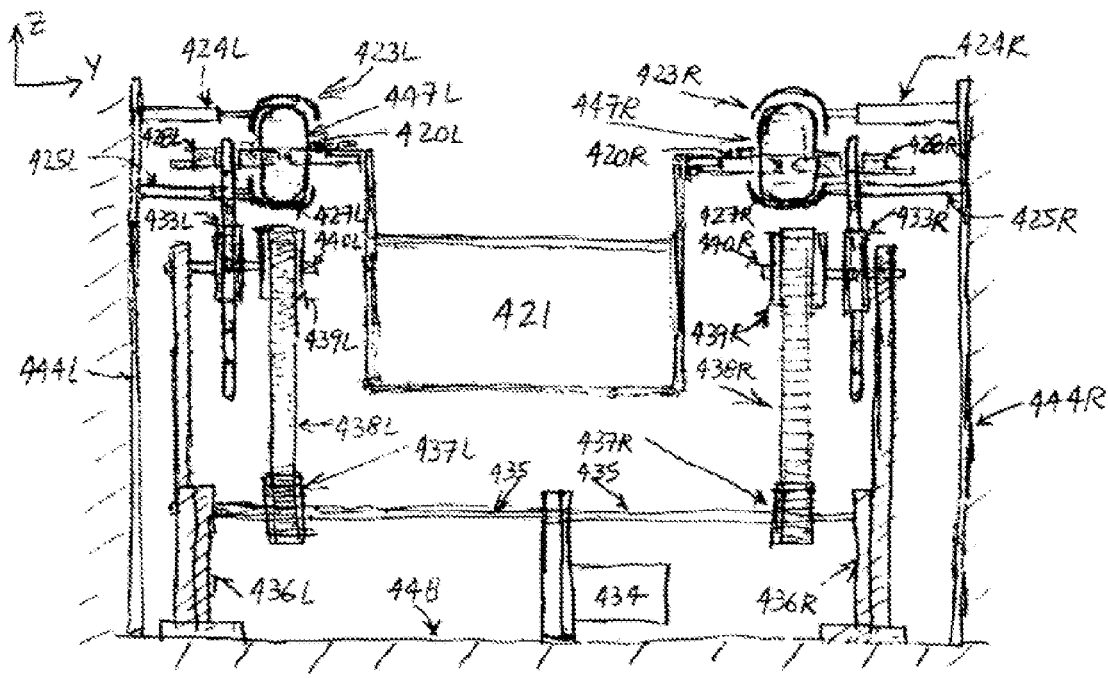

435L/R—left/right main shaft for respective sub-Conveyor Remaining elements are labeled same as on FIG. 50.

Figure 52:
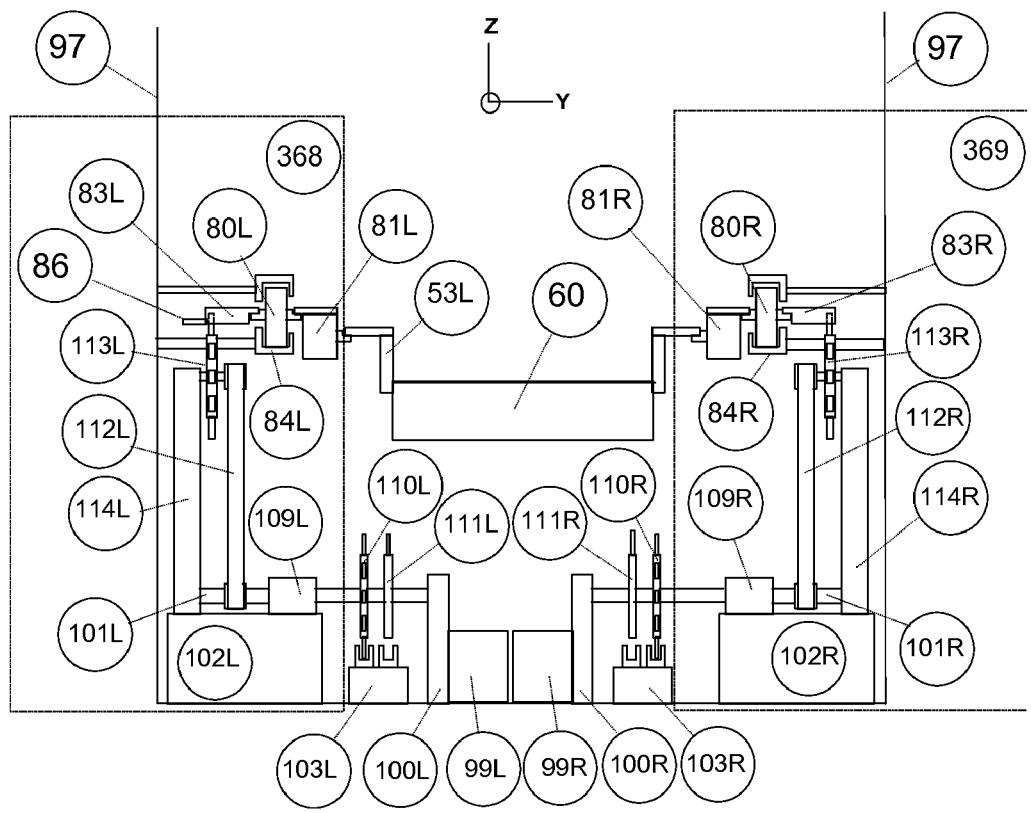

FIG. 52—Illustrates computer-generated drawing of the design outlined on FIG. 51.

Figure elements are labeled as follows:

368—sub-Conveyor Carrier assembly—left side of Carriers

369—sub-Conveyor Carrier assembly—right side of Carriers

53L—Carrier left side support assembly

60—Stationary Carrier

99L/R—respective left/right sub-Conveyor drive gear motor assembly

100L/R—gear box of sub-Conveyor drive gear motor assembly

101L/R—respective sub-Conveyor drive main shaft

111L/R—respective sub-Conveyor index wheel with only one Flag. Index wheel could be designated to represent respective sub-Conveyor rotary Home position

110L/R—respective sub-Conveyor position wheel with number of Flags, as needed. Position wheel could be used to represent sub-Conveyor rotary position

103L/R—Sensors for detecting flags of Home Index (111) and Position (110) wheels, respectively. Controller, which could monitor these Sensors, could calculate position of respective sub-Conveyor from it's respective Home position

109L/R—Support Bearings (on each side) for respective sub-Conveyor drive main shaft (101)

112L/R—left/right pulley-belt drive assembly, which could be used to transfer motion from respective sub-Conveyor drive main shaft (103) to sub-Conveyor Drive Sprocket assembly (113)

113L/R—sub-Conveyor Drive Sprocket assembly, which could engage with respective Drive Slots of Joint Brackets (83), and could transfer motion from sub-Conveyor drive main shaft (103) to Joint Bracket(s) (83), which in turn, could force respective sub-Conveyor Wheels (80) to advance along Bottom Guiding Rails (84)

114L/R—left/right Support Bearing assembly for respective sub-Conveyor pulley-belt drive assembly (112)

102L/R—platform for supporting respective assemblies (109) and (114)

83L/R—left/right sub-Conveyor Joint Brackets. The left Joint Brackets, in addition to Index Slots, could have Index Flags (86). The right Joint Brackets, in addition to Index Slots, could also have Index Flags, as needed, not shown for simplicity.

86—sub-Conveyor index Flags, which could be used to represent specific location associated with respective Carrier, such as: Carrier leading edge barcode label, etc.

97—side walls of Module Inner Enclosure

Figure 53:
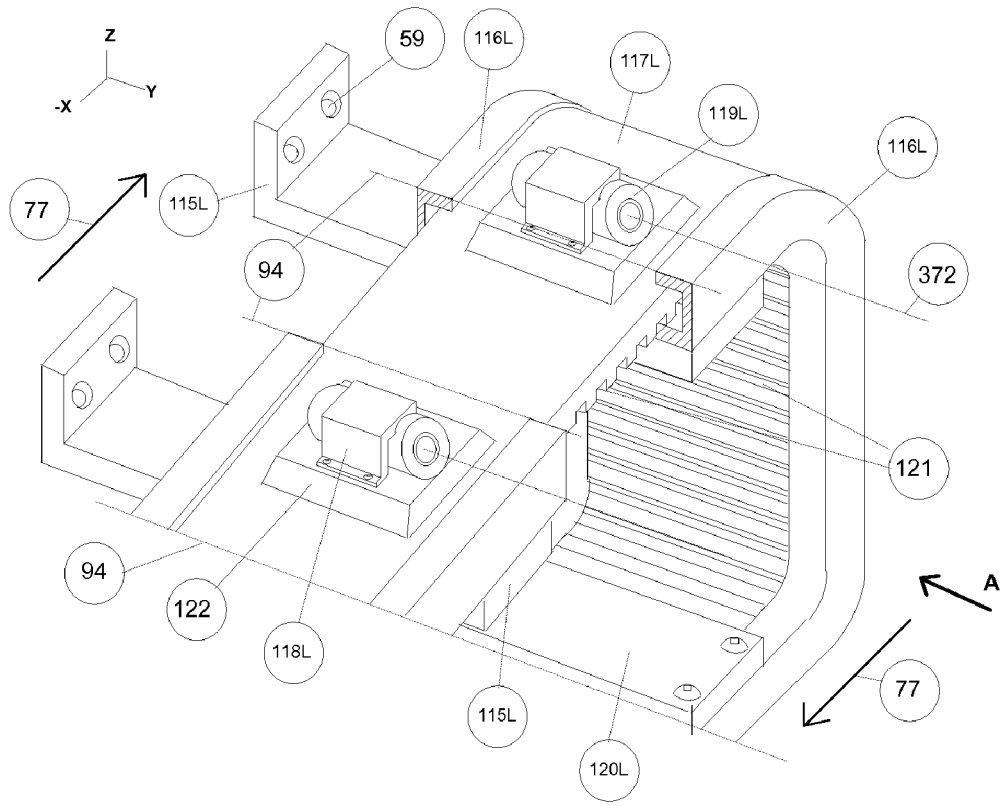

FIG. 53—Illustrates section of dual synchronized Belt-type Conveyor assembly, and related details. For simplicity, shown only sub-Conveyor assembly to the left side in respect to Carriers, which are also not shown for simplicity. NOTE: "L" suffix designates components to the left of Carriers.

Figure elements are labeled as follows:

59—One of threaded mounting holes (not all shown), which could be used for attaching respective brackets to support walls of Conveyor enclosure

77—Direction of Conveyor motion

94—Component or assembly "break" line

115L—Bottom sub-Conveyor assembly support bracket

116L—sub-Conveyor Guiding Rails, which could be designed (material, shape, dimensions) to minimize the impact on Carrier and on the Content inside when Conveyor is moving.

117L—sub-Conveyor timing Belt assembly, which could be constructed based on convertible timing belts with special inserts in a form of Belt Conveyor Carrier Support assembly (118L)

Figure 55:
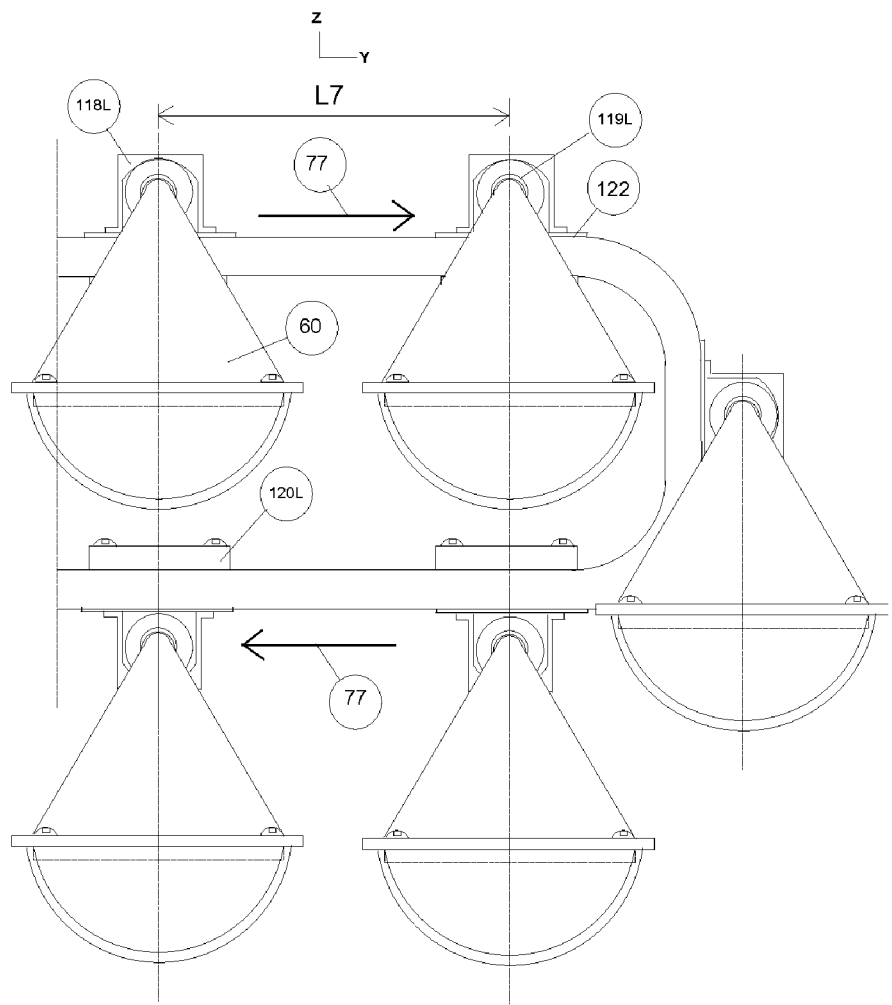

118L—Belt Conveyor Carrier Support assembly, which consists of several components, covered in detail on FIG. 55

119L—Belt Conveyor Carrier Support Bearing, part of (118L)

120L—Top sub-Conveyor assembly support bracket

121L—Exposed section of Belt Conveyor convertible timing belt assembly details. The outer surfaces of the Belt (121) and inner surfaces of the Guiding Rails (116) could be made out of or covered with a special material to minimize friction between them, which occurs when Conveyor is moving. Also, timing belt engagement teeth or slots, could be designed to provide reliable engagement with the respective Drive or alignment pulleys (shown on FIG. 57), while minimizing the friction and noise when they slide along respective Guiding Rail sections during Conveyor movements.

122L—Base platform, part of (118L)

372—Carrier Support Bearing center-line

Figure 54:
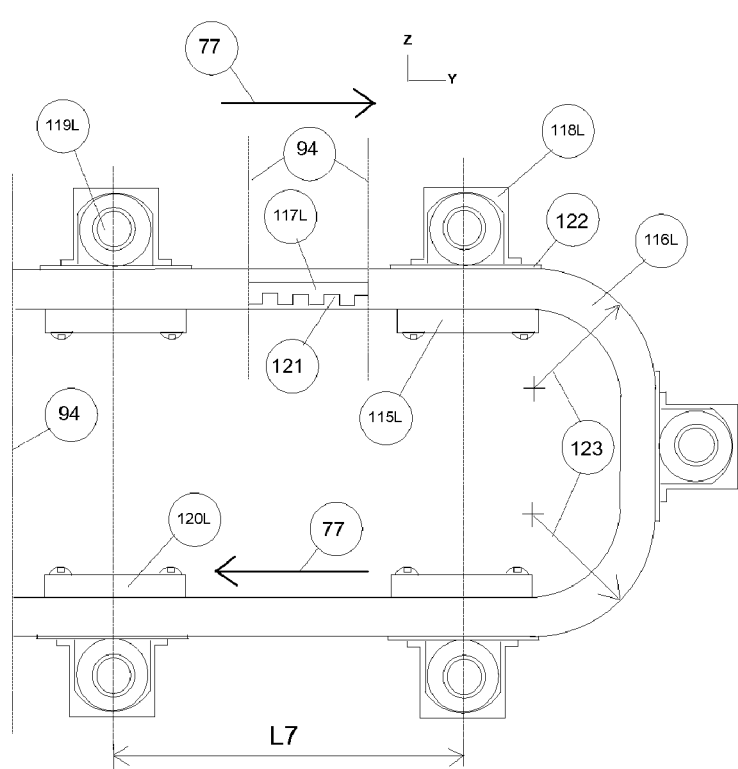

FIG. 54—View A of dual synchronized Be/t-type Conveyor assembly, as marked on FIG. 52.

123—Belt Conveyor Guiding Rails turning radius

L7—Distance between centers of adjacent Carrier Support Bearings, or Belt Conveyor Index The remaining elements are labeled same as on FIG. 52.

FIG. 55—View A of FIG. 52, as shown on FIG. 53, but with addition of Carriers (60). The remaining elements labeled same as on FIG. 53.

Figure 56:
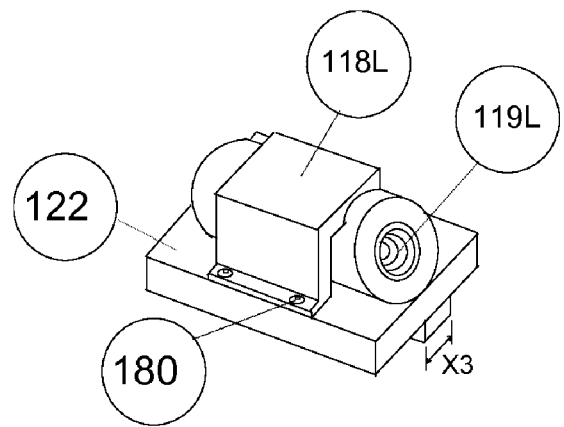

FIG. 56—Belt-type Conveyor Carrier Support assembly (118) detail.

Figure elements are labeled as follows:

119L—Belt Conveyor Carrier Support Bearing. Bearing design parameters (material, dimensions etc.) could be selected based on:
a) Maximum stress, which Bearing could experience during most demanding motion of maximum loaded sub-Conveyor assembly
b) Maximum allowable friction between Bearing and Support Bracket shaft inserted into it, to minimize Carrier "wobbling" while allowing Carrier to align itself vertically along "Z-axis" under force generated by it's own weight 122L—Insert into Belt Conveyor, which serves as a base platform for Carrier Support Bearing assembly.

180—One of mounting screw, which holds the Carrier Support Bearing assembly

X3—Width of Belt Conveyor insert (122L) bottom section. The design of the insert (material, size, shape) could be optimized to provide reliable support for Carrier assembly, and allow required turn radius for the Belt Conveyor, as shown on FIG. 53, element (123).

Figure 57:
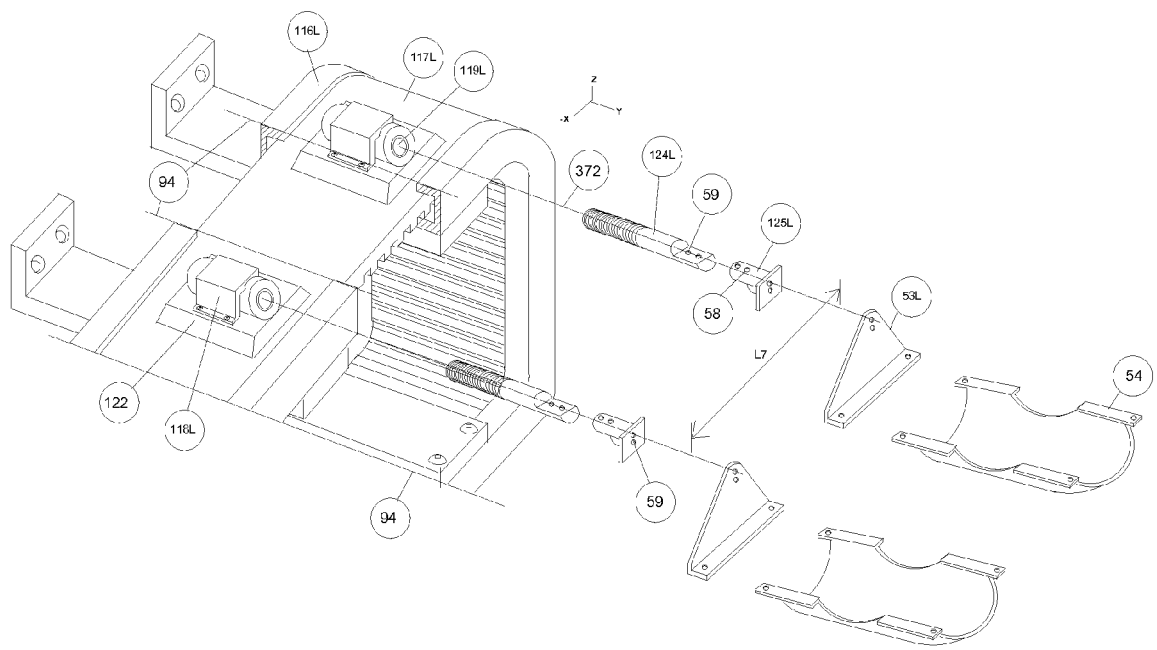

FIG. 57—Illustrates assembly details of Belt sub-Conveyor (118), Carrier assembly (60) and related components. Figure elements are labeled as follows:

53L—Left Carrier support assembly

54—Carrier holding assembly for round-shaped Items, or Containers, or Inserts

59—One of threaded mounting holes (not all shown), which could be used for attaching Carrier shaft coupling bracket (125)

124L—Left Carrier support shaft assembly, which could be inserted into Carrier Support Bearing (119)

125L—Left Carrier shaft coupling bracket, which could interconnect Carrier Support Bearing (119L) and Carrier side support assembly (53L)

L7—Distance between centers of adjacent Carrier Support Bearings (Belt Conveyor index)

Figure 58:
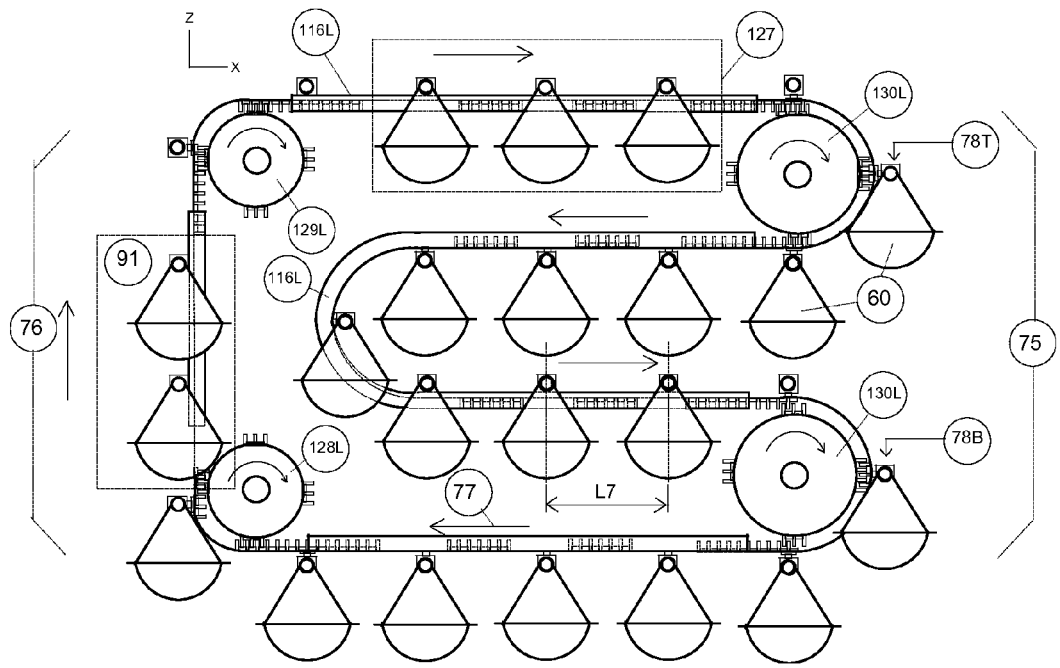

FIG. 58—Illustrates Belt-type Carrier Conveyor layout with capacity of 25 Carriers, not all shown for simplicity to show other details. This layout could be used for variety of applications, where Items could be loaded and unloaded by ADVS Automatic Gripper assembly at designated locations on Customer and Provider sides. Figure elements are labeled as follows:

60,75-78,91—are labeled same as on FIG. 38

116—Belt Conveyor Guiding Rails, which could be designed to accommodate required Conveyor layout. As shown, in this particular layout, the Guiding Rails could consist of individual horizontal or inclined sections. In this case, Belt Conveyor support pulley assemblies (129), (130) could be used to support and guide Conveyor through required turns 127—Conveyor upper section, which could be used for Item loading/unloading by Automatic Gripper assembly 128—Belt Conveyor main drive pulley assembly, which could be driven by Belt Conveyor drive assembly, as shown on FIG. 60. Main drive pulley assembly could be designed (material, dimensions, shape) to match the grove configuration of the Belt to ensure reliable engagement between them 129—Belt Conveyor support pulley assembly, which could be used for alignment purposes of the Belt going through 90° turns, and could be designed (material, dimensions, shape) to match the grove configuration of the Belt to ensure reliable engagement between them 130—Belt Conveyor support pulley assembly, which could be used for alignment purposes of the Belt going through 180° turns, and could be designed (material, dimensions, shape) to match the grove configuration of the Belt to ensure reliable engagement between them FIG. 59—Illustrates symbolic layout of Belt-type Carrier Conveyor shown on FIG. 57. Figure elements are labeled as follows:

98—Section of the Belt Conveyor. For simplicity, this section, as shown, includes horizontal Guiding tracks. As needed, these horizontal tracks could be inclined downward to further assist the Conveyor driving mechanics in terms of required power 117L—Belt Conveyor timing belt assembly.

The remaining elements are labeled as on FIG. 57.

Figure 60:
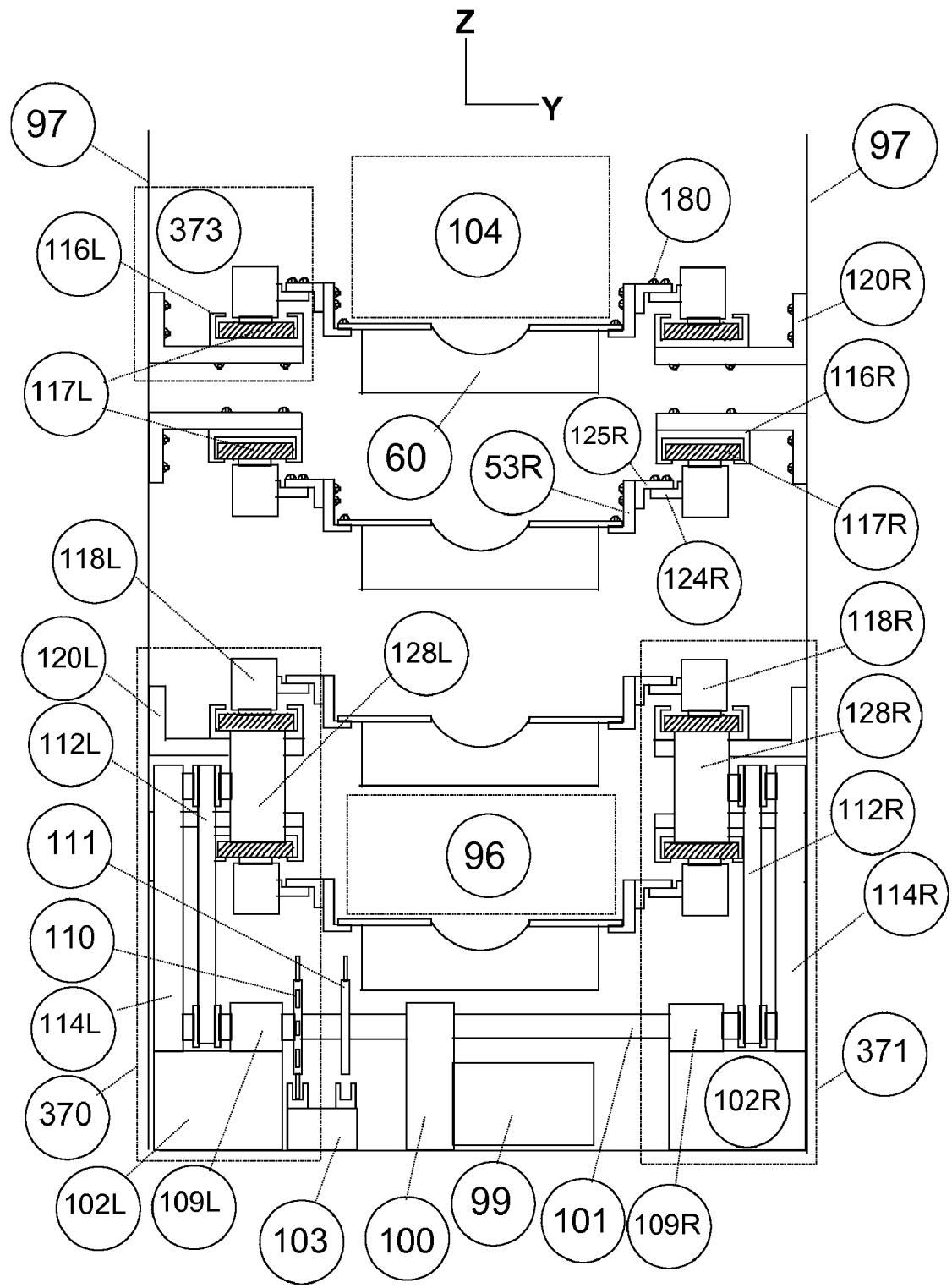

FIG. 60—Dual synchronized Belt-type Conveyor Drive assembly, and related details. For simplicity, common drive principal is shown and only major components are identified. The illustrated design could be used for number of applications. For applications requiring Conveyors with large number and capacity of Carriers, the Conveyor Drive system could be upgraded. The upgrade could include utilization of individual Drive system for each sub-Conveyor (same principal as illustrated on FIG. 52 for Roller-type Conveyor drive assembly), which could be synchronized with the other sub-Conveyor drive system, as needed. Figure elements are labeled as follows:

NOTE: "L" suffix designates components to the left of Carriers, and "R" suffix—components to the right.

53R—Right side of Carrier support assembly

60—Carrier assembly

96—"Z-Y" space inside enclosure (97), which could be used for Item unloading or loading by Automatic Gripper assembly from or into respective Carrier 97—Conveyor enclosure 99—Conveyor Drive motor 100—Conveyor Drive motor gear-box 101—Conveyor Drive main shaft 102L/R—left/right support platform for respective bearings of sub-Conveyor Drive main shaft (101) and sub-Conveyor pulley-belt drive assembly (112)

103—Sensors for detecting position Flag (110) and Home Flag (111), respectively

104—"Z-Y" space inside enclosure (97), which could be used for Item loading or unloading by Automatic Gripper assembly from or into respective Carriers located at the top 109L/R—respective Support Bearings for Conveyor Drive main shaft (101)

110—Conveyor position wheel with number of Flags, as needed. Position wheel could be used to represent Conveyor rotary position 111—Conveyor Drive index wheel, which could have only one Flag. This index wheel could be designated to represent Conveyor rotary Home position 112L/R—respective Pulley-belt drive assembly, which could be used to transfer motion from Conveyor Drive main shaft (101) to respective sub-Conveyor Drive Pulley assembly (128)

114L/R—left/right Support Bearings for respective sub-Conveyor pulley-belt drive assembly (112)

116L/R—left/right sub-Conveyor Guiding Rails, which could be designed (material, shape, dimensions) to minimize the impact on Carrier and on the Content inside when Conveyor is moving.

117L/R—left/right sub-Conveyor timing Belt assembly, which could be constructed based on convertible timing belts with special inserts in a form of Belt Conveyor Carrier Support assembly (118L)

118L/R—left/right Belt Conveyor Carrier Support assembly

120L/R—left/right top sub-Conveyor assembly support bracket

124R—Right Carrier support shaft assembly, which could be inserted into the Carrier Support Bearing (part of 118R)

125R—Right Carrier shaft coupling bracket, which could interconnect Carrier Support Bearing (part of 118R) and Carrier side support assembly (53R)

180—One of mounting screw for attaching respective components

370—Section of Belt-type sub-Conveyor assembly, left side

371—Section of Belt-type sub-Conveyor assembly, right side

373—Section of Belt-type sub-Conveyor assembly, shown in detail on FIG. 60

Figure 59:
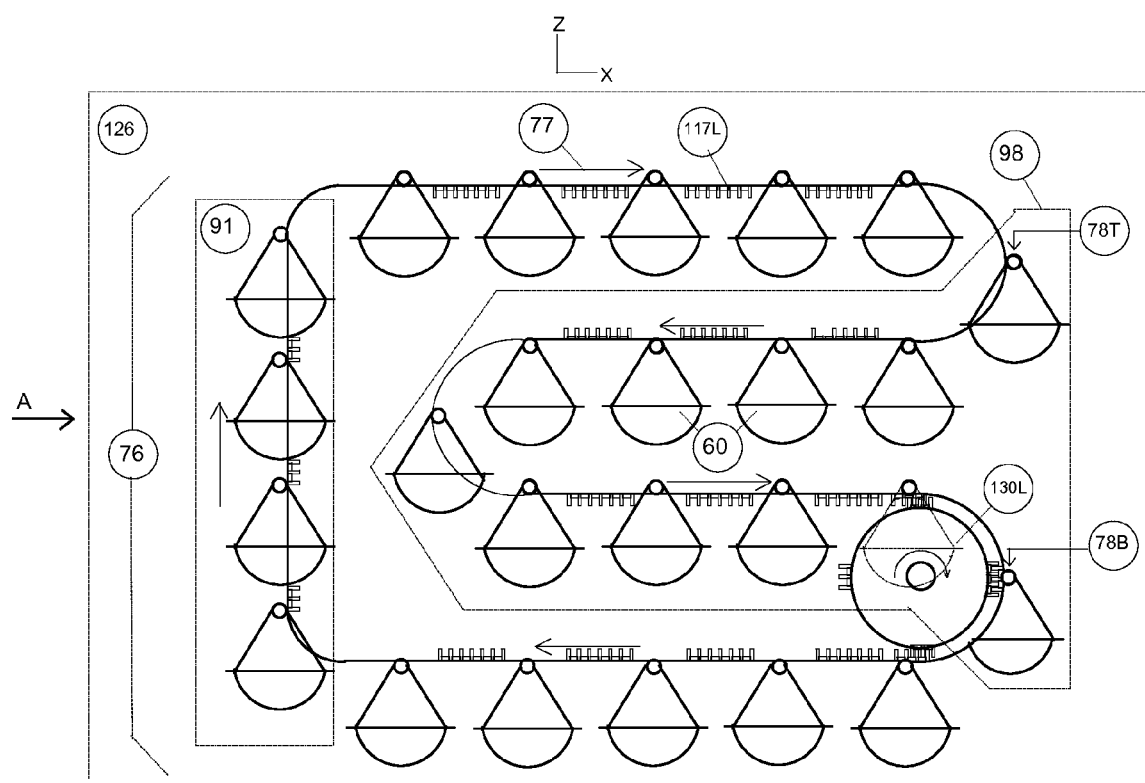
Figure 61:
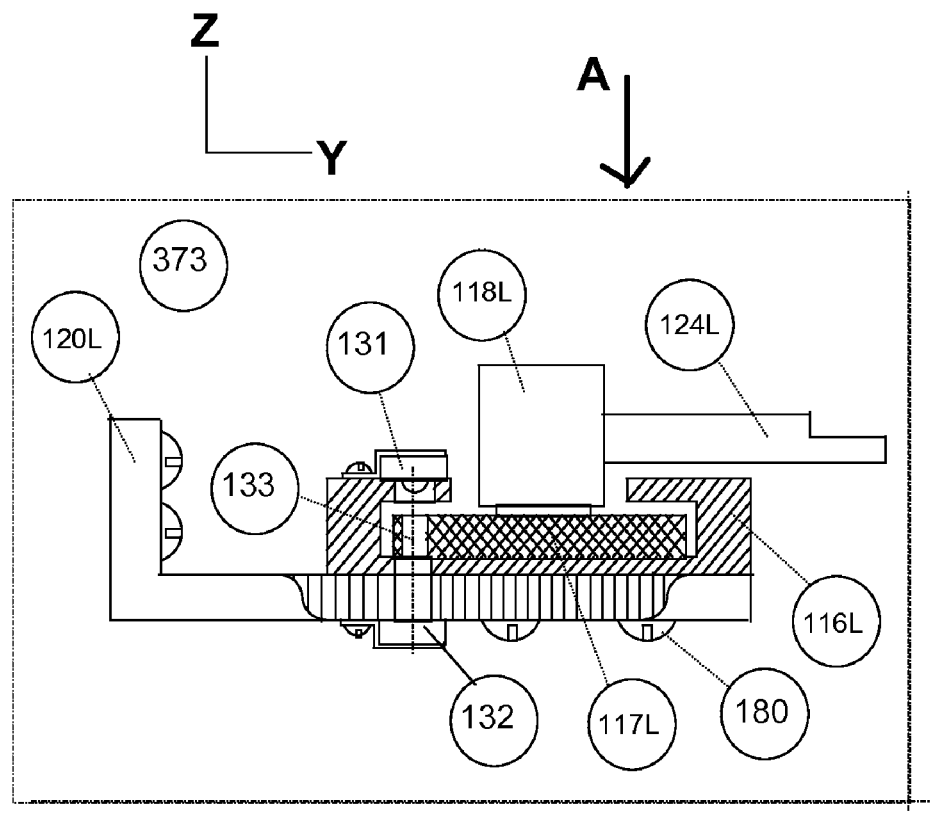

FIG. 61—Section of Belt-type Conveyor assembly, labeled (373) on FIG. 59. As shown, the Belt-type Conveyor could have index slots (133) embedded along the outer edge, which are spaced apart from each other a required distance (X4), which could be established based on required accuracy of keeping track of Conveyor linear position. A photo-diode emitter assembly (131) and respective Sensor, such as photo-diode receiver (132), could be properly mounted and used to detect condition when a Conveyor index slot is passing through, in-between (131) and (132). Respective ADVS Controller could monitor signals from the Sensor and determine the distance Conveyor traveled based on formula X5=N1*X4, where X5—distance Conveyor traveled, N1—number of index slots passed through Sensor, X4—distance between adjacent index slots. As needed, during initial alignment of the Belt Conveyors, the respective rotary Home Flag (111) and one of rotary Index Flags, with their Sensors, could be aligned with one of Belt Conveyor index slots. Figure elements are labeled as follows:

131—Photo-diode emitter assembly

132—Sensor, as photo-diode receiver assembly

133—Belt Conveyor index slot

The remaining elements are labeled same as on FIG. 59.

Figure 62:
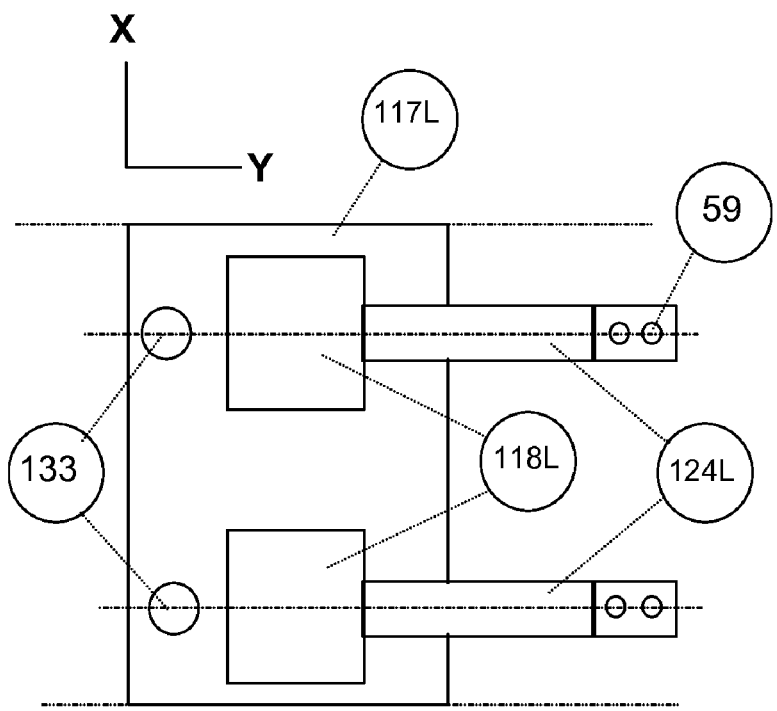

FIG. 62—View A of the section of Belt-type Conveyor assembly, as pointed on FIG. 60. Index Sensor detection components (131) and (132) are not shown. The Belt Conveyor index slots (133) are shown as round openings. As shown, the slots (133) are aligned with respective Carrier mounting components to represent the Carrier center line along "X-axis". For more accurate position tracking of the Conveyor, additional slots could be equally placed in-between the ones shown, with index distance between adjacent slots representing the linear resolution. Figure elements are labeled as follows:

59—One of threaded mounting holes, which could be used for attaching left Carrier shaft bracket (125L) The remaining elements are labeled same as on FIG. 60.

FIG. 63 through FIG. 76 illustrate design steps of ADVS Module for dual synchronized Roller-type conveyor with capacity of 25 Carriers. For simplicity, Module's Inner and Outer Enclosure panels are shown transparent.

Figure 63:
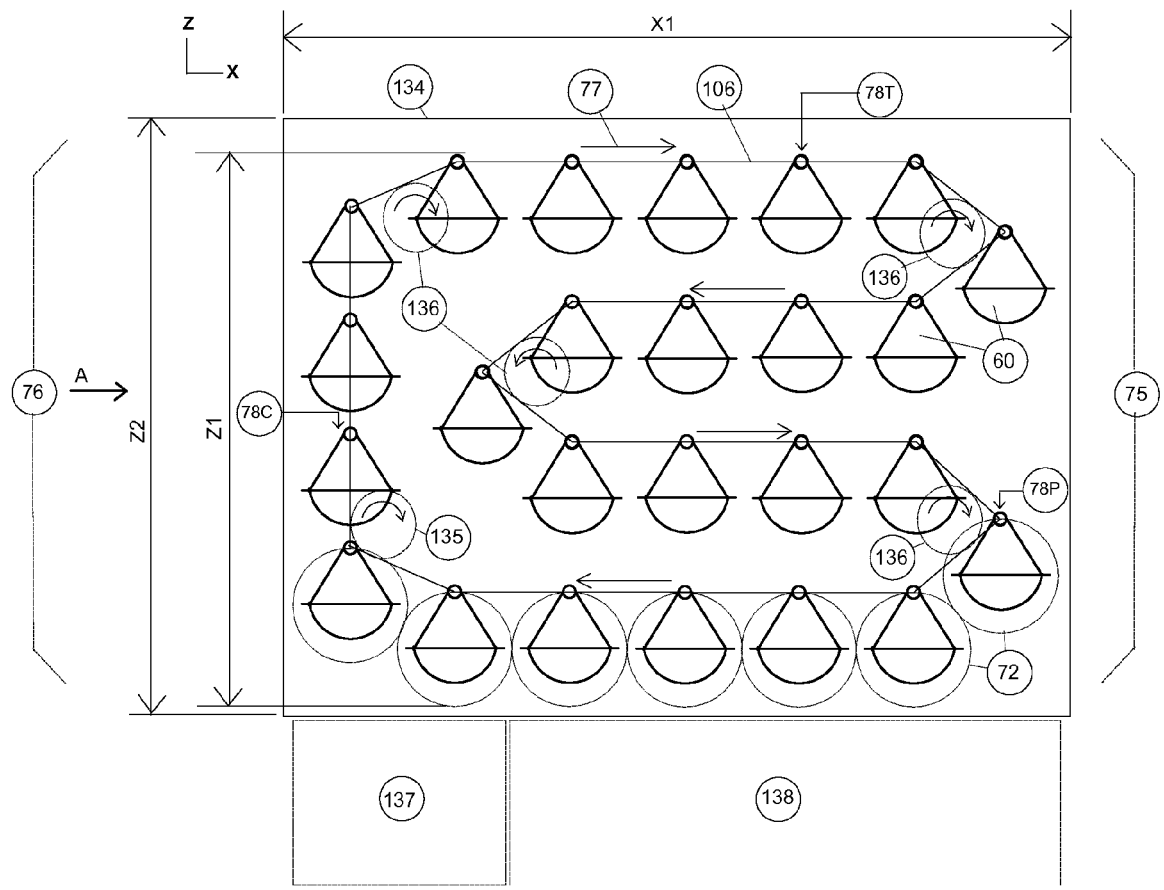

FIG. 63—Module Inner Enclosure layout. Figure elements are labeled as follows:

60—Item Carrier assembly

72—Carrier Clearance Sphere

75—Provider side of the Module. Provider could have access to this side and sides facing "Y-axis"

76—Customer side of the Module

77—Direction of Conveyor motion

78T—Module location, which could be designated for Item loading/unloading by Automatic Gripper assembly, top side. For reference purposes, any Carrier location on the very top horizontal section of the Conveyor could be used for Item loading/unloading by Automatic Gripper assembly.

78C—Module location, which could be designated for Item unloading/loading by Automatic Gripper assembly, Customer side. For reference purposes, any Carrier location along vertical section of the Conveyor facing Customer, could be used for Item unloading by Automatic Gripper assembly.

78P—Module location, which could be designated for Item unloading/loading by Automatic Gripper assembly, Provider side.

134—Module Inner Enclosure for housing Carrier Conveyor assembly and associated elements 136—Number of Roller Conveyor Idle Sprocket Wheel assemblies, one for each sub-Conveyor. There could be several Idle Sprocket Wheel assemblies installed for each sub-Conveyor, as needed, to assist in providing reliable and safe transportation of Carriers.

137—Area, which could be used for Roller dual synchronized Conveyor Main Drive assembly and support components 138—Area, which could be used for Module electrical components (power, control, interface, etc.)

X1—Depth of Inner Enclosure

Z1—Height of Conveyor

Z2—Height of Module

Figure 64:
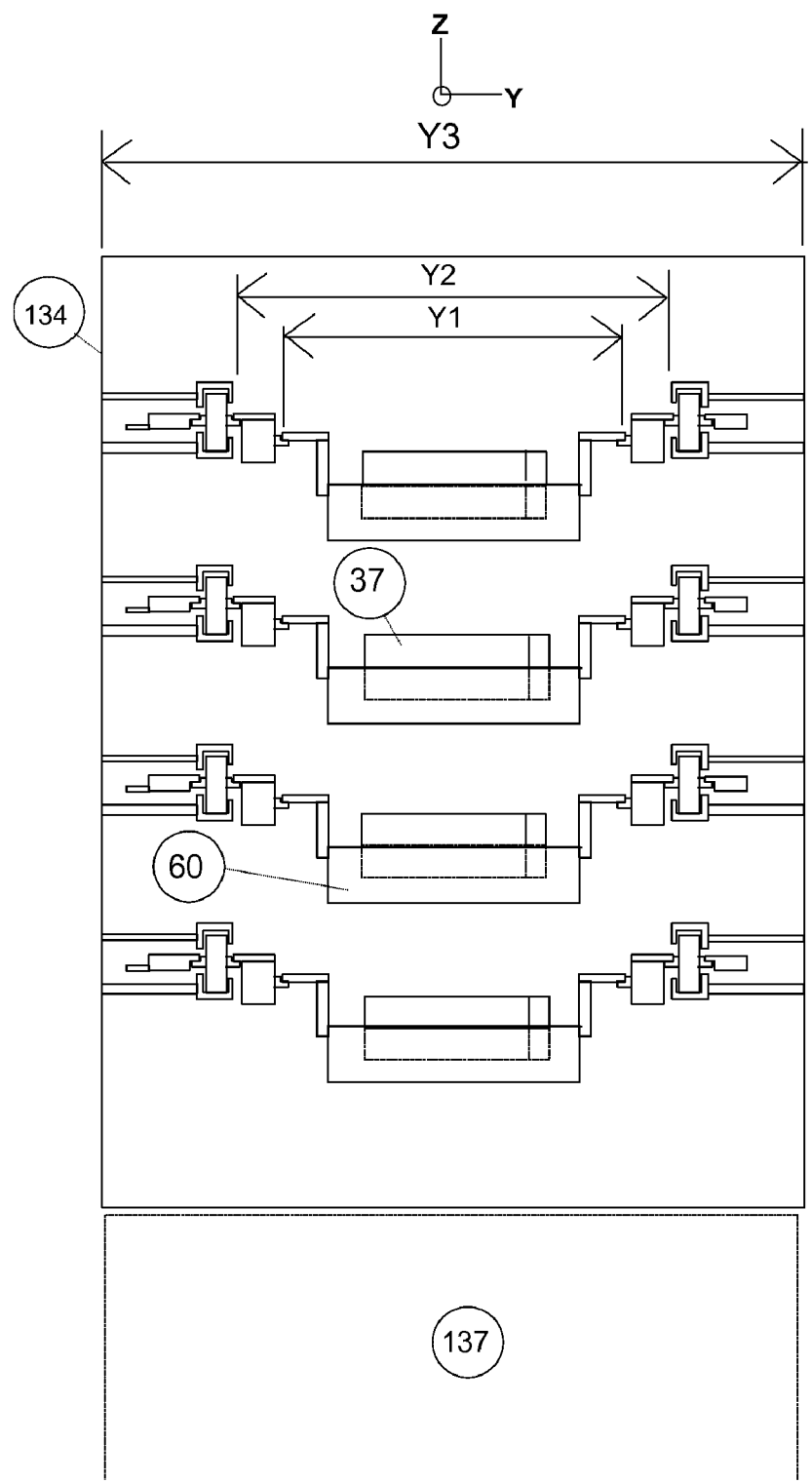

FIG. 64—View A of Module Inner Enclosure layout, as marked on FIG. 63. For simplicity, only front section of the Conveyor is shown. Figure elements are labeled as follows:

37—Item or Container of cylindrical shape

Y1—Width of Carrier

Y2—Distance between Conveyor Guiding Rails on the left and Guiding Rails on the right Y3—Width of Inner Enclosure.

Remaining elements are labeled same as on FIG. 63

Figure 65:
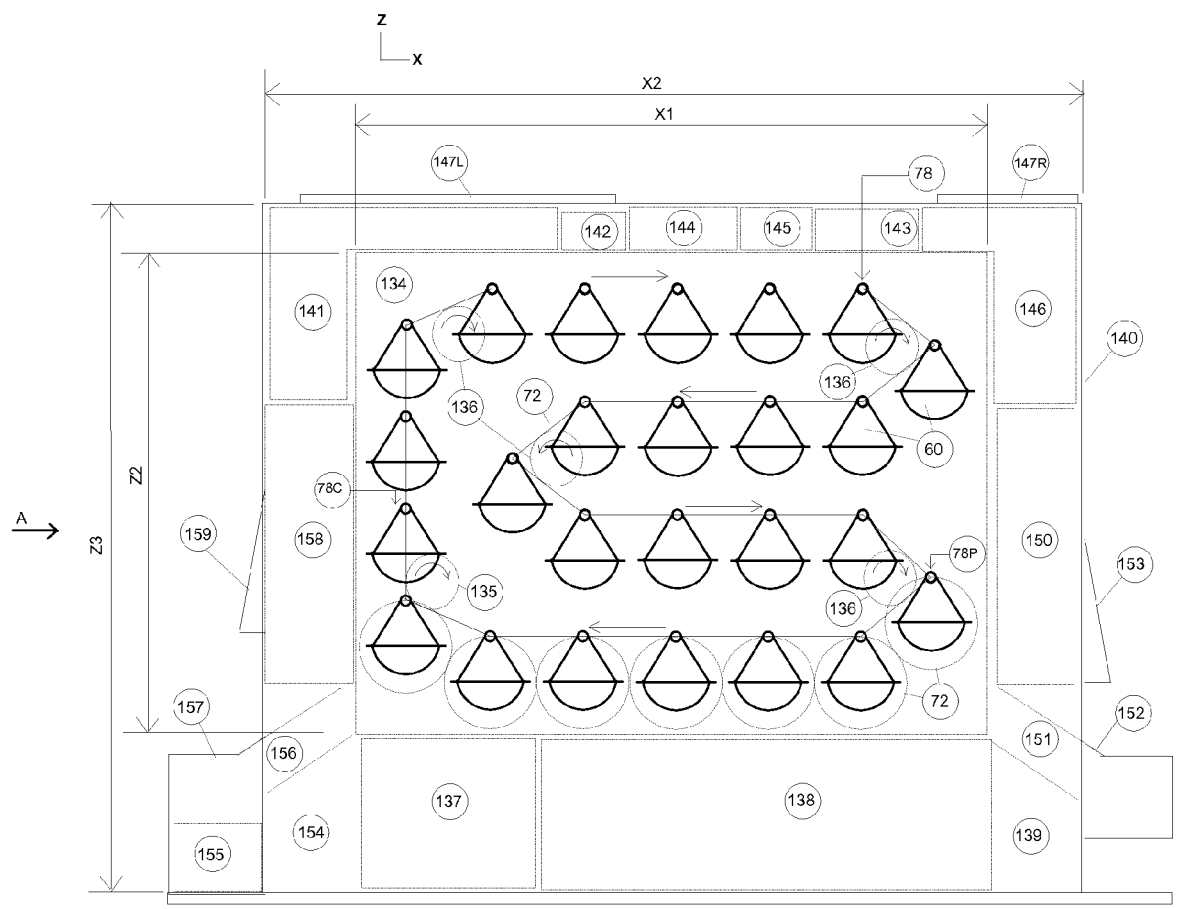

FIG. 65—View of Module layout with related details of Inner Enclosure (34), shown on FIG. 63, and Outer Enclosure (140). Figure elements are labeled as follows:

139—Area, which could be used for Module electrical components for interfacing to other devices outside the Module (power, control, interface to ADVS network, etc.)

140—Module's Outer Enclosure

141—Area, which could be used for Controller #2 and Customer side support electronics 142—Area, which could be used for Barcode Scan device, which could be used for real-time inspection and/or inventory tracking of Carriers and/or Items inside of them.

143—Area, which could be used for primary loading/unloading of Items by Provider manually, or by Automatic Gripper assembly 144—Area, which could be used for secondary loading/unloading of Items by Provider manually, or by Automatic Gripper assembly 145—Area, which could be used for visual inspection by Provider of components inside Module, such as Items, Carriers, etc.

146—Area, which could be used for Controller #1 and Provider side support electronics 147L/R—left/right removable panels or Access Doors, which could be used to block respective openings and access to inside of Module 150—Area, which could be used for primary unloading/loading of Items by Automatic Gripper assembly, Provider side. Barcode scan device(s) could be added, as needed, for Item automatic inspection purposes 151—Area, which could be used for primary unloading Item sliding track assembly, Provider side 152—Item pick-up bin, Provider side 153—User interface panel, Provider side 154—Area, which could be used for installation of support components for Automatic Packing Feeder, and other as needed 155—Area, which could be used for electromechanical interface to Automatic Packing Feeder assembly 156—Area, which could be used for primary unloading Item sliding track assembly, Customer side 157—Item pick-up bin, Customer side 158—Area, which could be used for primary unloading or loading of Items by Automatic Gripper assembly, Customer side. Barcode scan device(s) could be added, as needed, for Item automatic inspection purposes 159—User interface panel, Customer side X1—Depth or length of Module's Inner Enclosure (34)

X2—Depth or length of Module's Outer Enclosure (140)

Z2—Height of Module's Inner Enclosure (134)

Z3—Height of Module's Outer Enclosure (140).

The remaining elements are labeled same as on FIG. 63

Figure 66:
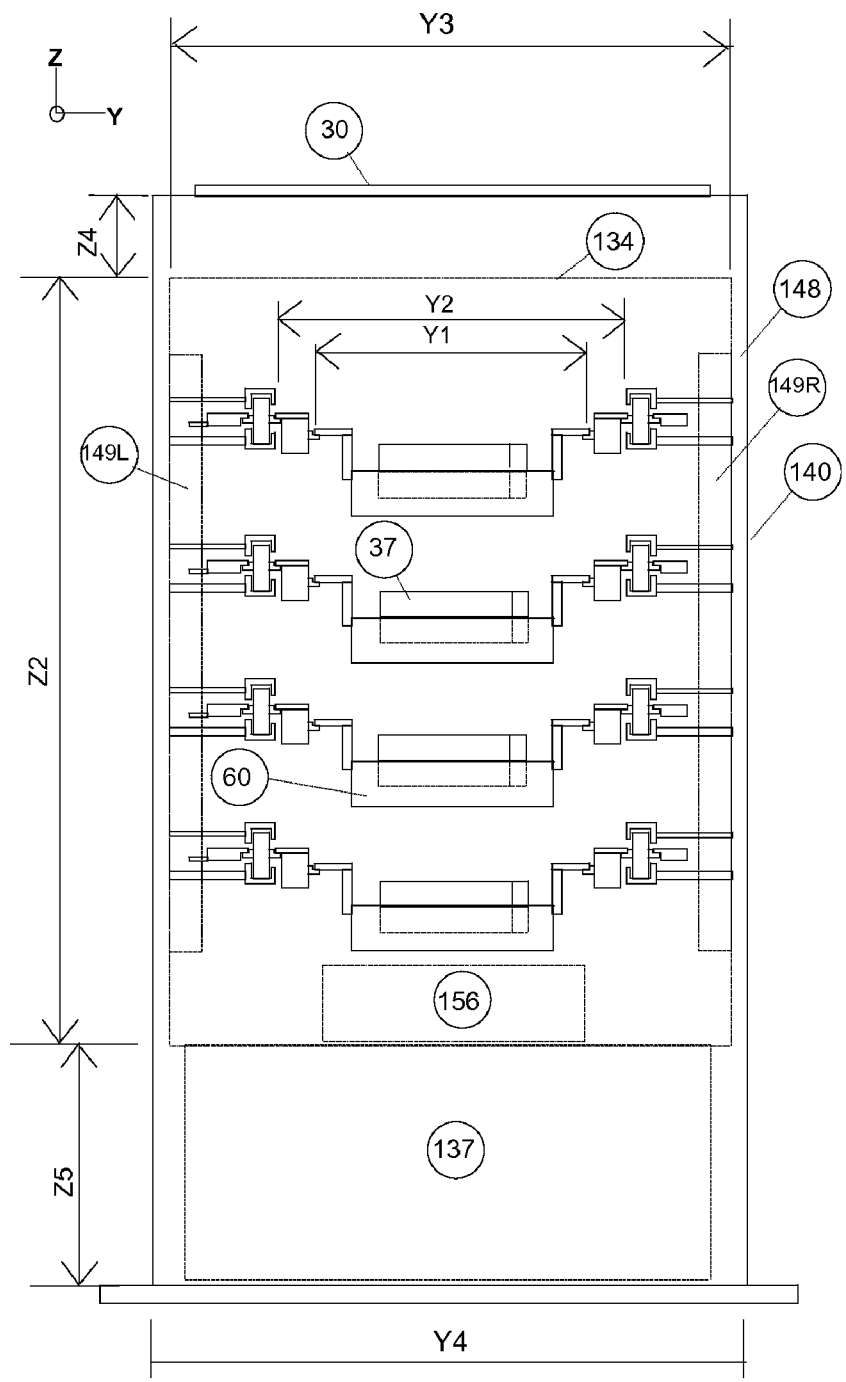

FIG. 66—View A of Module layout, as marked on FIG. 65. For simplicity, not all components are shown, and only front section of the Conveyor is shown. Figure elements are labeled as follows:

30—One of Access Gate or Door assembly, located along perimeter of Outer Enclosure (140), which could be used for: loading/unloading of Items, maintenance purposes, etc.

148—Area in-between Outer and Inner Enclosures, which could be used for installation of insulation (ambient/sound) material 149L/R—respective areas of Inner Enclosure, which could be used for attaching respective Conveyor support brackets, etc.

Y4—Width of Outer Enclosure

Z4—Height of the area within Outer Enclosure, which could be used for installation of elements labeled (141) through (146) on FIG. 65, and other components, as needed.

Z5—Height of the area within Outer Enclosure, which could be used for installation of elements labeled (137) through (139), (154) on FIG. 65, and other components, as needed.

The remaining elements are labeled same as on FIG. 65

Figure 67:
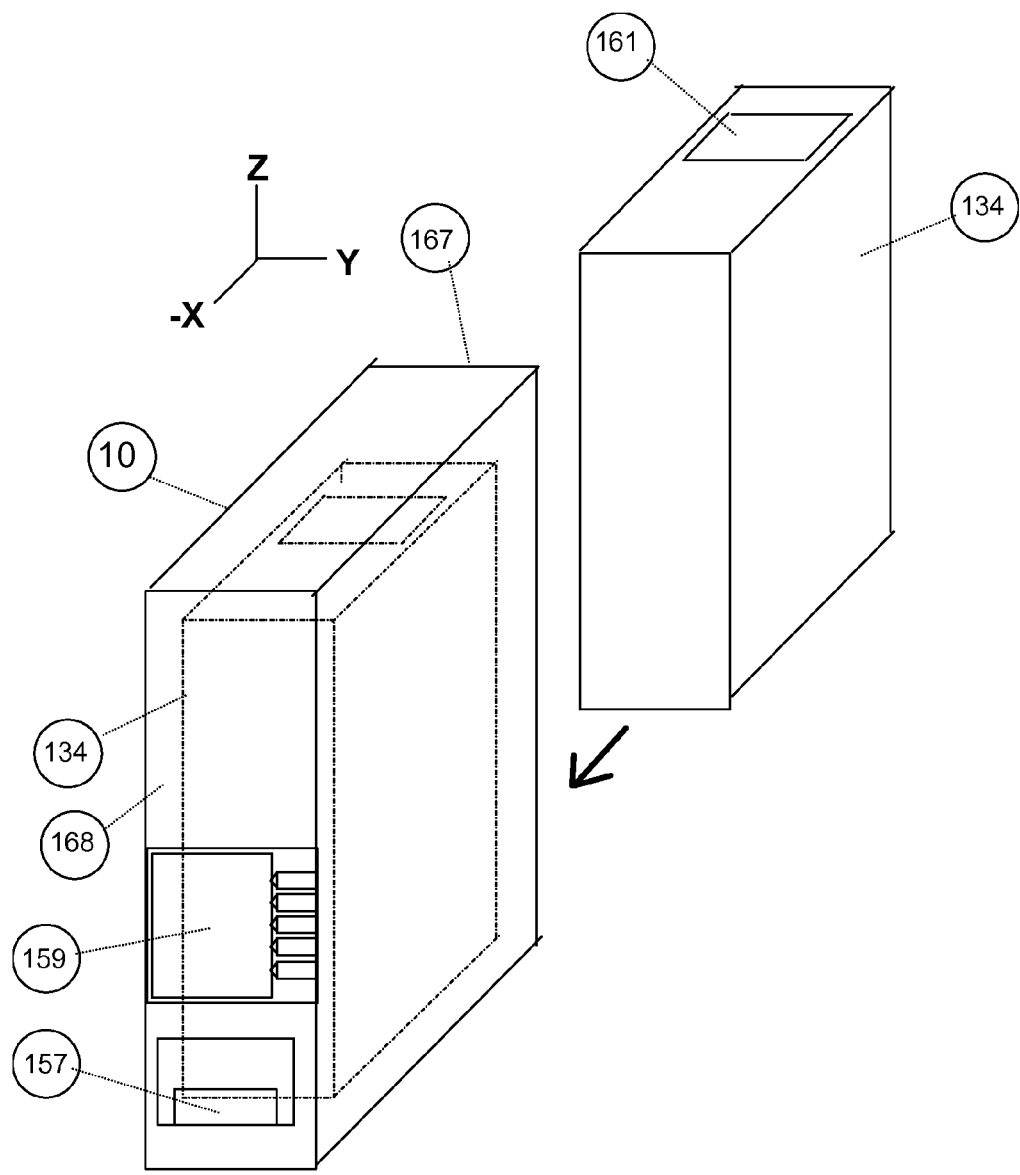

FIG. 67—Illustrates how Inner Enclosure (134) could fit inside Module's (10) Outer Enclosure. Figure elements are labeled as follows:

134—Module Inner Enclosure for housing Carrier Conveyor assembly and associated elements 157—Item pick-up bin, Customer side 159—User interface panel, Customer side 161—One of Access Gate or Door assembly, located along perimeter of Outer Enclosure (140), which could be used for: loading/unloading of Items, maintenance purposes, etc.

167—Outer Enclosure side panel, Provider side. It could be made as a removable or swing-type (up or to one of the sides), and could allow access to inside the Module from the Provider side.

168—Outer Enclosure side panel, Customer side. It could be made as a removable or swing-type, (up or to one of the sides), and could allow access to inside the Module from the respective side.

Figure 68:
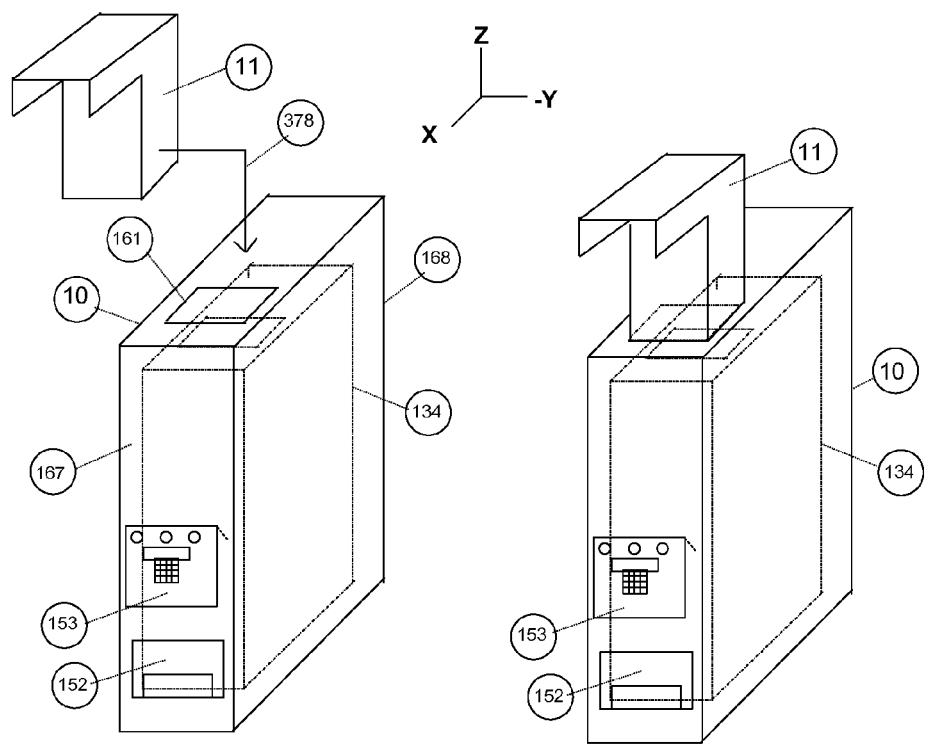

FIG. 68—Illustrates Module (10) with assembly detail in regard to installation of Automatic Gripper assembly (11), which could be used for automatic loading/unloading of Items in/out of Conveyor Carriers inside Module. Figure elements are labeled as follows:

134—Module Inner Enclosure for housing Carrier Conveyor assembly and associated elements 152—Item pick-up bin, Provider side 153—User interface panel, Provider side 378—Direction of installation of Automatic Item Loading/Unloading assembly on top of Module (10).

Remaining elements are labeled same as on FIG. 67.

Figure 69:
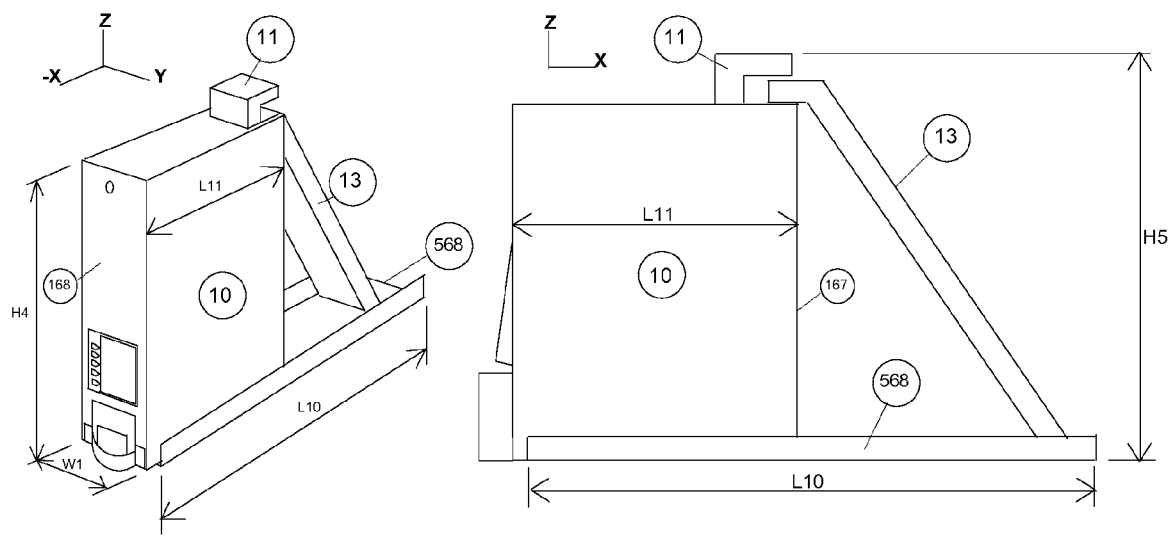

FIG. 69—Illustrates an example of Module (10) field installation detail. This configuration could provide sufficient flexibility and efficiency of installation of Modules and respective ADVS support components. Figure elements are labeled as follows:

11—Automatic Item Loading/Unloading assembly

13—Automatic Item Feeding assembly, which could be at the top attached to the rear top section of the Module (10) and at the bottom supported off the Module support platform (568), as shown.

568—Module support platform. The inner surface of the platform, that is facing the Module, could be designed to allow smooth sliding of a Module in—during installation, and out—during replacement or maintenance. This could be accomplished by covering the surfaces of the platform, which engage with Module, with special low-friction material, and/or addition of rollers at the base of the platform. In addition, mechanical latches could be used to secure the Module after installation is complete. The platform could be made long enough (dimension L10) to support Automatic Item Feeding assembly (13). L10 could be also designed to allow partial pull-back of a Module, after (13) is removed, for inspection or maintenance, while still residing on the top of it's support platform.

L10—Length of Module support platform (568)

L11—Length of Module

H4—Height of Module

H5—Height of Module with Automatic Gripper assembly (11) installed

The remaining elements are labeled same on FIG. 67.

Figure 70:
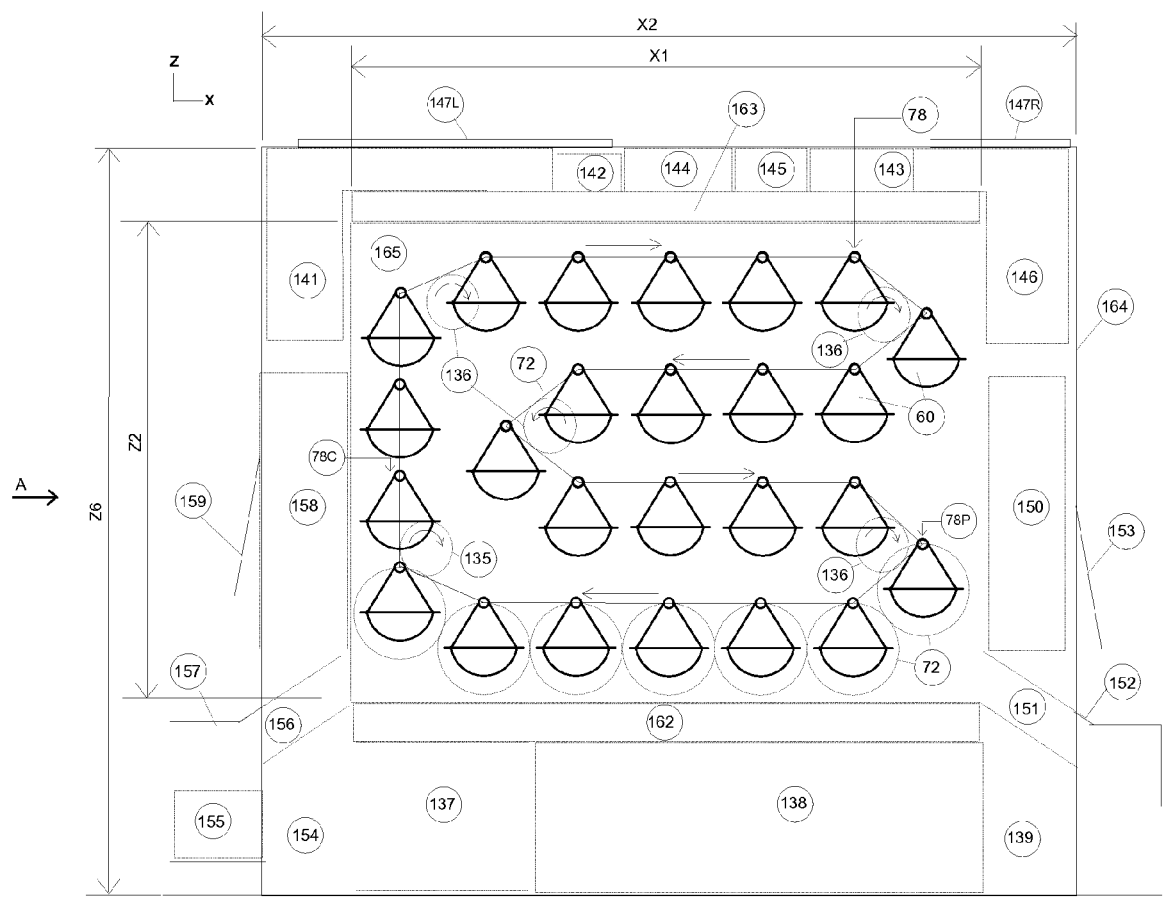

FIG. 70—View of Module layout with related details of Outer Enclosure (164) with removable or Portable type Inner Enclosure (165). Figure elements are labeled as follows:

162—Bottom area of (164), which could be used for mechanical coupling (alignment guides, supports, etc.) and electrical interface between Outer Enclosure (164) and Portable Inner Enclosure (165)

163—Top area of (164), which could be used for mechanical coupling (alignment guides, supports, etc.) and electrical interface between Outer Enclosure (164) and Portable Inner Enclosure (165)

Z6—Height of Outer Enclosure with removable portable Inner Enclosure

The remaining elements are labeled same as on FIG. 65.

Figure 71:
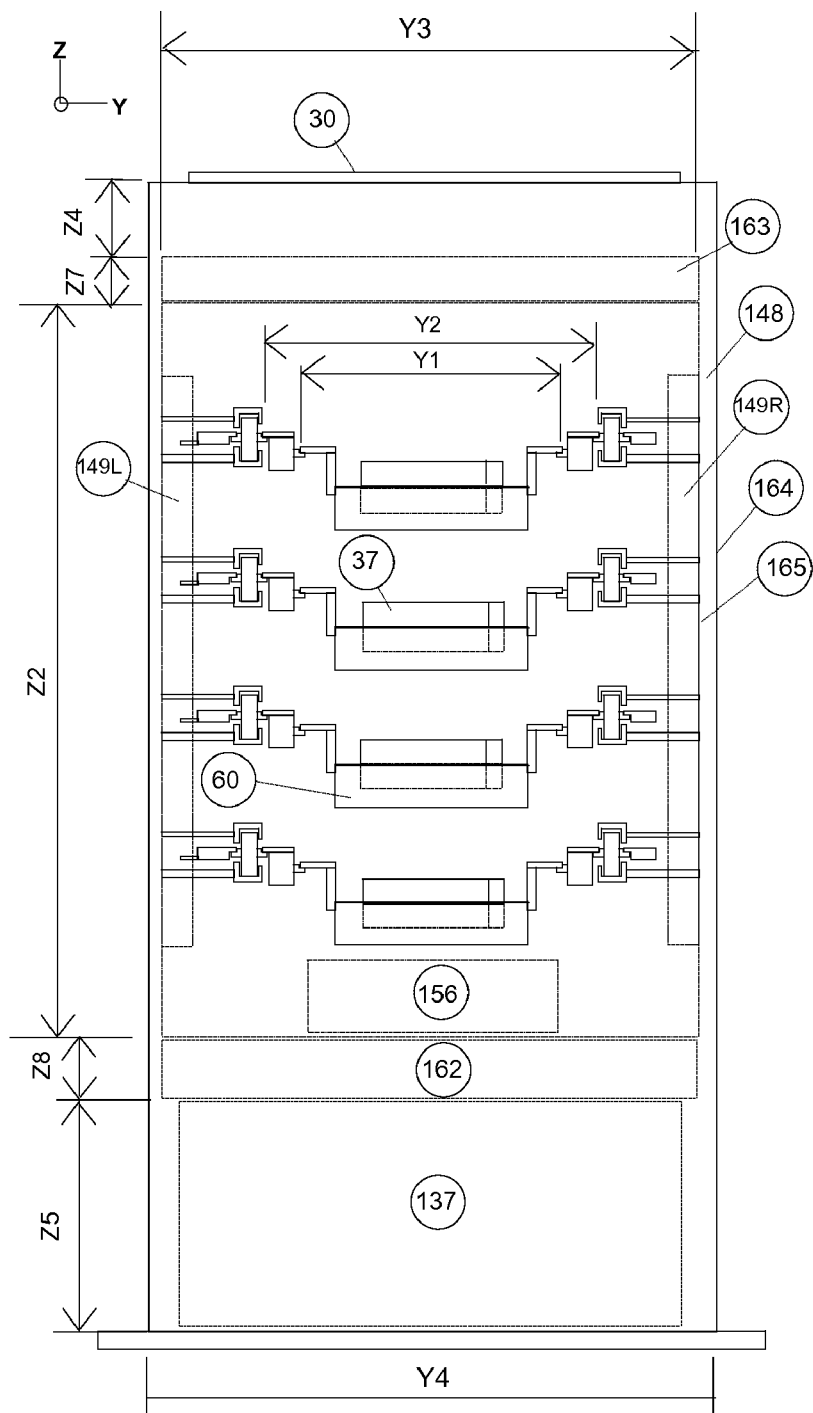

FIG. 71—View A of Module layout, as marked on FIG. 70. For simplicity, not all components are shown, and only front section of the Conveyor is shown. Figure elements are labeled as follows:

162,163—Same as on FIG. 70

Z7—Height of the area, which could be used for electromechanical coupling and electrical interface of Outer (164) and Portable Inner (165) Enclosures at the top of (164)

Z8—Height of the area, which could be used for electromechanical coupling and electrical interface of Outer (164) and Portable Inner (165) Enclosures at the bottom of (164)

Figure 72:
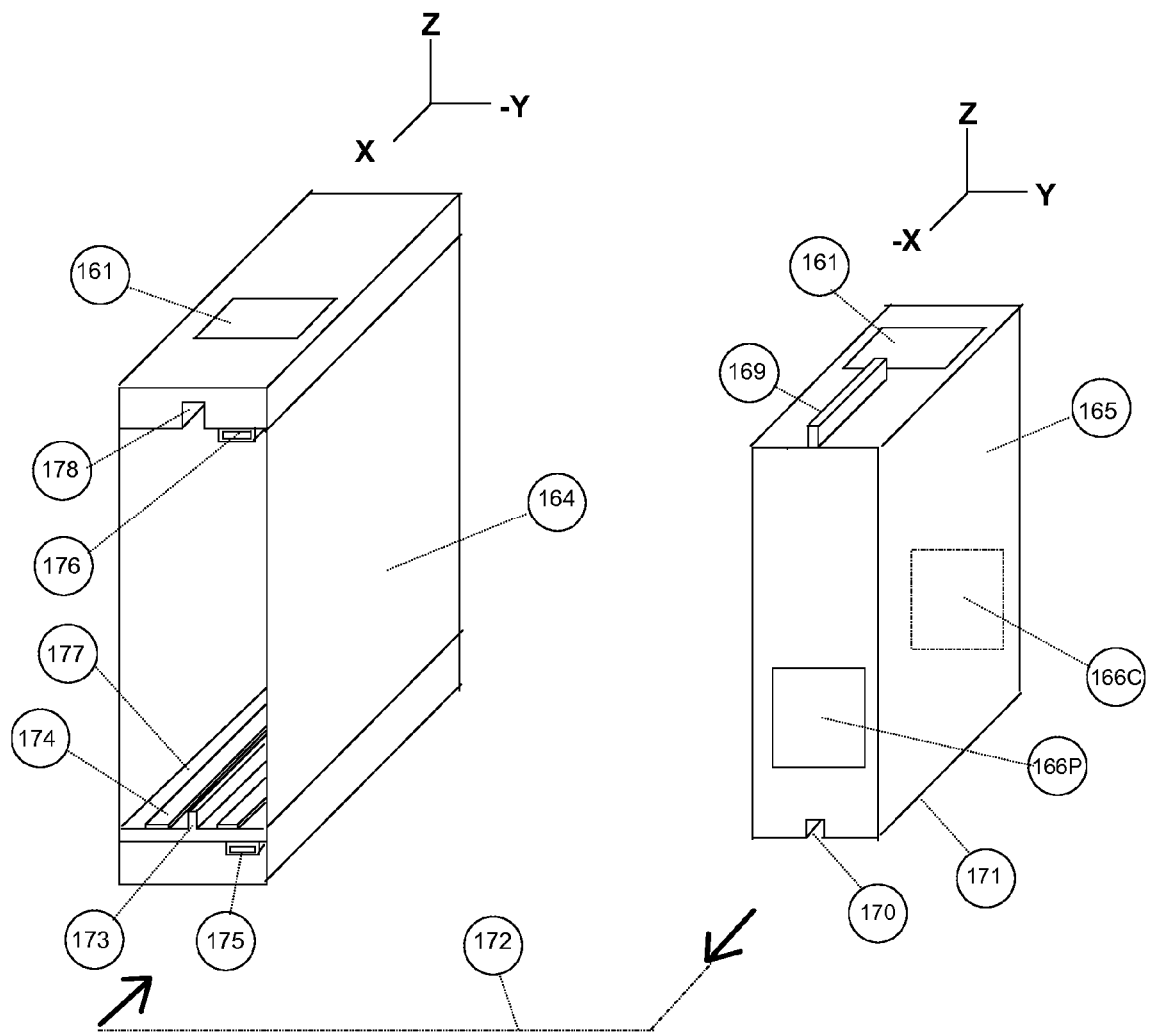

FIG. 72—illustrates design of Module with Portable Inner (165) and Outer (164) Enclosures, which could allow Inner Enclosure (empty, or fully/partially loaded with Items) to be moved in/out of Outer Enclosure, as needed. Shown a simplified version of guiding/aligning/support rails, as well as interface electrical hardware. For applications of vending large and/or heavy Items, number and type of guiding/aligning/support channels could be increased, as necessary, to provide efficient and reliable transitions during Inner Enclosure installation and removal. All loading/unloading openings (161,166) of Portable Inner Enclosure (165) could have removable panels (not shown), which when installed, could protect Items inside. Security Electronics inside Inner Enclosure could monitor position of these panels, as needed. Figure elements are labeled as follows:

161—Opening on top of Outer Enclosure. When Portable Inner Enclosure is installed, this opening could be used for loading/unloading of Items into/out of respective Conveyor Carriers inside Inner Enclosure.

164—Module Outer Enclosure, shown with Provider side panel removed

166C—Opening in Inner Enclosure for side Item Unloading, Customer side

166P—Opening in Inner Enclosure for side Item Unloading/ Loading, Provider side

169—Portable Inner Enclosure alignment/guiding channel assembly, which could be covered with, or made out of low-friction type material 170—Portable Inner Enclosure alignment/guiding slot assembly, which could be covered with, or made out of low-friction type material 171—Bottom panel of Portable Inner Enclosure, which could be covered with, or made out of with low-friction type material 172—Trajectory of plugging Portable Inner Enclosure into Outer Enclosure, for illustration purposes 173—Main alignment/guiding channel attached to platform (177), which could be used to assist in proper alignment of Portable Inner Enclosure during transitions in/out of Outer Enclosure.

174—Alignment brackets, attached to platform (177), which could be used to assist in proper alignment of Portable Inner Enclosure during transitions in/out of Outer Enclosure.

175—Electrical hardware interface connector at the bottom, which could be used for providing power and control to Portable Inner Enclosure from respective electrical components located inside Outer Enclosure of Module.

177—Bottom platform inside Outer Enclosure, which could be used for supporting Portable Inner Enclosure.

178—Main alignment/guiding slot mounted to top platform, which could assist in proper alignment of Portable Inner Enclosure during transitions in/out of Outer Enclosure.

Figure 73:
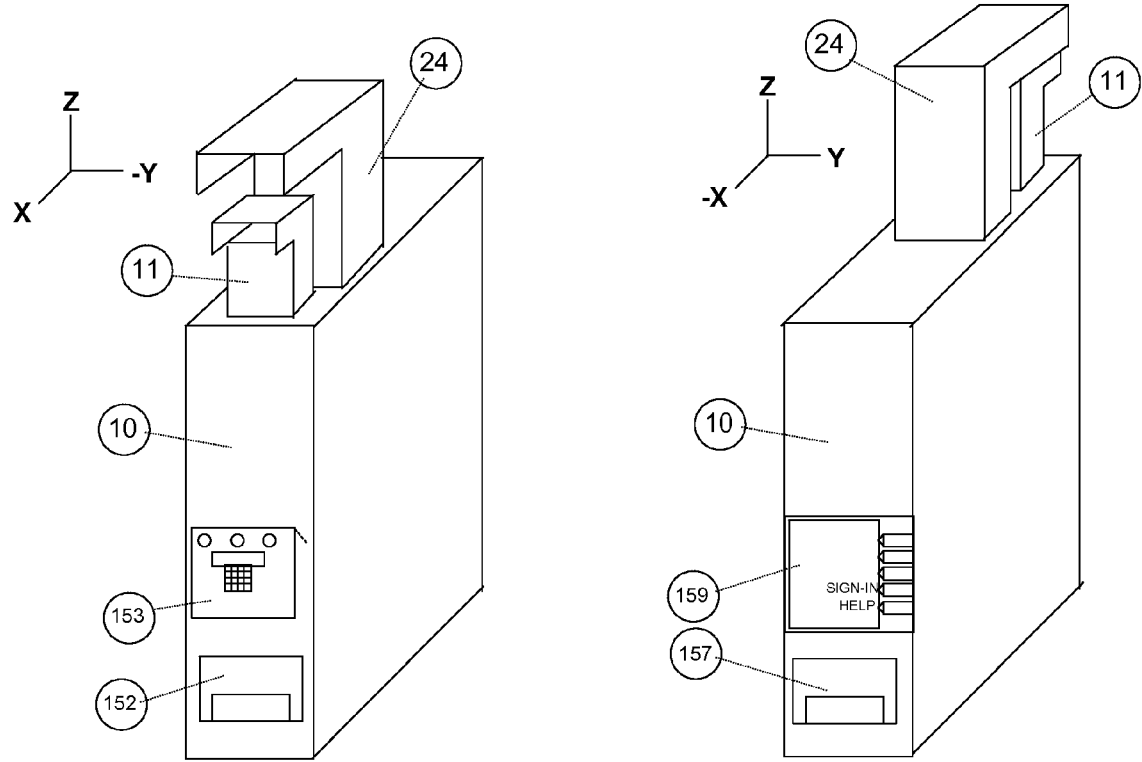

FIG. 73—illustrates a Module (10), which could have two different type of Conveyor Carriers inside, one—regular or small size, and one large size. Each Carrier within this Module could have barcode label, identifying each Carrier type. Controller could obtain this information from respective Barcode Scan devices within Module and ensure proper loading of Items into respective Carriers.

Figure elements are labeled as follows:

11—Automatic Item Loading/Unloading Gripper assembly, regular or small size

24—Automatic Item Loading/Unloading Gripper assembly, large size

152—Item pick-up bin, Provider side

153—User interface panel, Provider side

157—Item pick-up bin, Customer side

159—User interface panel, Customer side

Figure 74:
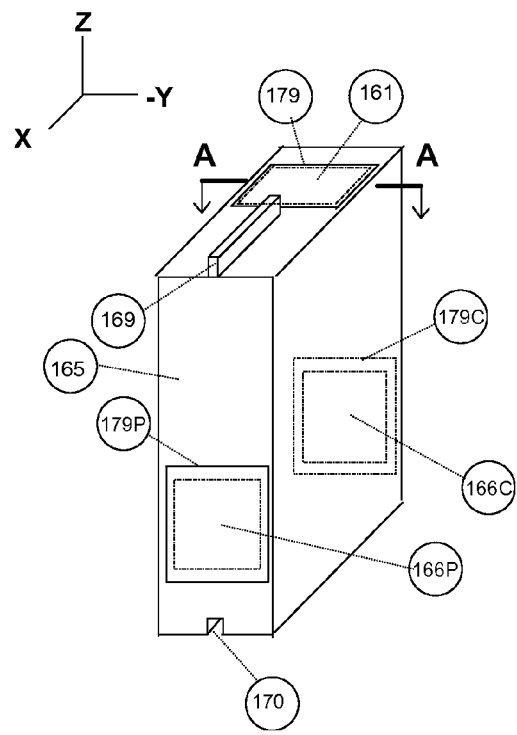

FIG. 74—illustrates design, which could be used for Portable Inner Enclosure (165). Figure elements are labeled as follows:

161—Access Gate or Door assembly, which could be used for: loading/unloading of Items in/out of (165), maintenance purposes, etc.

166C—Opening in Inner Enclosure for side Item Unloading, Customer side

166P—Opening in Inner Enclosure for side Item Unloading/ Loading, Provider side

169—Portable Inner Enclosure alignment/guiding channel assembly, which could be covered with, or made out of low-friction type material 170—Portable Inner Enclosure alignment/guiding slot assembly, which could be covered with, or made out of low-friction type material 179—Security Panel, which could be used to cover (161), and who's position (fully installed or tempered with) could be electronically monitored by Security Controller of (165)

179C—Security Panel, which could be used to cover (166C), and who's position (fully installed or tempered with) could be electronically monitored by Security Controller of (165)

179P—Security Panel, which could be used to cover (166P), and who's position (fully installed or tempered with) could be electronically monitored by Security Controller of (165)

Figure 75:
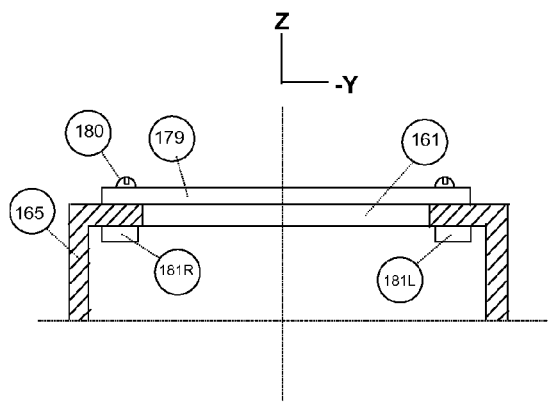

FIG. 75—Cross-section A-A, as marked on FIG. 74. It illustrates components, which could be used for monitoring Security Panels, shown on FIG. 74, of Portable Inner Enclosure (165)

Figure elements are labeled as follows:

181L/R—left/right Security Sensor, respectively. These Sensors could be a normally opened (electrically) switch, which will stay closed (electrically) when respective monitored Security Panel (179) is fully attached and securely covers respective Access Gate or Door assembly (161), or any opening to inside of Portable Inner Enclosure (165), which must be securely covered during transportation, etc.

Remaining elements are labeled same as on FIG. 74.

Figure 76:
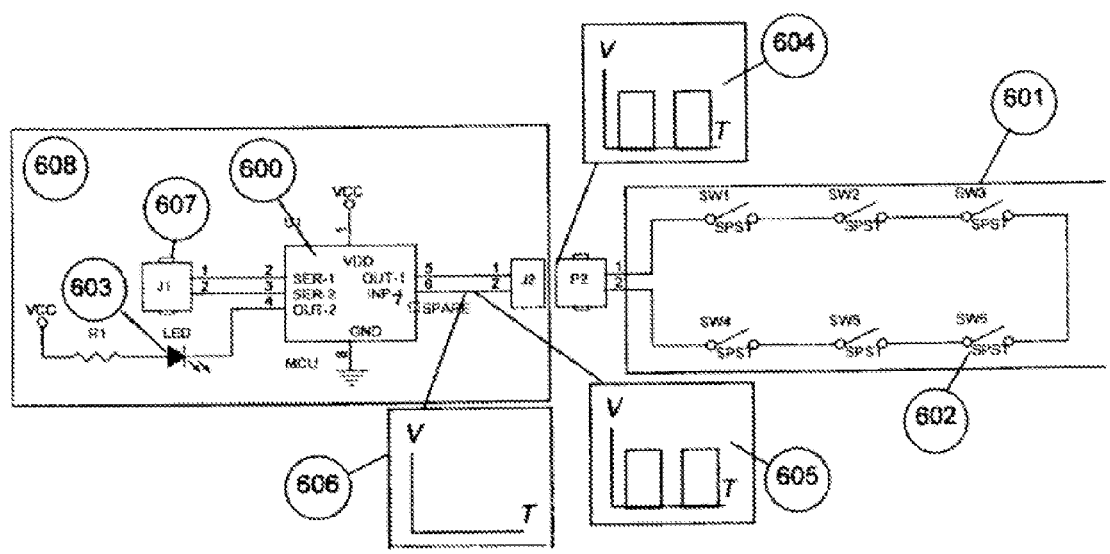

FIG. 76—Illustrates electrical components and their interconnection, which could be used for monitoring status of Security Sensors installed for on a Portable Inner Enclosure.

Figure elements are labeled as follows:

600—Security Controller, which is shown as an 8-pins low-power micro-controller with programmable flash memory, non-volatile internal memory, or external, as needed. The micro-controller could periodically generate signal profile (604) in a form of a voltage pulses at one of it's available outputs, labeled OUT-1. When all monitored Security Panels are in-place properly, all Security Sensor switches (602) connected in-series (601) will be closed and will allow the signal (601) to pass through, which could be detected by (600) at it's respective input, labeled INP-1, as indicated by (605). When any of (602) will go open, it will brake the electrical path, and signal at INP-1 will look as indicated by (606). The frequency of sending pulses through OUT-1 could be selected such that if any of (602) will go open, micro-controller (600) could promptly detect this condition, and properly record this event in non-volatile memory. Module Controller could communicate to Portable Inner Enclosure Security Controller (600) via serial interface (607), and instruct (600) in regard to Security monitoring procedure. As needed, Module Controller could instruct (600) to record every violation of Security in non-volatile memory. Security Controller (600) could indicate it's status, including violation(s) of Security, via status LED (603) controlled by output labeled OUT-2, which could be pulsed at specified frequency to indicate visually the respective status.

608—Security Controller assembly board. For simplicity, not all components are shown. This assembly could be mounted inside Portable Inner Enclosure in a location to allow the status LED (603) to be visible from outside, as needed.

FIg. 77 through FIG. 88 illustrate design of Modules with Item Processing capabilities. Process Modules could be designed using either Roller-type or Belt-type dual synchronized Conveyor system. Ability to Process Items inside Process Modules, and then store them in controlled environment, and then vend them out as needed, is one of the most important and unique features of the ADVS. There are number of design variables, which could be implemented within Process Module, which could expand possibilities of Item Processing features. Among them: Carrier Conveyor index (space between adjacent Carriers); Capacity of Process Chamber (number of Carriers, that could fit inside); Control features of Process Chamber, etc. In addition, Process Module Controller could also vary: Index travel (distance advanced every Process Cycle); Speed of Conveyor, Time at each Process stop, etc. Combination of all these design and control variables could allow to implement a wide variety of Item Processing procedures within Process Module. This drawing, for simplicity, illustrates design based on Roller-type Conveyor.

Figure 77:
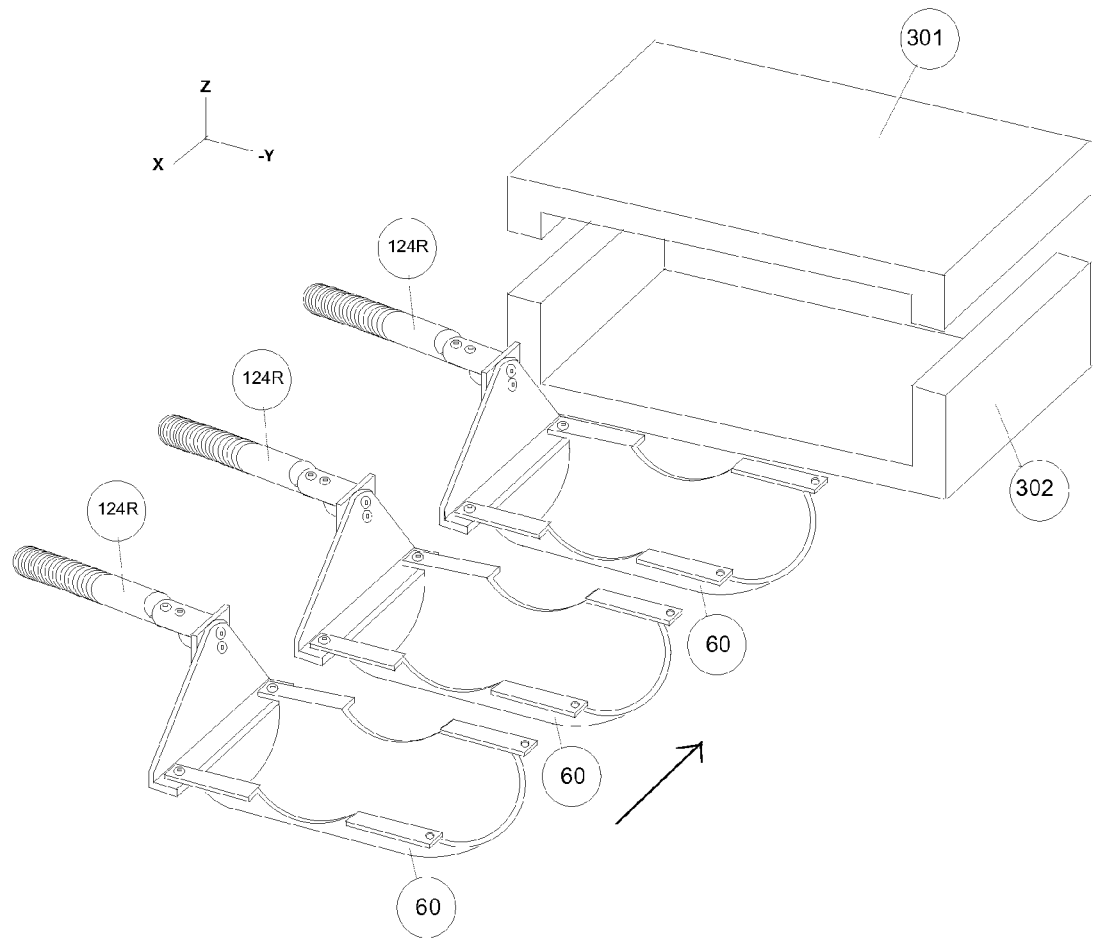
Figure 78:
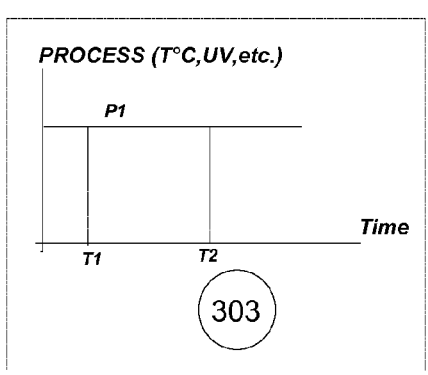
Figure 79:
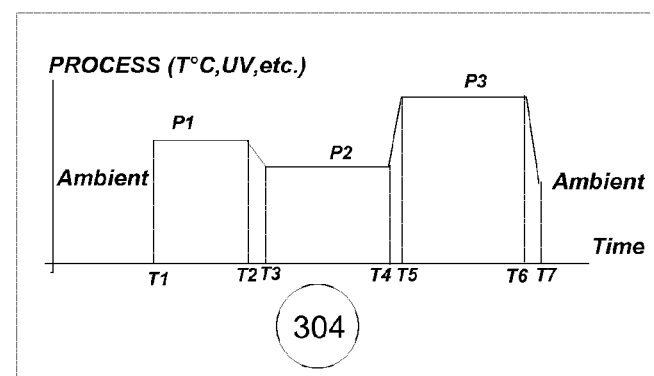
Figure 80:
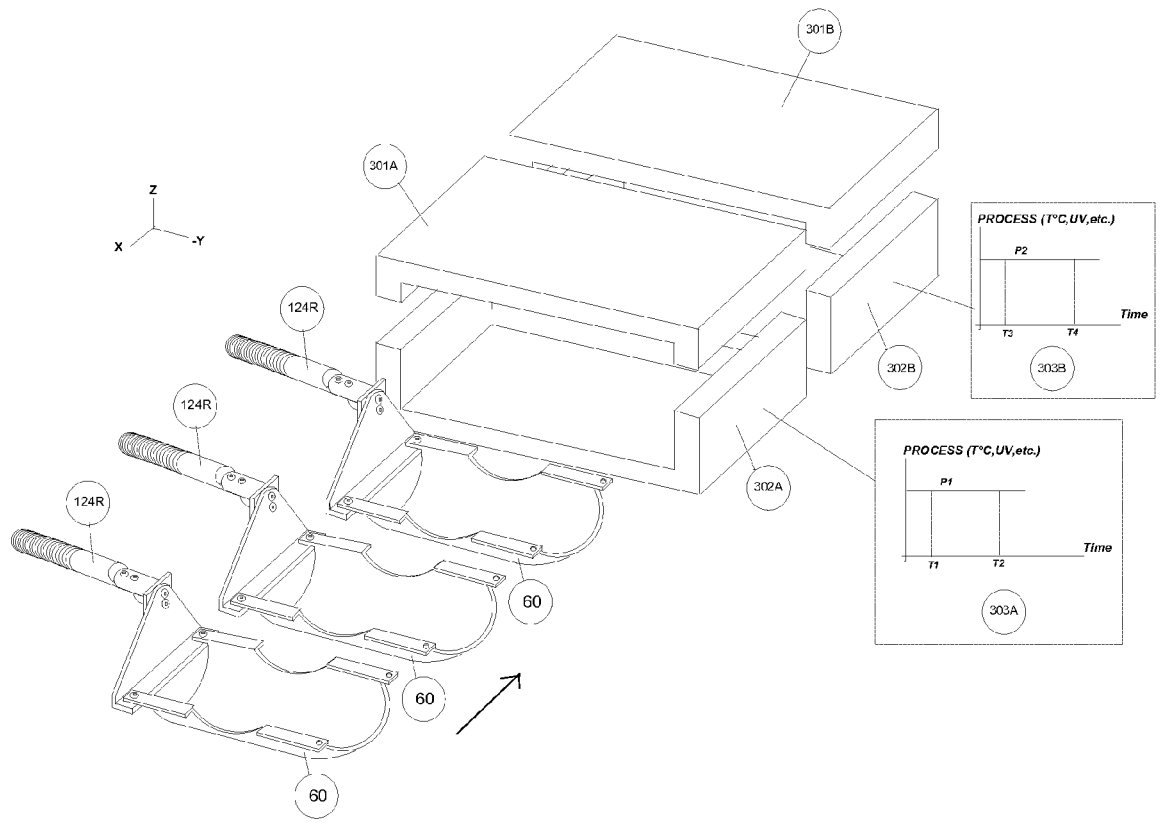

FIG. 77—Illustrates Process Chamber layout in relationship to Conveyor Carriers. Process Module could contain several Process Chambers. For simplicity, only one is shown.
Figure elements are labeled as follows:
60—Item Carrier assembly
124R—Carrier Support Shaft from the right side of the Carrier
301—Process Chamber upper section assembly
302—Process Chamber lower section assembly FIG. 78—Illustrates single Process graph of a controlled Process parameter within Process Chamber, such as temperature, UV radiation, etc. vs. time. As shown, Process Chamber could be designed to maintain a required value of Process parameter. Each Carrier with it's content upon entry into this type of Process Chamber, could be exposed to constant value of Process parameter, such as: constant temperature, UV radiation, etc. for a specified period of time. Figure elements are labeled as follows:
303—Constant Process parameter graph FIG. 79—Illustrates Process graph of a controlled Process parameters, which could be achieved by utilization of three Process Chambers. As shown, each Process Chamber could be designed to maintain a required value of Process parameter. Each Carrier with it's content upon entry into respective Process Chamber, could be exposed to constant value of respective Process parameter, such as: constant temperature, UV radiation, etc. for a specified period of time. Figure elements are labeled as follows:
304—Process graph, which could be attained utilizing three Process Chambers, located next to each other with distance in between to allow proper indexing of Carriers in-between them.
P1—Process Chamber #1 parameter value
P2—Process Chamber #2 parameter value
P3—Process Chamber #3 parameter value
T1—Time a Carrier enters the Process Chamber #1
T2—Time a Carrier exits the Process Chamber #1
T3—Time a Carrier enters the Process Chamber #2
T4—Time a Carrier exits the Process Chamber #2
T5—Time a Carrier enters the Process Chamber #3
T6—Time a Carrier exits the Process Chamber #3
T7—Time a Carrier upon exit of the Process Chamber #3 reaches ambient environment FIG. 80—Illustrates possible Item Processing inside Carriers (shown empty for simplicity) by exposing each of them to two Process Chambers. Figure elements are labeled as follows:
60—Item Carrier assembly
124R—Carrier Support Shaft from the right side of the Carrier
301A—Process Chamber #1 upper section assembly
302A—Process Chamber #1 lower section assembly
301B—Process Chamber #2 upper section assembly
302B—Process Chamber #2 lower section assembly
303A—Process graph, Chamber #1
303B—Process graph, Chamber #2

Figure 81:
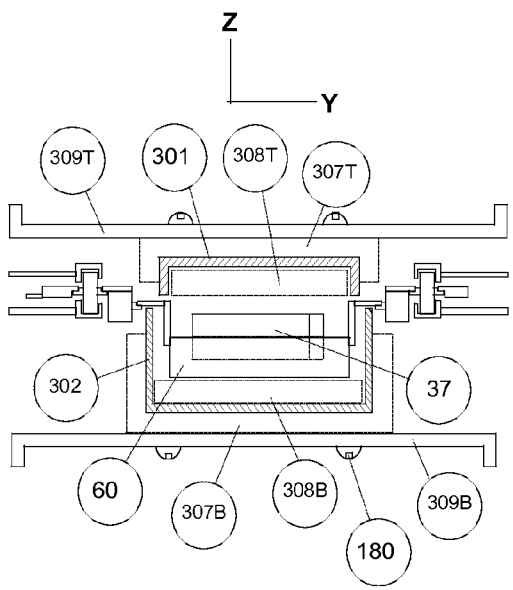
Figure 82:
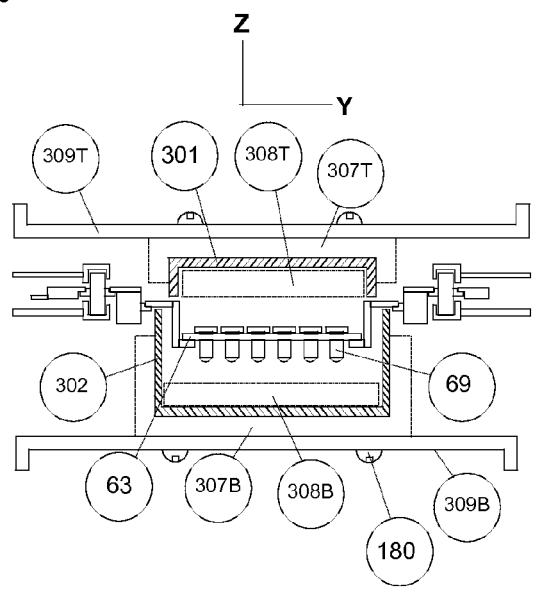

FIG. 81—Illustrates side view of a section of Roller-type Conveyor with a stationary Carrier loaded with Item going through Processing temperature Chamber, which is shown as cross-section.
Figure elements are labeled as follows:
37—Item cylindrical shape with cap on one side
60—Item Carrier assembly
180—One of mounting screw, recessed as needed to keep low profile
301—Process Chamber upper section assembly
302—Process Chamber lower section assembly
307T—Process Chamber insulation material, top side
307B—Process Chamber insulation material, bottom side
308T—Process control element, top side. Process element could be flexible foil heater, rubber heater, cartridge heater, quartz lamp, UV lamp, etc.
308B—Process control element, bottom side. Process element could be flexible foil heater, rubber heater, cartridge heater, quartz lamp, UV lamp, etc.
309T—Process Chamber mounting bracket, top side
309B—Process Chamber mounting bracket, bottom side FIG. 82—Illustrates side view of a section of Roller-type Conveyor with a removable Carrier Plate loaded with Items inside tubes/vials, going through Processing temperature Chamber, which is shown as cross-section. Figure elements are labeled as follows:
63—Carrier removable holding plate assembly
69—Tubes or vials with Item(s) inside
Remaining elements are same as shown on FIG. 81.

Figure 83:
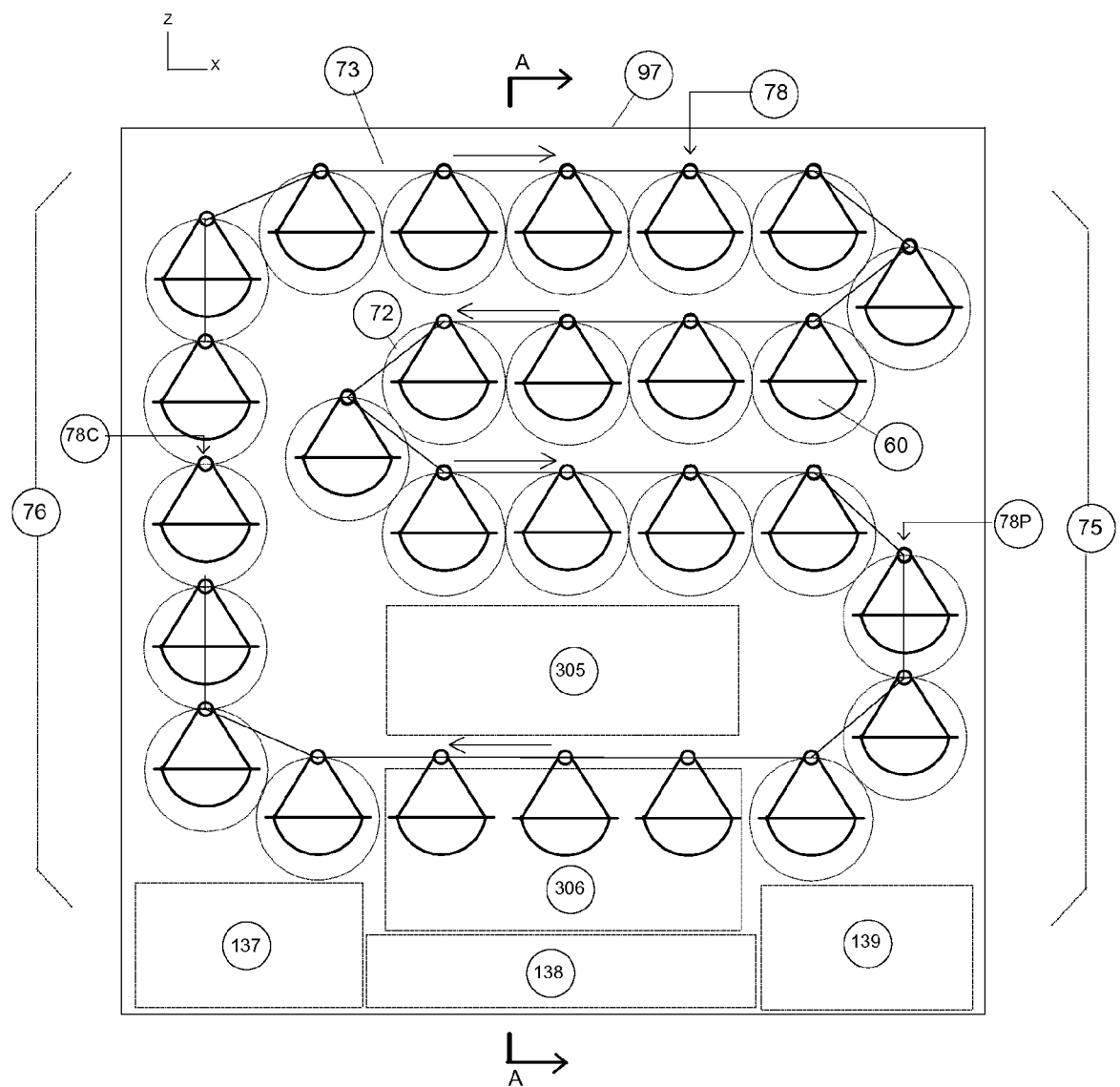

FIG. 83—illustrates Process Module with Roller-type Conveyor design with stationary Carriers and an area allocated for Item Processing. Ability to Process Items inside ADVS Process Modules, and then securely store them, as needed, is one of most important and unique features of ADVS, which could be effectively applied in a variety of applications, such as: biomedical, chemical, medical, etc.

Figure 84:
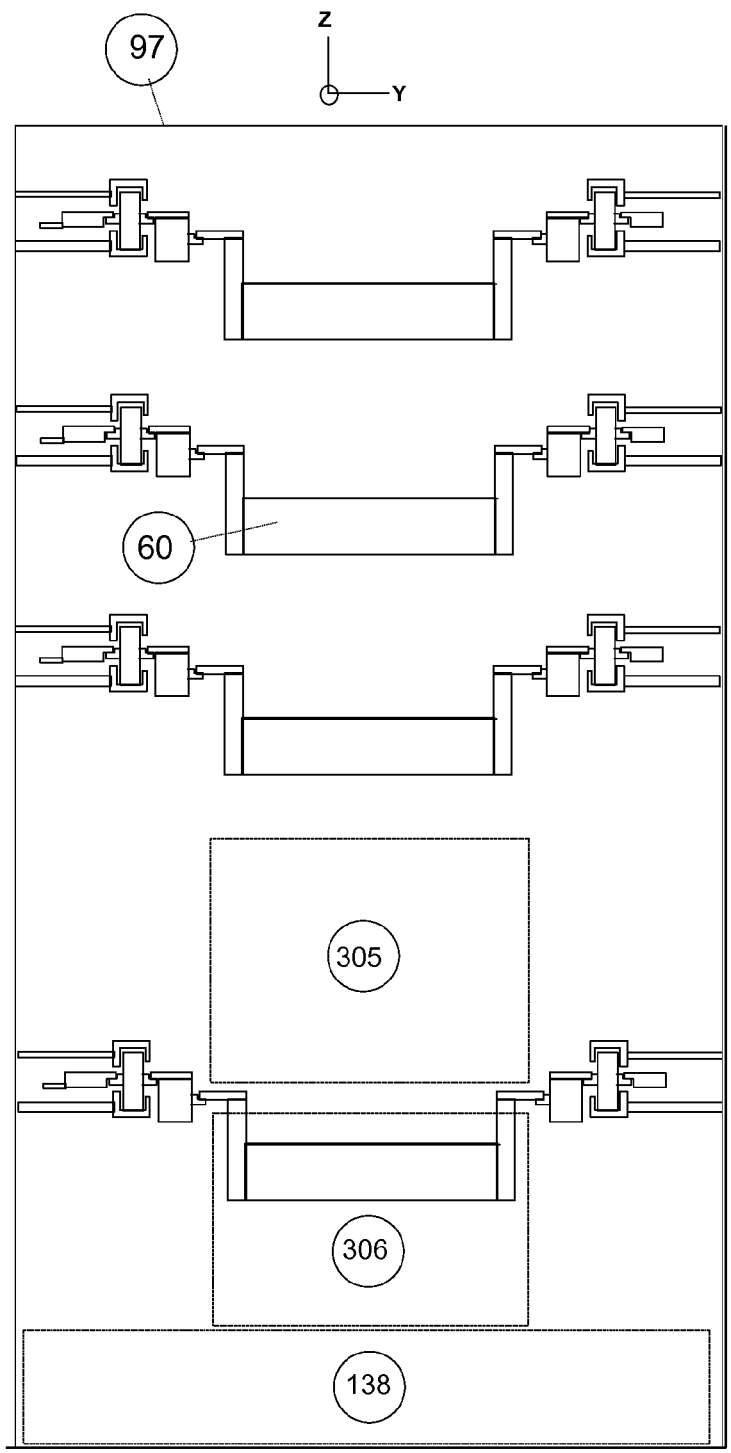

Application example, as shown, has Roller-type Conveyor capacity of 27 stationary-type Carriers, and Item Processing capacity of three Carriers at once. As result, it would take nine Process Cycles to complete Processing of all Items inside Carriers. Figure elements are labeled as follows:

60—Item stationary Carrier assembly
72—Carrier Clearance Sphere
73—ADVS Process Module Roller-type Conveyor
75—Provider side of the Process Module.
76—Customer side of the Process Module
78—Module location, which could be designated for Item loading/unloading by Automatic Gripper assembly, top side.
78C—Module location, which could be designated for Item unloading/loading by Automatic Gripper assembly, Customer side.
78P—Module location, which could be designated for Item unloading/loading by Automatic Gripper assembly, Provider side.
137—Area inside Process Module, which could be used for Roller dual synchronized Conveyor Main Drive assembly and support components
138—Area inside Process Module, which could be used for Module electrical components (power, control, interface, etc.)
139—Area inside Process Module, which could be used for Module electrical components for interfacing to other devices outside the Module (power, control, interface to ADVS Network, etc.)
305—Area inside Process Module, which could be used for Item Processing, upper section
306—Area inside Process Module, which could be used for Item Processing, lower section FIG. 84—View A, as marked on FIG. 83. For simplicity, not all components are shown. Figure elements are labeled same as on FIG. 83.

Figure 85:
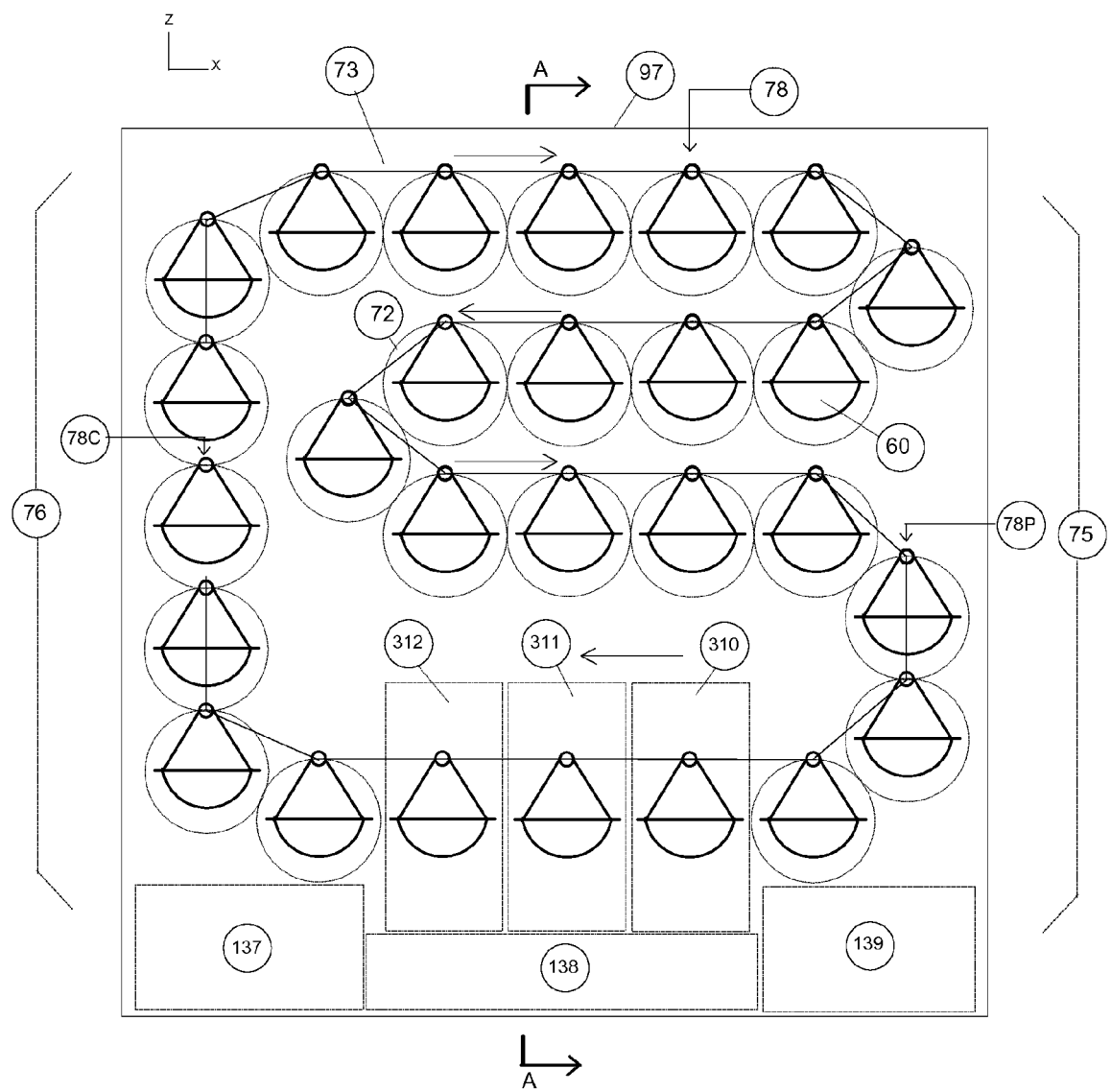
Figure 86:
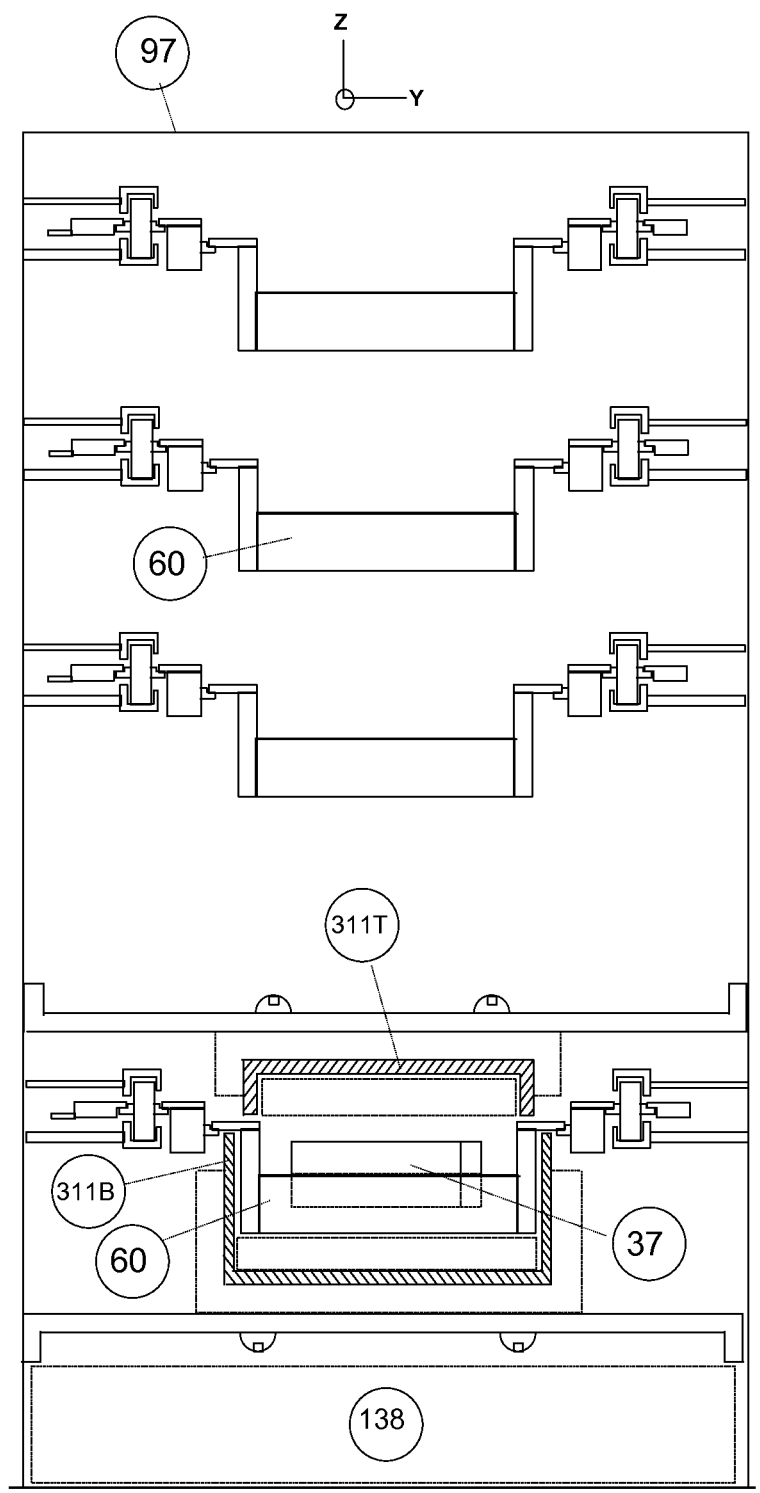

FIG. 85—illustrates Process Module with Roller-type Conveyor design with Item Processing, which could consist, as shown, of three Item Processing Chambers. Each Process Chamber could have specific Process, but every Process within each Chamber could have the same Processing time or cycle. For simplicity, shown example has each Process Chamber with specific temperature maintained inside. Items are Processed within each Chamber for time duration=T.

Figure elements are labeled as follows:
310—Process Chamber #1
311—Process Chamber #2
312—Process Chamber #3.

Remaining elements are labeled same as on FIG. 83.

FIG. 84—View A, as marked on FIG. 85, with cross-section of Process Chamber#2. For simplicity, not all components are shown. Figure elements are labeled as follows:
311T—Process Chamber #2 top section assembly
311B—Process Chamber #2 bottom section assembly
Remaining elements are labeled same as on FIG. 85.

Figure 87:
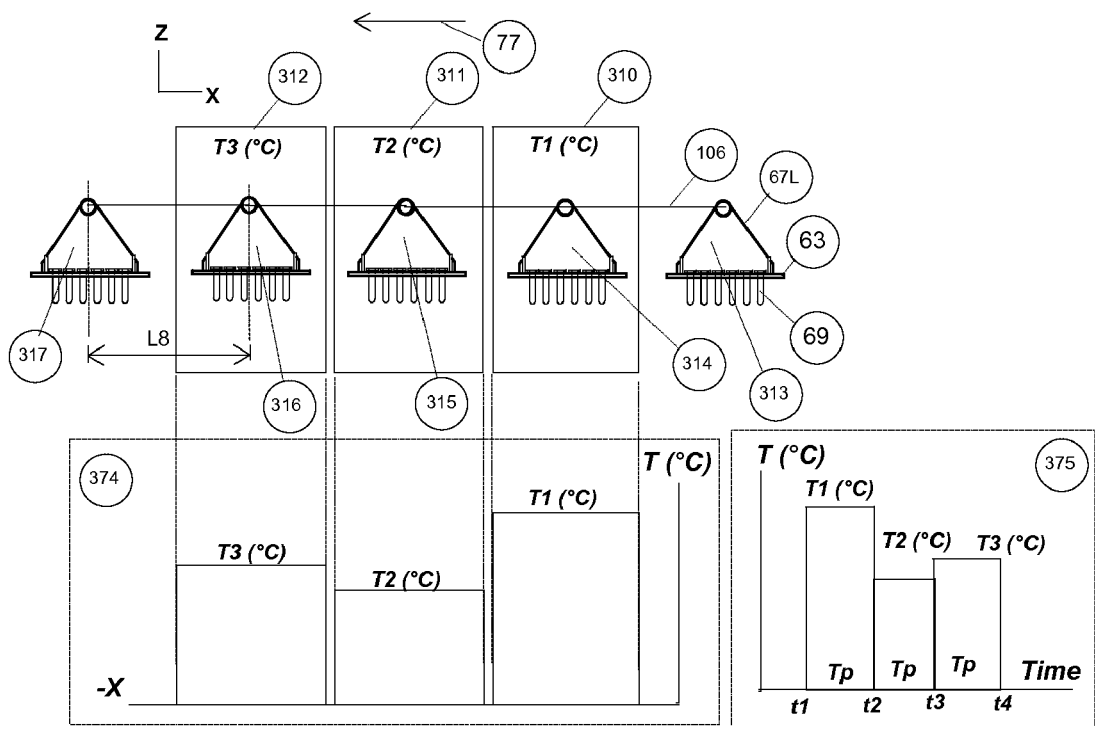

FIG. 87—illustrates section of a Conveyor design with Item Processing, which could consist, as shown, of three Item Processing Chambers. Each Process Chamber could have specific Process, but every Process within each Chamber—could have the same Processing time or cycle. For simplicity, shown example has each Process Chamber with specific temperature maintained inside—Process chart (374). Items are Processed within each Chamber for time duration equal to constant Process Time—Tp. Total Processing time, or Process Cycle, of one Carrier loaded with Items is equal to Tp*3 (for simplicity, Conveyor index time is considered<<than Tp). The Processing sequence of Items in this case could consist of the following steps, which could be executed by Module Controller Step 1. Module is empty. Module Controller could set the temperature for each Chamber according to the Process chart (374).
Step 2. Once each Chamber reached it's respective temperature setting, Carrier Plates with Items inside tubes/vials, which need to be Processed, could be loaded into respective Carriers. Out of all Carriers, the last three in a row, could be kept empty—not loaded.
Step 3. Conveyor, under commands from Controller, could execute required number of index moves equal to L6, with rest time at each stop equal to Tp.
Step 4. Once all Items loaded inside Module have been Processed, Controller could stop Conveyor, with three empty Carriers remaining inside respective three Chambers.
Step 5. Controller could turn off each Chamber.
Step 6. Once temperature inside each Chamber reached near ambient temperature, Controller could index Carriers, as needed. Processed Items could be unloaded, as needed, to Provider and/or Customer. Figure elements are labeled as follows:
63—Carrier removable holding plate for tubes/vials with Item(s) inside
67L—Carrier left support assembly for removable holding plates
69—Tube or vial with Item(s) inside
77—Direction of Conveyor motion
106—Conveyor direct linkage line, for illustration purposes
310—Process temperature Chamber #1, set to maintain temperature inside at T1(° C.)
311—Process temperature Chamber #2, set to maintain temperature inside at T2(° C.)
312—Process temperature Chamber #3, set to maintain temperature inside at T3(° C.)
313—Carrier loaded with tubes/vials, awaiting Processing. When Processing time of respective Carriers inside respective Chambers has expired (equal to T), Conveyor will advance one index.

As result, Carrier (313) will end up inside Chamber #1, Carrier (314)—inside Chamber #2, Carrier (315)—inside Chamber #3, Carrier (316)—will complete the entire Process Cycle.

314—Carrier loaded with tubes/vials, being Processed inside Chamber #1
315—Carrier loaded with tubes/vials, being Processed inside Chamber #2
316—Carrier loaded with tubes/vials, being Processed inside Chamber #3
317—Carrier loaded with tubes/vials, with Items, which have been through the entire Process Cycle
L8—Distance between centers of adjacent Conveyor Carrier Support Bearings
374—Process chart, based on Process Chambers (310,311, 312) settings.
375—Illustrates Process constant time graph, which each Item inside tubes/vials loaded into respective Carrier could be exposed to.

Figure 88:
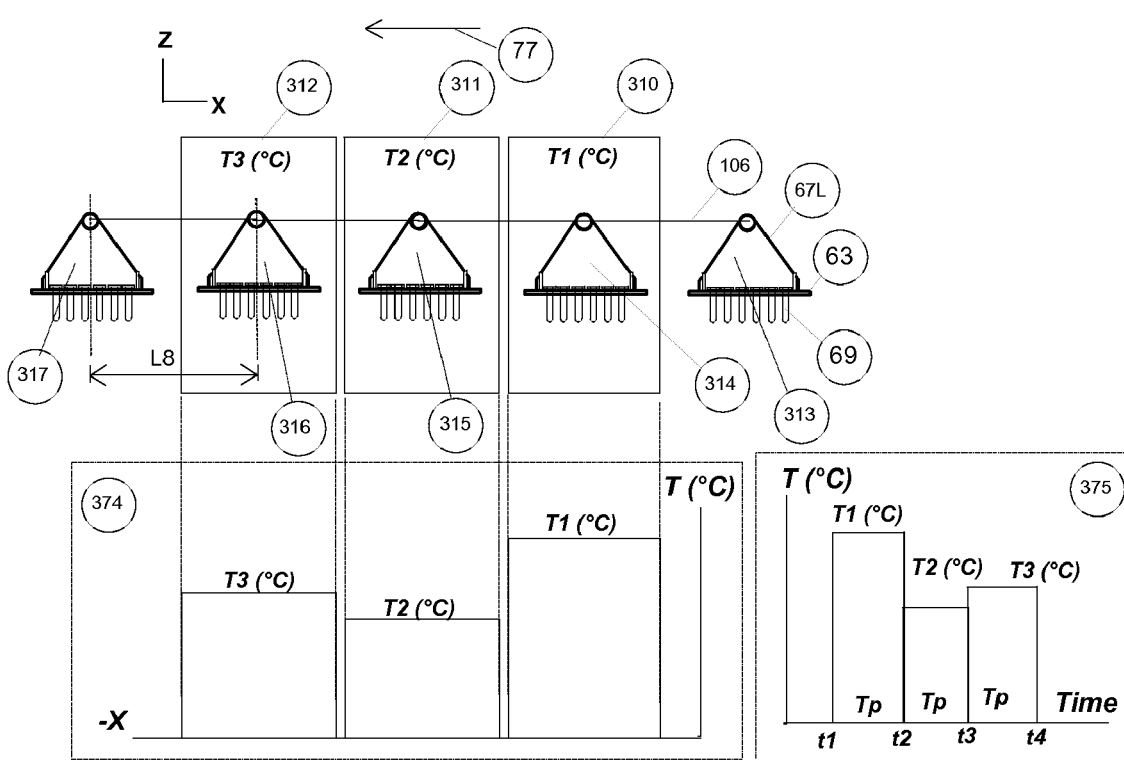

FIG. 88—illustrates section of a Conveyor design with Process Chambers same as on FIG. 87, except Carriers are spaced apart distance (L9) to allow Item Processing with variable Process time. Process time graph (376), is an example of one of possible Processes, which each Item inside tubes/vials loaded into respective Carrier could be exposed to. Total Processing time, or Process Cycle, of one Carrier loaded with Items is equal to Tp1+Tp2+Tp3 (for simplicity, Conveyor index time is considered <<than Tp1, Tp2, Tp3). As shown, the Processing sequence of Items in this case could consist of the following steps, which could be executed by Module Controller.

Step 1. Module is empty. Module Controller could set the temperature for each Chamber according to the Process chart (374).

Step 2. Once each Chamber reached it's respective temperature setting, Carrier Plates with Items inside tubes/vials, which need to be Processed, could be loaded into respective Carriers. Out of all Carriers, the last one could be kept empty—not loaded.

Step 3. Conveyor, under commands from Controller, could execute required number of index moves equal to ⅓ distance of L9, with rest times starting with Tp1 followed by Tp2, Tp3, Tp1, Tp2, Tp3, Tp1 and so on until all Items inside Module have been Processed. Controller could then stop Conveyor, with one empty Carriers remaining inside Chamber (310), while the other Carriers loaded with Processed Items remain outside Chambers.

Step 4. Controller could turn off each Chamber.

Step 5. Once temperature inside each Chamber reached near ambient temperature, Controller could index Carriers, as needed. Processed Items could be unloaded, as needed, to Provider and/or Customer. Figure elements are labeled as follows:

376—Illustrates Process variable time graph, which each Item inside tubes/vials loaded into respective Carrier could be exposed to.

Remaining elements are same as shown on FIG. 87.

FIG. 89 through FIG. 120 illustrate design of a number of ADVS support components, such as: Automatic Item Feeding assembly, Automatic Item Unloading Slider assembly, Automatic Item Loading/Unloading Gripper assembly, Automatic Empty Package Feeding assembly, Automatic Item multi-Module Feeding assembly.

Figure 89:
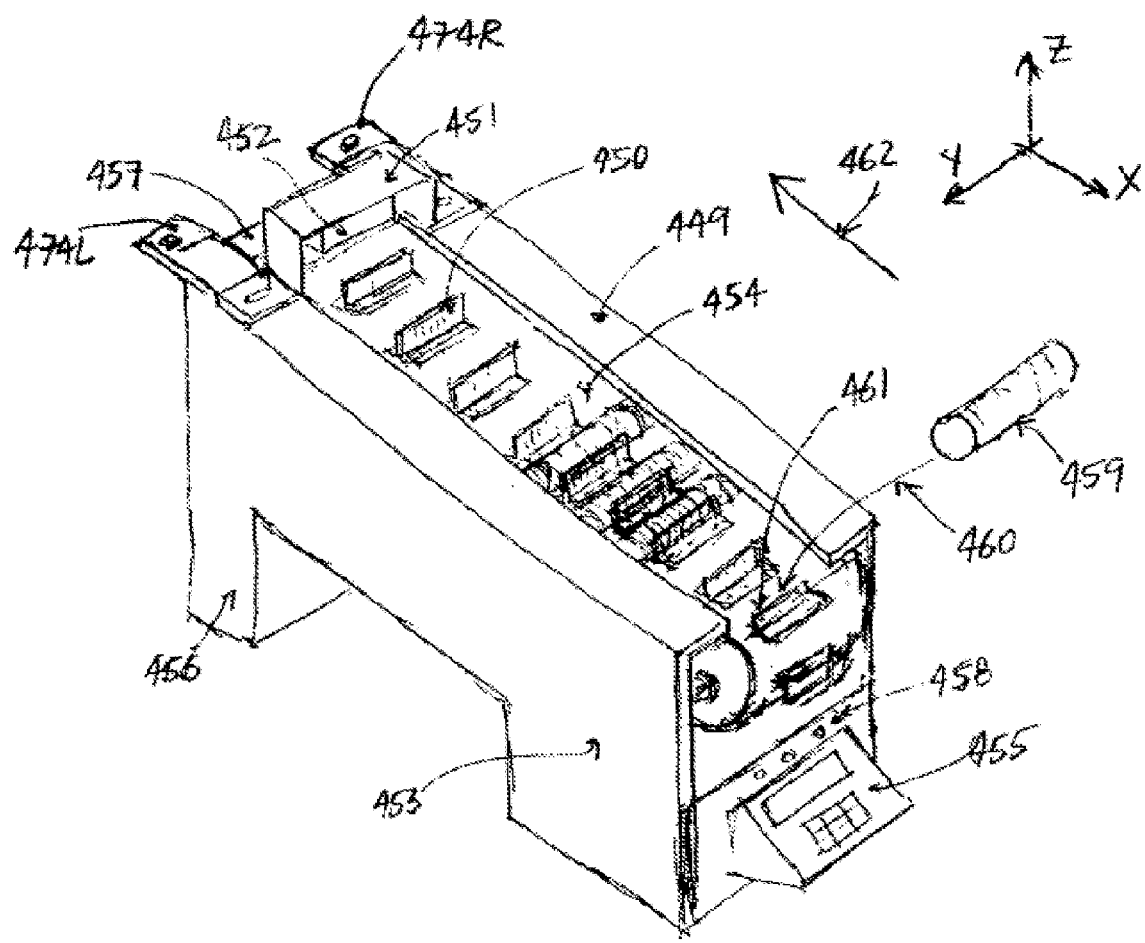

FIG. 89—Item Automatic Feeding assembly, which could be enclosed, as necessary, for specific application. Additional Barcode Scan device (not shown) could be mounted above Feeding Conveyor Loading Platform, and could be used by Feeding Controller to detect presence and identity of new Item loaded, and update Feeding Conveyor inventory status accordingly. Feeding Conveyor could have position Sensors (not shown), similar to sub-Conveyor position Sensors (combination of Flags, Index Slots, Optical Sensors, etc.), which could allow the Feeding Controller to control and monitor position of the Feeding Conveyor within required resolution. Combination of position, safety and self-diagnostics Sensors, monitored real-time by Feeding Controller, could ensure reliable and safe operation of Automatic Feeding assembly, including interface to respective Module Controller.

Loading of Items into Automatic Feeding assembly could be accomplished manually, by Provider, or automatically, by respective ADVS support components. Figure elements are labeled as follows:

449—Item upper retaining guides, which could be used to assist in retaining loaded Items on top of Feeding Conveyor.

450—Item support bracket, which could be attached to outer surface of Feeding Conveyor and create Feeding Slot, where loaded Item could safely reside during and after Conveyor motion.

451—Barcode Scan device mounting bracket

452—Barcode Scan device, which could be used by Feeding Controller to detect presence and identity of Item on top of Pick-up Platform (457). Controller could detect Item removal from Pick-up Platform (457) and update Feeding Conveyor inventory status, accordingly.

Figure 90:
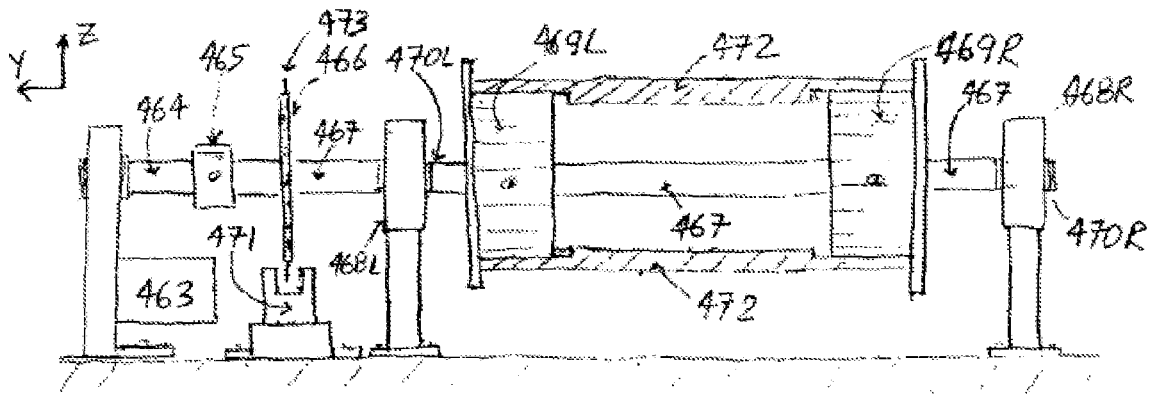

453—Section of Automatic Feeding enclosure which could be allocated for Feeding Conveyor drive assembly, detailed on FIG. 90 and FIG. 91.

454—Feeding Conveyor

455—Provider Control Panel for interfacing with Automatic Feeding Controller (not shown). Automatic Feeding Controller could be mounted behind Control Panel.

456—Section of Automatic Feeding enclosure which could be allocated for electromechanical assembly, which could be used for interfacing with Module Item Automatic Loading assembly

457—Item Pick-up Platform, from which Items could be picked-up by respective Module Automatic Item Loading assembly to be loaded into respective empty Carriers inside Module.

458—Automatic Feeding Controller status LED's

459—Item to be loaded onto loading platform of Automatic Feeding assembly

460—Direction of loading (459) on top of (461)

461—Automatic Feeder assembly Loading Platform

462—Direction of motion of Automatic Feeder Conveyor

Example of Operation.

Item Automatic Feeding assembly operation from empty state could consist of following steps:

1) On power up—Controller could move Conveyor to Home position and could report to Provider via Control Panel (455)—"at home"

2) Provider could place first Item onto lowest open Feeding Slot designated as Item Loading Platform (461)

3) Controller via Barcode Scan device (not shown) mounted above Loading Platform, could detect presence of Item barcode label. If barcode label information is expected, then Controller could advance Conveyor one Index, and could inform Provider via Control Panel (455)—"load next"

4) Steps 2 through 3 could be repeated until Controller detected via Sensor (Barcode device, etc.) that an Item (the first loaded Item in this case) reached the Pick-up Platform (457). Controller could report to Provider via Control Panel (455)—"load complete". At this point, Automatic Feeding assembly is "fully loaded" with Items, and Feeding Controller could report via hi-speed serial interface to Module Controller it could be attached to—"Item is ready for pick-up". Items could be removed from Pick-up Platform (457) by Module Automatic Item Loading assembly. Once Item is removed from Pick-up Platform (457), Feeding Controller could advance it's Conveyor one Index to allow Provider to place new Item onto Loading Platform.

FIG. 90—Item Automatic Feeding Conveyor Drive assembly, and related details. Feeding Conveyor timing belt cross-section (472) is shown for reference only. In addition to shown elements, a Rotary Encoder with only one Flag could be mounted to Conveyor drive shaft (464) with Sensor similar to (471) to detect this Flag, which could be used by Feeding Controller to establish Conveyor Home position. Upon power up Controller could move Conveyor at designated speed to Home position. After Home position of Conveyor is established, Controller could assign sequential Index Tags to each Feeding Slot.

Figure elements are labeled as follows:

463—Feeding Conveyor Drive gear motor assembly

464—Motor drive shaft

465—Flexible coupling connecting Motor shaft (2) with belt drive shaft (5)

466—Encoder wheel with position Flags (not all shown), which could be detected by Sensor (471) when they pass through Sensor's slot. Encoder design parameters (diameter "D3", number of Flags, etc.) could be designed to specific application requirements to provide reliable and accurate Conveyor position information to Controller.
467—Belt drive shaft
468L/R—Belt drive shaft (467) left/right support with respective bearing (470)
469L/R—Left/right belt pulley with belt retaining flange on respective side
470L/R—Support bearing
471—Sensor with slot for detecting Encoder Flags when they pass through.

Item Feeding Controller could monitor position of Conveyor by processing signals coming out of Sensor 472—Belt with grooves to engage with (469). Belt could have Index Slots, similar to belt-type sub-Conveyor design, which could be monitored by optical Sensor(s), which could report linear position of the Feeding Conveyor to Controller, as needed.

FIG. 91—illustrates 3-D view of a section of Feeding Conveyor Drive assembly, shown on FIG. 90. Dimension "X9" represents Feeding Conveyor Index, as distance between adjacent Feeding Slots. Figure elements are labeled as follows:
462—Direction of motion of Automatic Feeder Conveyor
467—Belt drive shaft, rotating in CCW direction, as shown
D3—Diameter of the of Rotary Encoder Wheel (466). The Encoder is rotating in CCW direction, as shown
W3—Width of Encoder Index Flag
L13—Distance between adjacent Index Flags of Rotary Encoder Remaining elements are labeled same as on FIG. 89 and FIG. 90.

Figure 92:
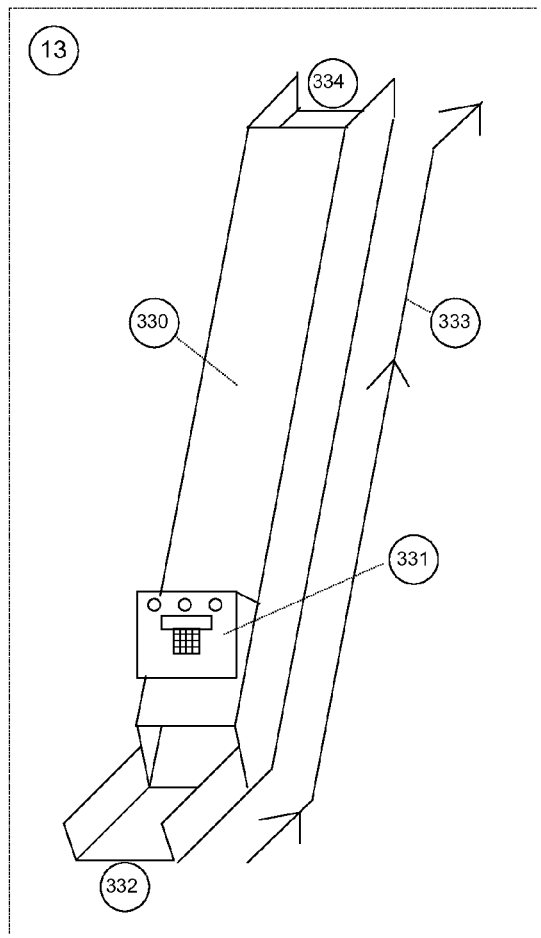

FIG. 92—Illustrates ADVS Automatic Item Feeding assembly. Item Automatic Feeding assembly could serve as Items buffer to respective Module, expanding capacity of Items within ADVS. Transfer of Items from Feeding assembly could be unattended, under direct control from respective Controllers—Module and Feeder. Figure elements are labeled as follows:
13—Automatic Item Feeding assembly, which in addition to shown components, could include:
a) Conveyor Drive assembly
b) Sensors for monitoring Item presence at various locations such as: Loading Platform, Pick-up Platform, etc.
c) Sensors for monitoring Conveyor position
d) Barcode Scan devices, which could report Item barcode label information.
330—Automatic Item Feeding conveyor assembly, which could be used for advancing Items from point of entry—Item Loading Platform (332) to point of unloading—Item Pick-up Platform. Feeding Conveyor could be indexed by Feeder Controller when Pick-up Platform (334) is empty.
331—Automatic Item Feeding assembly Controller Provider interface panel. Feeder Controller could have interface with respective Module Controller, which could be used to synchronize operations related to Item Feeding and transporting from Feeder Pick-up Platform into respective empty Carrier within Module by Automatic Loading assembly.
332—Item Loading Platform. Items could be loaded on top of Platform by Provider manually or via assistance of automatic means. Item loaded on Platform, could have their barcode label verified by Barcode Scan device. If accepted, Item information could be added to Item Inventory, otherwise Feeder Controller could notify Provider via Control panel (331), that the loaded Item has been rejected.
333—Direction of Item motion inside Automatic Feeding assembly (13)
334—Item Pick-up Platform. Items could be picked-up from this Platform by respective Automatic Item Loading assembly, and then could be loaded into respective empty Carriers inside Module.

Figure 93:
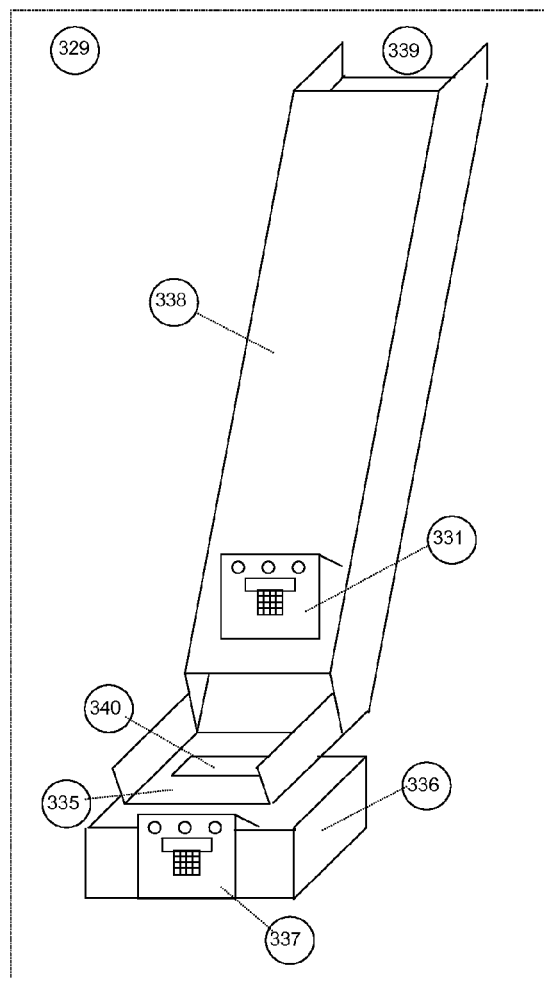

FIG. 93—Illustrates ADVS Automatic Item Feeding assembly with optional Automatic Item Inspection device. Figure elements are labeled as follows:
329—Automatic Item Feeding conveyor assembly for large size Items. Feeding Conveyor could be indexed by Feeder Controller when Pick-up Platform (339) is empty.
331—Automatic Item Feeding assembly (329) Controller Provider interface panel
335—Item loading and Inspection Platform.
336—Item Automatic Inspection device, which could be used for measuring Item's weight, size, etc.

In addition, a Barcode Scan device could be placed above (335), and used by Controller to obtain Item barcode label information.
337—Item Automatic Inspection device Control panel. Inspection Controller could be programmed by Provider directly via (337), or via ADVS Station Computer to inspect Items specific parameters. If results are within acceptable range, Item could be accepted, otherwise Inspection Controller could inform Provider that loaded Item is rejected
338—Automatic Item Feeding conveyor assembly, for large size Items
339—Item Pick-up Platform
340—Automatic Item Feeding assembly Item Inspection window, which could be used for measuring Items weight, size and/or reading barcode label.

Figure 94:
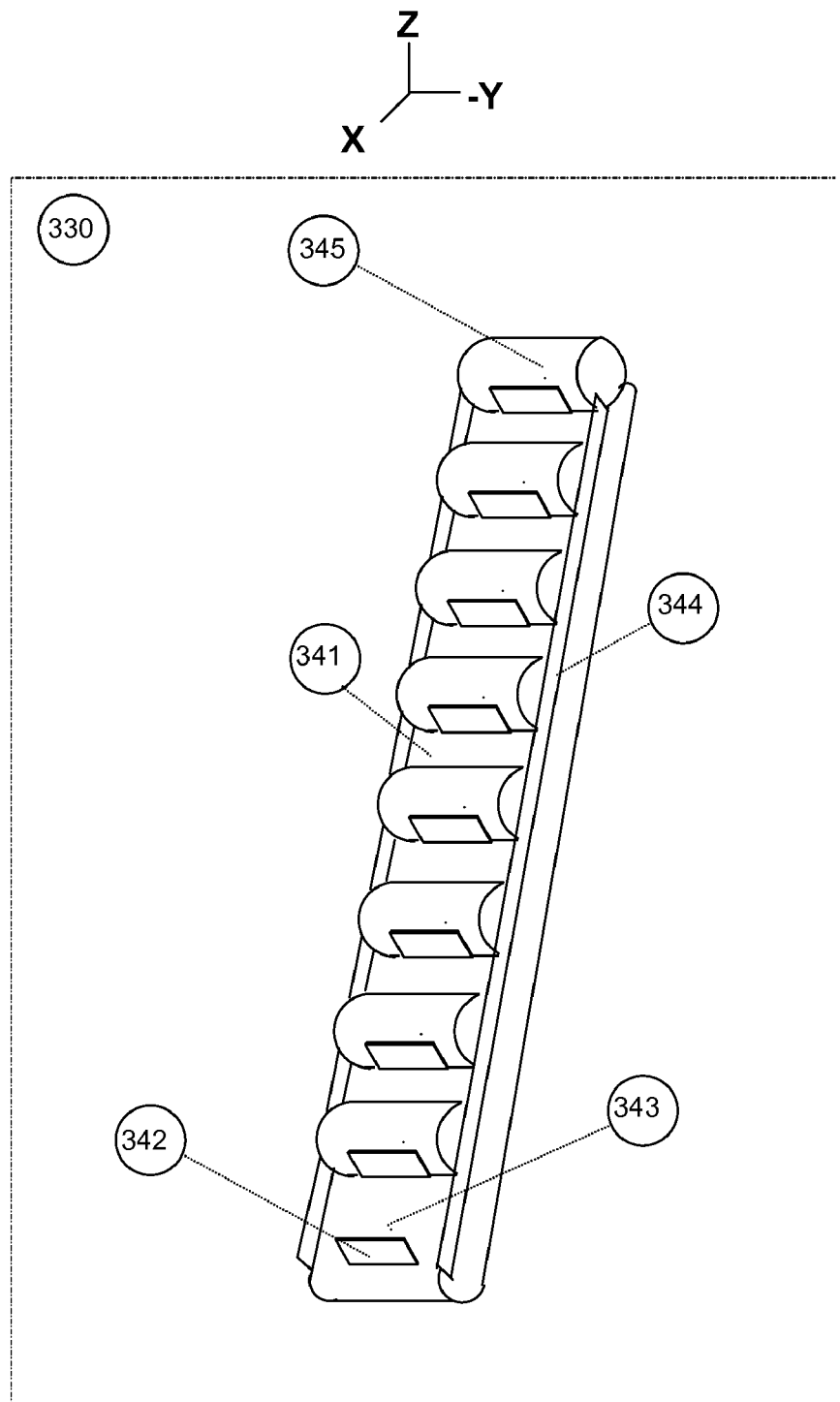

FIG. 94—Illustrates Automatic Item Feeding Conveyor assembly details.

Figure elements are labeled as follows:
330—Automatic Item Feeding conveyor assembly
341—Automatic Item Feeding belt assembly
342—Item support bracket assembly, which could be used to secure location of Items on conveyor
343—Open slot on (330), ready for Loading of an Item
344—Item retention panel, which could be used to secure Items within (330)
345—Item on top of Pick-up Platform (reference element 339, FIG. 93). This Item must be removed manually by Provider or by ADVS Automatic Item Pick-up assembly before Feeding Conveyor (330) could start indexing by Feeder Controller.

Figure 95:
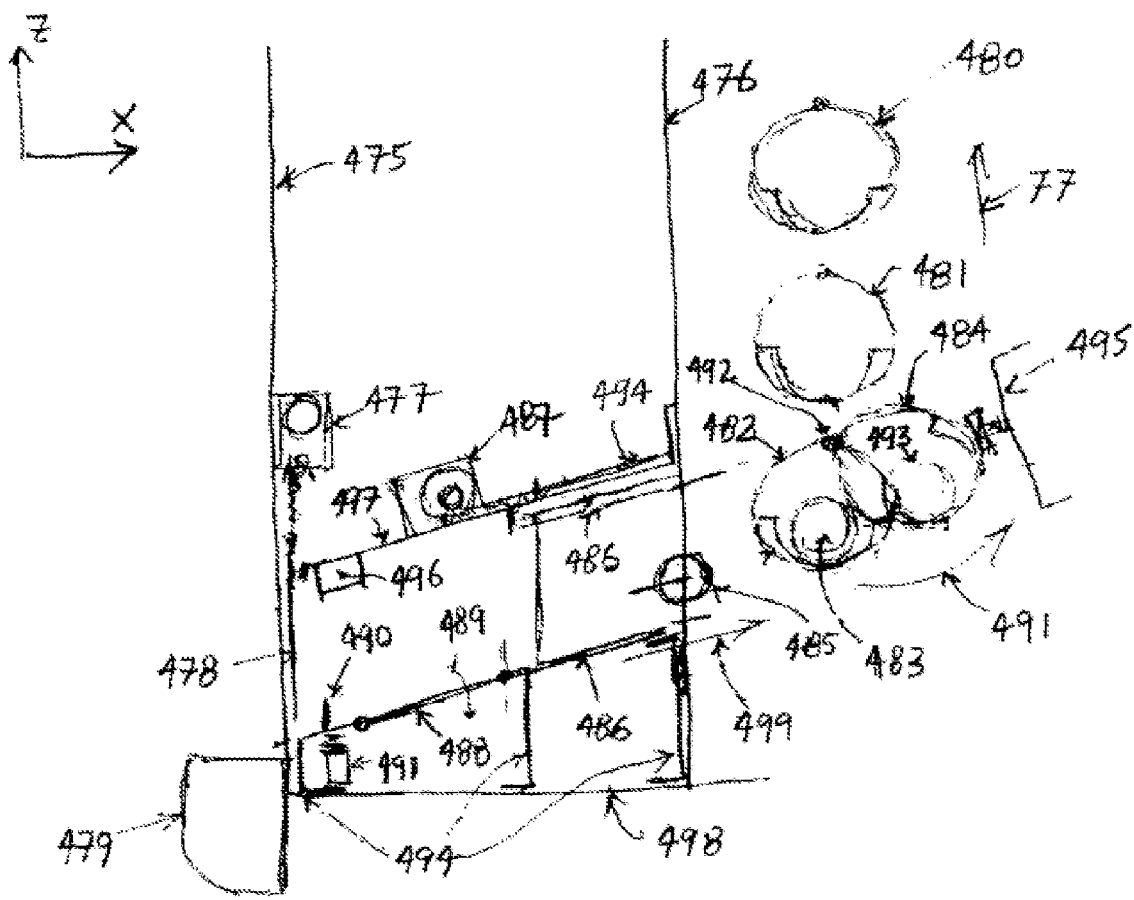

FIG. 95—Illustrates mechanical diagram of Item Automatic "Slider" Unloading assembly, and related details. Carrier Conveyor is represented by two unloaded Carriers (480), (481) and one loaded Carrier (482) at unloading location by Automatic Slider assembly. Conveyor could be stopped by Controller at this specified position for unloading Carriers (Carrier (482) is shown in this example). Carriers for applications with "Slider" Unloading could be designed with their side panels being engaged with "push-out" rollers, as shown on FIG. 97. Conveyor and Carriers interconnection details are not shown, for simplicity. Item "Slider" Unloading could be used for applications using cylindrical type Items, which could include such applications, as: Vending Money Rolls, etc. Sliding Item Unloading assembly could consist of: Stationary Tunnel assembly (497), Sliding Tunnel assembly (486), and Sliding Tunnel Drive assembly (487), which are shown in details on FIG. 96. Figure elements are labeled as follows:

476—Side panel (front or rear) of Module Inner Enclosure, which could have opening for unloading Items from Carriers of Conveyor within Inner Enclosure toward respective opening of Module Outer Enclosure by Automatic Sliding Item Unloading assembly

475—Side panel (front or rear) of Module Outer Enclosure, which could have opening for unloading Items from Sliding Item Unloading assembly into Item Pick-up Bin (479).

477—Access door (478) drive mechanism, which could be Rack-and-Pinion drive assembly

478—Access door, which could slide up/down along "Z-axis" and could prevent unauthorized entry to inside of Module from outside Module through unloading opening of Outer Enclosure

479—Item Pick-up Bin

480—Carrier #1, which could have been unloaded by Automatic Sliding Item Unloading assembly

481—Carrier #2, which could have been unloaded by Automatic Sliding Item Unloading assembly

482—Carrier #3 with Item (484) at location designated for Item unloading by Automatic Sliding Item Unloading assembly

483—Item inside Carrier (483) to be unloaded by Automatic Sliding Item Unloading assembly

484—Carrier (482) in process of being unloaded of Item (483) inside of it. Carrier, as shown, could be tilted upward around center line of Carrier Support Shaft along "Y-axis" by "Push-out" Rollers (485) of Sliding Tunnel (486). Module Controller could advance Sliding Tunnel a required distance at which "Push-out" Rollers (485) could engage with Carrier (482) and tilt it toward Carrier Stop Bracket assembly (495). During this motion, Carrier (482) could be tilted far enough to allow Item (483) inside of it to exit Carrier (482) under Item's own weight, and enter Sliding Tunnel (486)

487—Sliding Tunnel Drive assembly, which could be mounted on top of Stationary Tunnel assembly (497). Sliding Tunnel Drive assembly could include all necessary components, such as: motor, drive mechanics, Sensors (position, Safety, etc.), which could be used by Controller to ensure safe, accurate and reliable operation.

488—Reject Door, which could swing around "Y-axis" down in direction (489), and to divert rejected Item on top of it, into reject pick-bin below (not shown). Item could be rejected if it's barcode information obtained by Controller via Barcode Scan device (18) is incorrect or unreadable. Drive mechanism for Reject Door (not shown for simplicity), could be a solenoid, which under direction from Controller, when extended—could keep the Reject Door in it's upper position, allowing accepted Items to roll by. As needed, the Controller could retract the solenoid, allowing the Reject Door under combined weight of the door and rejected Item on top of it, to swing open in direction (489).

490—Item Stop Bracket, which could stop Item from advancing toward Pick-up Bin (479)

491—Stop Bracket (490) Solenoid, which could, when activated by Controller, overcome resistance of "return" spring, raise Stop Bracket (490) and stop Item from advancing toward Item Pick-up Bin (479). When solenoid is de-activated, Stop Bracket (490) could under force from compressed spring return to it's down position, and allow unloaded Item(s) to pass though into Pick-up Bin (479).

486—Sliding Tunnel assembly, which is under command from Controller, could slide in-out of Stationary Tunnel assembly (497) in direction (499). Sliding Tunnel inner tracks could be designed to match outline of Item, and guide Item safely toward Stationary Tunnel assembly (497)

485—"Push-out" Rollers, which could be attached to Sliding Tunnel assembly (486).

When Sliding Tunnel (486) is advanced by Drive assembly (487) toward loaded Carrier (482), "Push-out" Rollers at some point could engage with side panels of Carrier (482), and force Carrier (482) to tilt upwards in direction (491), around center line of Carrier (482) Support Shaft (492) along "Y-axis".

493—Item (483), shown in a position at which it could roll out of tilted Carrier (484), and advance inside Sliding Tunnel (486) down into Stationary Tunnel assembly (497).

494—Brackets, which could be used to support Sliding Unloading assembly from the bottom base of Module (498)

495—Carrier Stop assembly, which could be used to gently stop tilted loaded Carrier (484), and assist in aligning it in regard to "Y-axis", which could improve registration accuracy between Sliding Tunnel (486), tilted Carrier (484) and Item (493) sliding out of it.

496—Barcode Scan device, which could be installed to verify Item information prior to unloading it into Pick-up Bin (479).

497—Stationary Tunnel assembly. Stationary Tunnel inner tracks could be designed to match outline of Item, and guide Item safely toward Pick-up Bin (479)

498—Bottom base panel of Module

499—Direction of Sliding Tunnel motion out of Stationary Tunnel (497)

Example of Operation.

After power up or completion of Item unloading, Module Controller could move Sliding Tunnel (486) to Home position, inside Stationary Tunnel (497). Sequence of process steps to unload Item (483) out of Carrier (482) could be as follows:

1) Controller could stop Carrier (482) with Item (483) requested for unload at designated location
2) Controller could move Sliding Tunnel (486) out of Stationary Tunnel (497) a specified distance toward Carrier (482)
3) "Push-out" Rollers (485) could engage with Carrier (482) Side Panels and could force Carrier (482) to tilt around the Carrier Support Shaft (492) toward Carrier Stop assembly (495)
4) During step (3) Carrier (482) could be tilted far enough to allow or force Item (483) inside of it to exit Carrier (482) under Item's own weight, and enter Sliding Tunnel (486)
5) Controller via Sensors could detect Item traveling down the path through Sliding Tunnel (486), then Stationary Tunnel (497), and then stopped for final inspection by Solenoid (491)
6) Controller via Barcode Scan device (496) could verify Item's identity and, if accepted, could deactivate Solenoid (491) to allow Item under it's own weight to enter Pick-up Bin (479).

Throughout all process steps, Controller could keep Provider and higher level Computers connected to it, informed in real-time of all relevant events to ensure reliable and safe coordinated effort by respective ADVS components in executing requested or scheduled tasks.

Figure 96:
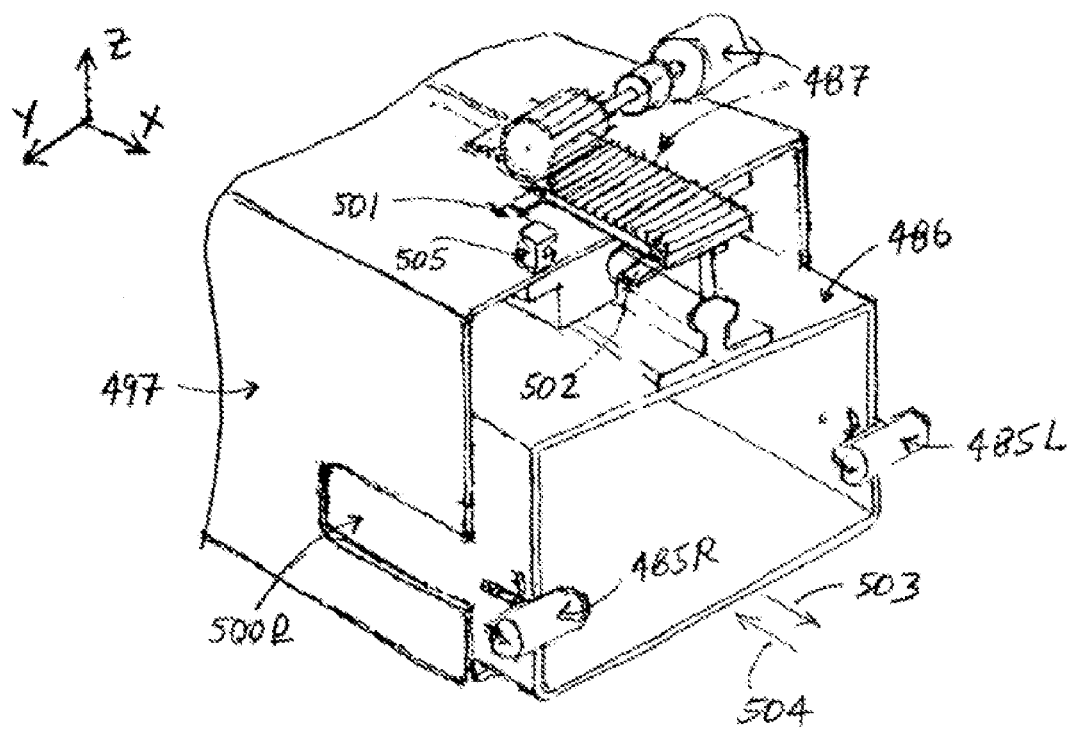

FIG. 96—Illustrates mechanical design details of Item Automatic "Slider" Unloading assembly. In addition to Sliding Tunnel (486) position optical Sensor (505), other Sensors and Flags could be added, such as: Home, Safety, etc. which could be used by Module Controller to ensure reliable and safe operation of "Slider" Unloading assembly. Figure elements are labeled as follows:

485L/R—left/right 'Push-out" Rollers
486—Sliding Tunnel assembly
487—Sliding Tunnel Drive assembly, which as shown, could be designed based on Rack-and-Pinion drive principals.
500R—Slot in Stationary Tunnel for "Push-out" Roller assembly, right side
501—Sliding Tunnel position Flag, which could be adjusted to indicate the required out-position of the Sliding Tunnel in relation to Stationary Tunnel, in direction (503)
502—Sliding Tunnel position Flag, which could be adjusted to indicate the required in-position of the Sliding Tunnel in relation to Stationary Tunnel, in direction (504)
505—Sensor, which could be used for detecting position Flags (501) and (502) Remaining elements are labeled same as on FIG. 95

Figure 97:
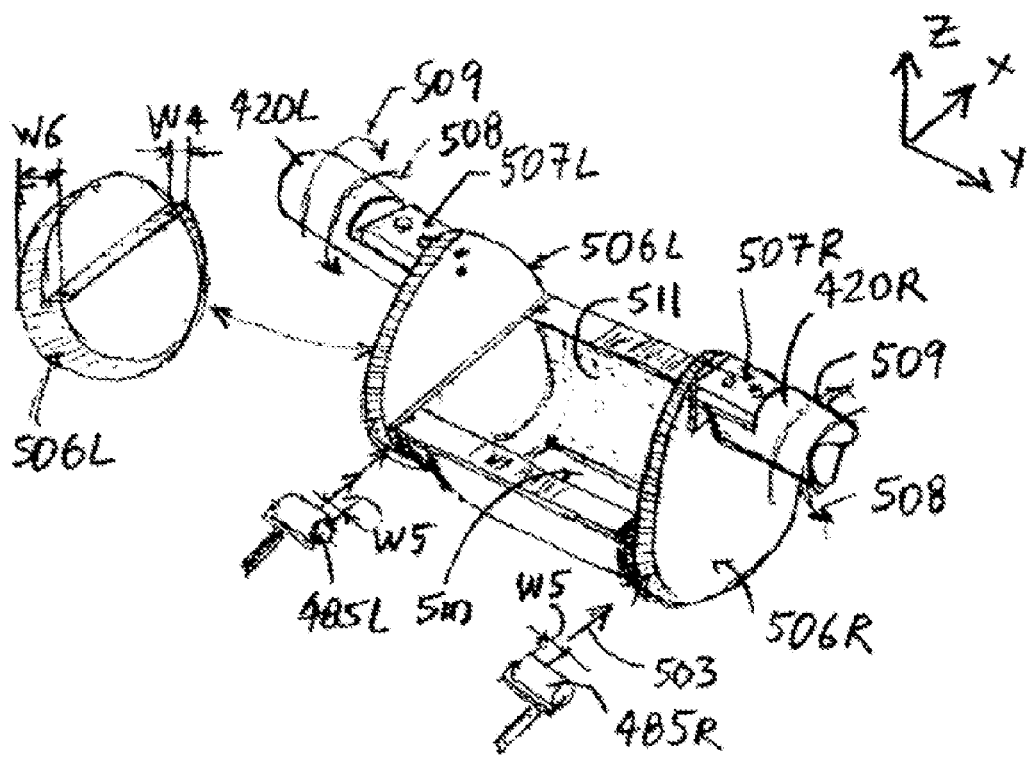
Figure 98:
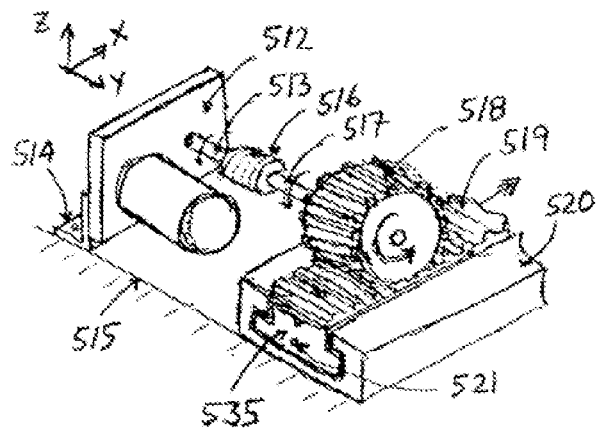

FIG. 97—mechanical design details of Carrier, which could be unloaded by Item Automatic "Slider" Unloading method. The Carrier, as shown, could consist of: Carrier Pocket (511) and Carrier left/right Side Panels (506L/R). Carrier Side Panels (506) could be designed to reliably engage with Push-out Rollers (485) of Item Automatic "Slider" Unloading assembly. Figure elements are labeled as follows:

506L/R—Carrier side panel, left/right
507L/R—Bracket for mounting Carrier to Carrier Support Shaft (420)
508—Direction CCW of Carrier rotation/tilt around it's Support Shaft (420), which could be caused by Push-out Rollers extending together with the Slide Tunnel (not shown) in the direction (503)
509—Direction of Carrier return rotation CW around it's Support Shaft (420), which could be caused by it's own weight, when Push-out Rollers (485) together with Sliding Tunnel retract back in the direction opposite to (503)
510—slot inside Carrier Pocket, which could be used to push Item residing inside, out of the Pocket by a mechanical actuator (plunger, etc.) from the opposite side.
511—Carrier Pocket, shown empty
W4—width of section of Carrier Side Panel (506), which could serve as a mounting-holding platform for Carrier Pocket (511)
W5—Width of section of Push-out Roller, which could engage with respective section of Carrier Side Panel
W6—Width of section of Carrier Side Panel, which could engage with respective section of Push-out Roller FIG. 98—illustrates mechanical design details of a drive assembly, which is based on Rack-and-Pinion principals. This type of drive could be used for variety of applications within ADVS components such as: Automatic Item Loading/Unloading assembly, Automatic Item Feeding assembly, etc. Figure elements are labeled as follows:

512—Motor drive assembly, which could be based on DC Gear Motor
513—Motor drive shaft, which could be rotated CCW by (512) around "Y-axis", as shown
514—Drive motor assembly mounting bracket
515—Base or platform, which could be used for mounting Drive motor assembly and other components
516—Flexible coupling, which could be used as mechanical interface between Motor drive shaft (513) and Pinion drive shaft (517)
517—Pinion drive shaft, which could follow rotation of (513), as shown
518—Pinion assembly, as part of Rack-and-Pinion drive
519—Upper section of sliding Rack, which could be attached to Lower section (535) via mounting screws
520—Sliding Rack Support Channel
521—one of tapped holes, which could be used for attaching other brackets or assemblies, as needed
535—Lower section of sliding Rack, which could slide in-out of Support Channel (520) along "Y-axis". The contact surfaces of (535) and (520), could be designed to minimize friction and ensure reliable operation.

Figure 99:
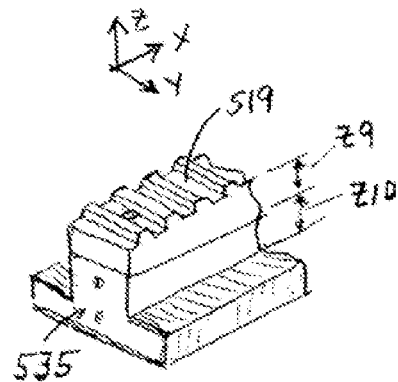

FIG. 99—illustrates details of Sliding Rack assembly Upper section (519) and Lower section (535), shown on FIG. 10. Figure elements are labeled as follows:

Z9—Height of (519), which could be selected to provide required support and strength
Z10—Height of (520), which could be selected to provide required support, strength and extension above Sliding Rack Support Channel (520), shown on FIG. 98

Figure 100:
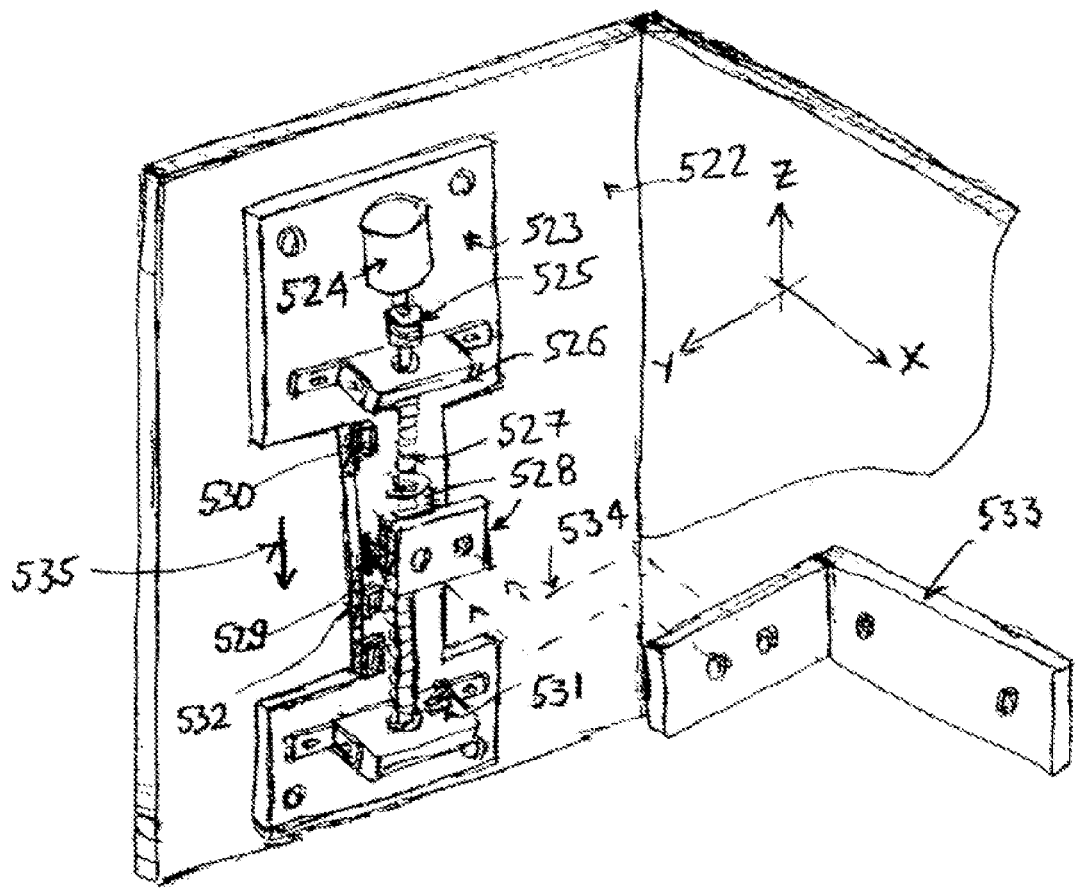

FIG. 100—illustrates mechanical design, which could be used as a vertical "Z-drive" assembly. Additional Flags and Sensors (not all shown) could be added to ensure safe, accurate and reliable operation. This type of drive could be used for variety of applications within ADVS components such as: Automatic Item Loading/Unloading assembly, Automatic Access Gate assembly, etc.

Figure elements are labeled as follows:

522—section of a side panel, which could be part of either Outer or Inner Enclosure
523—vertical or "Z-drive" assembly
524—"Z-drive" motor assembly
525—flexible coupling, which could serve as mechanical interface between "Z-drive" motor shaft (not labeled) and Lead-screw-nut assembly shaft (527)
526—"Z-drive" shaft bushing support assembly
527—"Z-drive" Lead-screw-nut assembly shaft
528—"Z-drive" Lead-screw nut assembly
529—"Z-drive" Lead-screw position Flag #1
530—Sensor with slot, which could be used for detecting Flag #1 (529)
531—One of limit switches. This switch, when activated, could be used as safety switch, which could disconnect power to "Z-drive" motor
532—"Z-drive" Lead-screw position Flag #2
533—Bracket, which could be used for attaching "X-drive" assembly (not shown) to "Z-drive" assembly
534—Direction of installing Bracket (533) to the platform, which is a part of Lead-screw nut assembly (528)
536—Direction of motion of "Z-drive" Lead-screw nut assembly (528) down along "Z-axis", when "Z-drive" motor (524) turns shaft (527) CCW around "Z-axis". The direction will be opposite, when (524) turns (527) CW around "Z-axis".

Figure 101:
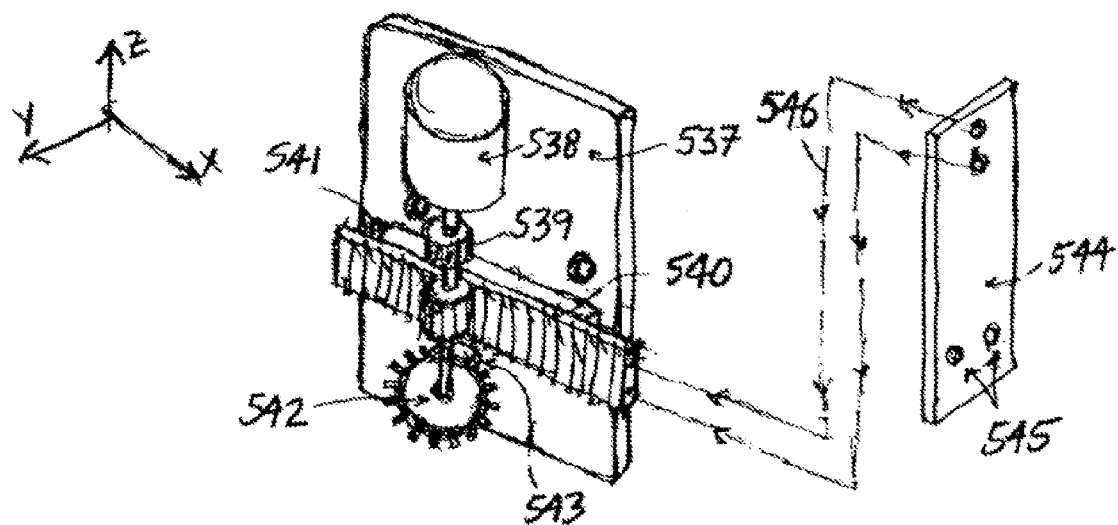

FIG. 101—illustrates mechanical design, which could be used for horizontal "X-drive" assembly. Throughout entire sequence, Controller via combination of Flags and Sensors (not all shown) could monitor position and status of each element of Horizontal Drive, and direct Actuator(s) accordingly, to ensure safe, accurate and reliable operation. Additional Flags could represent Horizontal Drive positions along "X-axis" such as: "ready for Item pick-up", "ready for Item inspection", etc. This type of drive could be used for variety of applications within ADVS components such as: Automatic Item Loading/Unloading assembly, Automatic Access Gate assembly, etc. Figure elements are labeled as follows:

537—"X-drive" mounting plate, which could be attached to respective bracket of "Z-drive" assembly
538—"X-drive" motor drive assembly

539—Flexible coupling, which could be used to connect motor shaft (not labeled) with Pinion drive shaft (not labeled) of Rack-and-Pinion drive assembly (540)

540—Rack-and-Pinion drive assembly

541—one of Safety limit switches, one on each side of sliding track (one shown). When either switch is activated, it could disconnect power to motor (538) and prevent sliding track from running out of set limits

542—Rotary Encoder wheel with Index Flags, which could be mounted to sliding track shaft.

543—Sensor, which could detect Index Flags of Encoder (542)

544—Bracket, which could be used for mounting Item Pick-up Gripper assembly (not shown)

545—Mounting holes, which could be used for attaching Item Pick-up Gripper assembly

546—Direction of installing Bracket (544) to the sliding Rack section of (540), which is a part of the Rack-and-Pinion drive assembly (540)

Figure 102:
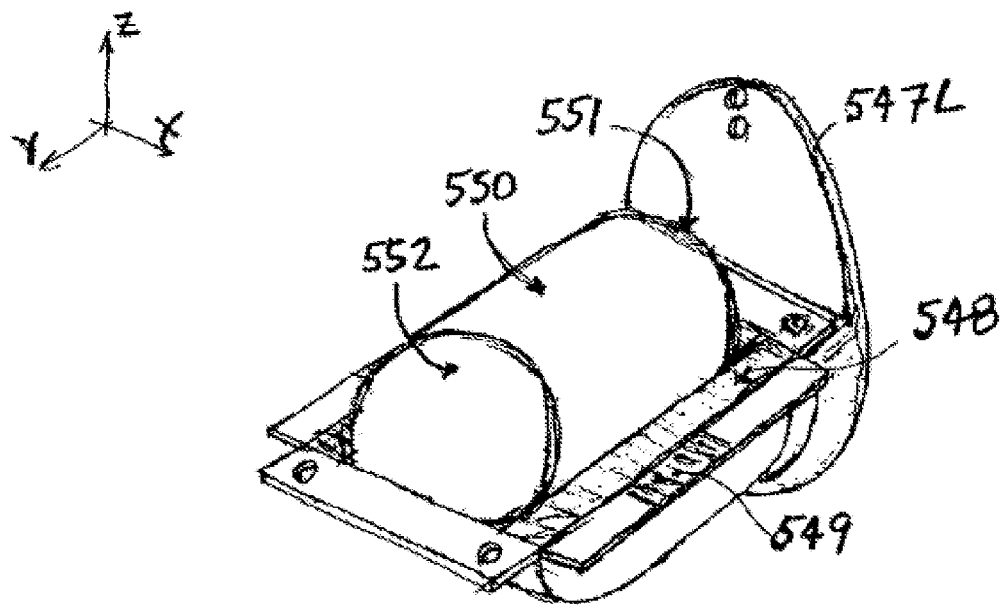

FIG. 102—illustrates mechanical design of Carrier, which could be used for Item loading/unloading by Automatic Gripper assembly. Not all components are shown, for simplicity. Figure elements are labeled as follows:

547L—left side panel of Carrier

548—Carrier Insert, which could be designed to match Item's shape, and used, as necessary, to secure and safely retain Item inside Carrier

549—Carrier barcode label

550—Item

551—left side of Item from which Automatic Gripper could pick-it-up and remove from the Carrier

Figure 103:
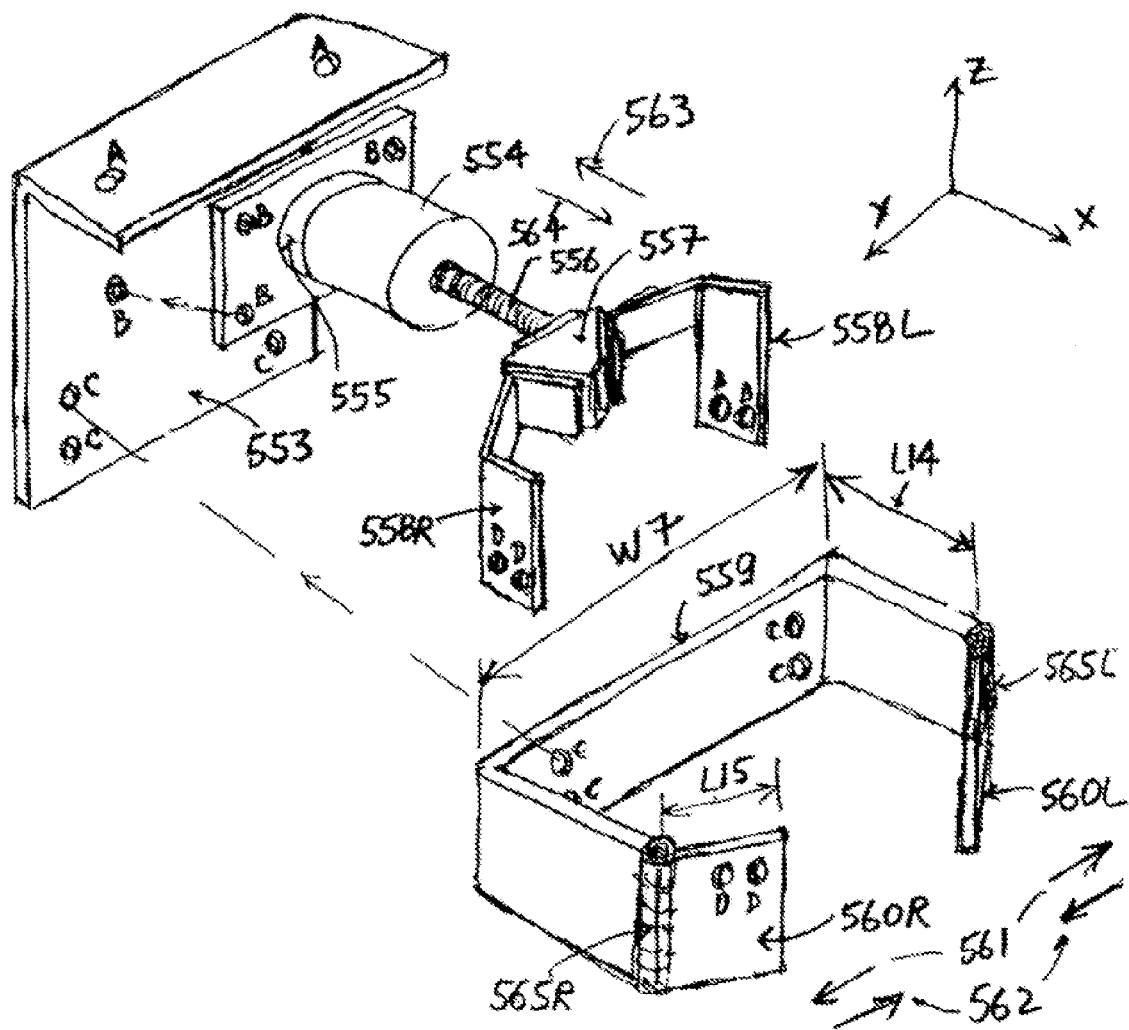

552—right side of Item from which Automatic Gripper could pick-it-up and remove from the Carrier FIG. 103—illustrates one of possible "Gripper" designs details, which could be used for Item Automatic Loading and Unloading assemblies. Orientation of Gripper could be changed to pick-up Item from sides along "Y-axis", or any angle, as required for specific application.

Figure elements are labeled as follows:

553—Gripper assembly support bracket, which could be attached to "X-drive" assembly bracket (544), shown on FIG. 101, via mounting holes labeled "A"

554—Linear drive motor assembly, which could be attached to Gripper assembly support bracket via mounting holes labeled "B". Linear drive motor under commands from Controller could move Gripper Action Block (557) in direction (563) or (564), along "X-axis' as shown, at designated speeds to ensure safe, accurate and reliable Item pick-up and relocation, as needed for a given application.

555—Encoder, which could be "stacked" (as shown) in the back of Linear drive (554), and could be used by Controller to monitor position of Action Block (557)

556—Linear drive motor shaft, which could move along "X-axis" in direction (564) to force to open or in direction (563) to allow to close—Gripper Side Panels (558)

557—Gripper Action Block, which could be attached to (556), and could engage with Gripper Side Panels (558). The contact surfaces of both Action Block (567) and Side Panels (558) could be made out of material to minimize friction and ensure reliable operation.

558L/R—left/right Gripper Side Panels, which could be attached to respective left/right Gripper Arms (560) via mounting holes labeled "D"

559—Support bracket for left/right Gripper Arms (560), which could be attached to (553) via mounting holes labeled "C"

560L/R—left/right Gripper Pick-up Arms. The Gripper Arms, when Action Block (557) moves in direction (563), under pressure from respective Spring Hinges (565) could move toward each other in direction (562)—"closing" gap in-between them. Arms could move in opposite direction (561)—"opening" gap in-between them, when Action Block (557) moves in direction (564), overcoming resistance of Spring Hinges (565). Design could be modified to reverse actions, if necessary. The surface of Gripper Arms, which could get in touch with an Item, could be designed out of special material or with added padding material to minimize impact on Item being picked and held by Arms (560), while providing reliable operation

565L/R—Spring Hinges for irrespective Gripper Arms (560), which could force them to move toward each other in direction (562)

Figure 104:
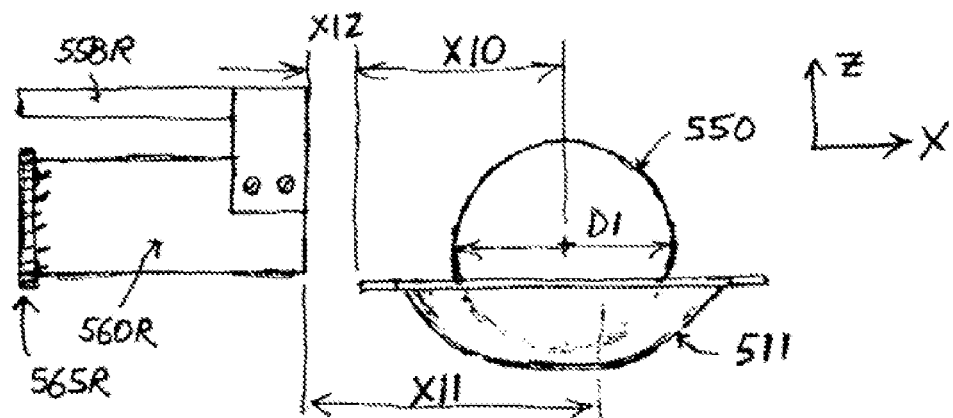

W7—Width of Support bracket for left/right Gripper Arms (559), which could be designed to reliably pick-up specified Item out of specified Carrier L4—Length of Support bracket for left/right Gripper Arms (559), which could be designed to reliably pick-up specified Item out of specified Carrier FIG. 104—illustrates side view of Gripper arms (560) section of Item Automatic "Gripper" Loading/Unloading assembly in relationship to Item (550) inside Carrier pocket (511), which could be picked-up by Gripper arms and removed from Carrier. Figure elements are labeled as follows:

511—Item holding pocket of a Carrier, which could move vertically along "Z-axis" by Conveyor (not shown). Carrier, as shown, is stopped at the location, which could be designated for unloading-vending Items, by Automatic "Gripper" Loading/Unloading assembly

550—Item, which could be unloaded by Gripper assembly

D1—Diameter of Item or Container

X10—Distance from center of Carrier pocket to end of Carrier, along "X-axis"

X11—Distance, which could be required for Gripper arms (560) to extend toward Item (550) in order to safely remove the Item from Carrier X12—Clearance between Gripper arms and Carriers during Conveyor motion, which should be selected to ensure reliable and safe operation.

The remaining elements are labeled same as on FIG. 103.

Figure 105:
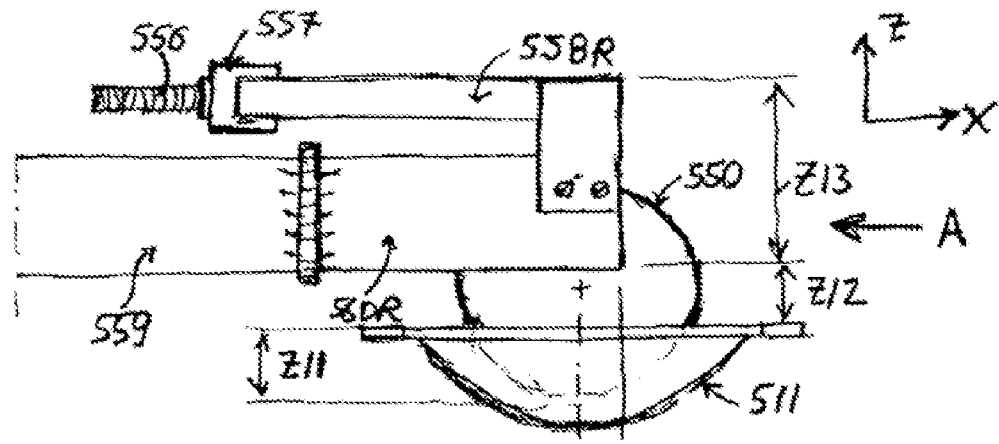

FIG. 105—illustrates side view of Gripper arms (560) section of Item Automatic "Gripper" Loading/Unloading assembly, which are extended toward Item (550), as part of the unloading process of Item (550) out of Carrier pocket (511). Figure elements are labeled as follows:

Z11—Height of portion of Item (550), which is residing inside Carrier pocket (511). This height could be selected to ensure reliable and safe transportation of Items inside respective Carriers Z12—Clearance between extended Gripper arms (560) and Carrier pocket (511), which should be properly selected to ensure reliable and safe operation.

Z13—Height of Gripper arms assembly. This dimension should be selected based on the requirement:

Z13<(Conveyor Index—(Z12+Z11))

The remaining elements are labeled same as on FIG. 103.

Figure 106:
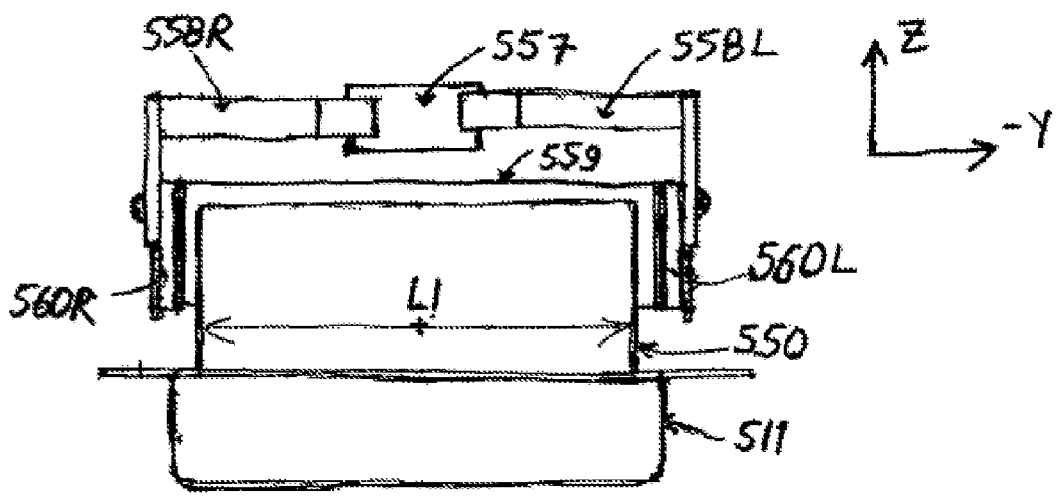

FIG. 106—illustrates view "A", as labeled on FIG. 105, of Gripper arms (560) section of Item Automatic "Gripper" Loading/Unloading assembly, which are extended toward Item (550), as part of the unloading process of Item (550) out of Carrier pocket (511). Gripper arms (560), as shown, are in their open position, with sufficient clearance in relationship to Item (550) along "Y-axis". The design of Gripper assembly, intended for Item pick-up along "Y-axis" (as shown), or "X-axis"—should be based on application-specific dimensions, tolerances, etc. for: Items, Carriers, respective Conveyor components, etc. to ensure safe and reliable operation. Figure elements are labeled as follows:

L1—the length of Item (550)

The remaining elements are labeled same as on FIG. 103.

Figure 107:
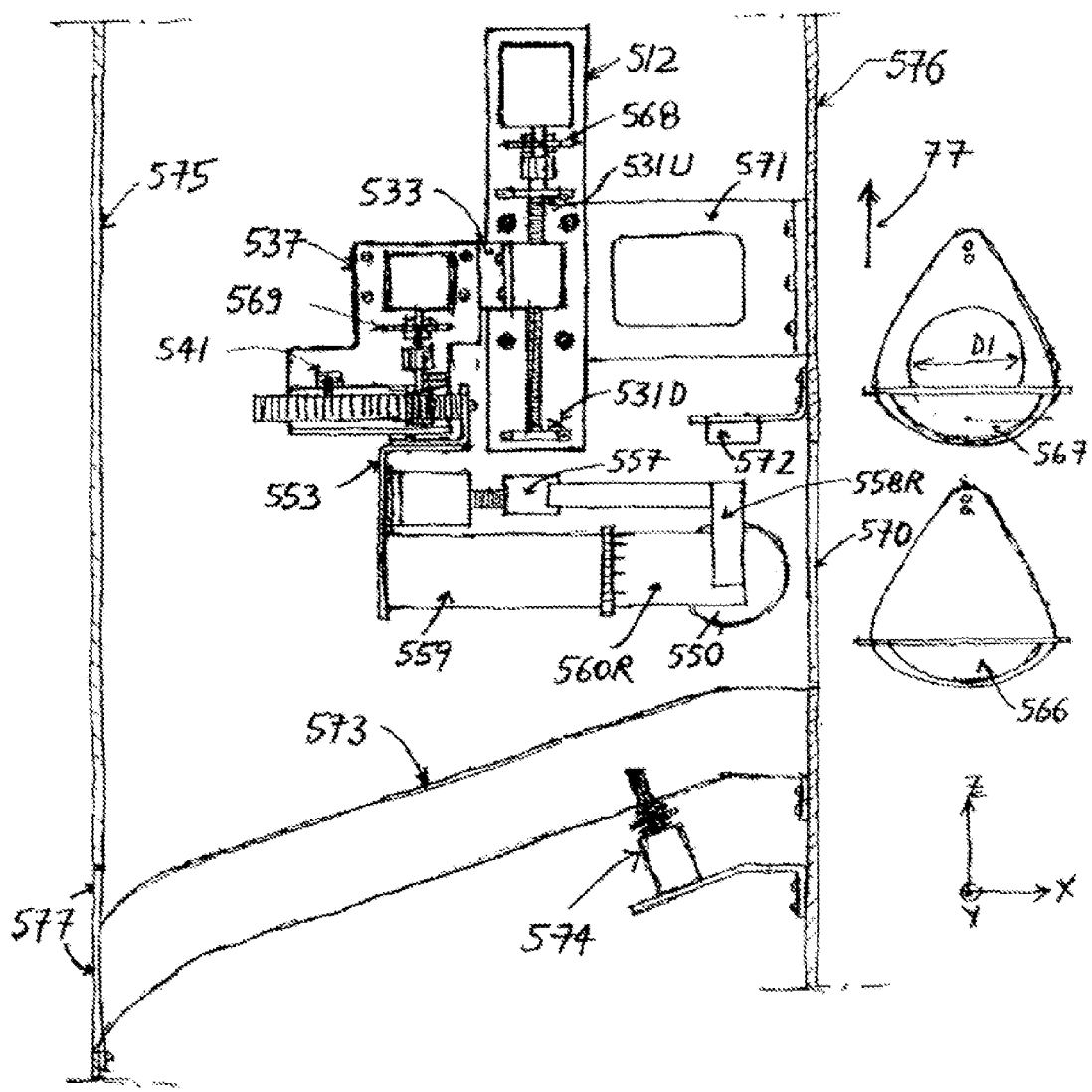

FIG. 107—illustrates side view of section of Module, designated for Items unloading and vending out by Item Automatic "Gripper" Loading/Unloading assembly. As shown, this section could be used to serve Customer side, as Conveyor direction is up, as indicated by (77). Similar arrangement to serve Provider side, could be implemented on the opposite side of Module, where Conveyor direction would be down, opposite to (77), Gripper arms (560), as shown, are holding Item (550), which was removed from Carrier (566). Vertical section of Conveyor is represented by Carrier (566), which was unloaded at this designated location, and Carrier (567) with an Item, which was not required to be unloaded. Once unloading of requested Item (550) out of Carrier (566) is complete (as shown), and final inspection of the Item (550) was successful, Controller could re-start moving Conveyor in the direction (77).

Figure elements are labeled as follows:

576—side panel of Module Inner Enclosure, Customer side

570—opening in the side panel (576), which could be used for unloading of Items by Automatic "Gripper" Loading/Unloading assembly

512—"Z-drive" assembly

568—"Z-drive" Encoder

537—"X-drive" assembly

569—"X-drive" Encoder

531U/D—upper/down Safety limit switches for "Z-drive"

533—Bracket, which could be used for attaching "X-drive" assembly to "Z-drive" assembly

541—one of Safety limit switches for "X-drive"

553—Gripper assembly support bracket, which could be attached to "X-drive" assembly

557—Gripper Action Block

558R—right Gripper Side Panel, which together with the respective left Gripper Side Panel, is closed, forcing Gripper Pick-up Arms (560) to securely embrace and hold the Item (550)

559—Support bracket for left/right Gripper Arms (560)

560R—right Gripper Pick-up Arm, which is together with the respective left Gripper Pick-up Arm, embrace and hold the Item (550).

550—Item, which was unloaded from Carrier (566), and is held by Gripper Pick-up Arms (560)

571—Bracket, which could be used for attaching Automatic Gripper Unloading assembly to side panel of Inner Enclosure

566—Carrier, located at designated Item unloading location, at which Item (550) was removed from it by Automatic "Gripper" Loading/Unloading assembly

567—Carrier with Item not requested for unloading

575—side panel of Module Outer Enclosure, Customer side

577—opening in the side panel (575), which could be used for unloading of Items into Pick-up Bin (not shown, for simplicity)

572—Barcode Scan device, which could be used by Controller to perform final inspection of Item (550) barcode information, prior to vending it out. If information is correct, Item could be vended out, otherwise Controller could direct the Gripper assembly to place the Item (550) back into Carrier (566), and inform the Provider, as needed. The rejected Item (550) could be then vended out to Provider on the opposite side of Module.

573—Item Unloading Track assembly, which could be designed to guide unloaded Item down through Outer Enclosure opening (577) toward the Pick-up Bin (not shown)

574—Item Stop Bracket Solenoid assembly, which could, when activated by Controller, overcome resistance of "return" spring, raise Stop Bracket (as shown) and stop Item from advancing down the Unloading Track (573) toward Item Pick-up Bin. When solenoid is de-activated, Stop Bracket could under force from compressed spring return to it's down position, and allow unloaded Item(s) to pass though into Pick-up Bin. This could be required when Outer Enclosure opening (577) has Automatic Access Door (not shown), operated by Controller, for additional security.

Example of Operation.

After power up or completion of Item unloading Controller could move "Gripper" "X-drive" and "Z-drive" assemblies to respective Home positions. Throughout entire sequence, Controller via combination of Flags and Sensors (not all shown) could monitor position and status of each element involved, and direct each Actuator accordingly, to ensure safe, accurate and reliable operation. Sequence of process steps to unload Item (550) out of Carrier (566) using "Gripper" could be as follows:

1) Controller stops Conveyor Carrier (566) with Item (550) requested for unload at designated location
2) Controller moves "Z-drive" down along "Z-axis" to respective unloading position, which could properly align Gripper vertically along "Z-axis" in reference to Item (550), which resides at that time inside Carrier (566). This position could be confirmed by respective Sensor—"ready for Item pick-up".
3) Controller moves "X-drive" forward along "X-axis", extending the Gripper arms through opening (570). This move properly aligns Gripper arms horizontally along "X-axis" in reference to Item (550), which resides at that time inside Carrier (566). Gripper is in position above Item (550), reference—FIG. 105.
4) Controller activates Gripper, which could force Gripper arms to embrace Item (550) from sides facing "Y-axis" with sufficient force from respective Hinge Springs—reference (565) FIG. 104.
5) Controller moves "Z-drive" up along "Z-axis" to respective unloading position, which could clear Gripper and Item (550), over Carrier (566). This position could be confirmed by respective Sensor—"Item cleared over Carrier".
6) Controller moves "X-drive" back along "X-axis", retracting Gripper with Item (550) through opening (570), and aligns unloaded Item (550) under Barcode Scan device (572) for inspection, as shown.
7) Controller verifies barcode information of Item (550). If information is correct (as expected in this example), matching request made by Customer or Provider, then Controller moves "Z-drive" down along "Z-axis" to respective unloading position, which could align Item (550) just above loading platform of Item Unloading Track (573). This position could be confirmed by respective Sensor—"Item ready for unload". If information is incorrect (after several attempts) because either information is "not readable", or does not match request made by Customer or Provider, Controller could request direct assistance from Provider, or return Item (550) back into Carrier (566), and inform Provider and respective upper level Computer(s) of this event. In event of Controller's request for Provider assistance, Provider upon prompt review of relevant status, could instruct Controller to either:

a) Return Item to Carrier and unload at Provider side for further inspection, or
b) Unload Item to Customer side as is, or
c) Halt operations for maintenance type tests, which could be conducted by Provider from either Customer side user-interface, or Provider side control interface.

NOTE: Throughout ADVS, Items stored or handled within various Modules and/or support assemblies, could be inspected and tested, as required by specific application. As with all operation activities, these type of situations could be properly handled by respective ADVS Controller(s) and Computers, based on Control Algorithm implemented at various layers of ADVS operating systems.

8) Controller commands Gripper to release Item (550) onto loading platform of Track (573). Item (550) under it's own weight slides down Track (573), and is stopped and held by Stop Bracket (574).

NOTE: Automatic "Gripper" Unloading method could ensure sufficient safety and security of Items stored within Module for most ADVS applications. As an extra add-on feature, Access Door assembly (not shown) could be installed to control access to inner area of Module through various openings, opening (577) in this example.

9) Controller could verify Item presence at Stop Bracket assembly (574) via respective Flag and Sensor (not shown), and when confirmed—could command Access Door to open.

10) Controller could detect Access Door in open position and command Solenoid of Stop Bracket assembly (574) to pull back Stop Bracket, and allow Item under it's own weight slide down through opening (577) into Pick-Up Bin (not shown)

Figure 108:
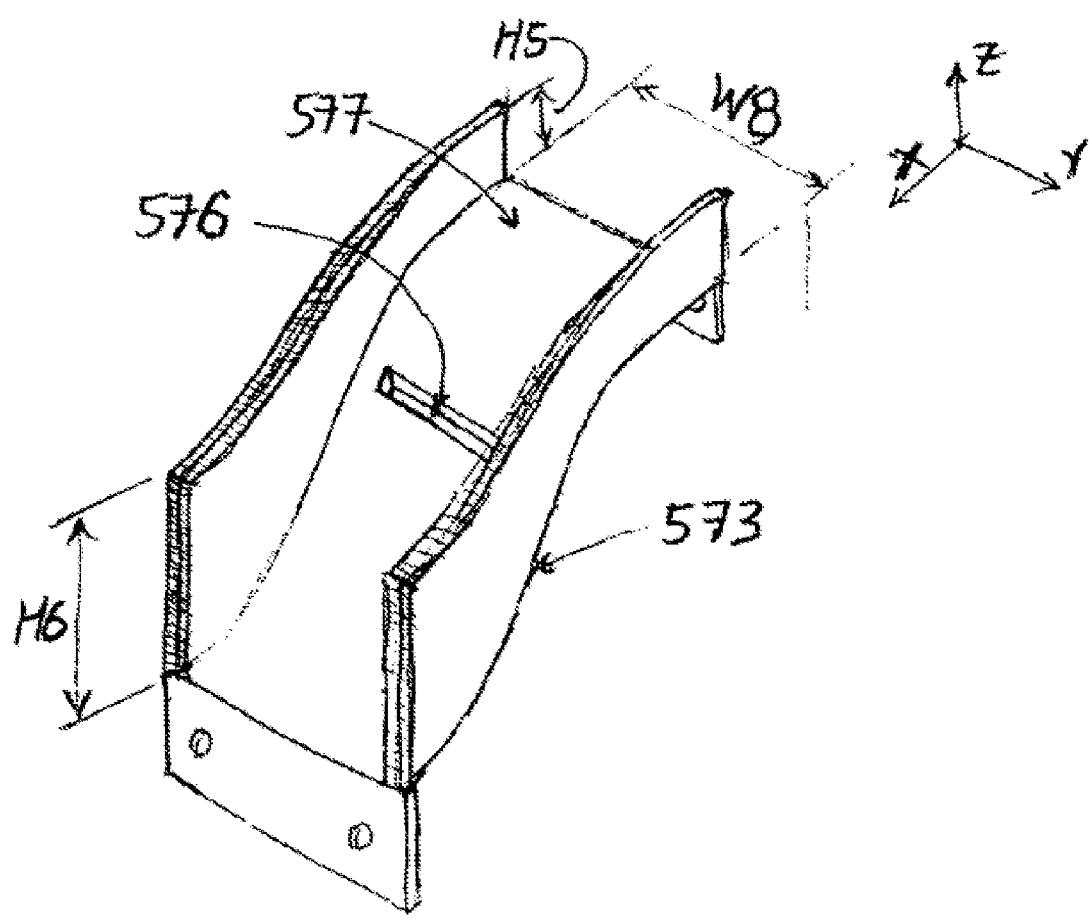

FIG. 108—illustrates one of possible designs of Item Unloading Sliding Track (573).

Figure elements are labeled as follows:

573—Item Unloading Sliding Track. The design of the Track, including shape, material for inner surfaces, etc. could be selected to minimize friction and ensure reliable and smooth transition of Items through the Sliding Track

576—Slot in (573), which could be used for Item Stop Bracket (not shown), part of Item Stop Bracket Solenoid assembly—reference FIG. 107, element (574). The Stop Bracket could move up, through the Slot (576) and prevent an Item from sliding down the Track (573).

577—Loading platform of the Track (573), where Item could be deposited by either Automatic Slider or Gripper Loading/Unloading assembly.

W8—Width of the Track, which could be designed to provide reliable transition of specified size Items through the Track

H5—Height of the Track at the Item loading platform, which could be designed to provide reliable mechanical interface with respective Item loading method selected

Figure 109:
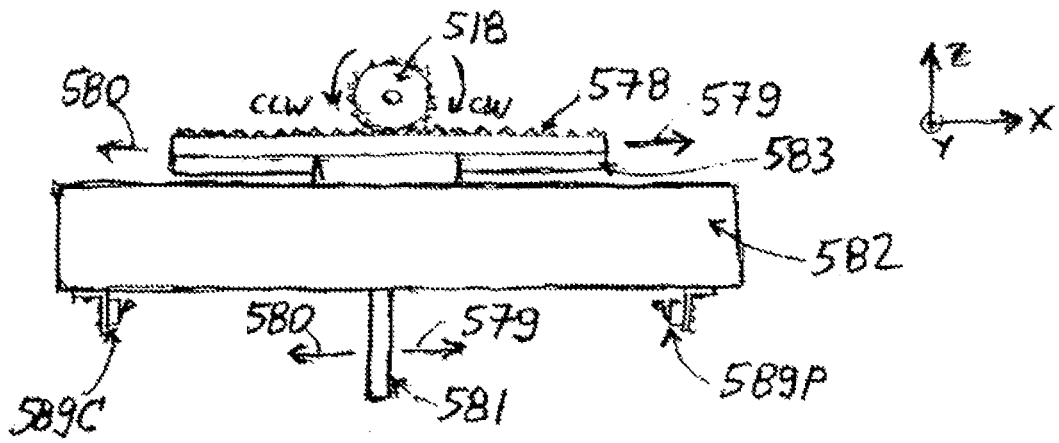

H6—Height of the Track at the Item exit platform, which could be designed to provide reliable mechanical interface with respective Item unloading method selected FIG. 109—illustrates one of possible Rack-and-Pinion based designs, in addition to the one shown on FIG. 101, which could be used for "X-drive" of Automatic Gripper Loading/Unloading assembly. For simplicity, not all components are shown. Figure elements are labeled as follows:

518—Pinion drive assembly, as part of Rack-and-Pinion drive
578—Sliding Rack assembly, as part of Rack-and-Pinion drive
579—Direction of (578) and (583) when (518) turns CCW
580—Direction of (578) and (583) when (518) turns CW
581—Bracket attached to (578), which could be used for mounting Gripper assembly
582—Guiding-support channel for Sliding Rack assembly (578). The contact surfaces of (578) and (582) could be designed out of material that could ensure smooth and reliable operation
583—Support bracket/channel for Sliding Rack (578)
589P/C—Limit switches on respective sides of (582), which could be used as safety switches to prevent Sliding Rack assembly (578) from moving too far out in either direction along "X-axis". This switches, when used for safety, could disconnect power to (518) drive motor, when activated.

Figure 110:
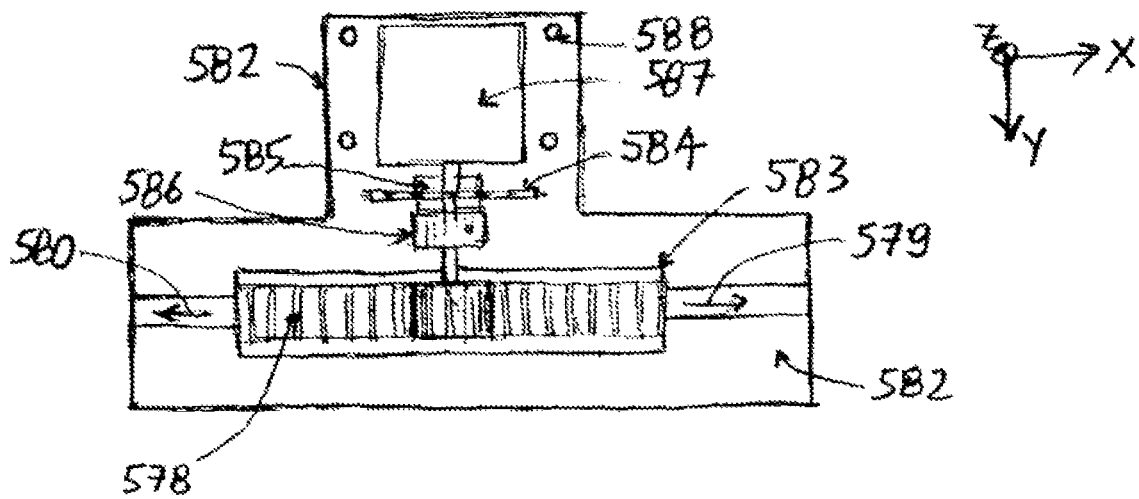

FIG. 110—illustrates top view of the Rack-and-Pinion based designs, shown on FIG. 109. Figure elements are labeled as follows:

584—Encoder with position Flags, which could be used together with (585) by Controller to monitor rotary position of the Pinion drive assembly (518)
585—Sensor for detecting Encoder (584) Flags
586—Flexible coupling
587—Motor for Pinion Drive assembly (518)
588—One of mounting holes, which could be used for attaching this drive assembly, as "X-drive" to "Z-drive" assembly of the Item Automatic Gripper Loading/Unloading assembly Remaining elements are labeled same as on FIG. 109.

Figure 111:
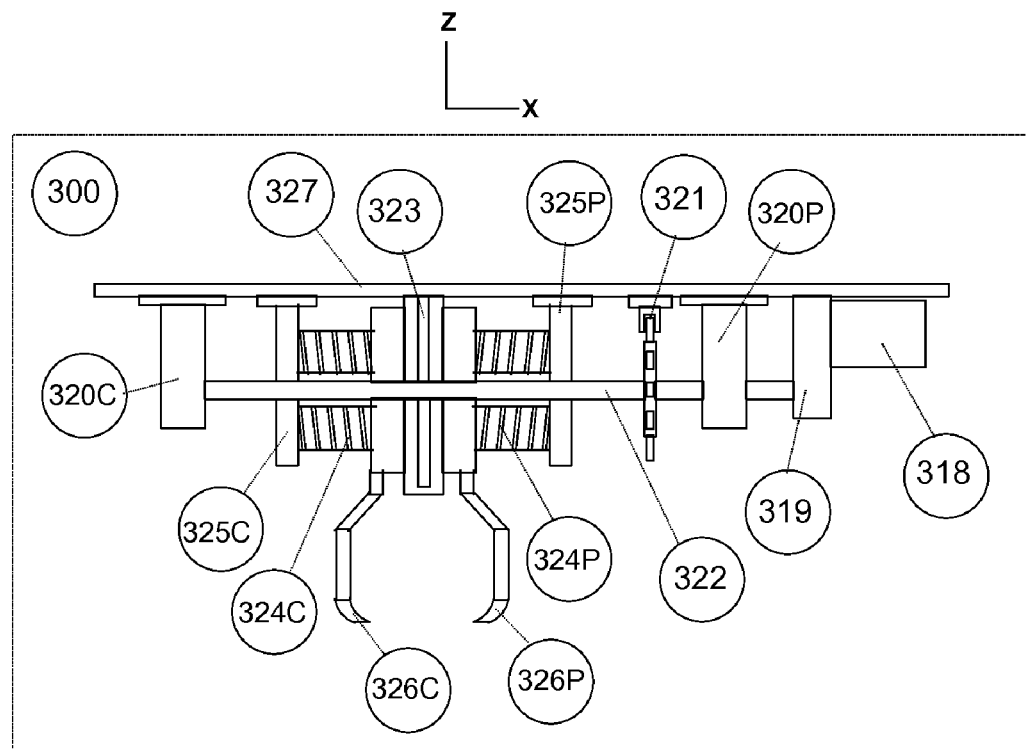

FIG. 111—illustrates side view of ADVS Automatic Gripper assembly, which could be used for loading/unloading Items, while holding them along "X-axis". The principal is based on Gripper cam-type wheel, which could have variable thickness. When turning, the Gripper cam-type wheel could work against pre-loaded springs. All components could be designed to minimize space required for Automatic Gripper assembly, including dimension along "Y-axis". Module Controller could turn Gripper cam-type wheel CW or CCW, as needed, to open or close Gripper arms. Figure elements are labeled as follows:

318—Gripper drive gear motor assembly
319—Gear box of Gripper drive gear motor assembly
320P/C—Support bearings (on each side) for main drive shaft of Gripper drive assembly
321—Sensor assembly for detecting main Gripper drive shaft rotary position. As shown, it could include rotary wheel with number of Flags, as needed, and Flag detector unit. Position wheel could be used to represent Gripper open/close position.
322—Gripper drive main shaft
323—Gripper open/close cam-type wheel, which when turned CW could overcome resistance of springs (324) and move Gripper arms to open. When Gripper cam-type wheel moves CCW it could allow springs (324) to move Gripper arms inward, or to close gap in-between them. The distance in-between Gripper arms could be controlled by Gripper cam-type wheel thickness along "X-axis". Gripper cam-type wheel could be designed to change its thickness as it turns, to ensure smooth transition of Gripper arms from open to close position, and wise versa. For each specific application, Gripper cam-type wheel could be designed to allow required Gripper arms control for reliable Item pick-up and then support during transitions from one location to another, as needed.
324P/C—Springs, one on each side of Gripper arm. Springs could be compressed in-between respective stationary plate (325) and Gripper arm assembly, forcing Gripper arms to move inward, or to close gap in-between them.
325P/C—Stationary plate holding respective spring in-place during spring compression or extension.

326P/C—Gripper arm assembly, one on each side. Section of Gripper arm assembly, which could get in-direct contact with Item, could be designed in respect to Item's shape, to ensure reliable Item pick-up and then support during transitions from one location to another, as needed. The inner surface of Gripper arm assembly, which could get in-direct contact with Item, could have additional layer of special material attached to it, such as: Teflon-like, rubber, etc. to reduce possibility of making impact on Item or it's packing Container during their handling by Gripper assembly.

327—Mounting plate for Gripper arm assembly and related components, which could be attached to ADVS Automatic Gripper Horizontal drive assembly.

Figure 112:
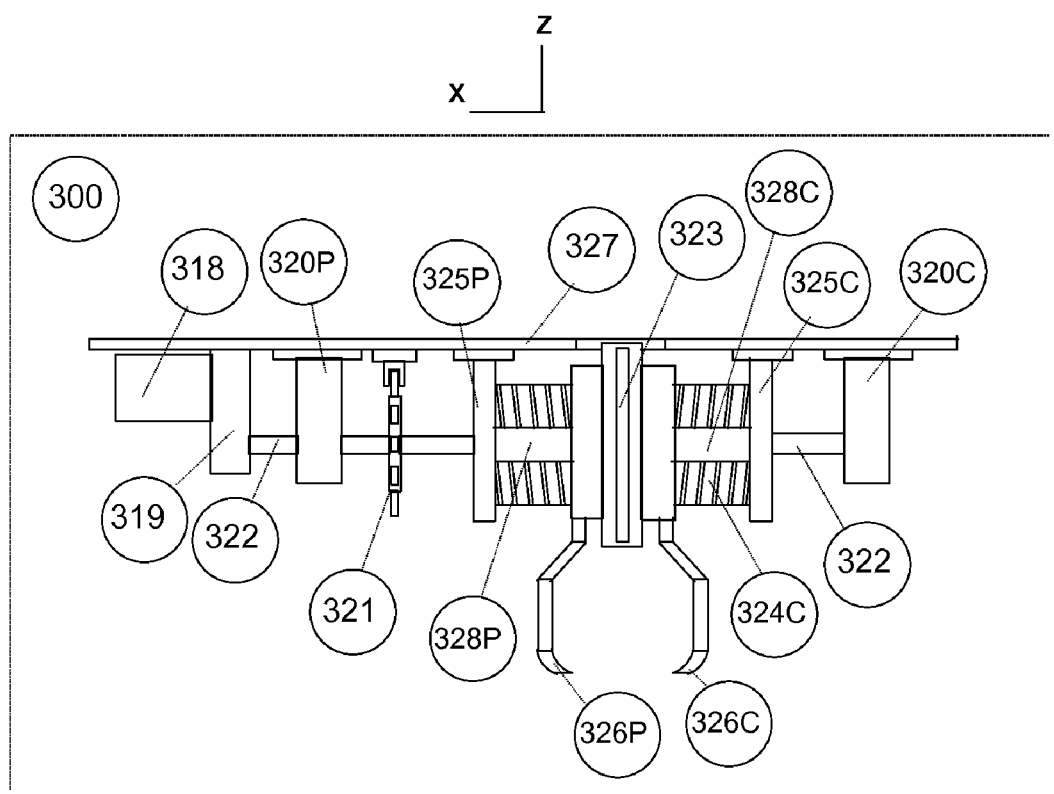

FIG. 112—illustrates side view of ADVS Automatic Gripper assembly from opposite side shown on FIG. 111. Figure elements are labeled as follows:

318-327—same as on FIG. 111

328P/C—Gripper drive secondary stationary shaft. Springs (324), when forced by Gripper cam-type wheel (323), could slide back and forth along this shaft in between stationary plate (325) and Gripper arms assembly (326).

Figure 113:
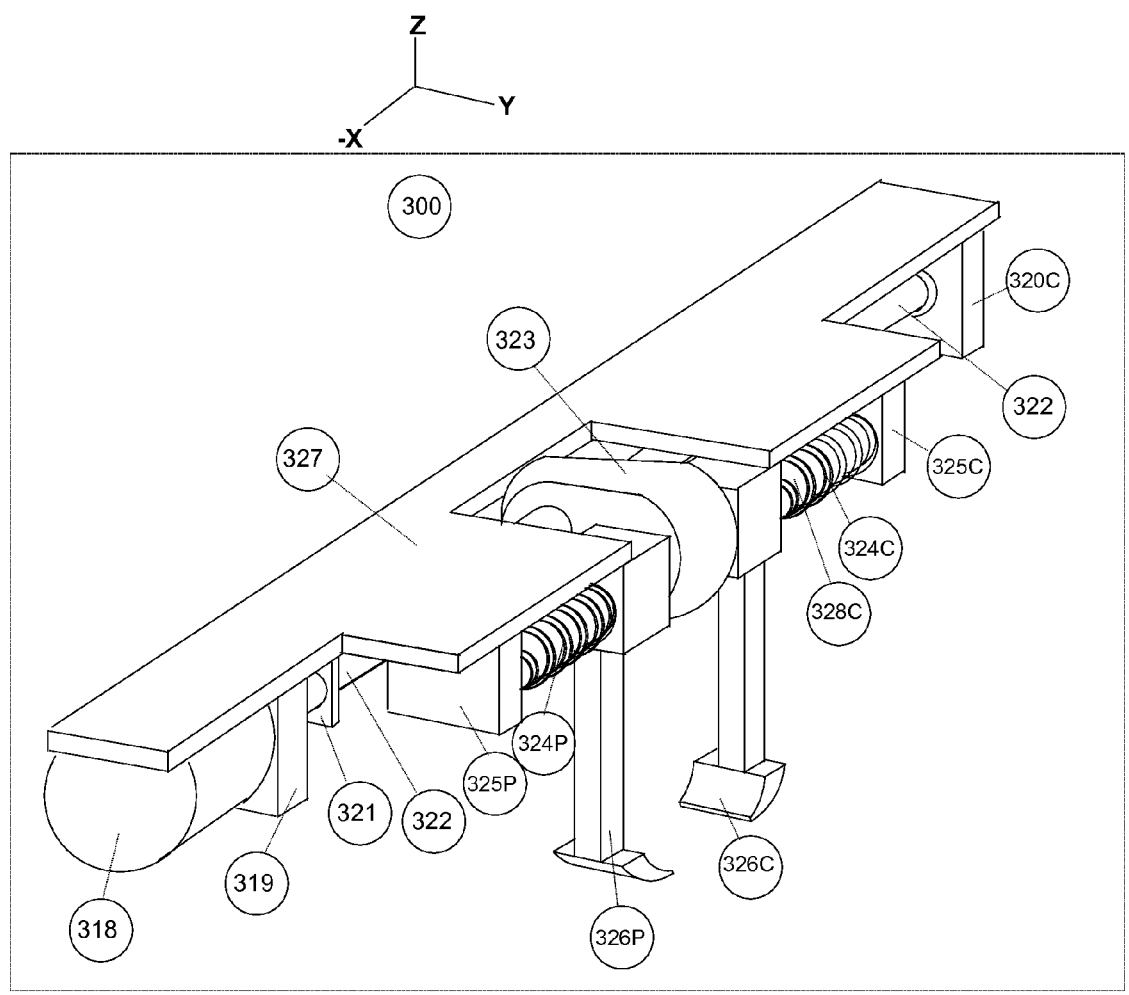

FIG. 113—illustrates 3-D view of ADVS Automatic Gripper assembly. For simplicity, not all components are shown. Figure elements are labeled same as on FIG. 112.

Figure 114:
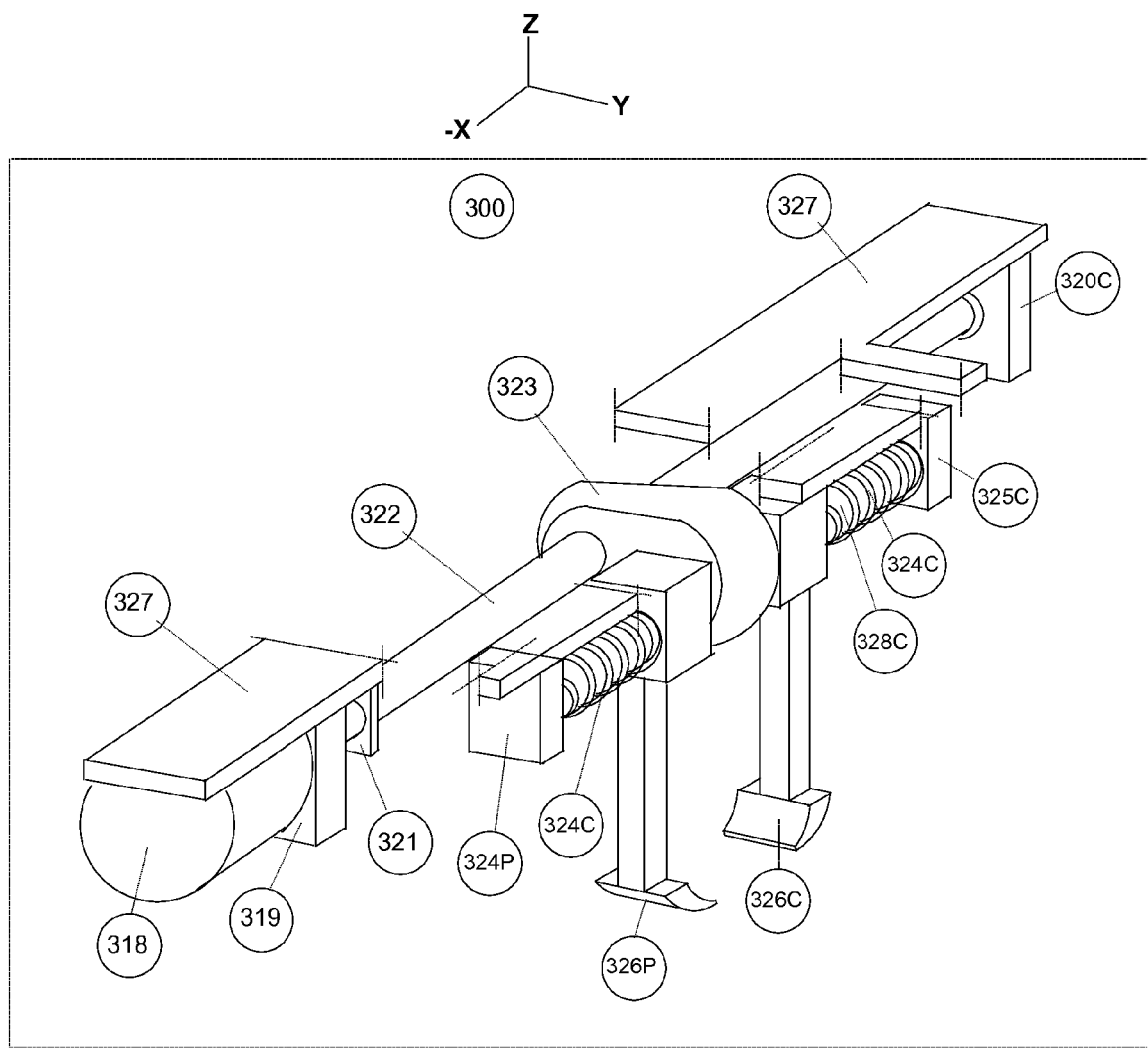

FIG. 114—illustrates 3-D view of ADVS Automatic Gripper assembly with mounting plate (327) partially removed to show other details. Figure elements are labeled same as on FIG. 112.

Figure 115:
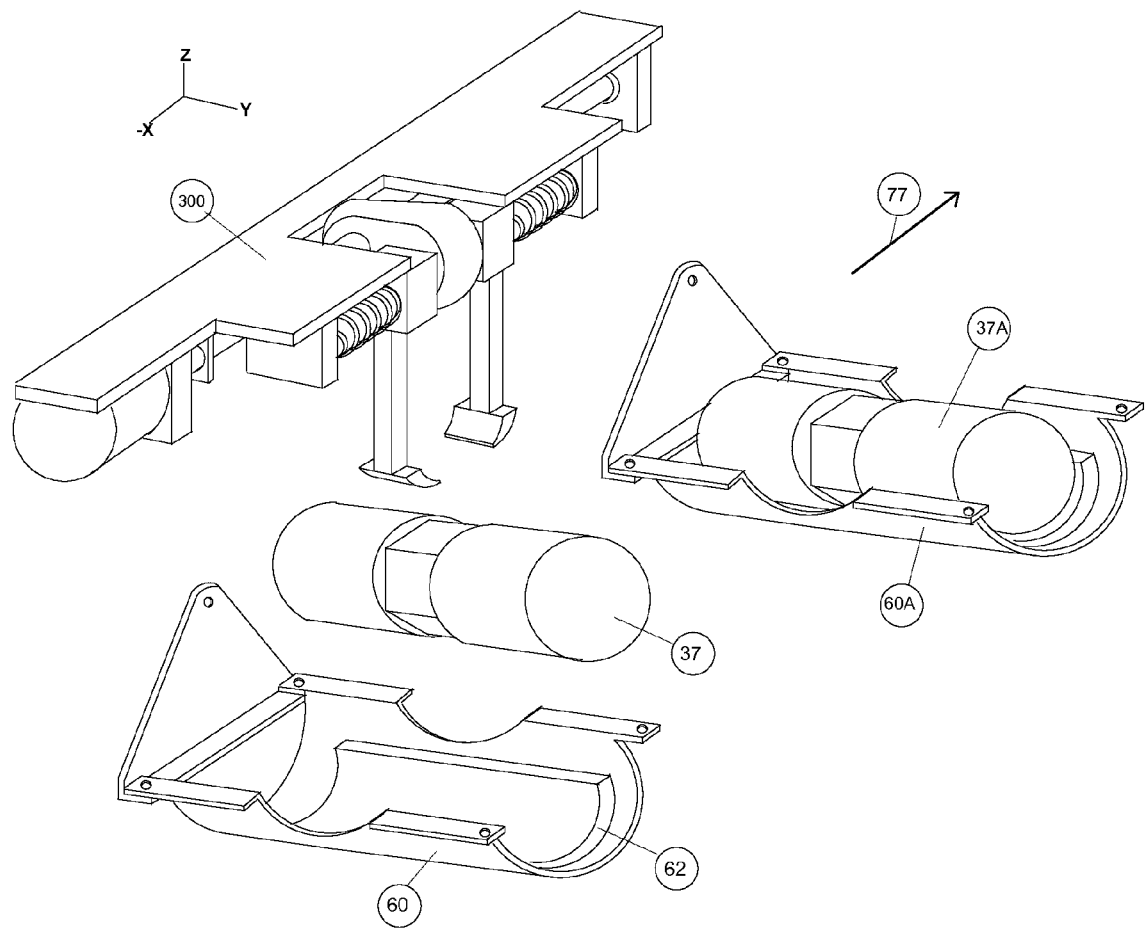

FIG. 115—illustrates 3-D view of loading of cylindrical type Items, or Container with Item(s) inside, into Conveyor stationary Carrier via ADVS Automatic Gripper assembly. Each Container could have the same outside dimensions, and could be loaded with different type of Items. For simplicity:
 a) Only major components are identified
 b) Not all components are shown
 c) Transition of Container with Item(s) is separated for illustration purposes only.

Figure elements are labeled as follows:

37—Container, which could house one or more Items inside.

37A—Container, which could house one or more Items inside, different from the ones in (37).

60—Empty Carrier of Conveyor with special insert component (62) to match outline of Item or Container with Item(s) (37)

60A—Carrier of Conveyor, same as (60), but loaded with Container (37) with Item(s) inside.

62—Carrier insert component, which could be used for holding and transporting of Item(s), or Container (37) with Items, loaded into Carrier. Insert component could be permanently attached to Carrier.

300—ADVS Automatic Gripper assembly, which could be used for pick-up, transportation, loading and unloading of Container (37), as needed. Gripper assembly could be attached to Horizontal Drive of ADVS Automatic Item Loading/Unloading assembly. As part of ADVS Automatic Item Loading/Unloading assembly, Gripper assembly, under directions of Module Controller, could be moved up/down along "Z-axis" and forward/backward along "X-axis".

Figure 116:
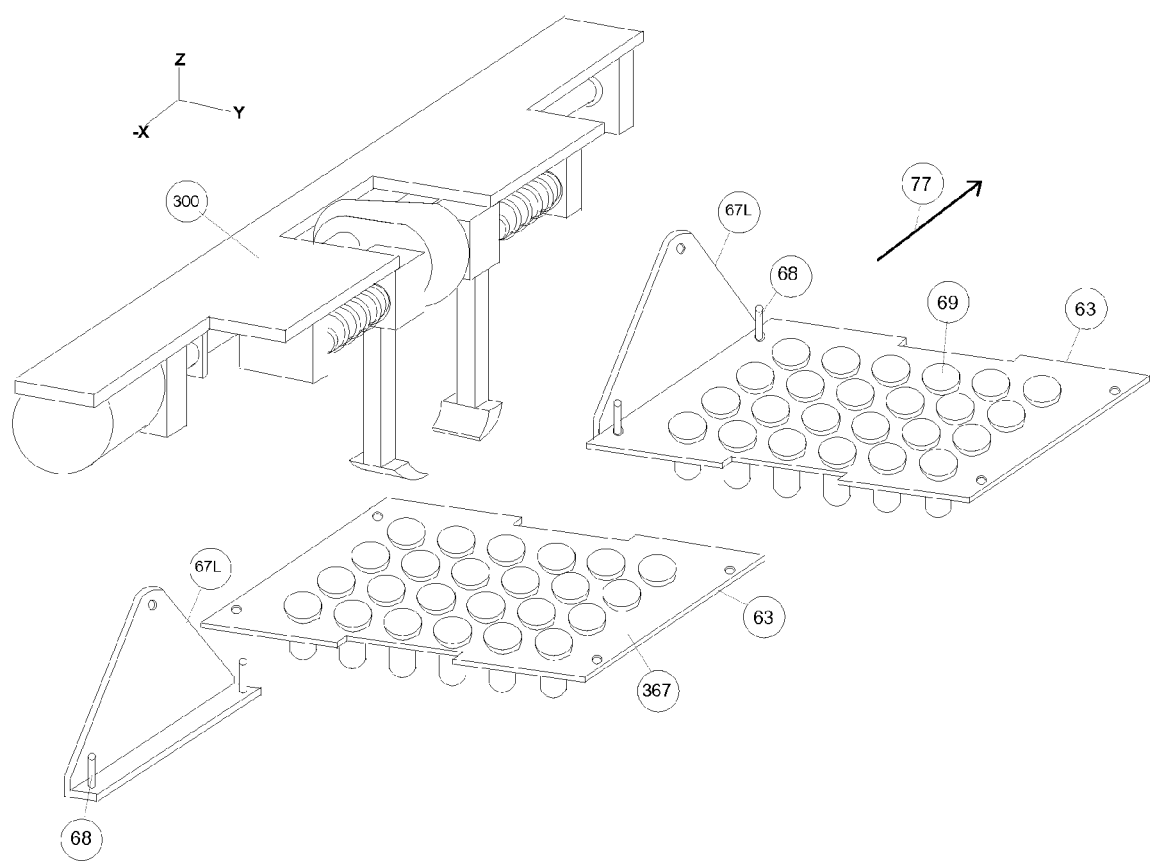

FIG. 116—illustrates 3-D view of loading of removable plate, which could hold up to 24 Items or Containers (tubes/vials, etc.) with Items inside, into Conveyor Carrier via ADVS Automatic Gripper assembly. For simplicity:
 a) Only major components are identified
 b) Not all components are shown
 c) Transition of Container with Item(s) is separated for illustration purposes only.

Figure elements are labeled as follows:

63—Removable plate, which could hold up to 24 Items inside tubes/vials (69).

67L—Left support plate (only one shown), which could hold Carrier suspended from Conveyor assembly.

68—One of holding plate (63) mounting pins, as part of (67)

69—Tube or vial, which could house one or more Items inside.

300—ADVS Automatic Gripper assembly, which could be used for pick-up, transportation, loading and unloading of plate (63), as needed. Gripper assembly could be attached to Horizontal Drive of ADVS Automatic Item Loading/Unloading assembly. As part of ADVS Automatic Item Loading/Unloading assembly, Gripper assembly, under directions of Module Controller, could be moved up/down along "Z-axis" and forward/backward along "X-axis".

367—Area on top of removable plate (63), which could be used for mounting barcode label. Barcode label could contain information about plate and Items inside tubes/vials (69).

Figure 117:
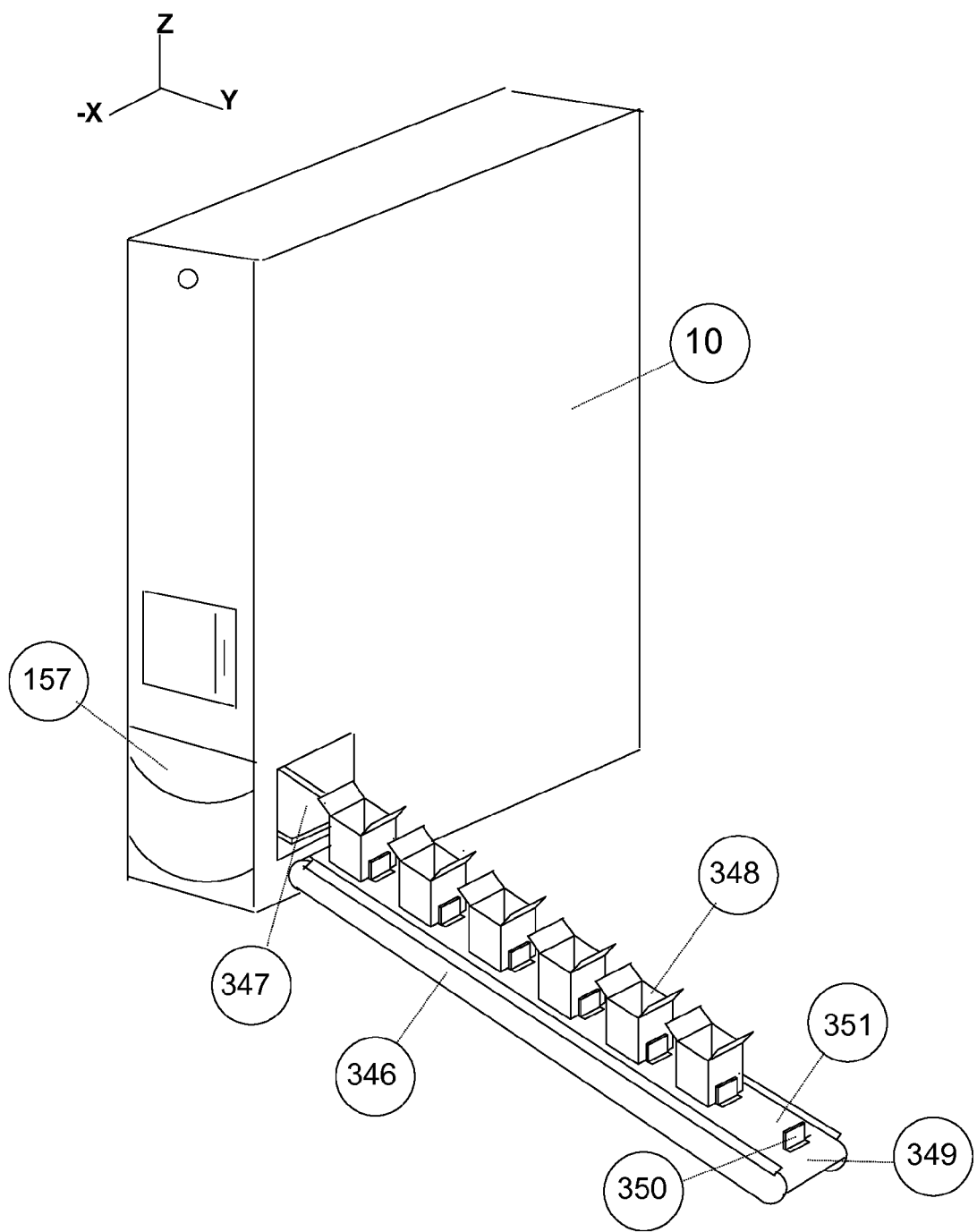

FIG. 117—illustrates ADVS features related to providing automatic means in packing Items being vended for additional security, safety and privacy. Shown—ADVS layout with Item Automatic Packing assembly installed along "Y-axis". Prior to vending requested Item, Module Controller could command Controller of Automatic Packing assembly to advance empty package to Item unloading location. Module Controller could detect presence of empty package, verify package position and barcode label, as needed. Module Controller could then unload requested Item into empty package. Empty packages could be loaded onto Automatic Packing assembly manually or by other ADVS automation means. Rejected by Module Controller empty package(s) could be dropped into reject bin, located under Item unloading platform. Figure elements are labeled as follows:

10—ADVS Module, which is designed with a side opening (347) for mechanical interface to Automatic Packing assembly (352)

157—Pick-up bin for Customer "boxed" Item(s)

346—ADVS Item Automatic Packing assembly. As shown, this assembly could be installed in "Z-Y" plane, and could be inclined 30-60° upward toward Module's side opening (347).

347—Opening inside Module Outer Enclosure for mechanical interfacing with Item Automatic Packing assembly (346)

348—Empty box/Container for housing Item

Figure 118:
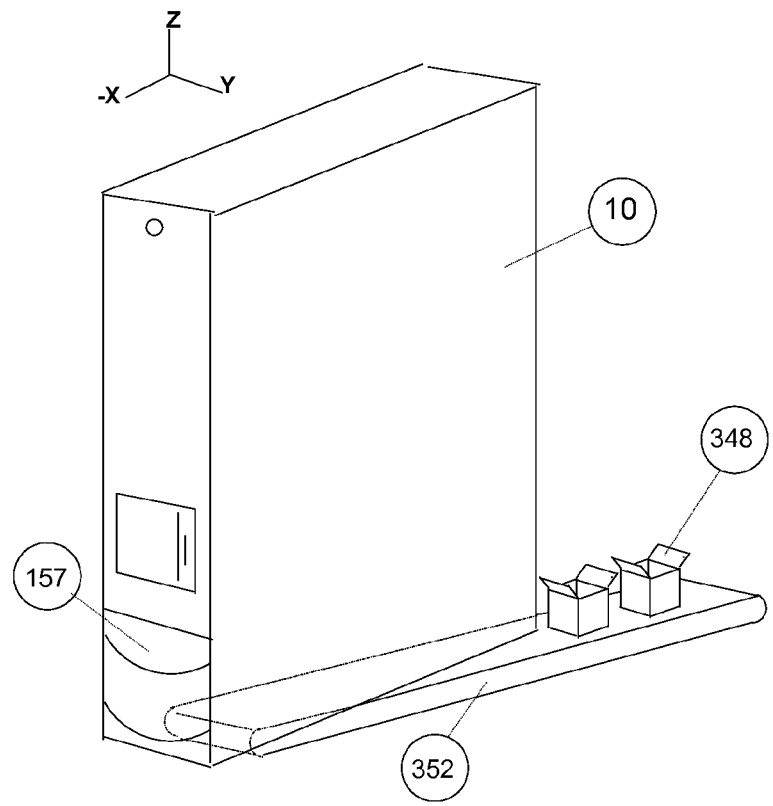

FIG. 118—ADVS layout with Item Automatic Packing assembly, which could be installed along "X-axis". Prior to vending requested Item, Module Controller could command Controller of Automatic Packing assembly to advance empty package to Item unloading location. Module Controller could detect presence of empty package, verify package position and barcode label, as needed. Module Controller could then unload requested Item into empty package. Rejected by Controller empty package(s) could be dropped into reject bin, located under Item unloading platform. Figure elements are labeled as follows:

10—ADVS Module, which is designed with an opening at the bottom (not shown) for mechanical interface to Automatic Packing assembly (352).

157—Pick-up bin for Customer "boxed" Item(s)

348—Empty box/Container for housing Item

352—ADVS Item Automatic Packing assembly. As shown, this assembly could be installed in "Z-X" plane and could be inclined 30-60° upward toward opening in the bottom of Module Outer Enclosure.

Figure 119:
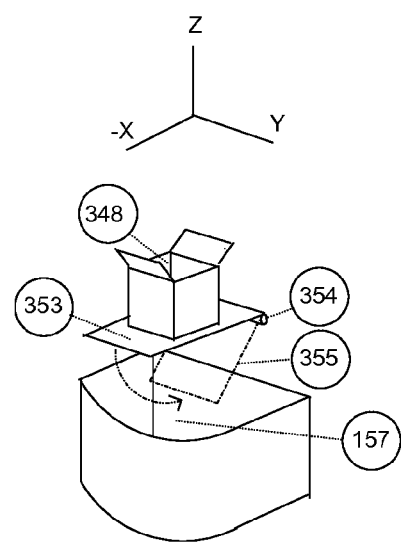

FIG. 119—ADVS Module Item unloading platform detail. Empty box (348) could be placed by Item Automatic Packing assembly on top of unloading platform (353). Requested Item (not shown), could be unloaded out of it's Carrier inside Module by Automatic Gripper assembly and then placed inside empty box (348). The platform (353) could be designed to swing around "Y-axis" via hinge (354) down along "Z-axis" to position labeled (355), as commanded by Module Controller. Platform in its upper position (354) could hold box (348) with Item inside. When commanded by Module Controller, the platform could swing down (position 355), and cause content on top—box with Item inside to fall into Pick-up Bin (157).

Figure elements are labeled as follows:

348—Empty box, which could be used for packing vended/unloaded Item

353—ADVS Module Item unloading platform in it's up position

Figure 120:
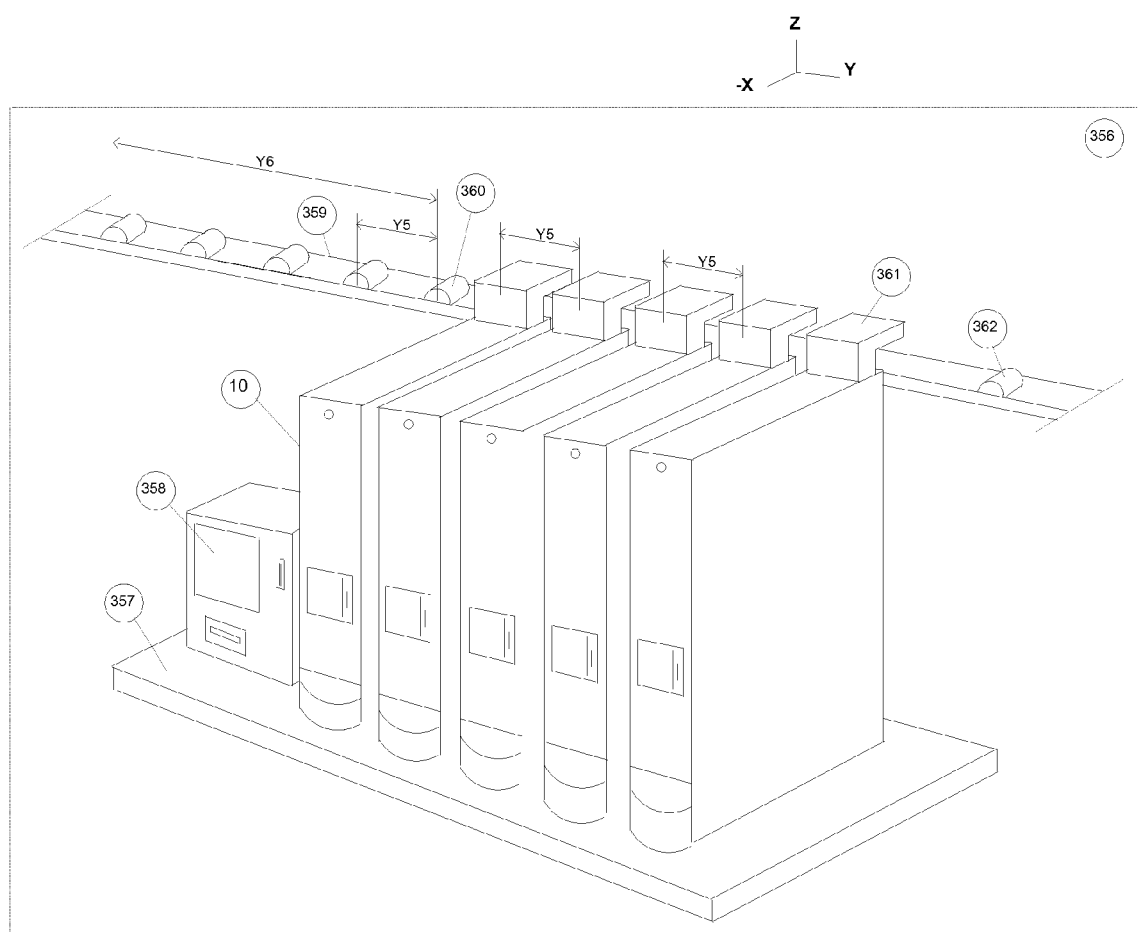

354—Hinge of unloading platform along 'Y-axis", which could allow platform to swing around it 355—Item unloading platform in it's down position FIG. 120—illustrates 3-D view of ADVS in-line automation features. As shown, ADVS Section consisting of Section Computer (358) and five same-type Modules (10) could be mounted on loading platform 357), which could then be rolled to designated automatic feeding location to re-fill content of each Module. Distance Y5 between Modules (10) located on top of platform (357) along "Y-axis" could match respective distance between Items or Containers (360) located on top of conveyor of ADVS Automatic Item Feeding assembly (359). This could significantly increase Item loading efficiency. ADVS Automatic Item Feeding assembly (359) could be modified or extended, as needed, to serve required number of Modules at once. ADVS Automatic Item Feeding assembly (359) could be configured to handle variety of Items (360) in terms of their packaging size and weight. Items could be loaded onto ADVS Automatic Item Feeding conveyor manually or by other ADVS automatic means. In some applications, ADVS Automatic Item Feeding could take place directly at manufacturer of Items, or at location where Item(s) are packaged into Container. Position of Automatic Item Feeding conveyor could be referenced in relation to positions of Modules on platform (357). Automatic Item Feeding Controller could advance it's conveyor, loaded with Items or Containers with Item(s), a distance equal to Y5*N, where N—number of Modules being loaded. As shown, N=5. Module Controller could detect presence of Item or Container on Item Feeding conveyor, and after verification of its barcode, could command it's Automatic Item Loading assembly (361) to pick-up respective Item from conveyor and transfer it to inside respective Module. Rejected Items, one is shown (362), could remain on conveyor, and then removed at appropriate location. Throughout entire operation, Automatic Item Feeding Controller could communicate via ADVS Network real-time, or as needed, with respective Module Controllers to ensure reliable, secured and safe loading of Items. Once each Module is loaded with required quantity of Items, the entire Section could be transported back to it's designated vending location. Same principal (not shown), as needed, could be used for automatic unloading of Items out of Modules on top of (357) via (361) onto conveyor (359). Unloaded Items could be transported by conveyor (359) to designated location, where they could be removed.

Figure elements are labeled as follows:

10—ADVS Module (typical), which could be mounted on top of platform (357). Modules location on platform could be designated, so that the distance Y5 between adjacent Modules along "Y-axis" could match respective distance between Items (360) located on top of conveyor of ADVS Automatic Item Feeding assembly (359).

357—Platform, which could be on wheels, and which could serve for convenient transportation of ADVS Sections or Modules between loading and vending locations. Platform could be referenced in relation to ADVS Automatic Item Feeding assembly (359).

358—ADVS Section Computer, which could be used for supervision of Module's loading activities. Computer, as shown, could include; touch-screen monitor, security access ID card reader, printer, etc.

359—ADVS Automatic Item Feeding assembly, which could be loaded with Items or Containers with Item(s) inside. Items or Containers could be loaded on top of Feeding Conveyor manually or by other automatic means. Automatic Item Feeding assembly could be referenced in relation to platform (357). Controller of Automatic Item Feeding assembly could advance conveyor, with Items on top of it, required distance along "Y-axis".

360—Item or Container with Item(s) inside, which could be loaded on top of ADVS Automatic Item Feeding conveyor (359).

361—ADVS Module Automatic Item Loading assembly (typical), which could pick-up respective Item from conveyor (359) and transfer it into respective Carrier inside Module.

362—Item or Container with Item(s) inside rejected by Controller of one of Modules on platform (351). Rejected Item could remain on Conveyor, and then removed at appropriate location.

FIG. 121 through FIG. 131 illustrate block-diagrams of various ADVS systems and related components. Some components, for simplicity, are represented via graphical symbol inside a box. Interfaces (electrical, software) between various components could be based on industry standard hi-speed serial interfaces (USB, RS232C, etc.), or connection-specific parallel interface.

Figure 121:
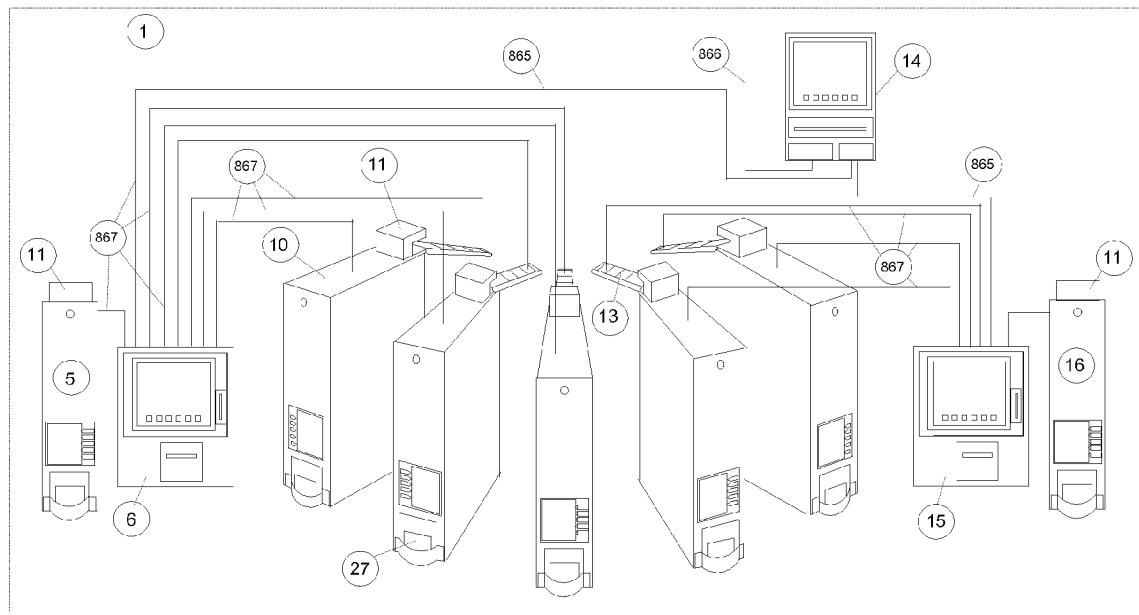
Figure 122:
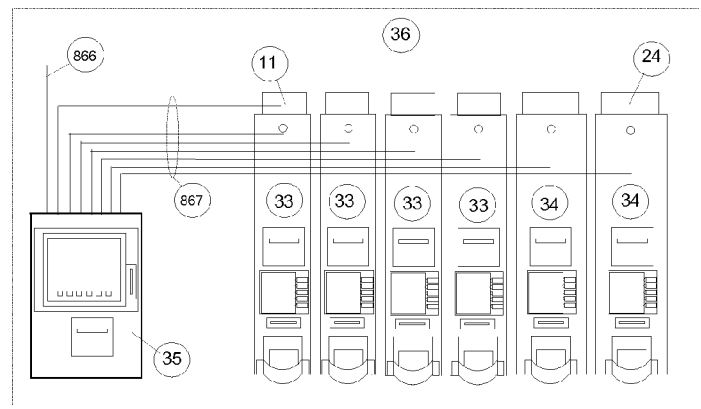
Figure 123:
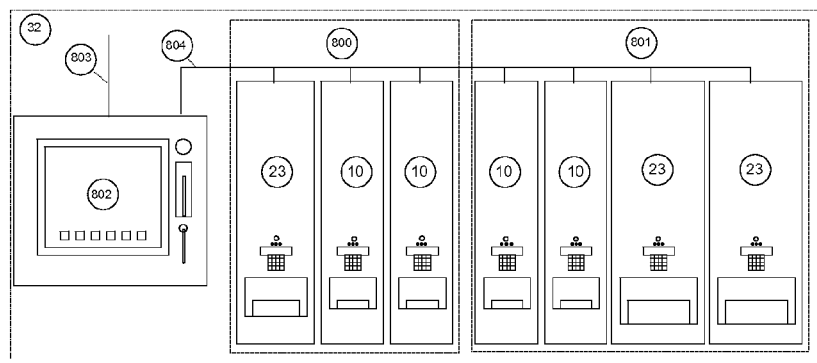

FIG. 121—ADVS configuration as half-star layout. Figure elements are labeled as follows:

1—ADVS 5,16—respectively Dynamic Modules #1 and #2

6,15—respectively Station Computers #1 and #2, which could consist of such components as: touch-screen monitor, card reader for accepting ID/ATM/credit cards, printer, etc.

10—One of Modules (5 shown), which could be used for General or Assigned vending 11—Automatic Item Loading/Unloading assembly, one attached to each Module for Automatic Item Loading/Unloading 13—Automatic Item Feeding assembly, one attached to each Module for Automatic Item Feeding 14—ADVS Host Computer 27—Item Pick-up Bin, Customer side 865—Network interface between Station Computer and ADVS Host Computer 866—Network interface, which could be used for connecting ADVS Host Computer to Corporate computer 867—Hi-speed serial Local Network interface, which could be used as interface between: Station Computer and Modules, Station Computer and Module support components, Module and it's respective support components FIG. 122—ADVS configuration as in-line layout installation. Figure elements are labeled as follows:
- 11—Automatic Item Loading/Unloading assembly, one attached to respective Module for Automatic Item Loading/Unloading
- 24—Automatic Item Loading/Unloading assembly, large size, one attached to respective Module for Automatic Item Loading/Unloading
- 33—Module for General or Assigned vending, outdoor configuration
- 34—Large Module for General or Assigned vending, outdoor configuration
- 35—Station Computer, outdoor configuration
- 36—ADVS Station
- 865—Network interface between Station Computer and ADVS Host Computer
- 867—Hi-speed serial Local Network interface, which could be used as interface between: Station Computer and Modules, Station Computer and Module support components, Module and it's respective support components FIG. 123—Station block-diagram, which illustrates ADVS installation consisting of Main Section and one Satellite Section, which could be used in a variety of applications. Figure elements are labeled as follows:
- 10—Module for Assigned and/or General Vending of small size Items
- 23—Module for Assigned and/or General Vending of medium size Items
- 32—Main Section of Station, which consists of three Modules
- 801—Satellite Section of Station, which consists of four Modules
- 802—Station Computer
- 803—ADVS local area Network for communications between Station Computer (802) and ADVS Host Computer (not shown)
- 804—Station local area Network for communications between Station Computer (802) and Module Controllers FIG. 124—ADVS Module block-diagram, which illustrates an example of installation consisting of ADVS support components: Item Automatic Feeding, Item Automatic Loading and Unloading.
Figure elements are labeled as follows:
- 805—Controller #1 installed at Provider side of Module
- 806—Controller #2 installed at Customer side of Module
- 807—User Interface at Provider side
- 808—dual-synchronized Carrier Conveyor assembly, which could all required support components, such as: Conveyor drive assembly, Sensors (rotary/linear position, safety limits), etc.
- 809—Item Automatic Loading Gripper assembly, Provider side
- 810—Item Automatic Feeding assembly
- 811—Barcode Scan device, which could be used for real-time Item inspection and/or inventory at loading platform
- 812—Barcode Scan device, which could be used for real-time inspection and/or inventory of Carriers and/or Items inside Module
- 813—Interface between Controller #1 and dual-synchronized Conveyor assembly (808)
- 814—Interface between Controller #1 and Barcode Scan device(s)
- 815—Interface between Controller #1 and Item Loading assembly (809)
- 816—Interface between Controller #1 and Item Feeding assembly (810)
- 817—Interface between Controller #1 and Controller #2
- 818—Network interface between Controller #1 and Station Computer (not shown)
- 819—Serial hi-speed interface (USB, RS232C, etc.) between Controller #2 and devices
- 820—User Interface at Customer side
- 821—Security Camera with hi-speed serial interface (819)
- 822—Signature Pad with hi-speed serial interface (819)
- 823—Item Automatic Unloading Gripper assembly
- 824—Printer with hi-speed serial interface (819)
- 825—Barcode Scan device, which could be used for real-time Item final inspection/verification and inventory control at unloading platform
- 826—Barcode Scan device, which could be used for Item final inspection inside respective Carrier prior to be picked-up by Automatic Gripper assembly and placed on top of unloading platform
- 827—Magnetic Card Reader with hi-speed serial interface (819)
- 828—Item Packing Feeding assembly
- 829—Interface between Controller #2 and User Interface, Customer side
- 830—Interface between Controller #2 and Item Packing Feeding assembly (828)
- 831—Interface between Controller #2 and Automatic Unloading assembly (823)
- 852—Interface between Controller #1 and User Interface, Provider side FIG. 125—Item Automatic Gripper Loading/Unloading assembly block-diagram.
Figure elements are labeled as follows:
- 838—Controller of a main assembly (Module, portable Inner Enclosure, etc.), which could be served by Item Automatic Gripper assembly
- 839—Horizontal Drive ("X-drive") assembly
- 840—Vertical Drive ("Z-drive") assembly
- 841—Gripper Drive assembly
- 842—Horizontal Drive Rotary Encoder assembly, which could include optical Sensor for detecting Encoder Flags
- 843—Vertical Drive Rotary Encoder assembly, which could include optical Sensor for detecting Encoder Flags
- 844—Gripper Drive Rotary Encoder assembly, which could include optical Sensor for detecting Encoder Flags
- 845—Barcode Scan device assembly for Item(s) inspection/verification prior to loading
- 846—Interface between Controller (838) and Rotary Encoder assembly, which could be typical for (842,843, 844)
- 849—Interface between Controller (838) and Horizontal Drive assembly (839)
- 850—Interface between Controller (838) and Vertical Drive assembly (840)
- 851—Interface between Controller (838) and Gripper Drive assembly (841)
- 814—Interface between Controller (838) and Barcode Scan device (845)

Figure 126:
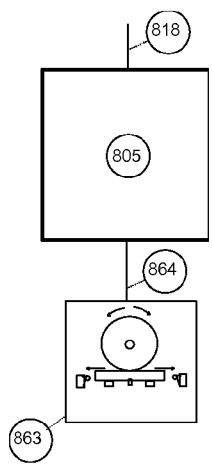
Figure 127:
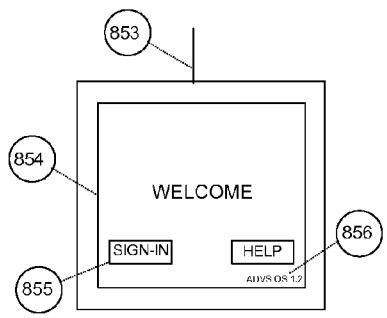
Figure 128:
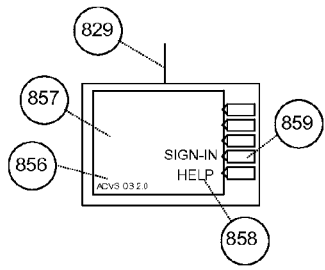
Figure 129:
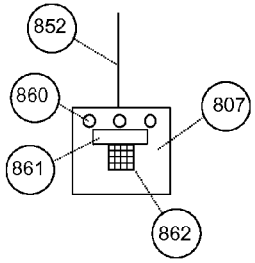
Figure 130:
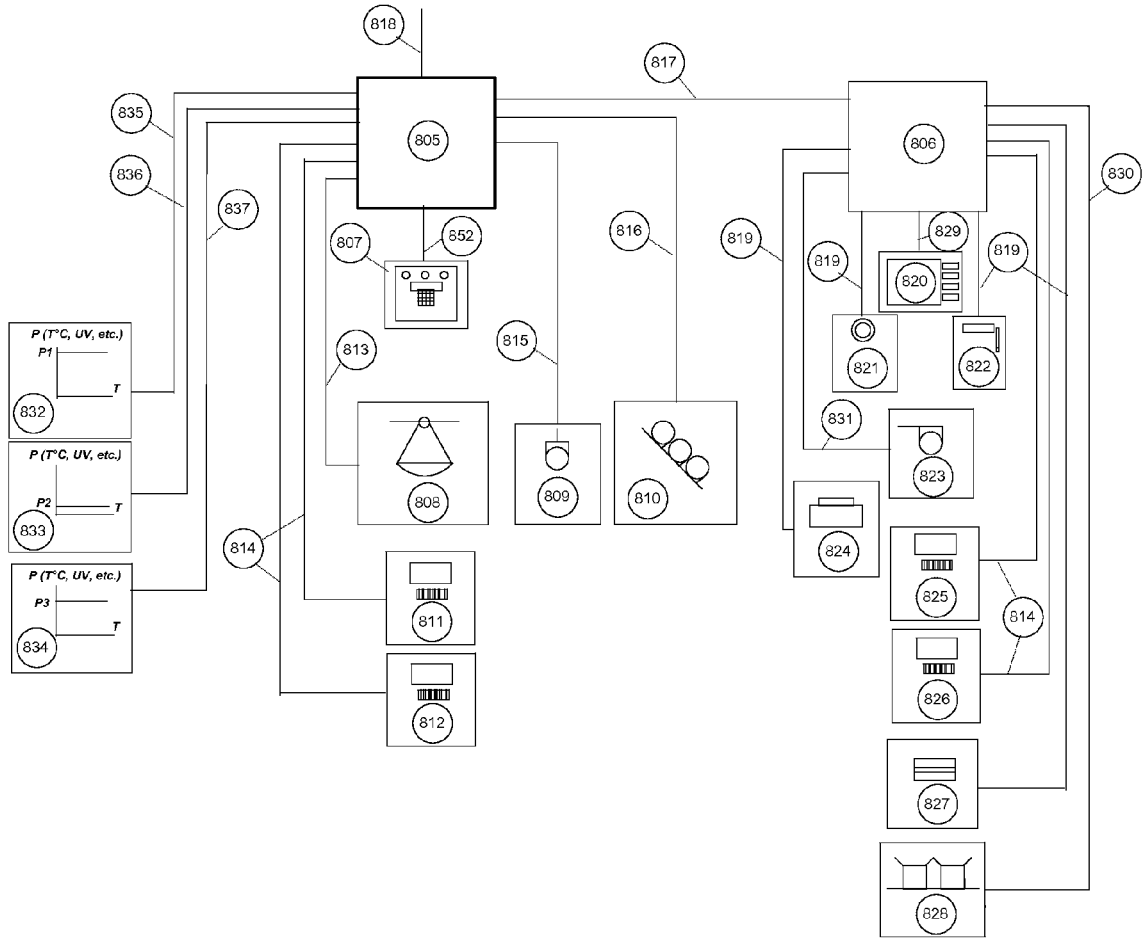

FIG. 126—block-diagram of Access Gate assembly. This assembly could be closed to secure/control access to Item(s) inside Module or portable Inner Enclosure, and then could be opened during Item loading and unloading. Figure elements are labeled as follows:
- 805—Controller #1 installed at Provider side of Module
- 818—Network interface between Controller #1 and Station Computer (not shown)
- 863—Access Door Drive assembly, which could include all necessary elements such as: motor, drive mechanics, Sensors (position, Safety, etc.), which could be used by respective Controller to ensure safe, accurate and reliable operation FIG. 127—block-diagram of User Interface Computer. Displays on the screen for illustration purposes only. User interface program and operating system could be designed according to requirements of a specific application. Figure elements are labeled as follows:
854—Touch-Screen Display
855—Example of User commands, "SIGN-IN" as shown
856—User interface software version installed
853—Interface to Module Controller FIG. 128—block-diagram of User Interface Terminal. Displays on the screen for illustration purposes only. User interface program and operating system could be designed according to requirements of a specific application. Figure elements are labeled as follows:
857—User Interface Terminal Display
859—User data entry and/or control keypad
858—User commands made available under supervision of Module Controller
856—User interface software version installed
829—Interface to Module Controller FIG. 129—block-diagram of User Interface Panel. Figure elements are labeled as follows:
807—User Interface Panel
861—LCD display
862—User data entry and/or control keypad
860—Diagnostic LED's
852—Interface to Module Controller FIG. 130—ADVS Process Module block-diagram, which is the same as the one shown on FIG. 124, but with addition of three Item Processing chambers. Each Processing chamber could be configured to control one specified parameter. Figure elements are labeled as follows:
832—Item Processing chamber #1 with 1-zone Process control
833—Item Processing chamber #2 with 1-zone Process control
834—Item Processing chamber #3 with 1-zone Process control
835—Interface between Controller #1 and Item Processing chamber #1 (832)
836—Interface between Controller #1 and Item Processing chamber #2 (833)
837—Interface between Controller #1 and Item Processing chamber #3 (834)

Figure 124:
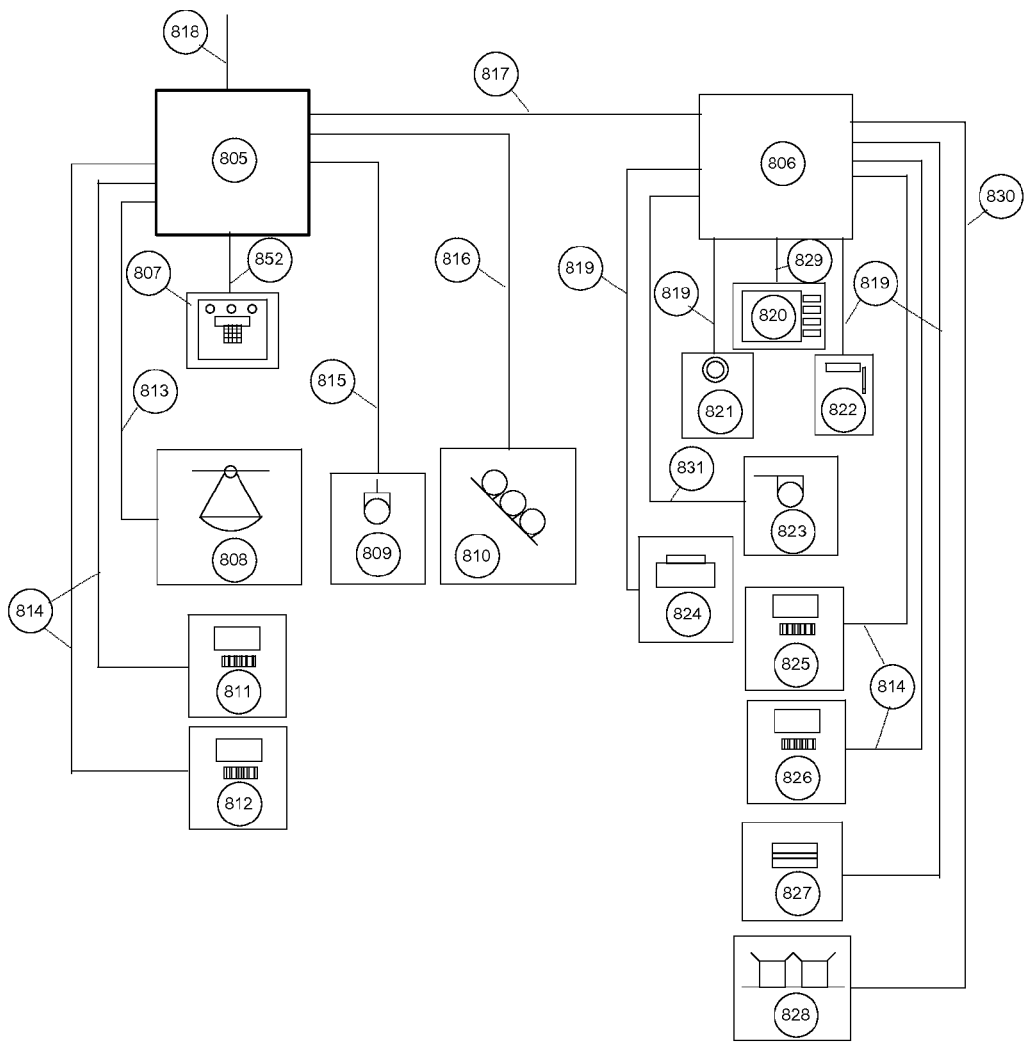
Figure 125:
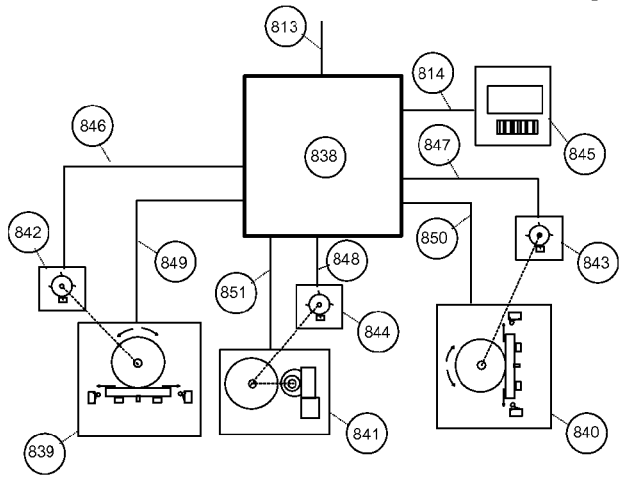

Remaining elements are labeled same as on FIG. 124.

Figure 131:
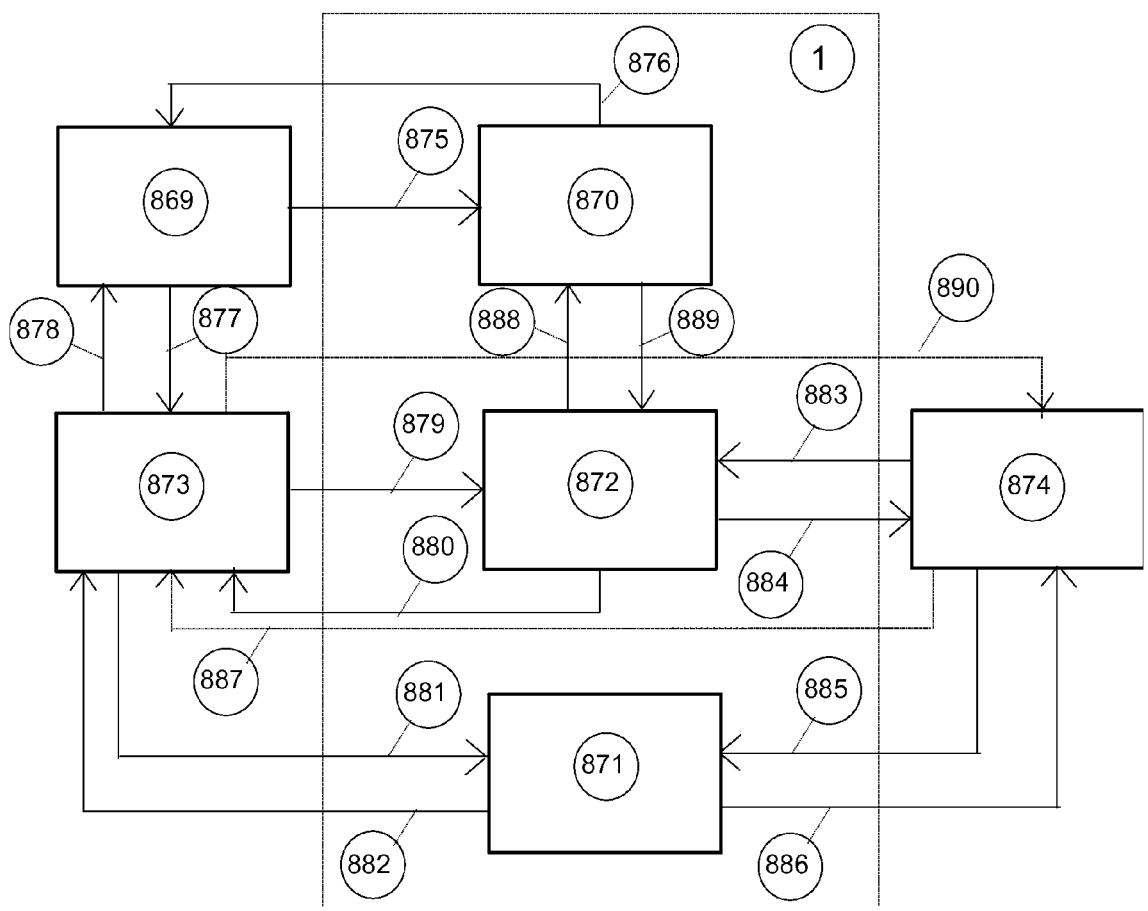

FIG. 131—ADVS block-diagram, which illustrates it's ability to be installed as an automatic distributed closed-loop Item Processing and Vending System, configuration and layout of which could be optimized in terms of productivity, efficiency, quality, safety, esthetics for number of vending applications such as: vending general items and/or vending prescribed items at pharmacy or drug store; vending general items and/or vending assigned items at retail operations; vending money rolls at any cash operated business; storage-processing-vending of Items at biomedical research or service laboratory. Inventory of Items, including number of parameters, which could be unique for each Item, within all components of the ADVS, could be automatically monitored in real time by respective Controllers and Computers, and optimized accordingly to requirements of a specific application. Figure elements are labeled as follows:
869—Manufacturer of Items. In this configuration, manufacturer of Items could be responsible for on-time supply of Items, requested by Provider. Manufacturer could utilize ADVS off-site loading and delivery sub-system (871) to supply Items in a format of pre-loaded portable Inner Enclosures.
870—ADVS off-site loading and delivery sub-system, which could be utilized for Items loading into portable Inner Enclosures at a remote location, such as: manufacturer, distributor, etc. and then transporting loaded Inner Enclosures (by truck, train, ship or air) to designated location of Provider.
871—ADVS Item Dynamic Sub-system, which could have a reserved capacity of empty Carriers, which could be used by Provider or the System for prompt availability of specific Items in a relatively short period of time from the moment request was received from a Customer.
872—ADVS Item processing sub-system, which could be used for vending Regular and/or Assigned Items to Customers, as needed.
873—Provider of Items
874—Customer
875—Link: Manufacturer (869)—to—ADVS off-site loading sub-system (870). The ADVS off-site loading sub-system (870) could be located at the manufacturer (869) site, and used for loading Items into respective portable Inner Enclosures. This Link could include: information request/exchange between respective Computers and/or Controllers over ADVS Network, and physical transfer of Items, as needed. Information could include: availability of specific Items, quality report, order status, etc.
876—Feedback: ADVS off-site loading sub-system (870)—to—Manufacturer (869), which could include: information response/exchange over ADVS Network and physical transfer/return of rejected Items, as needed. Information could include: quality report, order request, etc.
877—Feedback: Manufacturer (869)—to—Provider (873), which could include: information response/exchange between respective Computers and/or Controllers over ADVS Network and physical transfer of Items loaded inside portable Inner Enclosures, as needed. Information could include: availability of specific Items, quality report, order status, etc.
878—Link: Provider (873)—to—Manufacturer (869), which could include: information request/exchange between respective Computers and/or Controllers over ADVS Network and physical transfer/return of rejected Items, as needed. Information could include: order request for specific Items, quality report, etc.
880—Link: Provider (873)—to—ADVS processing sub-system (872), which could include: information request/exchange between respective Computers and/or Controllers over ADVS Network and physical transfer/return of rejected Items, as needed. Information could include requests to: vend specific Item, available inventory data, status of operations, etc.
881—Feedback ADVS processing sub-system (872)—to—Provider (873), which could include: information response/exchange between respective Computers and/or Controllers over ADVS Network and physical transfer of requested Item(s) either to Customer(s) or Provider. Information could include: availability of specific Items, quality report, request status, etc.
882—Feedback ADVS Dynamic Sub-System (871)—to—Provider (873), which could include: information response/exchange between respective Computers and/or Controllers over ADVS Network and physical transfer of requested Item(s) either to Customer(s) or Provider. Information could include: availability of specific Items, quality report, request status, etc.

883—Link: Customer (874)—to—ADVS processing sub-system (872), which could include: information request/exchange between Customer and respective user interface Computer and/or Controller. Information could include requests to: vend specific Item, general/specific assistance, etc.
884—Feedback: ADVS processing sub-system (872)—to—Customer (874)
885—Link: Customer (874)—to—ADVS Dynamic Sub-System (871)
886—Feedback: ADVS Dynamic Sub-System (871)—to—Customer (874)
887—Link: Customer (874)—to—Provider (873)
888—Link: ADVS off-site loading sub-system (870)—to—ADVS Item processing sub-system (872)
889—Feedback ADVS Item processing sub-system (872)—to—ADVS off-site loading sub-system (870)

The invention claimed is:

1. An apparatus comprising:
  a conveyor timing belt assembly including one or more bearing assemblies, the conveyor timing belt assembly including a first surface and a second surface,
  wherein the first surface is substantially smooth and the second surface is opposite the first surface and includes a plurality of conveyor timing belt engagement teeth or slots designed to provide reliable engagement with the respective drive or alignment pulleys,
  wherein each of the one or more bearing assemblies are mounted fixedly and permanently to the first surface of the conveyor timing belt and opposite to the second surface of the conveyor timing belt,
  wherein the one or more bearing assemblies are aligned substantially along a longitudinal center of the first surface of the conveyor timing belt,
  wherein the one or more bearing assemblies do not extend beyond the width of the conveyor timing belt and do not extend through the second surface of the conveyor timing belt,
  wherein each of the one or more bearing assemblies include a cavity configured to allow a shaft of an item carrier to be inserted, the conveyor timing belt guided by at least two pulleys assemblies designed to match the timing belt engagement teeth or slots to ensure reliable engagement between the teeth or slots of the second surface of the conveyor timing belt and the pulley assemblies;
  wherein the at least one conveyor timing belt assembly is supported by at least two pulley assemblies will advance and maintain carriers in generally upright position at all times;
  wherein an inner enclosure is configured to contain the conveyor timing belt including the one or more bearing assemblies, the at least two pulleys assemblies, and each of the item carriers; and
  wherein an outer enclosure is configured to allow the inner enclosure to be slideably inserted into the outer enclosure.

2. The apparatus of claim 1, wherein each of the one or more bearing assemblies includes the cavity having an inner race into which the shaft of the item carrier is inserted allowing the item carrier to swing about the axis of the inner race, and wherein the outer enclosure is configured to include a channel to mate with a slot of the inner enclosure.

3. The apparatus of claim 1, wherein the outer enclosure is configured to include a slot to mate with a channel of the inner enclosure.

4. The apparatus of claim 1 further comprising:
  a controller to track bar codes applied to at least one of the inner enclosure, outer enclosure, item carrier, and items carried by the item carrier.

5. The apparatus of claim 1, wherein the conveyor includes a plurality of items carriers.

* * * * *